(12) United States Patent
Hoffman

(10) Patent No.: US 8,639,629 B1
(45) Date of Patent: *Jan. 28, 2014

(54) SYSTEM AND METHOD FOR ACCESSING AN ONLINE USER ACCOUNT REGISTRY VIA A THIN-CLIENT UNIQUE USER CODE

(75) Inventor: Ned Hoffman, Sebastopol, CA (US)

(73) Assignee: Nexus Payments, LLC, Reno, NV (US)

( * ) Notice: Subject to any disclaimer, the term of this patent is extended or adjusted under 35 U.S.C. 154(b) by 1137 days.

This patent is subject to a terminal disclaimer.

(21) Appl. No.: 11/978,067

(22) Filed: Oct. 27, 2007

Related U.S. Application Data

(63) Continuation-in-part of application No. 11/904,283, filed on Sep. 25, 2007, which is a continuation-in-part of application No. 11/899,384, filed on Sep. 4, 2007, which is a continuation-in-part of application No. 11/823,020, filed on Jun. 25, 2007, which is a continuation-in-part of application No. 11/804,167, filed on May 16, 2007, which is a continuation-in-part of application No. 11/636,231, filed on Dec. 6, 2006, which is a continuation-in-part of application No. 11/523,222, filed on Sep. 18, 2006, which is a continuation-in-part of application No. 11/517,873, filed on Sep. 8, 2006, which is a continuation-in-part of application No. 11/502,472, filed on Aug. 9, 2006, which is a continuation-in-part of application No. 11/394,417, filed on Mar. 31, 2006, which is a continuation-in-part of application No. 11/305,448, filed on Dec. 15, 2005.

(60) Provisional application No. 60/967,278, filed on Sep. 1, 2007, provisional application No. 60/876,417, filed on Dec. 20, 2006, provisional application No. 60/850,374, filed on Oct. 6, 2006, provisional application No. 60/818,953, filed on Jul. 5, 2006, provisional application No. 60/802,265, filed on May 19, 2006, provisional application No. 60/749,901, filed on Dec. 12, 2005, provisional application No. 60/723,859, filed on Oct. 4, 2005, provisional application No. 60/721,831, filed on Sep. 28, 2005, provisional application No. 60/708,979, filed on Aug. 16, 2005, provisional application No. 60/669,941, filed on Apr. 9, 2005, provisional application No. 60/650,367, filed on Feb. 2, 2005.

(51) Int. Cl.
*G06Q 20/00* (2012.01)

(52) U.S. Cl.
USPC .................... 705/67; 705/64; 705/76; 705/44

(58) Field of Classification Search
USPC ...................................................... 705/50–79
See application file for complete search history.

(56) References Cited

U.S. PATENT DOCUMENTS

| | | |
|---|---|---|
| 5,485,519 A | 1/1996 | Weiss |
| 5,585,787 A | 12/1996 | Wallerstein |

(Continued)

OTHER PUBLICATIONS

U.S. Appl. No. 10/192,488, filed Mar. 11, 2004, Michael S. Berardi.

(Continued)

*Primary Examiner* — Jacob C. Coppola
(74) *Attorney, Agent, or Firm* — Antonio Papageorgiou; Ostrow Kaufman LLP

(57) ABSTRACT

The invention is a system and method for accessing an online user account registry, comprising: a) Approving access to an online user account registry via a verification platform comparing a bid verification data, comprising a unique user code provided from a nexus access token, with a registered verification data; b) Accessing the online user account registry via a rule-module invoked from a rule-module nexus, said online user account registry comprising a plurality of financial accounts of the user; Whereby an online account registry, comprising a plurality of financial accounts, is accessed via a unique user code provided from a nexus access token.

20 Claims, 107 Drawing Sheets

(56) References Cited

U.S. PATENT DOCUMENTS

| | | |
|---|---|---|
| 5,613,012 A | 3/1997 | Hoffman |
| 5,696,824 A | 12/1997 | Walsh |
| 5,802,199 A | 9/1998 | Pare et al. |
| 5,819,226 A | 10/1998 | Gopinathan |
| 5,955,961 A | 9/1999 | Wallerstein |
| 6,040,783 A | 3/2000 | Houvener |
| 6,041,314 A | 3/2000 | Davis |
| 6,529,880 B1 | 3/2003 | McKeen |
| 6,547,040 B2 | 4/2003 | Goodwin, III |
| 6,685,088 B1 | 2/2004 | Royer |
| 6,732,919 B2 | 5/2004 | Macklin |
| 7,096,198 B1 | 8/2006 | Cuervo |
| 7,191,150 B1 | 3/2007 | Shao |
| 2001/0029493 A1 | 10/2001 | Pare et al. |
| 2001/0034720 A1 | 10/2001 | Armes |
| 2001/0042016 A1* | 11/2001 | Muyres et al. .................. 705/14 |
| 2002/0062249 A1 | 5/2002 | Iannacci |
| 2002/0083067 A1* | 6/2002 | Tamayo et al. ............... 707/100 |
| 2002/0091635 A1 | 7/2002 | Dilip |
| 2002/0111917 A1 | 8/2002 | Hoffman |
| 2002/0128981 A1 | 9/2002 | Kawan |
| 2002/0147653 A1 | 10/2002 | Shmueli |
| 2004/0093281 A1 | 5/2004 | Silverstein |
| 2004/0128249 A1 | 7/2004 | Hoffman |
| 2004/0206814 A1 | 10/2004 | Kawai |
| 2004/0232225 A1 | 11/2004 | Bishop |
| 2004/0238620 A1 | 12/2004 | Cohagan |
| 2005/0004866 A1 | 1/2005 | Bonalle |
| 2005/0015332 A1 | 1/2005 | Chen |
| 2005/0033688 A1 | 2/2005 | Peart |
| 2005/0114367 A1* | 5/2005 | Serebrennikov .............. 707/100 |
| 2005/0144133 A1 | 6/2005 | Hoffman |
| 2005/0154664 A1* | 7/2005 | Guy et al. ....................... 705/35 |
| 2005/0177521 A1 | 8/2005 | Crosson Smith |
| 2005/0246278 A1 | 11/2005 | Gerber |
| 2006/0064372 A1 | 3/2006 | Gupta |
| 2007/0008179 A1* | 1/2007 | Hedley et al. ................. 340/928 |

OTHER PUBLICATIONS

U.S. Appl. No. 09/737,277, filed Feb. 28, 2002, Michael Maritzen.
U.S. Appl. No. 09/895,795, filed Mar. 7, 2002, Akara Isaibashi.
U.S. Appl. No. 09/737,277, filed Feb. 28, 2002, C. Michael Maritzen.
U.S. Appl. No. 09/815,795, filed Mar. 7, 2002, Akira Ishibashi.

* cited by examiner

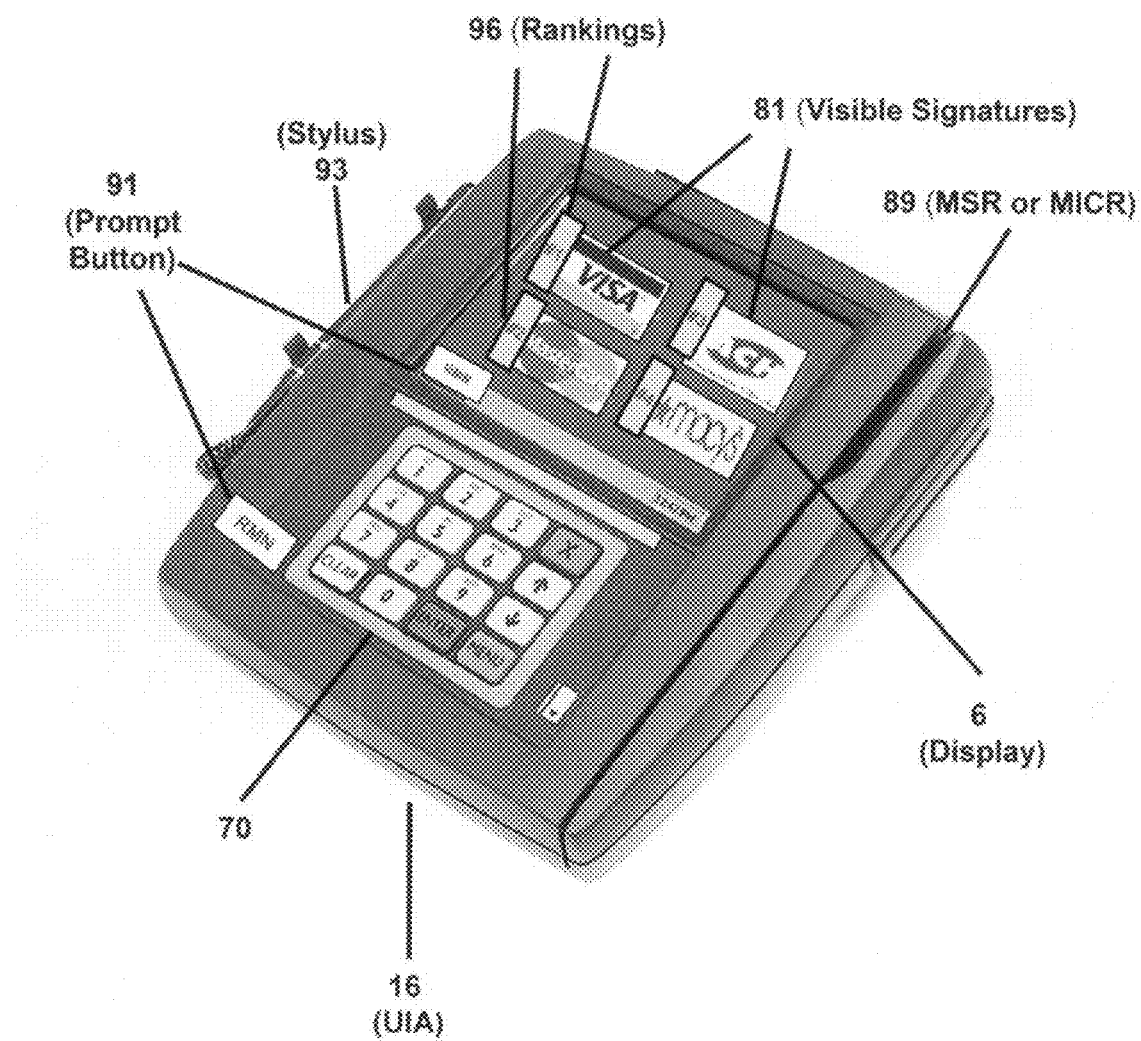

FIG. 3E
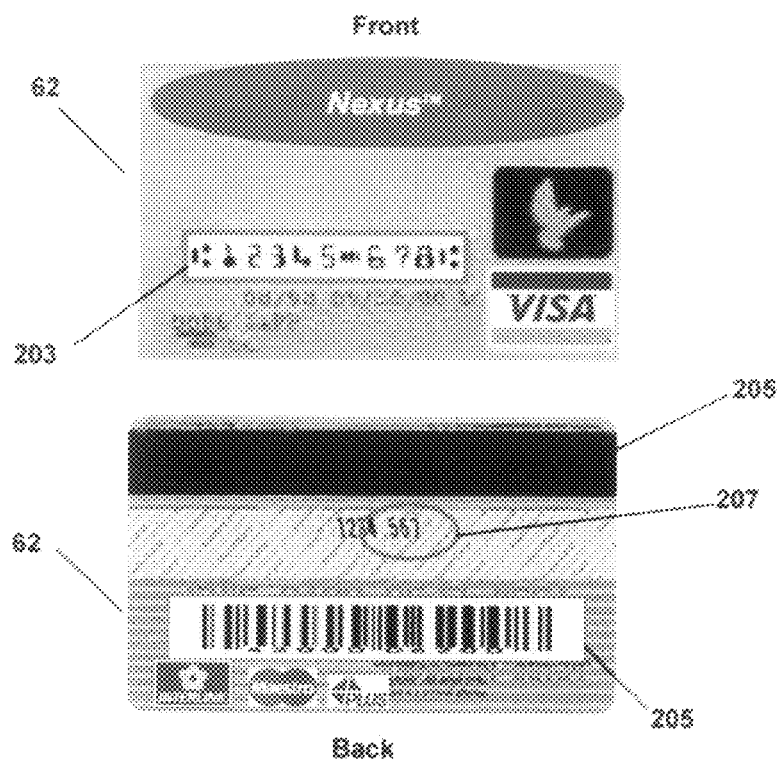
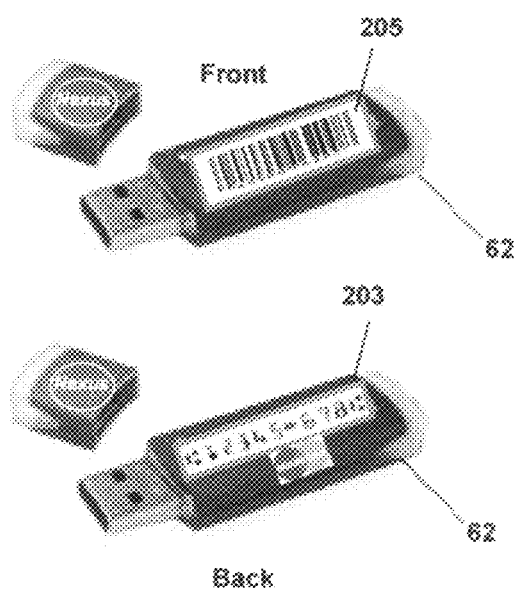

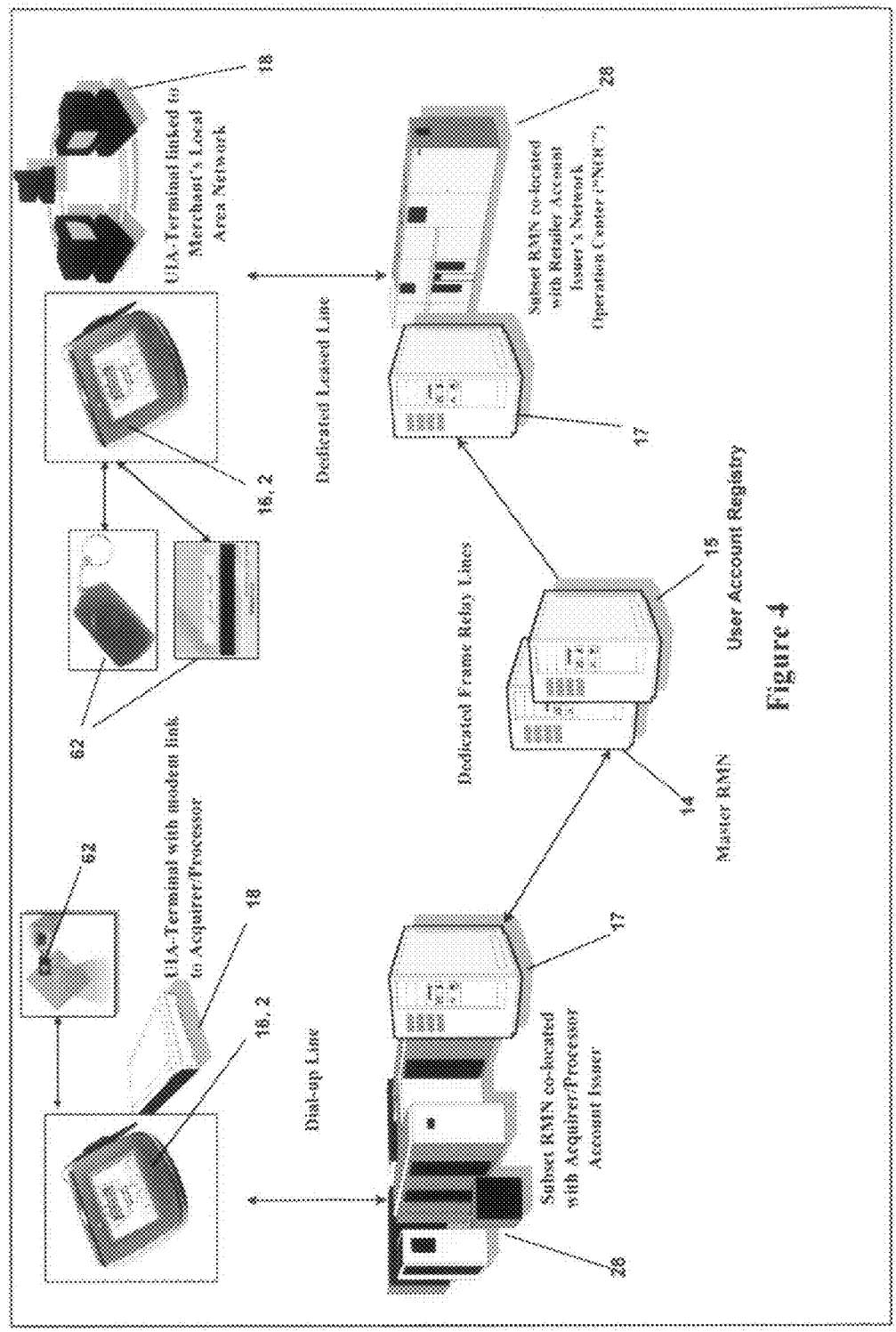

Financial Transaction Request Packet

251

Financial Transaction Response Packet

252

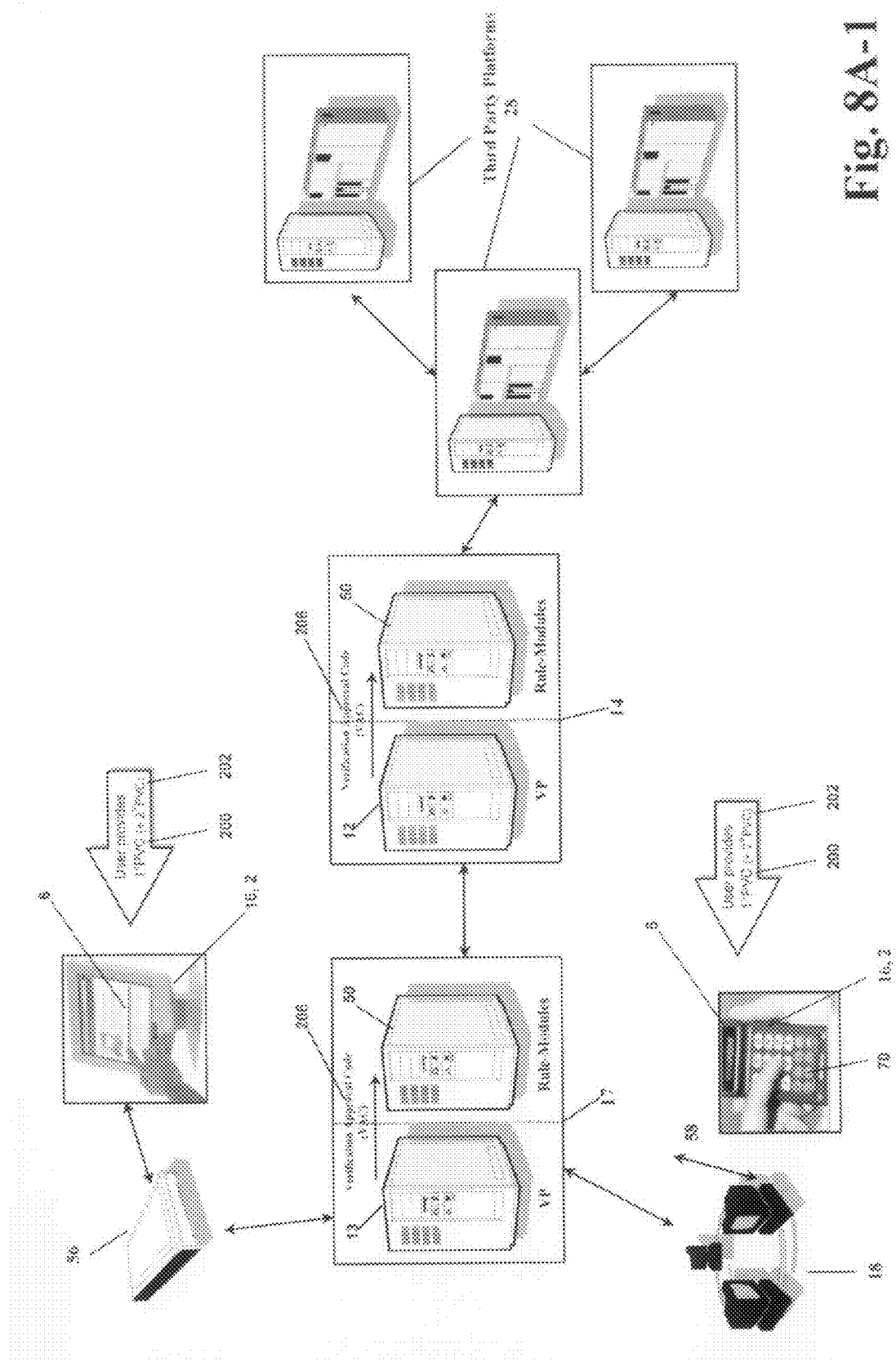

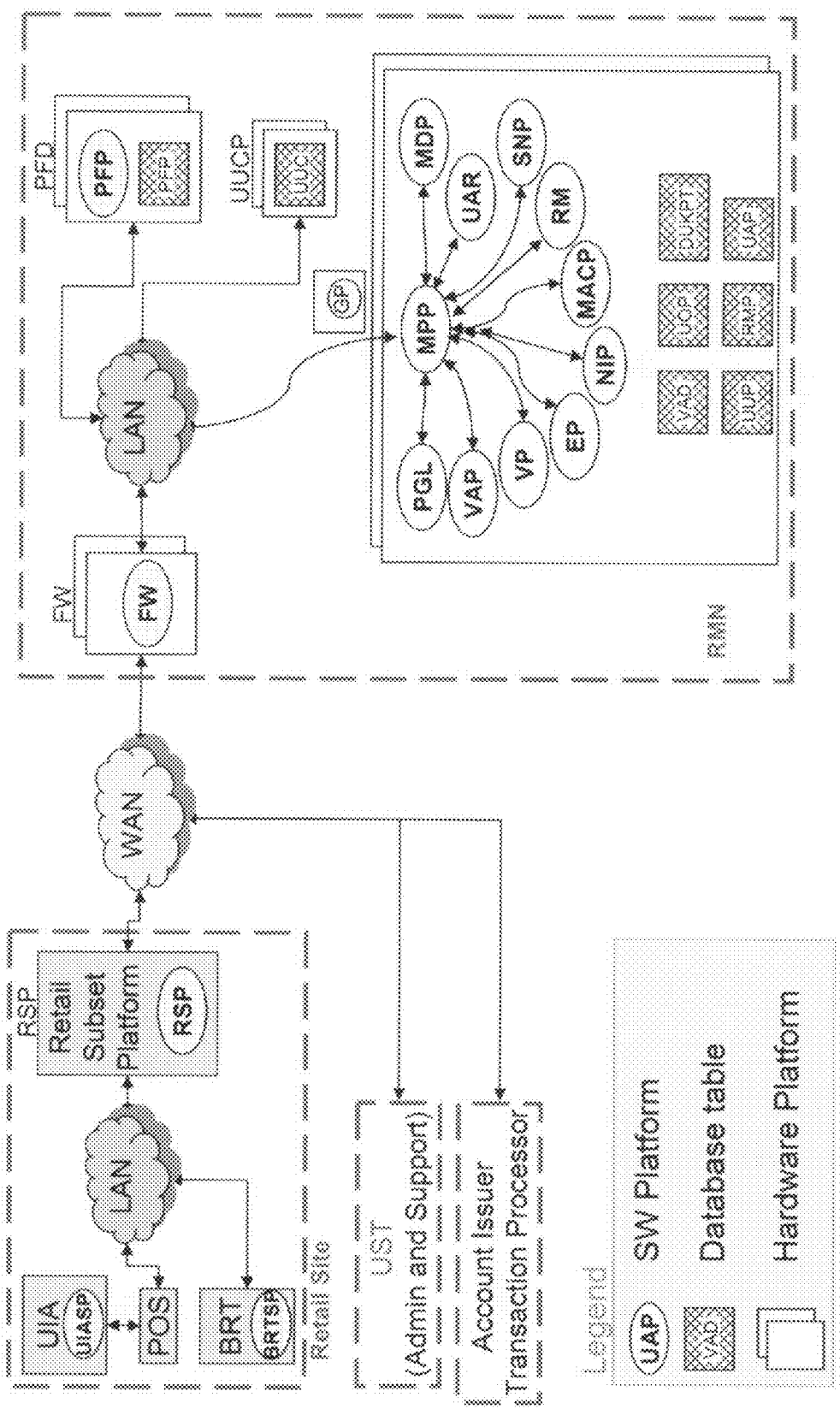

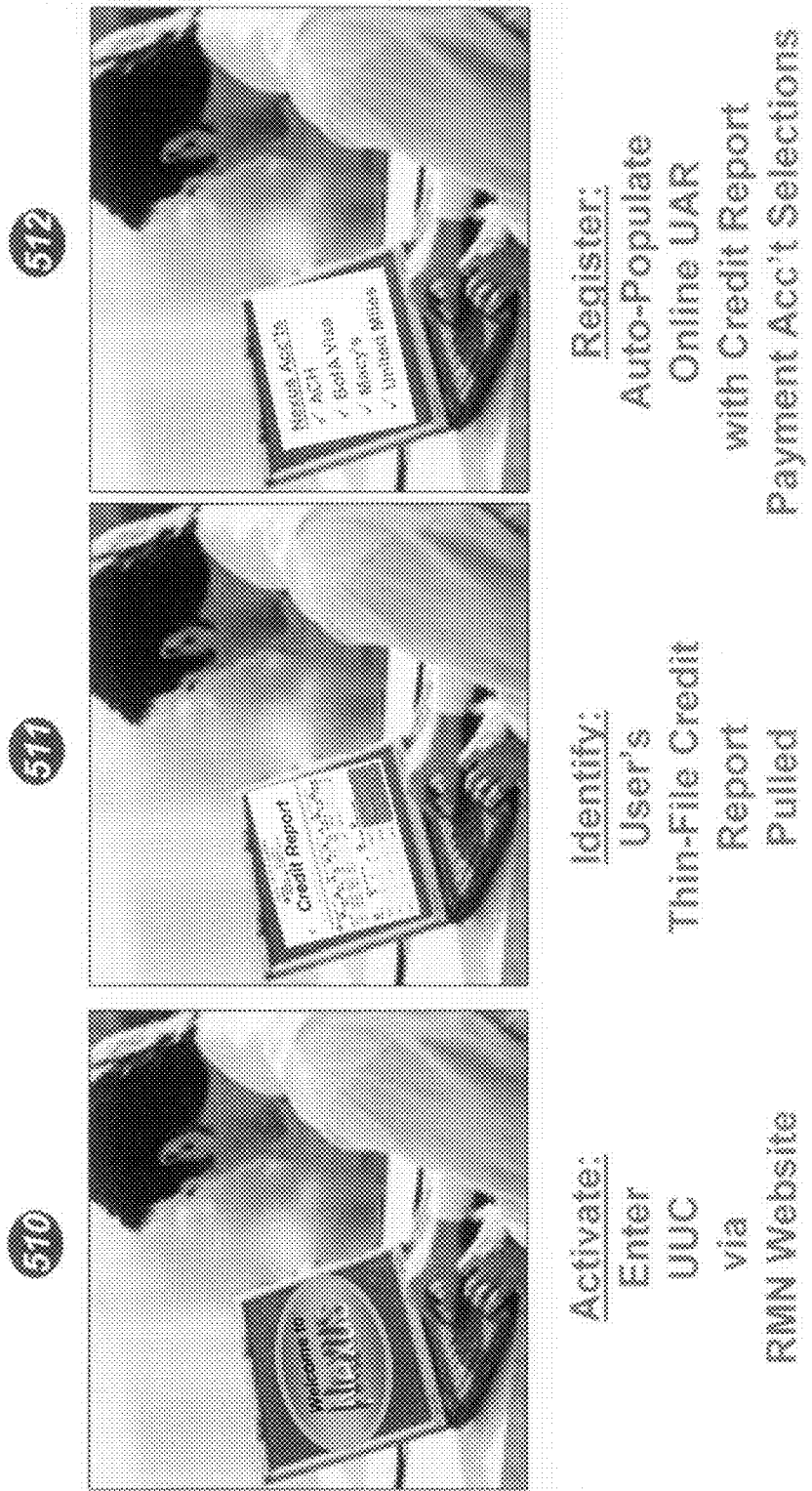

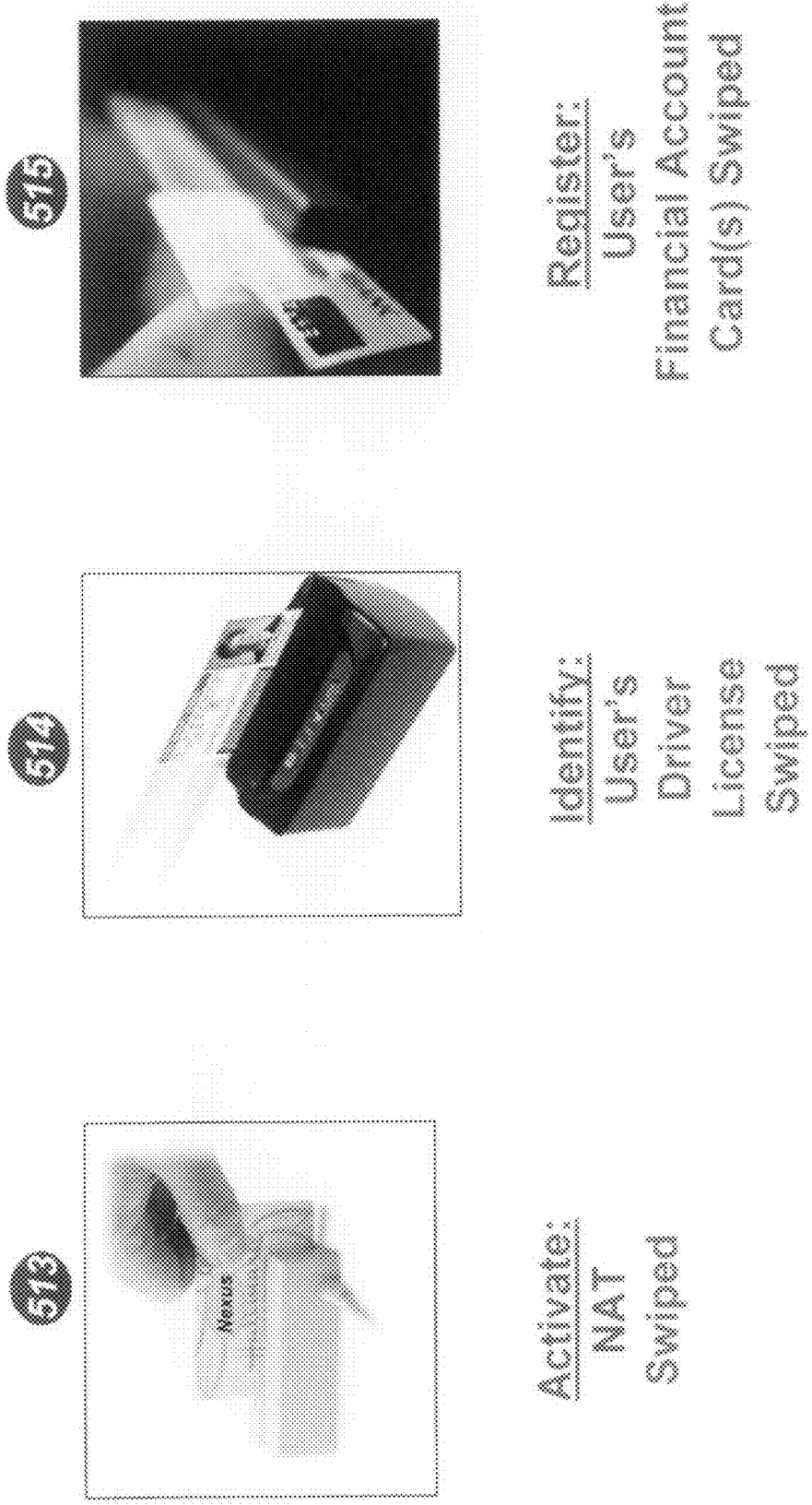

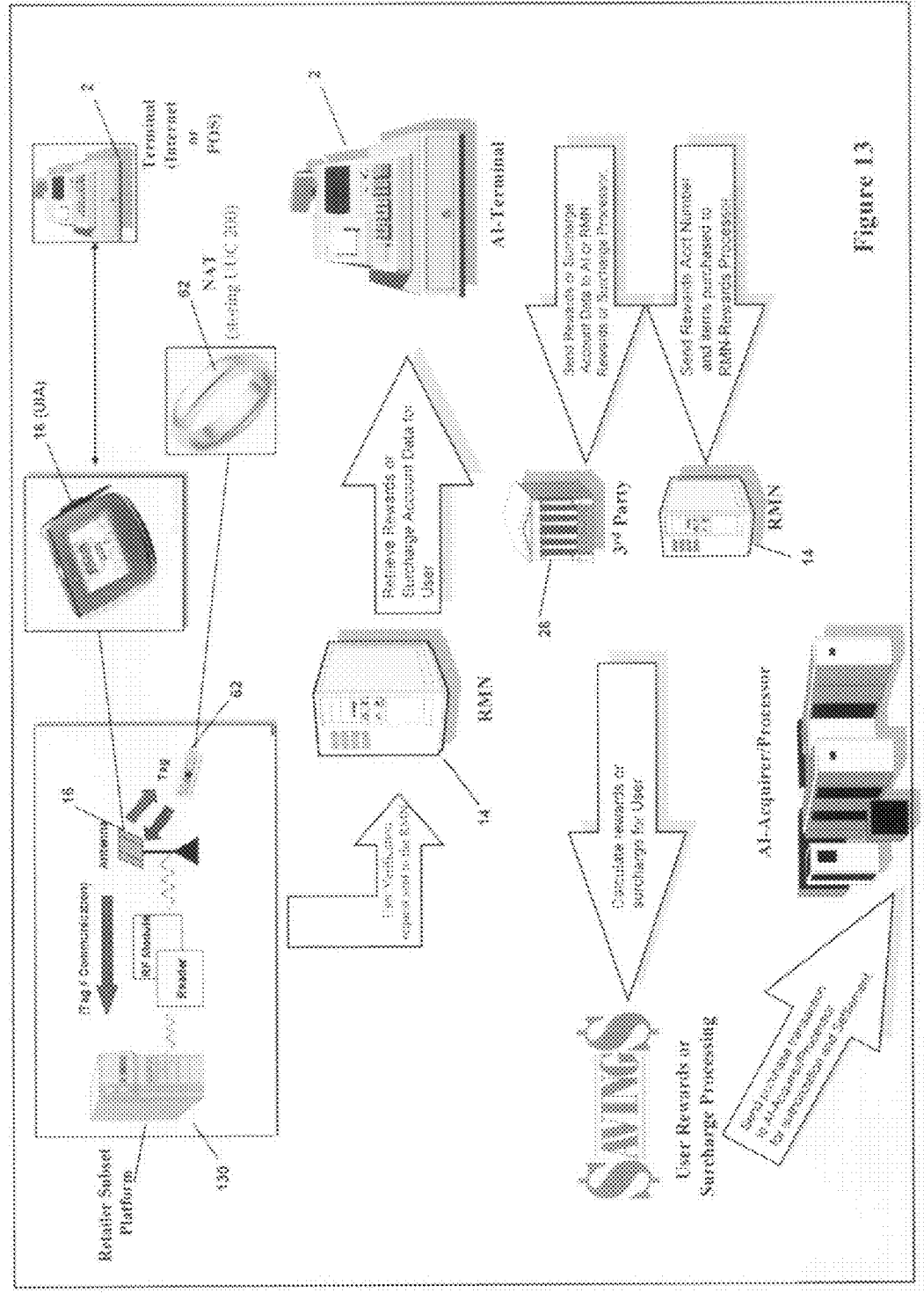

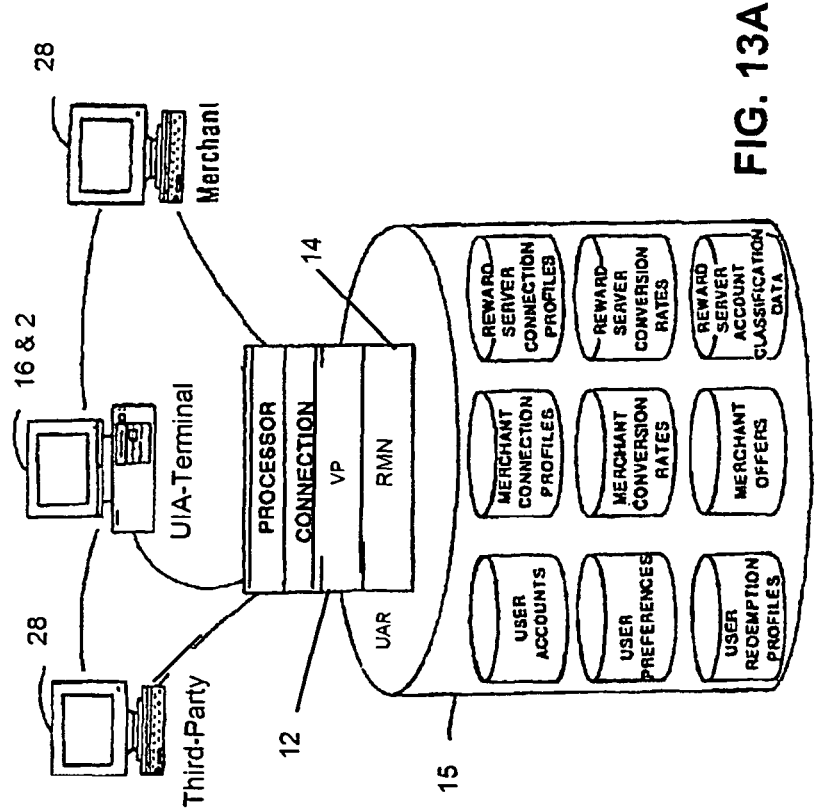

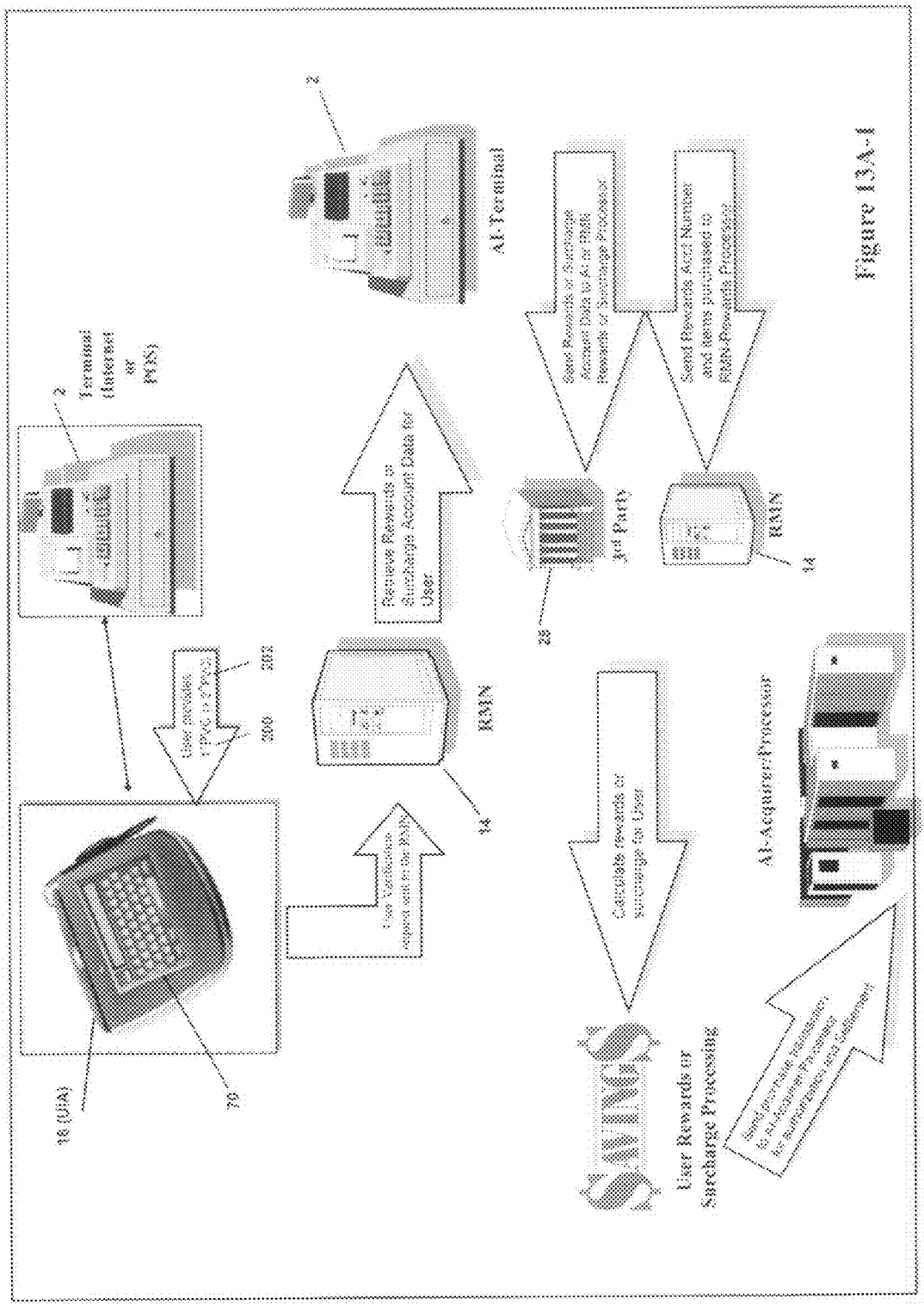

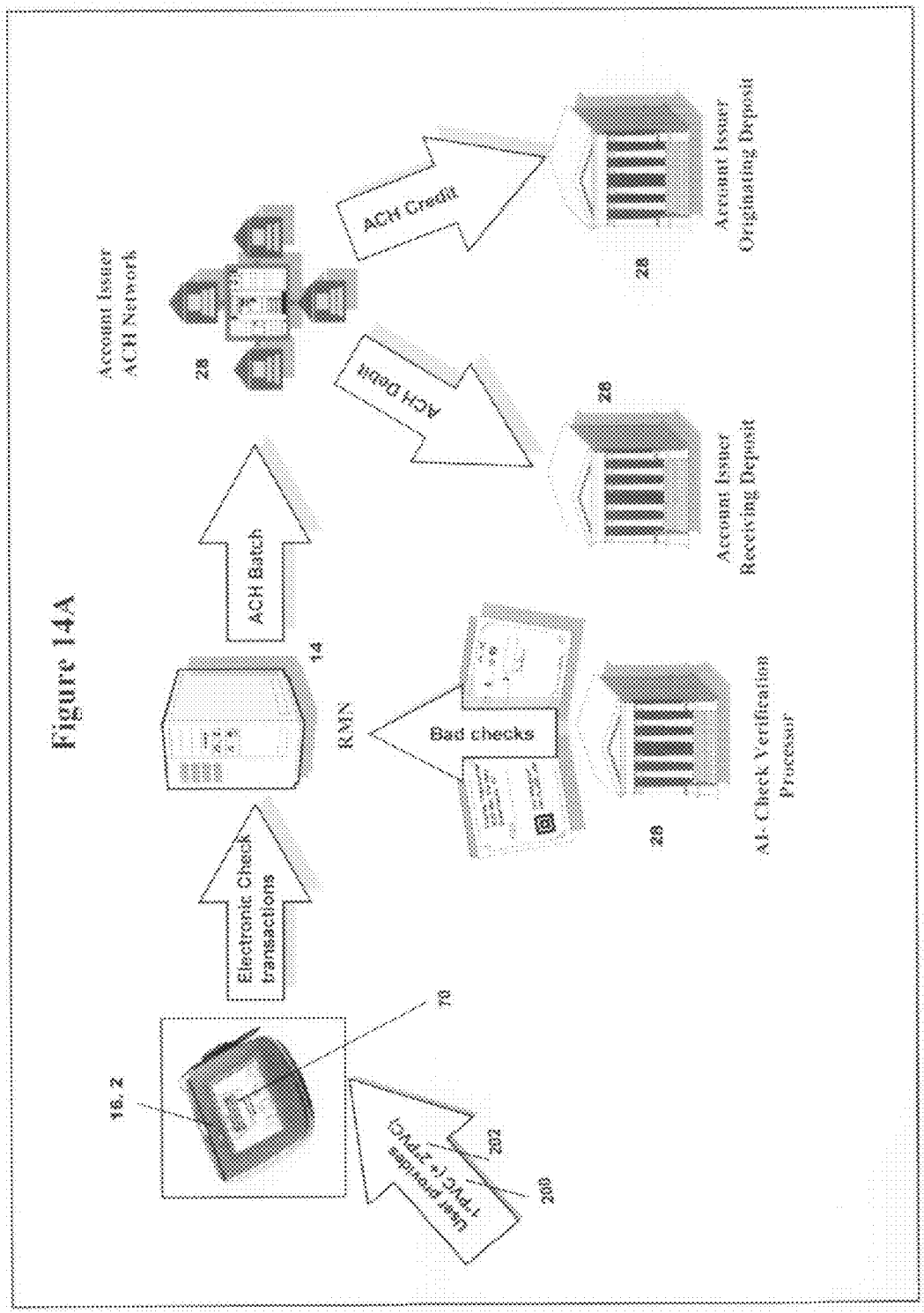

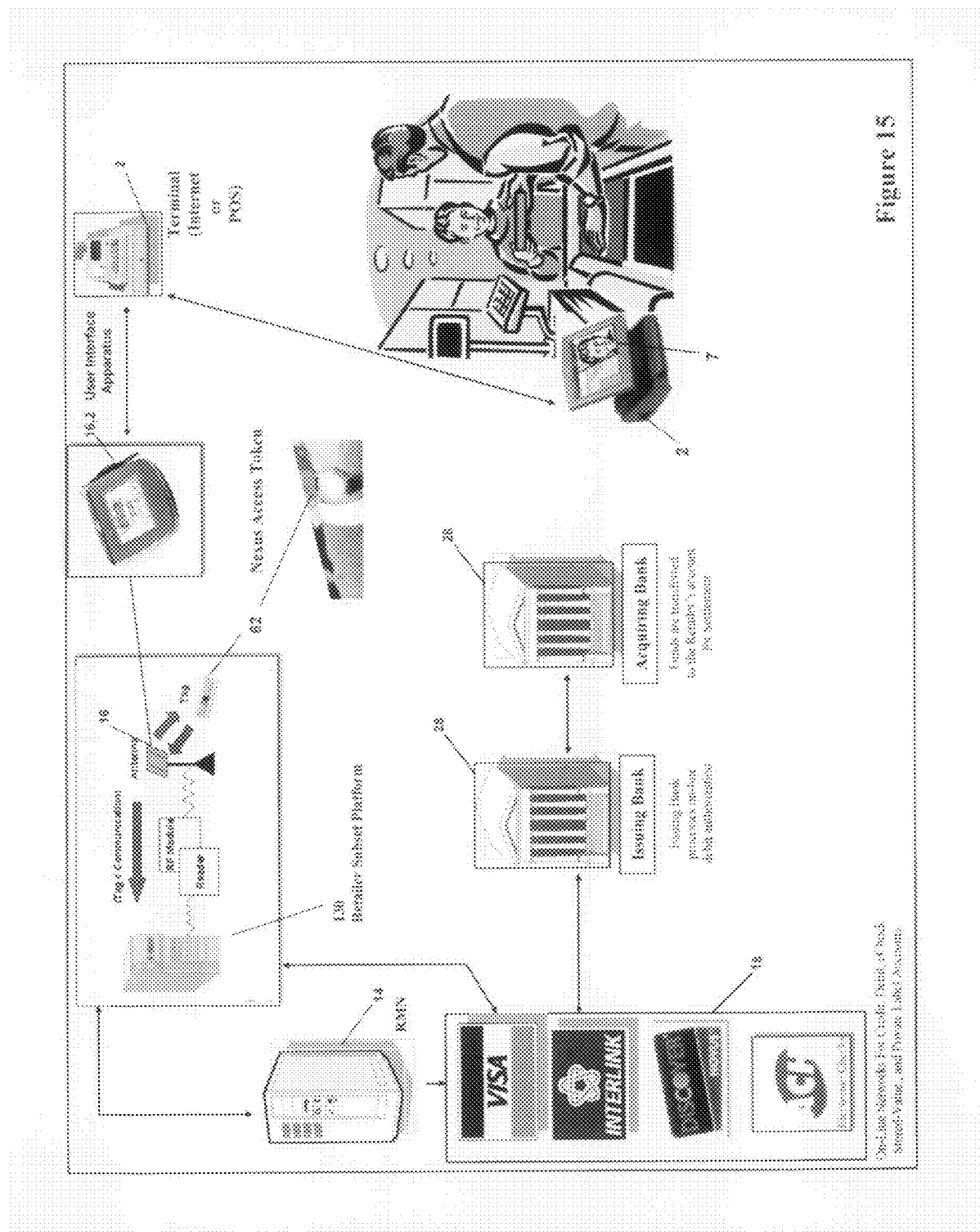

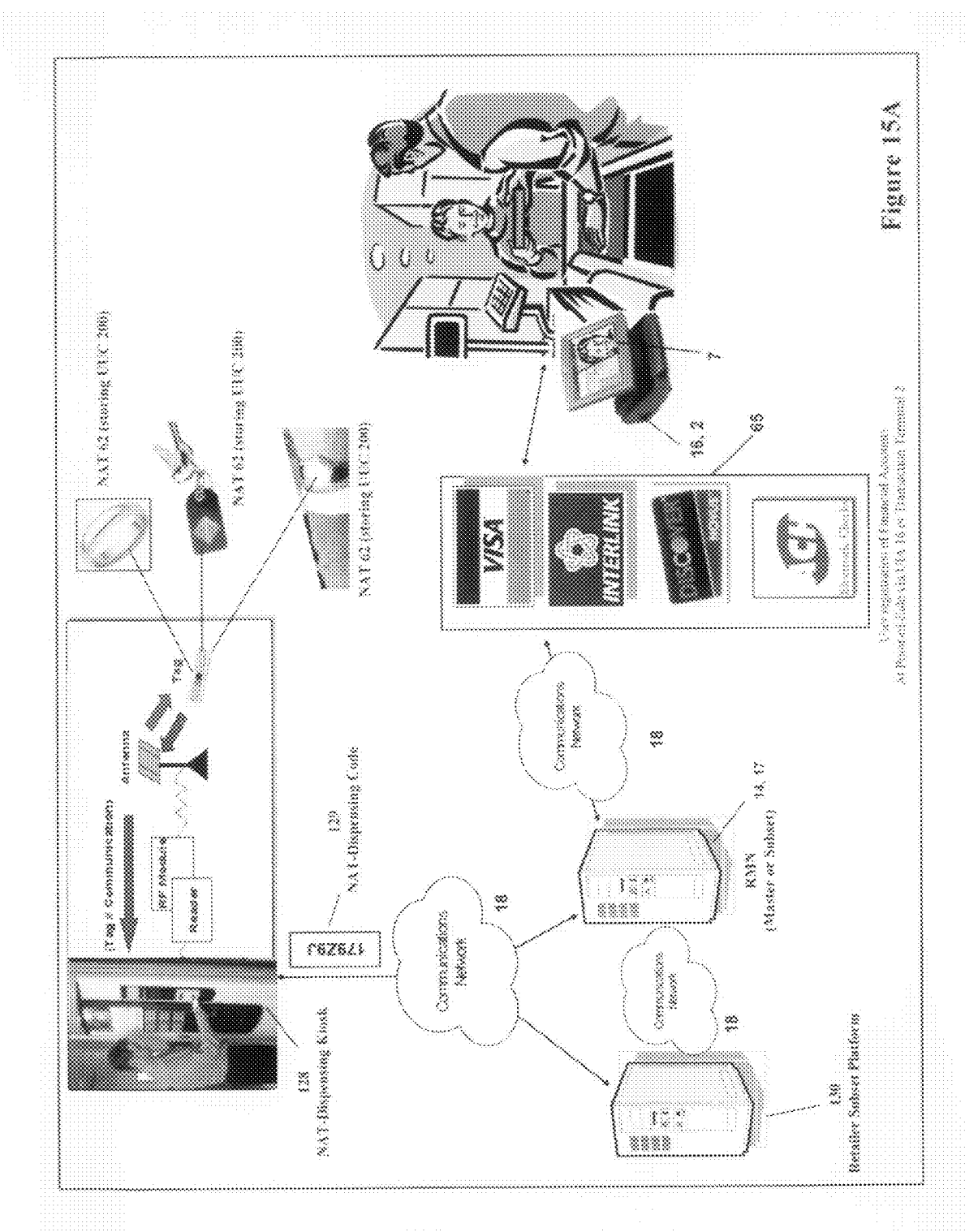

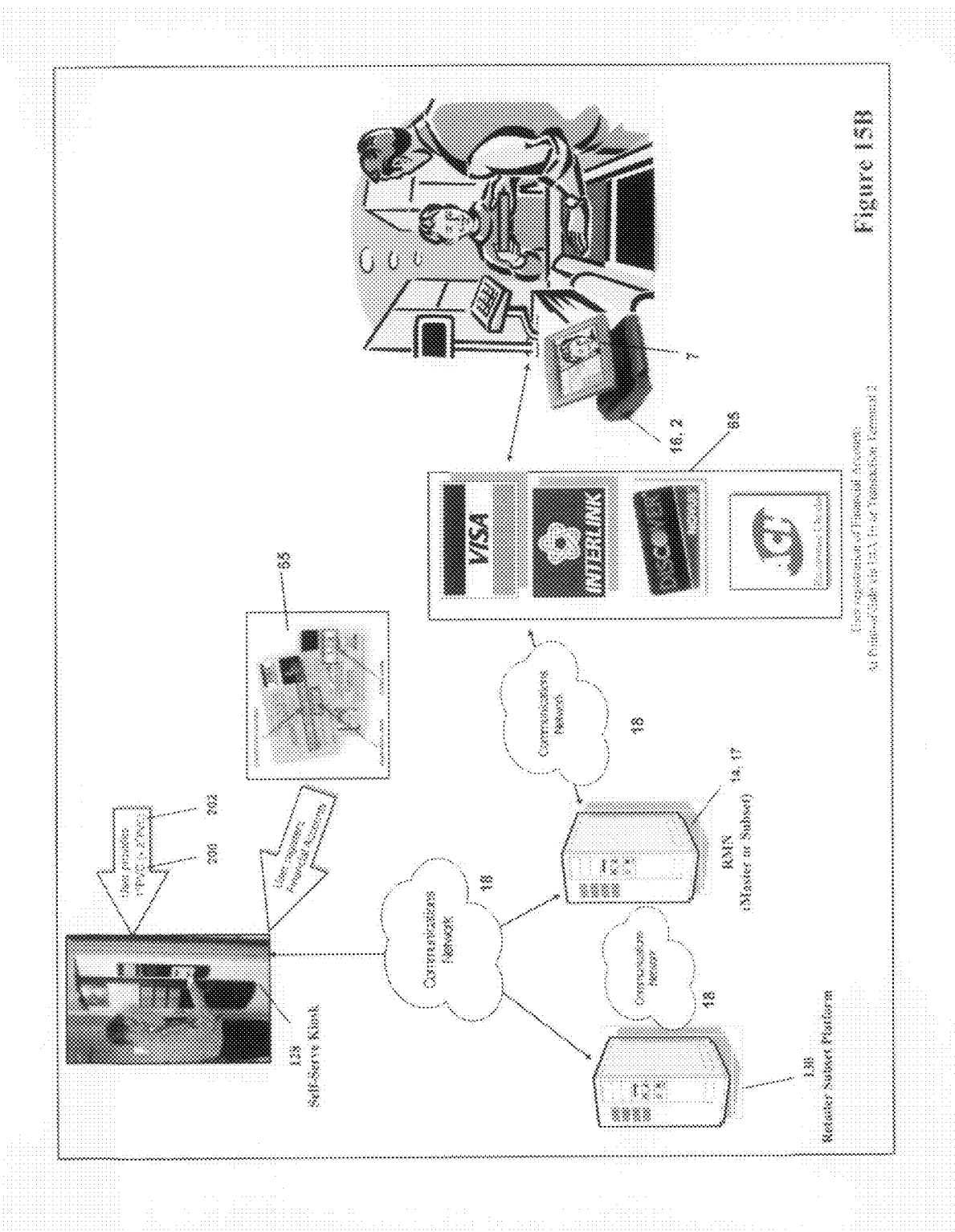

Single Nexus Access Token provides online Access to Plurality of Payment Accounts Fig. 18B
User Accounts Tagged and Ranked By Criteria for Improving a Transaction Benefit
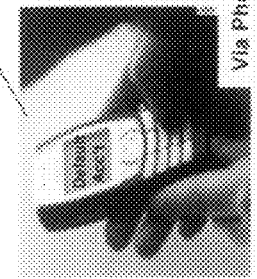 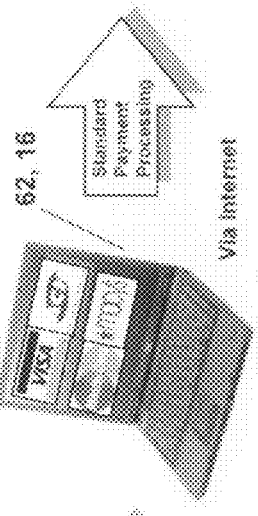 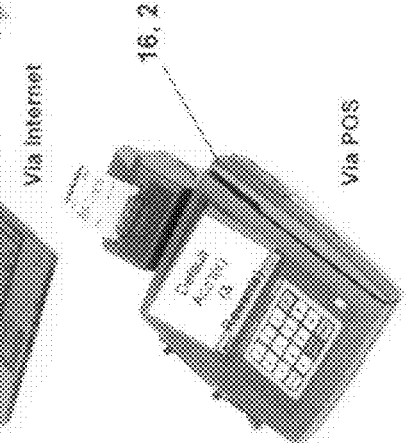

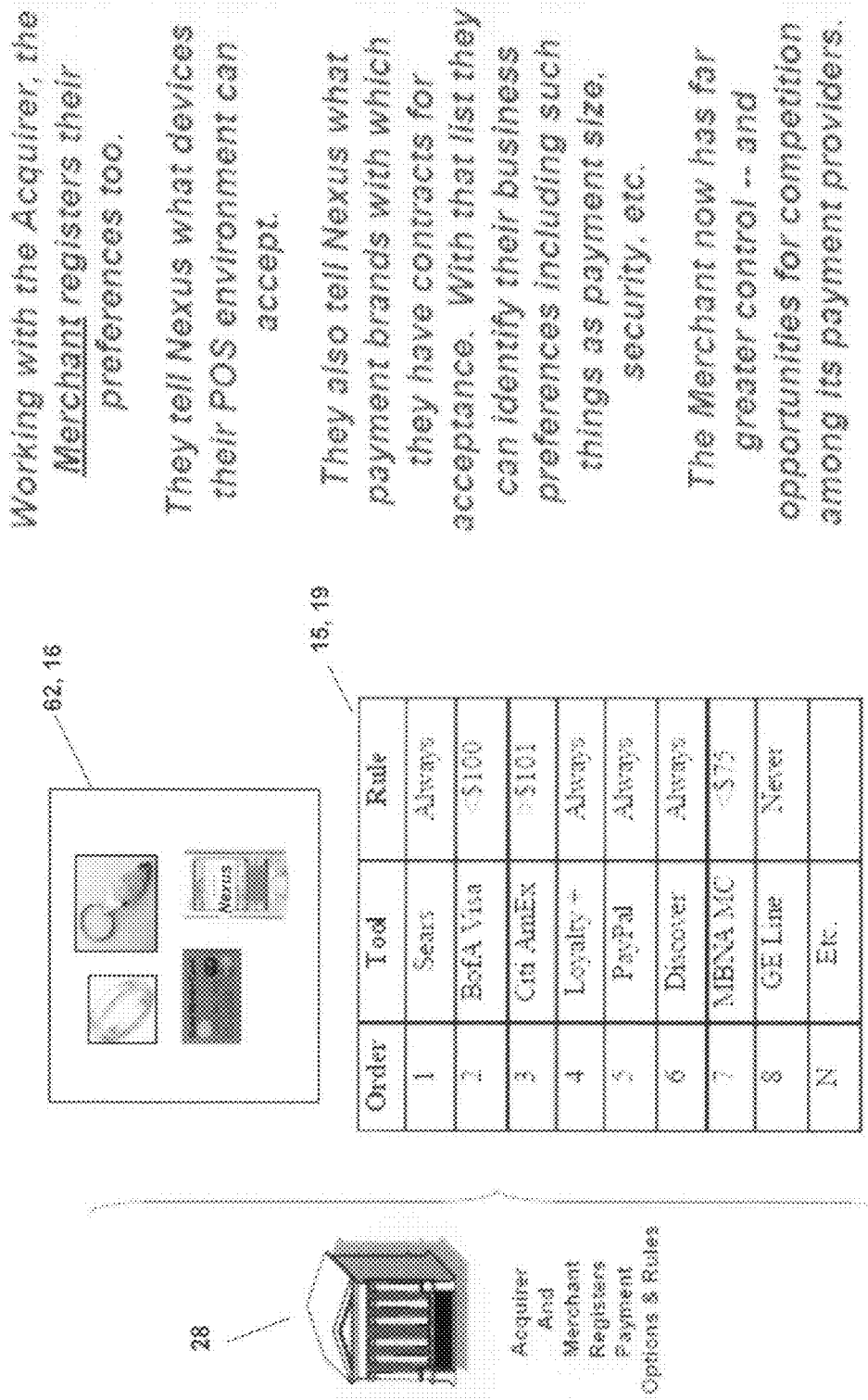

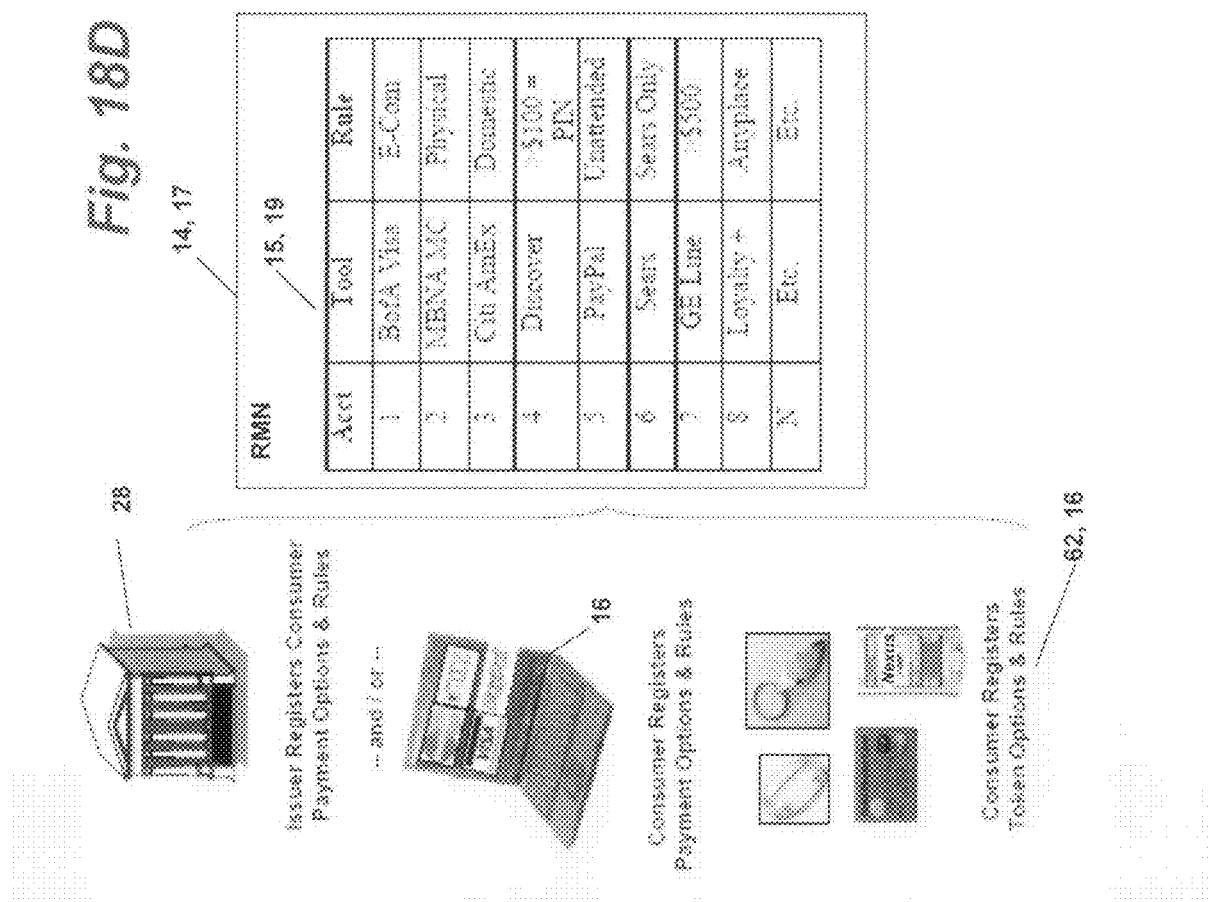

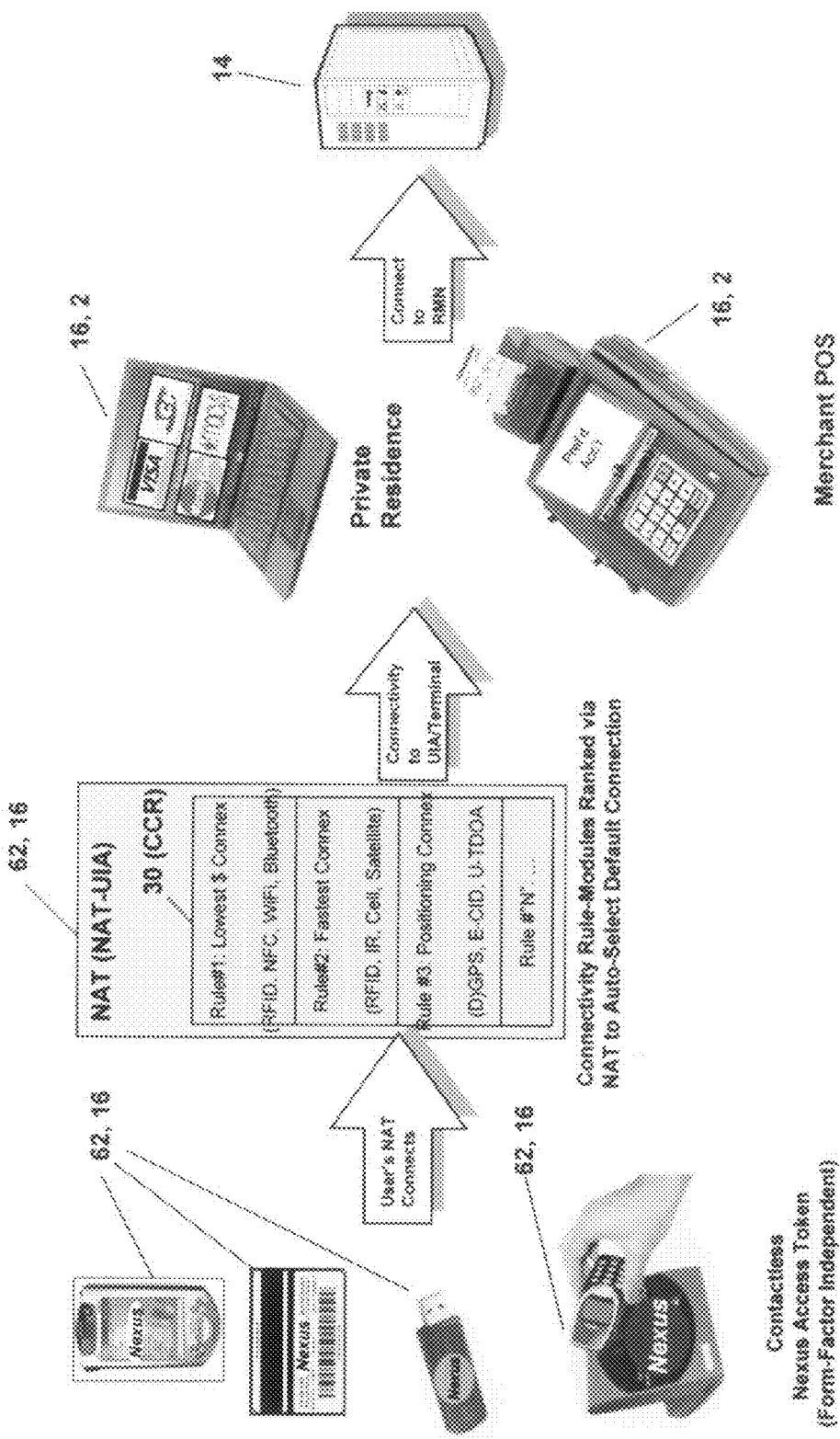

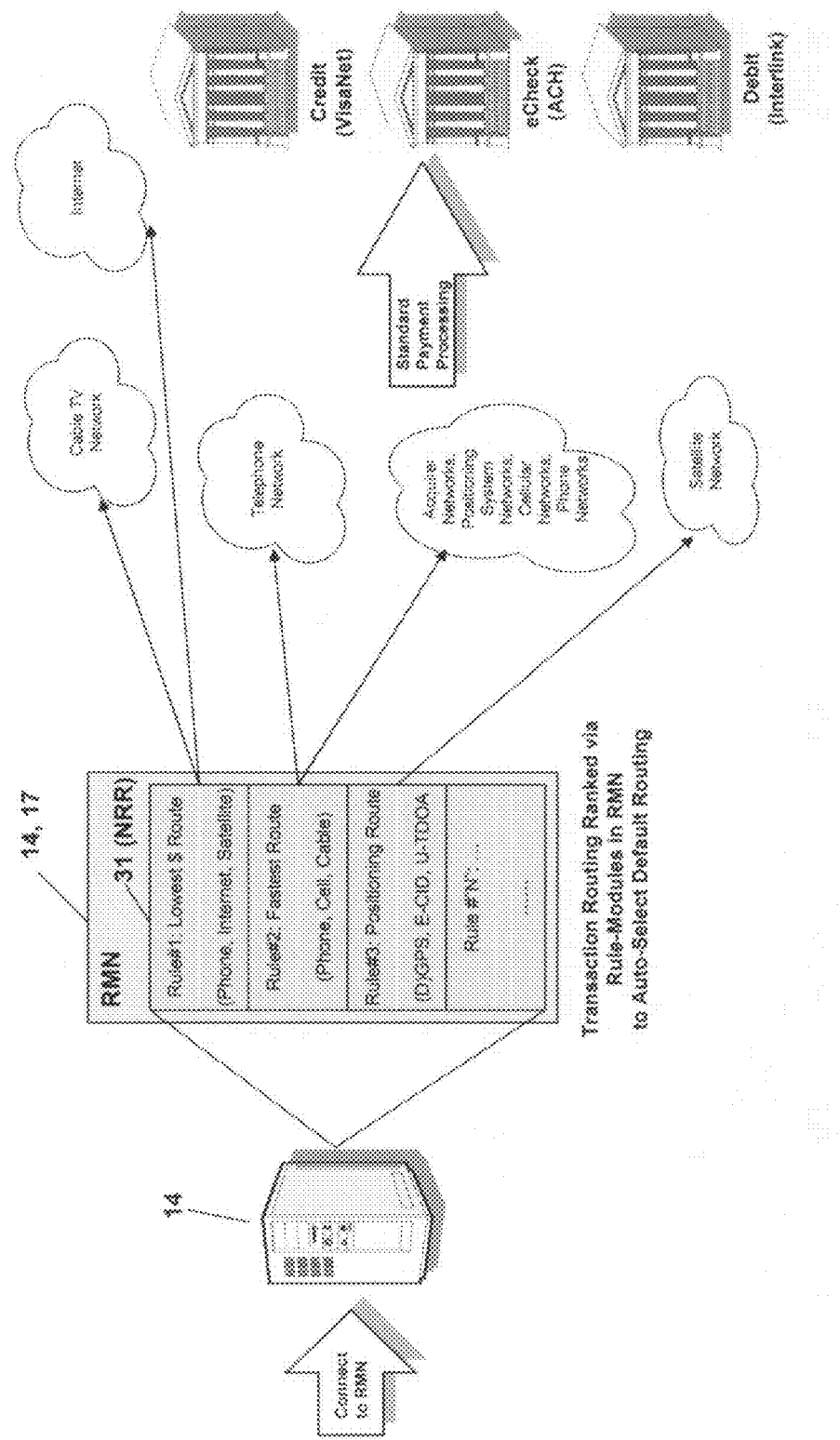

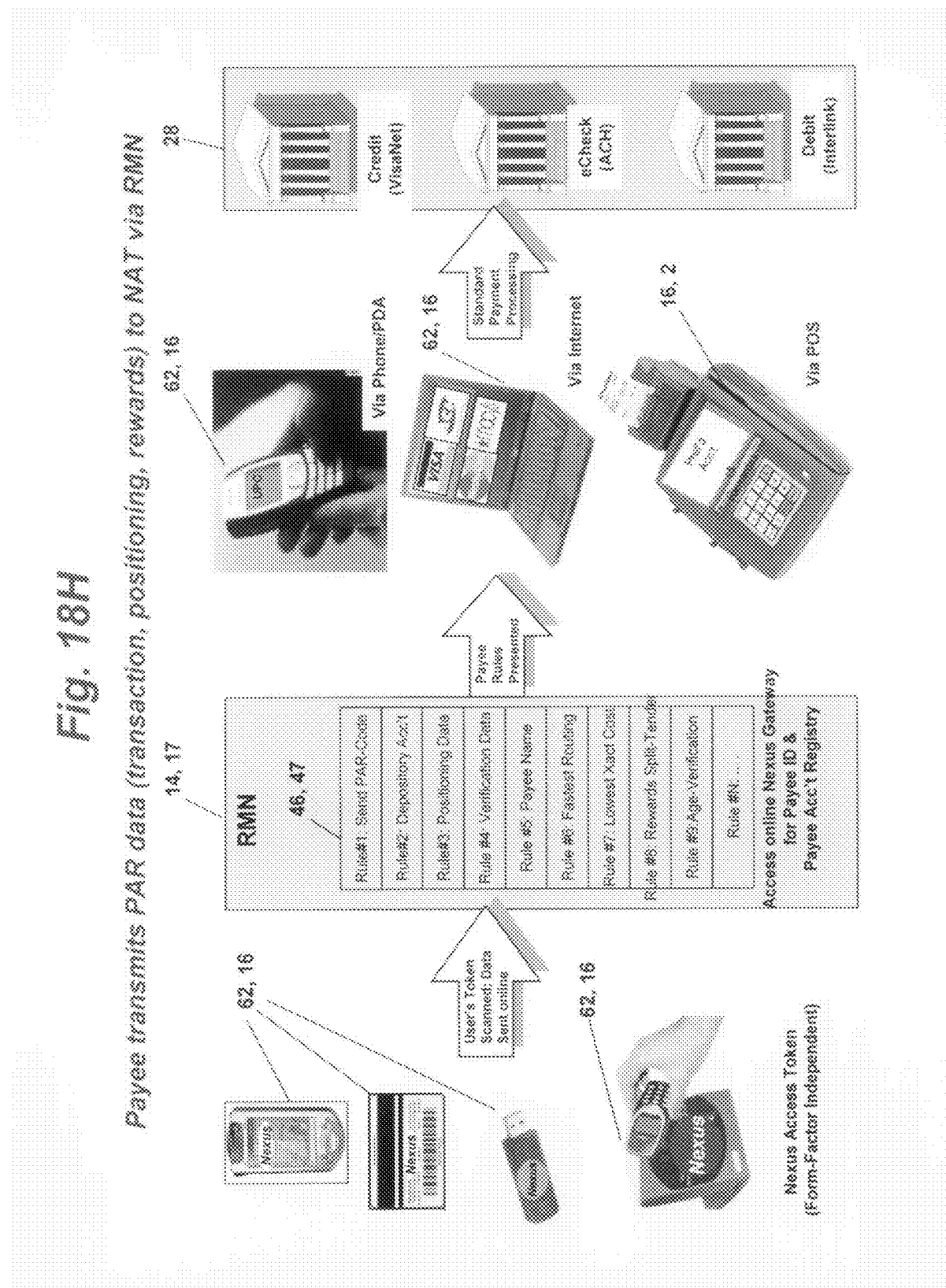

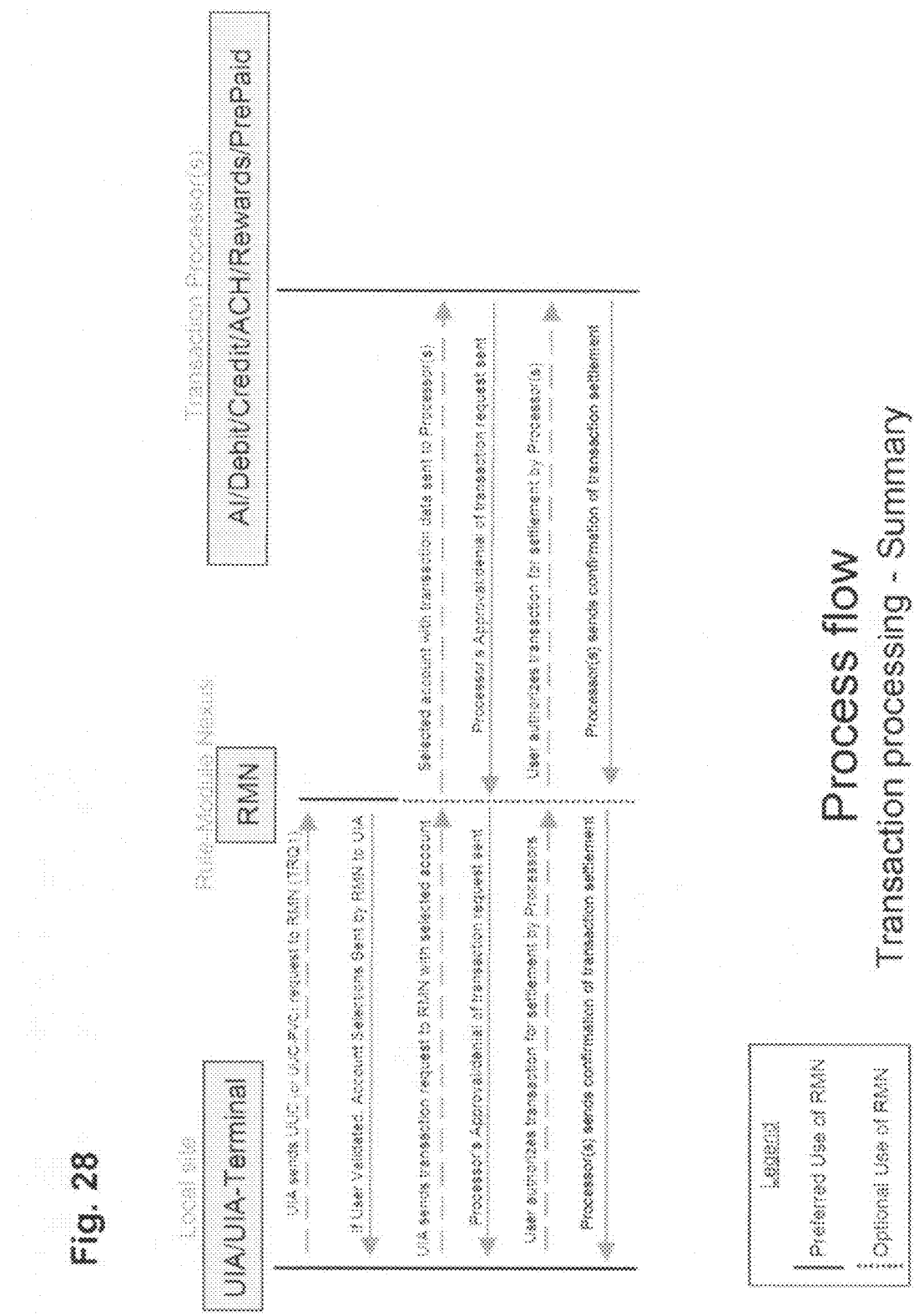

RMN Transaction Packet: WAP Protocol Stack

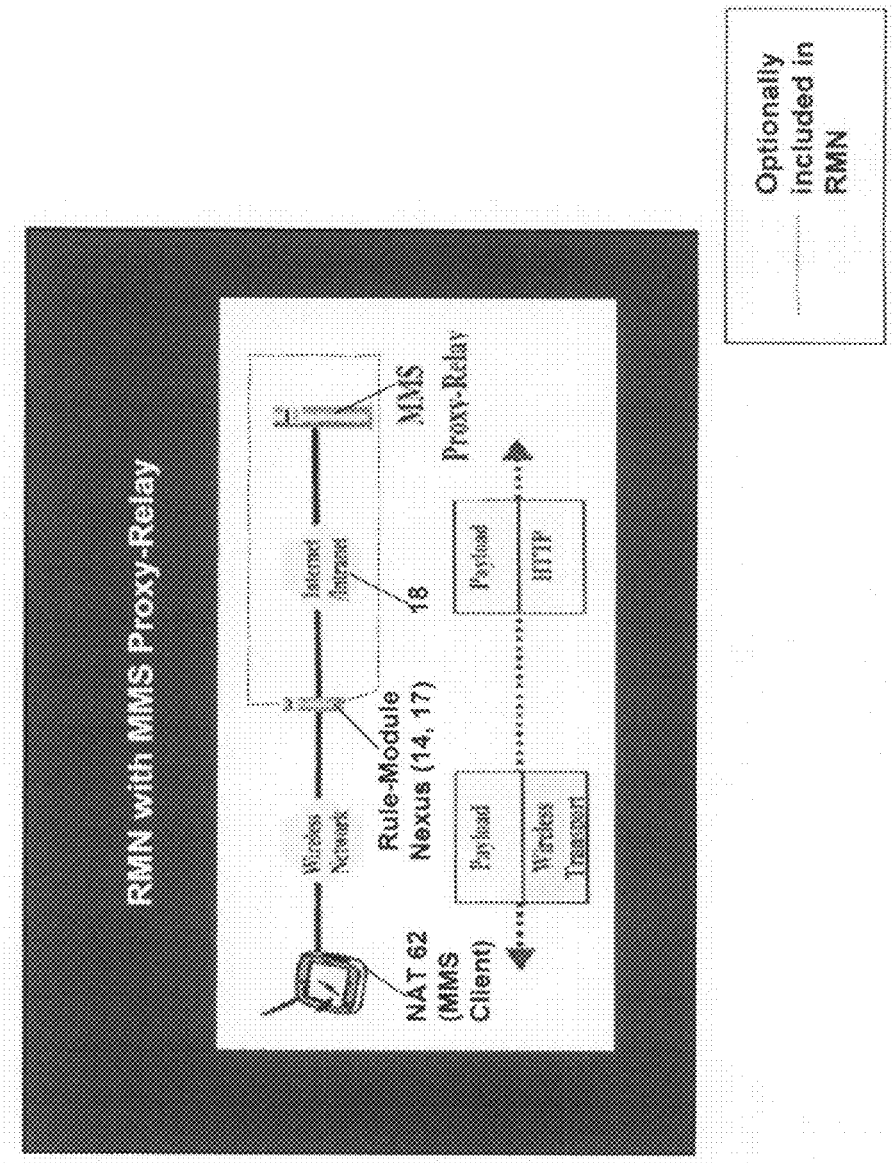

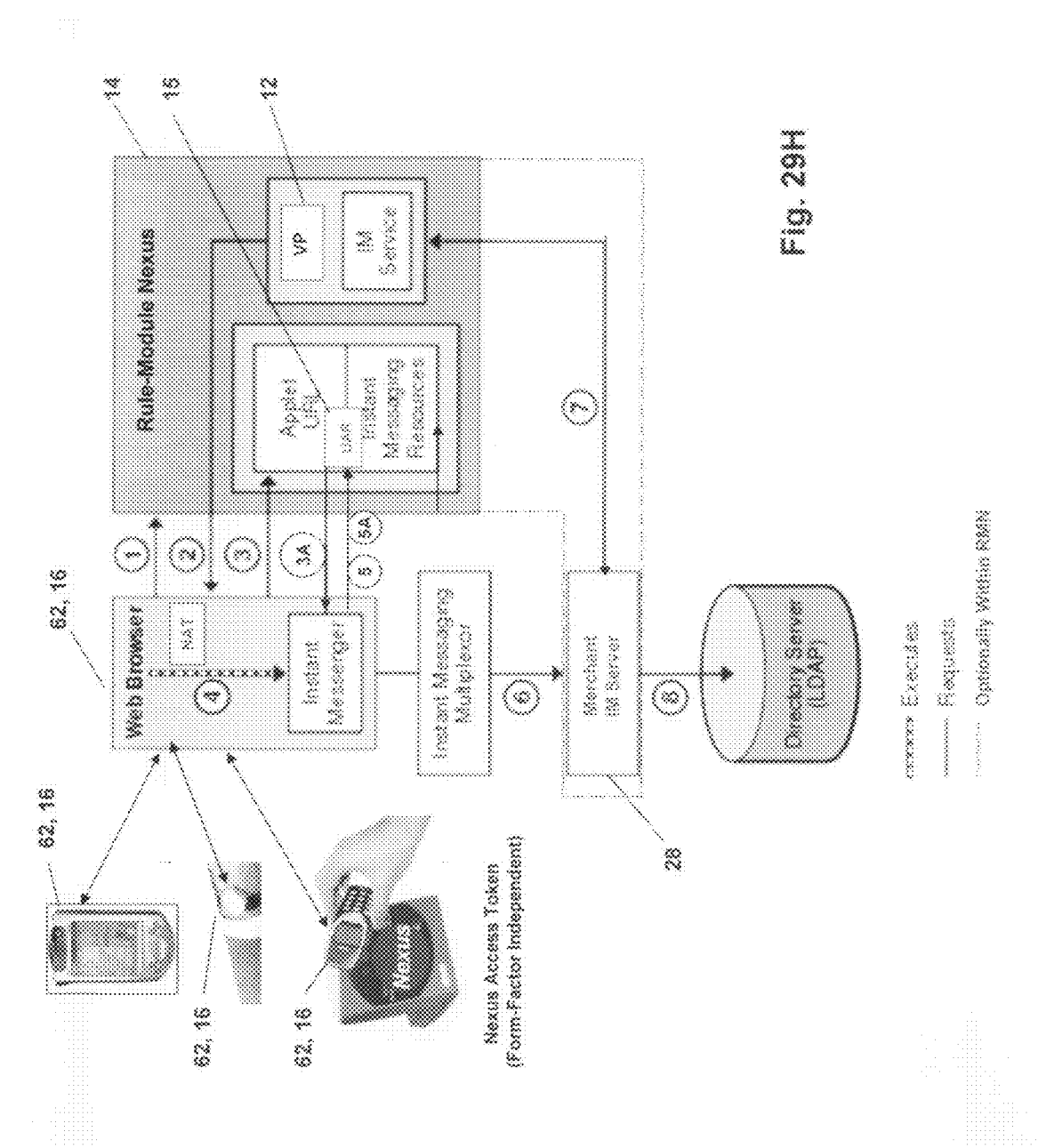

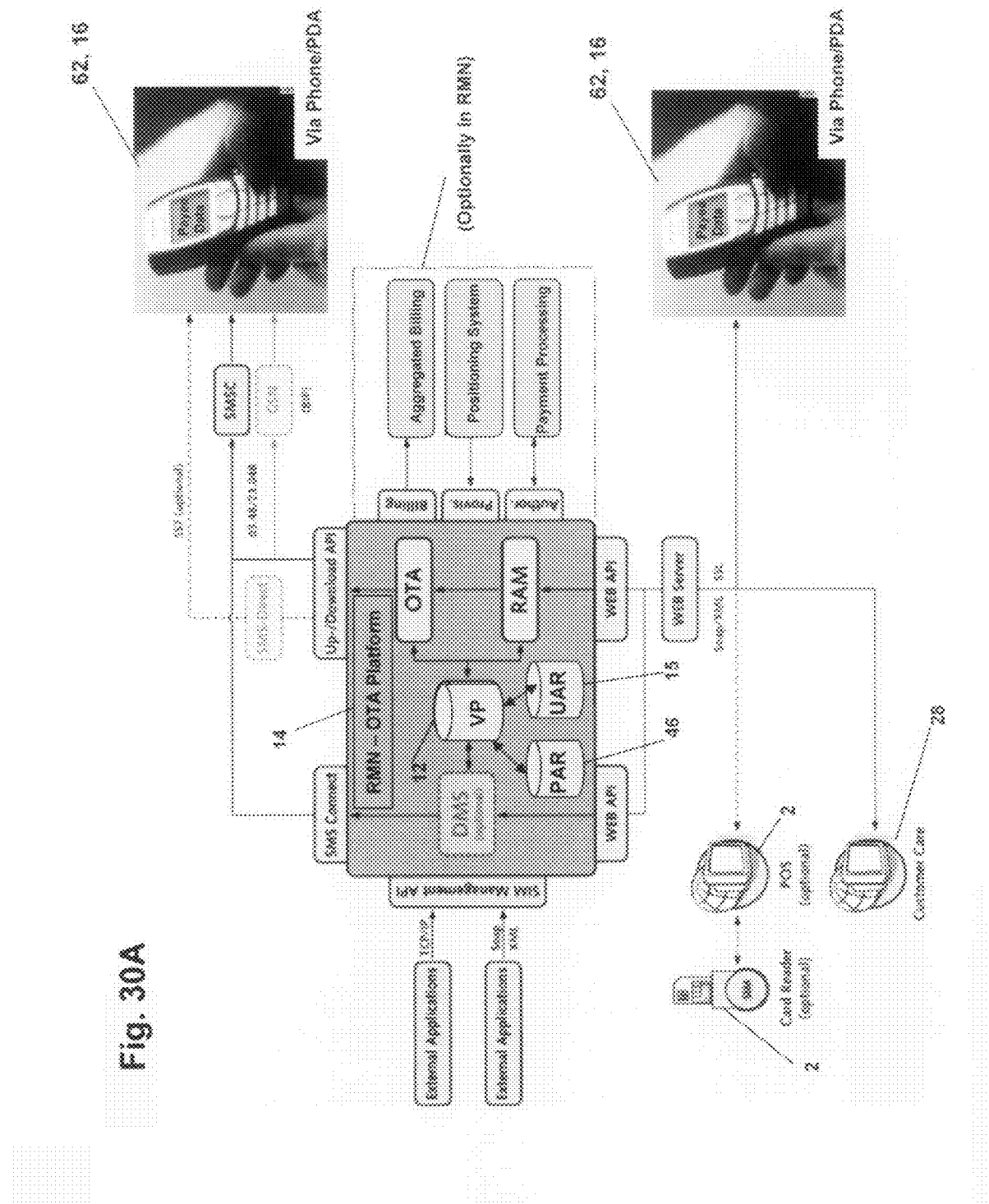

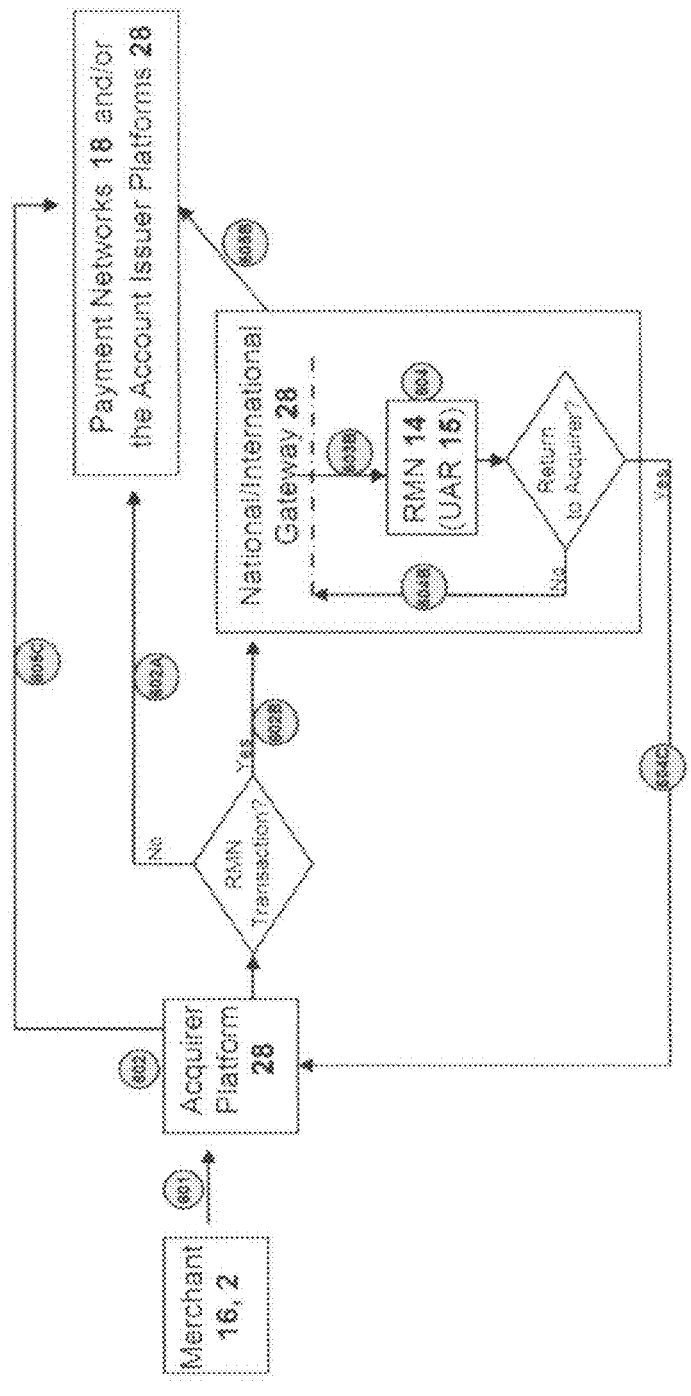

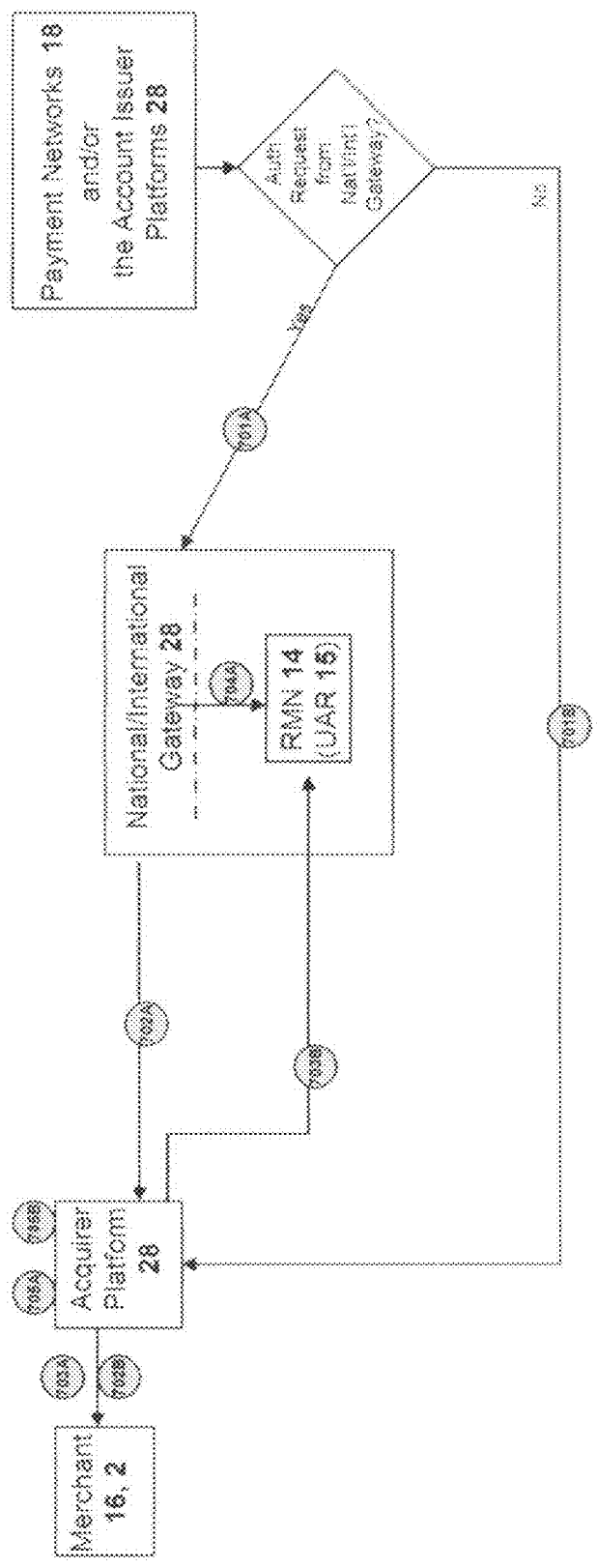

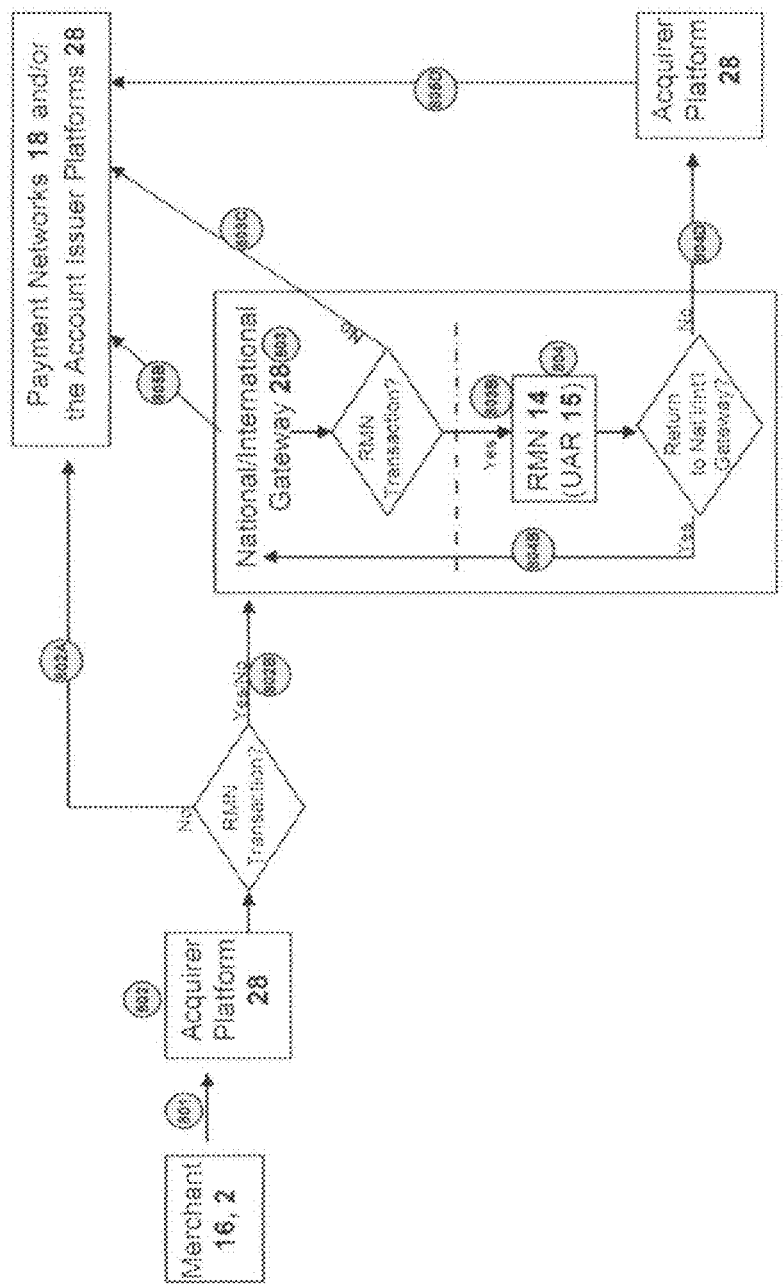

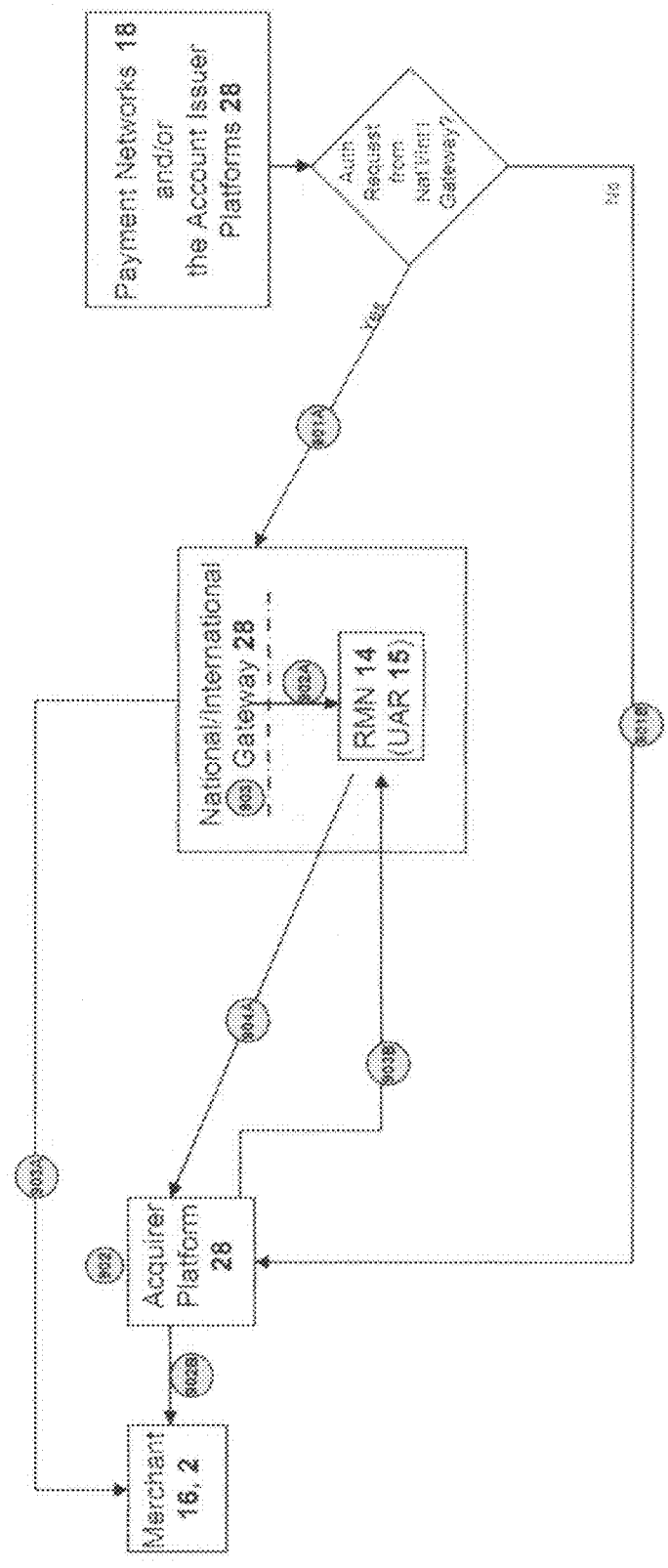

SYSTEM AND METHOD FOR ACCESSING AN ONLINE USER ACCOUNT REGISTRY VIA A THIN-CLIENT UNIQUE USER CODE

CROSS-REFERENCE TO RELATED APPLICATIONS

This utility patent application claims the benefit of provisional patent application Ser. No. 60/967,278, filed on Sep. 1, 2007, and is a continuation-in-part of utility patent application Ser. No. 11/904,283, filed on Sep. 25, 2007, which claims the benefit of provisional patent application Ser. No. 60/876, 417, filed on Dec. 20, 2006, which is a continuation-in-part of utility patent application Ser. No. 11/899,384, filed on Sep. 4, 2007, which claims the benefit of provisional patent application Ser. No. 60/850,374, filed on Oct. 6, 2006, which is a continuation-in-part of utility patent application Ser. No. 11/823,020, filed on Jun. 25, 2007, which claims the benefit of provisional patent application Ser. No. 60/818,953, filed on Jul. 5, 2006, which is a continuation-in-part of utility patent application Ser. No. 11/804,167, filed on May 16, 2007, which claims the benefit of provisional patent application Ser. No. 60/802,265, filed on May 19, 2006, which is a continuation-in-part of utility patent application Ser. No. 11/636,231, filed on Dec. 6, 2006, which claims the benefit of provisional patent application Ser. No. 60/749,901, filed on Dec. 12, 2005, and is a continuation-in-part of utility patent application Ser. No. 11/523,222, filed on Sep. 18, 2006, which claims the benefit of provisional patent application 60/723,859, filed on Oct. 4, 2005, which is a continuation-in-part of utility patent application Ser. No. 11/517,873, filed on Sep. 8, 2006, which claims the benefit of provisional patent application Ser. No. 60/721,831, filed on Sep. 28, 2005, which is a continuation-in-part of utility patent application Ser. No. 11/502,472, filed on Aug. 9, 2006, which claims the benefit of provisional patent application Ser. No. 60/708,979, filed on Aug. 16, 2005, which is a continuation-in-part of utility patent application Ser. No. 11/394,417, filed on Mar. 31, 2006, which claims the benefit of provisional patent application Ser. No. 60/669,941, filed on Apr. 9, 2005, which is a continuation-in-part of utility patent application Ser. No. 11/305,448, filed on Dec. 15, 2005, which claims the benefit of provisional patent application Ser. No. 60/650,367, filed on Feb. 2, 2005, all of which are incorporated herein by reference.

FIELD OF THE INVENTION

The invention relates generally to computer methods and systems to process electronic financial transactions. More specifically, this invention relates to processing financial transactions, in an illustrative embodiment, using: a portable "thin-client" Nexus Access Token, a Rule-Module Nexus, and a User Account Registry stored apart from the Nexus Access Token.

BACKGROUND OF THE INVENTION

Electronic financial transaction systems have become a popular part of merchant point of sale and internet commerce. Currently, over $6 trillion in commercial exchanges occur in the United States annually using electronic financial transaction systems, including transactions involving credit, debit, stored value, electronic check, electronic benefits transfer, scrip, and reward incentives.

SUMMARY OF THE INVENTION

The present invention satisfies these needs by providing an improved system and method for real-time processing of financial transactions using a nexus access token and a remotely located rule-module nexus.

The invention describes a method for financial transactions, comprising the steps of: a) registering a user, wherein a rule-module is registered to a user within a rule-module nexus, said registered rule-module further comprising a pattern data associated with an execution command; b) data-storing in a nexus access token, wherein a unique user code of the user is stored in a portable nexus access token; c) processing a financial transaction, using a nexus access token and a user interface apparatus located remotely from the rule-module nexus, comprising: (i) verifying a user, wherein a user's authority to access the rule-module nexus is verified online by a verification platform using verification data provided via the user interface apparatus, said verification data comprising a bid unique user code provided directly from the nexus access token, and; (ii) accessing financial accounts, wherein upon the verification platform verifying the user is authorized to access the rule-module nexus, the rule-module nexus enables access to a plurality of proprietary financial accounts of the user for completing the financial transaction; whereby, a nexus access token and a rule-module nexus provide an authorized user access to a plurality of proprietary financial accounts for processing a financial transaction.

In an illustrative embodiment of the method of the invention, the unique user code comprises: no data which uniquely and directly identifies a specific financial account of the user; no live financial account data; no payment enabling data; a rule-module nexus routing code; an electronic positioning system code, and; a network routing instruction for processing the financial transaction via the rule-module nexus.

In an illustrative embodiment of the method of the invention, the pattern data comprises: a registration personal verification code; a registration secondary personal verification code; a registration unique user code, and; a plurality of proprietary financial accounts.

In an illustrative embodiment of the method of the invention, the user interface apparatus comprises: being conjoined with a transaction terminal; being conjoined with the nexus access token, and; being fully integrated with a transaction terminal.

In an illustrative embodiment of the method of the invention, completing the financial transaction comprises the rule-module nexus preserving a processing preference of a party registered with the rule-module nexus, said party comprising: an account issuer; a user, and; a payee.

In an illustrative embodiment of the method of the invention, selecting the financial account further comprises: data-entering by the user via a touch-screen; data-entering by the user via a key pad; data-entering by the user via an audio receiver.

In an illustrative embodiment of the method of the invention, preserving the processing preference of a party registered with the rule-module nexus, said preference comprising: invoking criteria predetermined by the party for declining the financial transaction; invoking criteria predetermined by the party for approving the financial transaction, and; invoking criteria predetermined by the party for settlement of the financial transaction.

In an illustrative embodiment of the method of the invention, criteria predetermined by the party for settlement of the financial transaction comprises: invoking a proprietary network; invoking a discount rate; invoking an interchange fee; invoking a settlement protocol; invoking a surcharge; invoking a processing partner; enabling a payee to electronically store and batch the financial transaction with at least one other financial transaction for later settlement, and; invoking a time period for settlement.

In an illustrative embodiment of the method of the invention, processing a financial transaction further comprises: precluding a global execution command from requiring all financial transactions of all users to bypass a processing preference of a party; precluding a global execution command from requiring all financial transactions of all users to invoke a specific processing preference of a specific party; precluding a global execution command from requiring all financial transactions of all users to use a specific merchant service, and; precluding a global execution command from requiring all financial transactions of all users to use a specific merchant product.

In an illustrative embodiment of the method of the invention, a code is identified as compromised based on an occurance comprising: unusual usage of the code; loss of the code; inaccessibility of the code due to nexus access token damage; fraudulent duplication of the code; unauthorized access to the code, and; coersion of the user.

In an illustrative embodiment of the method of the invention, the compromised code comprises: a unique user code; a personal verification code; a verification approval code; a user account registry code; a payee account registry code; a unique payee code; an account issuer verification code; a payee verification code, and; a user interface apparatus hardware verification code.

In an illustrative embodiment of the method of the invention, resolving the compromised code comprises: deactivating the compromised code and activating a replacement code, and; verifying the user further comprising providing dual personal verification codes.

In an illustrative embodiment of the method of the invention, activating the replacement code comprises: data-storing a replacement unique user code in the nexus access token of the user to replace a compromised unique user code stored therein, and; data-storing a replacement unique user code in a new nexus access token of the user, the new nexus access token replacing a nexus access token of the user storing a compromised unique user code.

In an illustrative embodiment of the method of the invention, the plurality comprises two or more.

In an illustrative embodiment of the method of the invention, a proprietary financial account comprises: a financial account having an account issuer which is distinct from an account issuer of another financial account; a financial account having a unique financial account identifier; a financial account having a code identifying an account issuer, as approved by the International Organization for Standardization [(Bank Identification Code, or BIC Code) or (Bank Identification Number, or BIN)]; a financial account having a code identifying an account issuer, as approved by the Society for Worldwide Interbank Financial Telecommunications (SWIFT Address or SWIFT Code), and; a financial account having a code identifying an account issuer, as approved by the American Banker's Association (ABA Routing Code).

In an illustrative embodiment of the method of the invention, the verification platform electronically compares the user's bid unique user code with a user's registration unique user code, and makes a matching determination for verifying the user's authority to access the rule-module nexus, said matching determination comprising: making a positive matching determination verifying that the user is authorized to access the rule-module nexus, and; failing to make a positive matching determination, wherein making a negative matching determination is automatic, verifying that the user is not authorized to access the rule-module nexus.

In an illustrative embodiment of the method of the invention, upon a positive matching determination, the verification platform issues a verification approval code invoking a rule-module of the user in the rule-module nexus.

In an illustrative embodiment of the method of the invention, the verification approval code invokes a user account registry code identifying a user account registry, said user account registry code comprising: no data directly identifying a specific financial account of the user, and; no data identifying a primary financial account of the user for all financial transactions of the user.

In an illustrative embodiment of the method of the invention, the user account registry comprises a plurality of proprietary financial accounts of the user.

In an illustrative embodiment of the method of the invention, the verification approval code comprises: a static code identifying the user account registry; a dynamic code comprising a unique code for storage and retrieval of data relating to processing of the financial transaction, and; a static code and a dynamic code.

In an illustrative embodiment of the method of the invention, a rule-module of the user is modified by parties authorized by the rule-module nexus, said parties comprising: the user; the rule-module nexus; a payee; an account issuer, and; a third-party with predetermined authorization.

In an illustrative embodiment of the method of the invention, modifying a rule-module further comprises: registering, deleting, adding pattern data; registering, deleting, adding execution commands, and; registering, deleting, adding associations between pattern data and execution commands.

In an illustrative embodiment of the method of the invention, the pattern data comprises: personal legal name; a private code; a driver's license number; a unique user code; a physical POS unique user code; a virtual POS unique user code; a personal verification code; a secondary personal verification code; an emergency code; a plurality of proprietary financial accounts; demographic information; an email address; social security number; a mother's maiden name; a biometric sample; a facial photograph; an Internet browsing pattern; a telephone number; a mailing address; a purchasing pattern; an authorized subordinated user; electronic data usage patterns; employee status; job title; data on user behavior patterns; a credit score; a digital certificate; a network credential; an Internet protocol address; a digital signature; an encryption key; an instant messaging address; personal medical records; an electronic audible signature, and; an electronic visible signature.

In an illustrative embodiment of the method of the invention, the execution command comprises invoking at least one of the following: accessing the rule-module nexus; accessing a user account registry; accessing a financial account; authorizing a subordinated user to access a financial account of the user; presenting a financial account of the user; completing the financial transaction; authorizing settlement of the online transaction; presenting the pattern data; presenting the execution command; presenting the rule-module; notifying an emergency authority upon rule-module nexus receiving an emergency code of the user; accessing a third-party database; accessing an account issuer database, and; accessing a payee database.

In an illustrative embodiment of the method of the invention, invoking the rule-module comprises: accessing a plurality of rule-modules in the rule-module nexus; accessing a plurality of proprietary financial accounts; authorizing a subordinated account user authority; accessing a third-party computer via the rule-module nexus.

In an illustrative embodiment of the method of the invention, the unique user code comprises: a dynamic code which changes periodically based on predetermined criteria synchronized with the verification platform, and; a static code which remains constant based on a predetermined code synchronized with the verification platform.

In an illustrative embodiment of the method of the invention, the personal verification code comprises: an alpha-numeric sequence selected by the user; an alpha-numeric sequence selected by the rule-module nexus; an alpha-numeric sequence selected by an account issuer; a visible image; an audible sound.

In an illustrative embodiment of the method of the invention, verifying the user further comprises detecting rule-module nexus fraud, wherein criteria predetermined by a fraud prevention platform are invoked for detecting fraud by the user involving the rule-module nexus, said criteria comprising: unusual usage of bid verification data; unusual modifying of a rule-module, and; unusual accessing of a financial account.

In an illustrative embodiment of the method of the invention, upon a determination by the rule-module nexus that the user has committed fraud involving the rule-module nexus, data of the user is registered with a fraud prevention platform, said data comprising: a pattern data; an execution command, and; a rule-module.

In an illustrative embodiment of the method of the invention, the private code, registered to the user, distinct from a personal verification code and not used in verifying the user, is presented to the user via the rule-module nexus for verifying to the user that the authentic rule-module nexus has been accessed.

In an illustrative embodiment of the method of the invention, the private code is registered to the user in the rule-module nexus by a party, said party comprising: the user; the rule-module nexus, and; an account issuer.

In an illustrative embodiment of the method of the invention, during the financial transaction processing, the emergency code, distinct from a personal verification code and not used in verifying the user, is provided by the user to the user interface apparatus for sending an alert via the rule-module nexus of an emergency comprising: the bid verification data being compromised; the nexus access token being compromised, and; the user being coerced.

In an illustrative embodiment of the method of the invention, the emergency code comprises: an alternate personal verification code; an alpha-numeric code; a visible image, and; an audible signal.

In an illustrative embodiment of the method of the invention, alerting of emergency invokes an execution command via the rule-module nexus, comprising: presenting a visible display of predetermined emergency data to the user; presenting an audible signal of predetermined emergency data to the user; alerting an emergency authority, and; identifying a compromised code.

In an illustrative embodiment of the method of the invention, the visible display comprises: a false financial account; a false financial data with in a financial account, and; confirming an emergency authority has been contacted.

In an illustrative embodiment of the method of the invention, the audible signal comprises: a false financial account; a false financial data within a financial account, and; confirming an emergency authority has been contacted.

In an illustrative embodiment of the method of the invention, resolving the compromised code further comprises deactivating the unique user code and activating a secondary personal verification code.

In an illustrative embodiment of the method of the invention, providing dual personal verification codes, further comprises the rule-module nexus enabling the user on a limited basis to provide a bid secondary personal verification code in replacement of the user's unique user code.

An illustrative embodiment of the method of the invention further comprises: a) calling by the user from a predetermined first phone number to a predetermined second phone number; b) data-entering by the user of the personal verification code of the user; c) invoking by the user of a secondary personal verification code, and; d) notifying the user that the secondary personal verification code has been activated for providing dual personal verification codes when verifying the user.

In an illustrative embodiment of the method of the invention, invoking by the user further comprises: activating a registration secondary personal verification code of the user; creating by the user of a secondary personal verification code, and; accepting by the user of an offered secondary personal verification code.

An illustrative embodiment of the method of the invention further comprises: a) emailing by the user from a predetermined internet protocol address to a predetermined web site; b) data-entering by the user of the personal verification code of the user; c) invoking by the user of a secondary personal verification code, and; d) notifying the user that the secondary personal verification code has been activated for providing dual personal verification codes when verifying the user.

In an illustrative embodiment of the method of the invention, invoking by the user further comprises: activating a registration secondary personal verification code of the user; creating by the user of a secondary personal verification code, and; accepting by the user of an offered secondary personal verification code.

In an illustrative embodiment of the method of the invention, providing dual personal verification codes further comprises the bid personal verification code and the bid secondary personal verification code, both provided directly by the user to the user interface apparatus, being electronically compared by the verification platform with a registration personal verification code and a registration secondary personal verification code, to make a matching determination for verifying the user's authority to access the rule-module nexus.

In an illustrative embodiment of the method of the invention, the limited basis comprises: a predetermined time period; predetermined financial account access when using the secondary personal verification code; predetermined frequency for usage for using the secondary personal verification code, and; predetermined geographic area for using the secondary personal verification code.

In an illustrative embodiment of the method of the invention, the secondary personal verification code comprises: an alpha-numeric sequence selected by the user; an alpha-numeric sequence selected by the rule-module nexus; an alpha-numeric sequence selected by an account issuer; a visible image; an audible sound.

In an illustrative embodiment of the method of the invention, processing the financial transaction further comprises: a credit transaction; a debit transaction; a scrip transaction; a rewards transaction; an electronic check transaction; a private label transaction; a stored value transaction; an electronic benefits transfer transaction; a brokerage trade transaction; invoking a surcharge to a transaction based on predetermined criteria; a buyer-seller exchange wherein a user's financial account balance is adjusted and a payee's financial account is correspondingly adjusted; an intra-account transfer transaction between financial accounts of the user without a buyer-seller exchange; redeeming a pre-paid ticket transaction for venue admittance without a buyer-seller exchange, and; redeeming a pre-paid membership benefit transaction for venue admittance without a buyer-seller exchange.

In an illustrative embodiment of the method of the invention, the venue comprises: a concert hall; a sports stadium; a movie theatre; a live-action theatre; an airplane; a train; a bus; a boat; a dance club; a restaurant; a garage; an office building; a health club; an apartment building; a medical facility; a toll booth, and; a dining club.

In an illustrative embodiment of the method of the invention, venue admittance comprises displaying a facial photograph of the user, wherein upon the verification platform making a positive matching determination that the user is authorized to access the rule-module nexus, the rule-module nexus transmits the user's registered facial photograph for display to a third-party present during the financial transaction for visually verifying that the user's actual face is sufficiently similar to the user's displayed facial photograph to permit venue admittance.

In an illustrative embodiment of the method of the invention, accessing a financial account comprises: accessing a rule-module associated with a financial account; querying data associated with a financial account; retrieving data from a financial account; querying data of a financial account via accessing a third-party computer; accessing a third-party computer to retrieve data from a financial account; presenting a visible electronic image of a financial account; presenting visible electronic text communication of a financial account; presenting a visible J2ME-enabled communication; presenting an audible signal of a financial account; adjusting the balance in a financial account by making a credit to a financial account; transmitting an electronic positioning system communication; transmitting an electronic navigating system communication; transmitting an electronic mapping communication; an electronic guiding system communication; transmitting an electronic text message of a financial account, and; adjusting the balance in a financial account by making a debit from a financial account.

In an illustrative embodiment of the method of the invention, the data-storing in the nexus access token comprises: storing no data which uniquely and directly identifies a specific financial account of the user; storing no live financial account data, and; storing no payment-enabling data.

An illustrative embodiment of the method of the invention further comprises verifying the user, further comprising displaying a facial photograph of the user, wherein upon the verification platform making a positive matching determination that the user is authorized to access the rule-module nexus, the rule-module nexus transmits the registered facial photograph of the user for display to a third-party present during the financial transaction, for visually verifying that the user's actual face is sufficiently similar to the user's displayed facial photograph to permit the financial transaction.

An illustrative embodiment of the method of the invention, further comprises data-storing in a user interface apparatus, wherein a hardware verification code, registered with the rule-module nexus and unique to the user interface apparatus, is stored in the user interface apparatus.

In an illustrative embodiment of the method of the invention, a rule-module is registered to a payee, said registered rule-module comprising a pattern data associated with an execution command.

In an illustrative embodiment of the method of the invention, a pattern data comprises: the payee's legal name; a user interface apparatus hardware verification code; an employer identification number; financial account access authorization fields; a payee account registry; a unique payee code; a payee verification code; a a transaction terminal identification code; a user interface apparatus identification code; an emergency code; a financial account; an email address; a telephone number; a mailing address; authority of at least one employee of the payee; a digital certificate; a network credential; an Internet protocol address; a digital signature; an encryption key; electronic audible signature, and; an electronic visible signature.

In an illustrative embodiment of the method of the invention, the execution command comprises: accessing a user's financial account; processing a user's financial transaction; presenting selected data from user's rule-module data, and; alerting an emergency authority.

In an illustrative embodiment of the method of the invention, processing the financial transaction further comprises verifying the payee, wherein the verification platform electronically compares bid verification data of the payee with registered verification data of a payee, and makes a matching determination for verifying the payee's authority to access the rule-module nexus, said matching determination comprising: making a positive matching determination verifying that the payee is authorized to access the rule-module nexus, and; failing to make a positive matching determination, wherein making a negative matching determination is automatic, verifying that the payee is not authorized to access the rule-module nexus.

In an illustrative embodiment of the method of the invention, the bid verification data comprises any registered pattern data of the payee enabling the verification platform to verify that the payee is authorized to access the rule-module nexus.

In an illustrative embodiment of the method of the invention, upon the verification platform making a positive matching determination of the payee's authority to access the rule-module nexus, an execution command of the payee is invoked, comprising: authorizing a field for accessing rule-modules in the rule-module nexus; accepting a subordinated payee; authorizing a field for accessing a third-party computer being accessed by the rule-module nexus, and; invoking a processing preference of the payee.

In an illustrative embodiment of the method of the invention, upon a determination by the rule-module nexus that the payee has committed fraud involving the rule-module nexus, data of the payee data is registered with a fraud prevention platform, said data comprising: a pattern data; an execution command, and; a rule-module.

In an illustrative embodiment of the method of the invention, a platform is a computer-based set of related data subject to electronic processing with software using predetermined criteria associated with the rule-module nexus, said processing comprising: data storage; data queries; data retrieval, and; data modification.

In an illustrative embodiment of the method of the invention, the rule-module nexus is remotely located from the user, the user interface apparatus, and the nexus access token.

In an illustrative embodiment of the method of the invention, processing the financial transaction further comprises accessing the remotely located rule-module nexus via a network comprising: a cable network; a wireless network; a land-line phone network; the Internet; an intranet; a local area network, a wide area network; an electronic positioning network; a satellite network, and; an X.25 network.

In an illustrative embodiment of the method of the invention, processing the financial transaction further comprises transmitting transaction data via the rule-module nexus, said transaction data comprising: pricing information; a list of goods and services; a verification data of the user; a verification data of a payee; a date or time; a location of the user interface apparatus; a location of the nexus access token; an electronic positioning code; a unique payee code; a hardware verification code of the user interface apparatus; the name of a payee; an invoice number, and; transaction settlement instruction.

In an illustrative embodiment of the method of the invention, the payee and the account issuer are identical.

In an illustrative embodiment of the method of the invention, the predetermined time period for settlement comprises: an immediate adjustment of a balance in the user's financial account; a delayed adjustment of a balance in the user's financial account, and; a time interval for repeated adjustment of a balance in the user's financial account.

In an illustrative embodiment of the method of the invention, an account issuer of a financial account comprises: an owner, comprising a party that owns the financial account; a servicer, comprising a party that services the financial account on behalf of an account owner; an agent, comprising a party that acts on behalf of another party associated with the financial account, and; a fiduciary, comprising a party with the fiduciary duty to the financial account.

In an illustrative embodiment of the method of the invention, the account issuer comprises: a bank; a merchant; a scrips provider; credit account organization; the rule-module nexus; a government agency; an insurance company; a brokerage firm; a reward incentives provider; a services provider; a product provider, and; an internet payment provider.

In an illustrative embodiment of the method of the invention, the financial account is a computerized set of related financial data having a predetermined legal monetary value for usage comprising: purchasing a product; purchasing of a service; exchanging a product; exchanging a service, and; exchanging for other financial data of equivalent monetary value.

In an illustrative embodiment of the method of the invention, the financial account comprises any: checking account; credit account comprising Visa®, MasterCard® and American Express®; reward incentives account; insurance account; brokerage account; savings account; scrip incentives account; pre-paid account; pre-paid ticket; membership benefits account; private label credit account; services barter account; product barter account, and; internet payment account.

In an illustrative embodiment of the method of the invention, an incentives account comprises financial data, comprising: gift certificate units; stored-value units; electronic coupon units having a predetermined monetary value; minutes of telephone calling time; miles towards earning a free airplane flight; accruing units of a predetermined monetary value exchangeable for a product, and; accruing units of a predetermined monetary value exchangeable for a service.

In an illustrative embodiment of the method of the invention, accessing financial accounts further comprises presenting a financial account to the user, comprising: a visible display of an electronic visible signature; a visible text message, and; an audible signal of an electronic audible signature.

An illustrative embodiment of the method of the invention, further comprises ranking the plurality of proprietary financial accounts within a user account registry, wherein predetermined criteria is used for tagging and ranking the plurality of proprietary financial accounts in a certain order.

In an illustrative embodiment of the method of the invention, the predetermined criteria for the ranking further comprises: improving a transaction benefit for an account issuer, and; improving a transaction benefit for the user, and; improving a transaction benefit for a payee.

In an illustrative embodiment of the method of the invention, improving a transaction benefit further comprises: increasing efficiency; increasing speed; increasing profit; increasing security; decreasing cost; increasing reward incentives, and; invoking a surcharge predetermined by the user.

In an illustrative embodiment of the method of the invention, the ranking further comprises presenting to the user a display comprising: a default financial account; a plurality of financial accounts, with visibly distinct indicators for the respective rankings of the financial accounts, and; a plurality of financial accounts displayed in sequence as a function of their respective rankings.

In an illustrative embodiment of the method of the invention, the electronic visible signature is an electronic visible image comprising: streaming media; a video clip; a moving image; a holographic display; a static display; a dynamic display; an alpha-numeric display, and; a textual display.

In an illustrative embodiment of the method of the invention, ranking proprietary financial accounts further comprises presenting: a plurality of financial accounts, with audibly distinct indicators for the respective rankings of the financial accounts.

In an illustrative embodiment of the method of the invention, the electronic audible signature is an audible signal comprising: a musical fragment; speech; phonation, and; a song.

In an illustrative embodiment of the method of the invention, the surcharge comprises: an additional financial amount debited from the financial account selected by the user, and credited to a different financial account.

In an illustrative embodiment of the method of the invention, the surcharge comprises: a fixed financial amount, and; a variable financial amount.

In an illustrative embodiment of the method of the invention, the variable financial amount comprises a formula for calculating the surcharge as a function of a predetermined factor comprising: income of the user; a credit score of the user; a financial amount of the transaction; time; a purchasing frequency of the user; a balance in a financial account of the user; an economic indicator, and; a financial objective of the user.

In an illustrative embodiment of the method of the invention, processing the financial transaction further comprises the rule-module nexus accessing a third-party computer, comprising: verifying a user; detecting a rule-module nexus fraud; registering a user fraud; registering an account issuer fraud; registering a payee fraud; alerting of an emergency; resolving a compromised code; accessing a financial account; settlement of the financial transaction, and; completing the financial transaction.

In an illustrative embodiment of the method of the invention, accessing financial accounts further comprises verifying resources, wherein upon a selection of a financial account by the user, an electronic determination is made if the selected financial account of the user has sufficient resources for settlement of the financial transaction.

An illustrative embodiment of the method of the invention further comprises settlement of the financial transaction, comprising: invoking a debit of financial data within the selected financial account of the user, and; invoking a credit of financial data within the selected financial account of the user.

In an illustrative embodiment of the method of the invention, the data-storing in the nexus access token further comprises storing the unique user code in the nexus access token in memory comprising: read only memory, and; read and write memory.

In an illustrative embodiment of the method of the invention, processing the financial transaction further comprises: the rule-module nexus accessing a third-party computer; the rule-module nexus accessing the user interface apparatus, and; the rule-module nexus accessing a transaction terminal, and; the rule-module nexus accessing the user interface apparatus.

In an illustrative embodiment of the method of the invention, accessing financial accounts invokes an execution command comprising: querying the user's financial account balance; invoking an authorization a field within the rule-module nexus; invoking a user's rewards program; invoking a micro-merchandising advertising and upsell program; invoking an intelligent tracking and extrapolating agent, and; invoking an automated User notification program.

In an illustrative embodiment of the method of the invention, the automated User notification program invokes an outgoing communication comprising: sending a wireless phone text message; mailing a paper notice; sending a fax; a phone number dialing, and; sending a page.

In an illustrative embodiment of the method of the invention, the transaction terminal comprises: a wireless telephone; a wireless pager; a personal computer; a merchant point of sale register; a vending machine; a venue admittance device; a personal digital assistant; an internet kiosk; a land line telephone; a television, and; a digital music player.

In an illustrative embodiment of the method of the invention, the transaction terminal further comprises: a data-entering touch screen; a data-entering key pad; a visible display screen; an audible signal speaker, and; an audio receiver.

In an illustrative embodiment of the method of the invention, the user interface apparatus comprises: a contactless proximity communications interrogator; an electronic positioning system communications element; an electronic navigating system communications element; an electronic mapping system communications element; an electronic guiding system communications element; a contactless proximity communications data-reader and data-writer; a magnetic stripe reader; a magnetic ink character reader; a bar code reader; a data-entering touch screen; a data-entering key pad; a visible display screen; an audible signal speaker; an audio receiver, and; a biometric scanning sensor.

In an illustrative embodiment of the method of the invention, the nexus access token further comprises communicating capability, comprising: electronically readable bar-code imprint; electronically readable alpha-numeric code; radio signal; infrared signal; digital signal; cellular signal; visible display; and vibrational signal; acoustic sound signal; microwave signal; satellite signal; X-ray signal; pulsar signal; television signal; electronically readable magnetic stripe, and; photo signal.

In an illustrative embodiment of the method of the invention, the nexus access token is conjoined with a device comprising: wireless telephone, key fob; wireless pager; personal digital assistant; wearable ornament; digital media player; refillable container; removeably implantable computer chip; a user interface apparatus, and; door key.

In an illustrative embodiment of the method of the invention, the wearable ornament comprises any of the following: jewelry, and; clothing.

In an illustrative embodiment of the method of the invention, the refillable container comprises any of the following: a beverage container, and; a gasoline container.

In an illustrative embodiment of the method of the invention, processing the financial transaction further comprises the real-time elapsed in which the transaction terminal remains online communicating with the remotely located rule-module nexus as measured from verifying the user to selecting the financial account.

In an illustrative embodiment of the method of the invention, completing the financial transaction comprises: declining the financial transaction, and; settlement of the financial transaction.

In an illustrative embodiment of the method of the invention, declining the financial transaction is invoked by a party comprising: the user; an account issuer; a payee, and; the rule-module nexus.

In an illustrative embodiment of the method of the invention, declining the financial transaction is invoked based upon predetermined criteria comprising: insufficient financial data within the financial account; a credit score of the user; geography; usage frequency; usage recency; demographics of the user; financial amount of the financial transaction; a user fraud; a payee fraud; an account issuer fraud, and; a compromised code.

In an illustrative embodiment of the method of the invention, accessing the financial account further comprises determining resources via an account issuer, comprising: a positive determination wherein the selected financial account has sufficient resources, outputting an approval of the financial account for settlement of the financial transaction; a negative determination wherein the selected financial account has insufficient resources, outputting a decline of the financial account for settlement, whereupon at least one other financial account of the user is automatically displayed to the user by the transaction terminal based upon predetermined criteria.

In an illustrative embodiment of the method of the invention, a rule-module comprises: pattern data associated with a plurality of execution commands; a plurality of pattern data associated with an execution command, and; a plurality of pattern data associated with a plurality of execution commands.

In an illustrative embodiment of the method of the invention, the rule-module nexus comprises: a master rule-module nexus comprising all pattern data, execution commands, and rule-modules registered by users, payees and by account issuers, and; a subset rule-module nexus comprising a subset of all pattern data, execution commands, and rule-modules registered by users, by payees, and by account issuers.

In an illustrative embodiment of the method of the invention, the subset rule-module nexus comprises a subset of data selected as a function of predetermined criteria, comprising: a credit score of the user; geography; usage frequency; usage recency; demographics of the user; financial amount of the financial transaction; a user fraud; a payee fraud; an account issuer fraud, and; a compromised code.

In an illustrative embodiment of the method of the invention, registering a rule-module further comprises checking user re-registration, wherein the registered rule-module of the user is compared against a previously registered rule-module, wherein a match alerts the rule-module nexus that the user is attempting a re-registration.

In an illustrative embodiment of the method of the invention, the biometric sample is an electronic template scanned directly from a biometric of the user, said biometric comprising: a unique human characteristic, comprising: a finger, a retina, an iris, a voice, a face.

An illustrative embodiment of the method of the invention, further comprises notifying a user, wherein upon completing the financial transaction, the transaction terminal presents notification to the user of the financial transaction results, comprising: notification of a decline of the financial transaction, and; notification of settlement of the financial transaction.

In an illustrative embodiment of the method of the invention, presenting notification comprises: a visible display; an audible signal; and a printed receipt.

In an illustrative embodiment of the method of the invention, the emergency authority comprises: a government agency, and; a private entity.

In an illustrative embodiment of the method of the invention, registering a rule-module further comprises aggregating financial account maintenance, wherein the rule-module nexus aggregates maintenance services for the plurality of proprietary financial accounts of the user, said maintenance services comprising: invoicing the user; collecting invoice payments from the user; reconciling scrip incentive financial data; reconciling reward incentive financial data; being an agent for intelligent data tracking on behalf of the user, and; being an agent for extrapolating data on behalf of the user.

An illustrative embodiment of the method of the invention, further comprises verifying the user interface apparatus, wherein the verification platform electronically compares a bid hardware verification code of the user interface apparatus with a previously registered hardware verification code, to make a matching determination for verifying the authenticity of the user interface apparatus via the rule-module nexus, said matching determination comprising: making a positive matching determination verifying to the rule-module nexus that the user interface apparatus is authentic, and; failing to make a positive matching determination, wherein making a negative matching determination is automatic, verifying to the rule-module nexus that the user interface apparatus is not authentic.

The invention also describes a system for financial transactions, comprising:

a) a registration platform, configured within a rule-module nexus to comprise registering a rule-module to a user, said rule-module further comprising a pattern data associated with an execution command; b) a nexus access token, configured to comprise: portability, and; storing a unique user code of the user; c) a financial transaction processing platform, comprising: (i) a nexus access token; (ii) a user interface apparatus, conjoined with a transaction terminal and located remotely from the rule-module nexus, configured to gather bid verification data of the user, said verification data comprising a bid unique user code provided directly from the nexus access token, and; (iii) a verification platform configured to verify a user online using the bid verification data, wherein a user's authority to access the rule-module nexus is verified, and; (iv) a user account registry platform configured to access financial accounts via the rule-module nexus, wherein upon the verification platform verifying the user is authorized to access the rule-module nexus, the user is provided online access via the rule-module nexus to a plurality of proprietary financial accounts of the user for completing the financial transaction; whereby, a nexus access token and a rule-module nexus provide an authorized user access to a plurality of proprietary financial accounts for processing a financial transaction.

In an illustrative embodiment of the system of the invention, the unique user code comprises: no data which uniquely and directly identifies a specific financial account of the user; no live financial account data; no payment enabling data; a rule-module nexus routing code; an electronic positioning system code, and; a network routing instruction for processing the financial transaction via the rule-module nexus.

In an illustrative embodiment of the system of the invention, the pattern data comprises: a registration personal verification code; a registration secondary personal verification code; a registration unique user code, and; a plurality of proprietary financial accounts.

In an illustrative embodiment of the system of the invention, the user interface apparatus comprises: being conjoined with a transaction terminal; being conjoined with the nexus access token, and; being fully integrated with a transaction terminal.

In an illustrative embodiment of the system of the invention, the rule-module nexus is configured to preserve a processing preference of a party registered with the rule-module nexus, said party comprising: an account issuer; a user, and; a payee.

In an illustrative embodiment of the system of the invention, the transaction terminal is configured for a financial account to be selected by the user, comprising: a touch-screen; a key pad; data—an audio receiver.

In an illustrative embodiment of the system of the invention, preserving the processing preference of the party comprises: invoking criteria predetermined by the party for declining the financial transaction; invoking criteria predetermined by the party for approving the financial transaction, and; invoking criteria predetermined by the party for settlement of the financial transaction.

In an illustrative embodiment of the system of the invention, criteria predetermined by the party for settlement of the financial transaction comprises: invoking a proprietary network; invoking a discount rate; invoking an interchange fee; invoking a settlement protocol; invoking a surcharge; invoking a processing partner; enabling a payee to electronically store and batch the financial transaction with at least one other financial transaction for later settlement, and; invoking a time period for settlement.

In an illustrative embodiment of the system of the invention, the financial transaction processing platform is configured to comprise: precluding a global execution command from requiring all financial transactions of all users to bypass a processing preference of a party; precluding a global execution command from requiring all financial transactions of all users to invoke a specific processing preference of a specific party; precluding a global execution command from requiring all financial transactions of all users to use a specific merchant service, and; precluding a global execution command from requiring all financial transactions of all users to use a specific merchant product.

An illustrative embodiment of the system of the invention, further comprises a compromised code identification platform, configured to identify a code as compromised based on an occurance comprising: unusual usage of the code; loss of the code; inaccessibility of the code due to nexus access token damage; fraudulent duplication of the code; unauthorized access to the code, and; coersion of the user.

In an illustrative embodiment of the system of the invention, the compromised code comprises: a unique user code; a personal verification code; a verification approval code; a user account registry code; a payee account registry code; a unique payee code; an account issuer verification code; a payee verification code, and; a user interface apparatus hardware verification code.

An illustrative embodiment of the system of the invention, further comprises a compromised code resolution platform configured to comprise: deactivating the compromised code and activating a replacement code, and; verifying the user by providing dual personal verification codes.

In an illustrative embodiment of the system of the invention, activating the replacement code comprises: data-storing a replacement unique user code in the nexus access token of the user to replace a compromised unique user code stored therein, and; data-storing a replacement unique user code in a new nexus access token of the user, the new nexus access token replacing a nexus access token of the user storing a compromised unique user code.

In an illustrative embodiment of the system of the invention, the plurality comprises at least two.

In an illustrative embodiment of the system of the invention, a proprietary financial account comprises: a financial account having an account issuer which is distinct from an account issuer of another financial account; a financial account having a unique financial account identifier; a financial account having a code identifying an account issuer, as approved by the International Organization for Standardization [(Bank Identification Code, or BIC Code) or (Bank Identification Number, or BIN)]; a financial account having a code identifying an account issuer, as approved by the Society for Worldwide Interbank Financial Telecommunications (SWIFT Address or SWIFT Code), and; a financial account having a code identifying an account issuer, as approved by the American Banker's Association (ABA Routing Code);

In an illustrative embodiment of the system of the invention, the verification platform further comprises being configured to electronically compare the user's bid unique user code with a user's registration unique user code, and make a matching determination for verifying the user's authority to access the rule-module nexus, said matching determination comprising: making a positive matching determination verifying that the user is authorized to access the rule-module nexus, and; failing to make a positive matching determination, wherein making a negative matching determination is automatic, verifying that the user is not authorized to access the rule-module nexus.

In an illustrative embodiment of the system of the invention, upon a positive matching determination, the verification platform issues a verification approval code invoking a rule-module of the user in the rule-module nexus.

In an illustrative embodiment of the system of the invention, the verification approval code invokes a user account registry code identifying a user account registry platform, said user account registry code comprising: no data directly identifying a specific financial account of the user, and; no data identifying a primary financial account of the user for all financial transactions of the user.

In an illustrative embodiment of the system of the invention, the account registry platform comprises a plurality of proprietary financial accounts of the user.

In an illustrative embodiment of the system of the invention, the verification approval code comprises: a static code identifying the user account registry; a dynamic code comprising a unique code for storage and retrieval of data relating to processing of the financial transaction, and; a static code and a dynamic code.

An illustrative embodiment of the system of the invention, further comprises a rule-module modification platform, configured for a rule-module of the user to be modified by parties authorized by the rule-module nexus, said parties comprising: the user; the rule-module nexus; a payee; an account issuer; and a third-party with predetermined authorization.

In an illustrative embodiment of the system of the invention, modifying a rule-module further comprises: registering, deleting, adding pattern data; registering, deleting, adding execution commands, and; registering, deleting, adding associations between pattern data and execution commands.

In an illustrative embodiment of the system of the invention, the pattern data comprises: personal legal name; a private code; a driver's license number; a unique user code; a physical POS unique user code; a virtual POS unique user code; a personal verification code; a secondary personal verification code; an emergency code; a plurality of proprietary financial accounts; demographic information; an email address; social security number; a mother's maiden name; a biometric sample; a facial photograph; an Internet browsing pattern; a telephone number; a mailing address; a purchasing pattern; an authorized subordinated user; electronic data usage patterns; employee status; job title; data on user behavior patterns; a credit score; a digital certificate; a network credential; an Internet protocol address; a digital signature; an encryption key; an instant messaging address; personal medical records; an electronic audible signature, and; an electronic visible signature.

In an illustrative embodiment of the system of the invention, the execution command comprises invoking at least one of the following: accessing the rule-module nexus; accessing a user account registry; accessing a financial account; authorizing a subordinated user to access a financial account of the user; presenting a financial account of the user; completing the financial transaction; authorizing settlement of the online transaction; presenting the pattern data; presenting the execution command; presenting the rule-module; notifying an emergency authority upon rule-module nexus receiving an emergency code of the user; accessing a third-party database; accessing an account issuer database, and; access a payee database.

In an illustrative embodiment of the system of the invention, invoking the rule-module comprises: accessing a plurality of rule-modules in the rule-module nexus; accessing a plurality of proprietary financial accounts; authorizing a subordinated account user authority; accessing a third-party computer via the rule-module nexus.

In an illustrative embodiment of the system of the invention, the unique user code comprises: a dynamic code which changes periodically based on predetermined criteria synchronized with the verification platform, and; a static code which remains constant based on a predetermined code synchronized with the verification platform.

In an illustrative embodiment of the system of the invention, the personal verification code comprises: an alpha-numeric sequence selected by the user; an alpha-numeric sequence selected by the rule-module nexus; an alpha-numeric sequence selected by an account issuer; a visible image; an audible sound.

In an illustrative embodiment of the system of the invention, the rule-module nexus further comprises a fraud prevention platform configured to invoke criteria predetermined to detecting fraud by the user involving the rule-module nexus, said criteria comprising: unusual usage of bid verification data; unusual modifying of a rule-module, and; unusual accessing of a financial account.

An illustrative embodiment of the system of the invention, further comprises a user fraud registration platform configured to determine if the user has committed fraud involving the rule-module nexus, wherein data of the user is registered with a fraud prevention platform, said data comprising: a pattern data; an execution command, and; a rule-module.

An illustrative embodiment of the system of the invention, further comprises a rule-module nexus verification platform, configured for the private code, registered to the user, distinct from a personal verification code and not used in verifying the user, to be presented to the user via the rule-module nexus for verifying to the user that the authentic rule-module nexus has been accessed.

In an illustrative embodiment of the system of the invention, the private code is registered to the user in the rule-module nexus by a party, said party comprising: the user; the rule-module nexus, and; an account issuer.

An illustrative embodiment of the system of the invention, further comprises an emergency alert platform configured to send an alert via rule-module nexus of an emergency wherein, the emergency code, distinct from a personal verification code and not used in verifying the user, is provided by the user to the user interface apparatus, said emergency comprising: the bid verification data being compromised; the nexus access token being compromised, and; the user being coerced.

In an illustrative embodiment of the system of the invention, the emergency code comprises: an alternate personal verification code; an alpha-numeric code; a visible image, and; an audible signal.

In an illustrative embodiment of the system of the invention, the emergency alert platform is configured to invoke an execution command via the rule-module nexus, comprising: presenting a visible display of predetermined emergency data to the user; presenting an audible signal of predetermined emergency data to the user; alerting an emergency authority, and; identifying a compromised code.

In an illustrative embodiment of the system of the invention, the visible display comprises: a false financial account; a false financial data with in a financial account, and; confirming an emergency authority has been contacted.

In an illustrative embodiment of the system of the invention, the audible signal comprises: a false financial account; a false financial data within a financial account, and; confirming an emergency authority has been contacted.

In an illustrative embodiment of the system of the invention, the compromised code resolution platform is configured to further comprise deactivating the unique user code and activating a secondary personal verification code.

In an illustrative embodiment of the system of the invention, the rule-module nexus is configured to enable the user to provide a bid secondary personal verification code to the verification platform in replacement of the user's unique user code.

An illustrative embodiment of the system of the invention, further comprises: a) a calling platform configured for the user to call from a predetermined first phone number to a predetermined second phone number; b) a data-entering platform configured for the user to enter the personal verification code; c) an invoking platform configured for the user to invoke a secondary personal verification code, and; d) a notification platform for notifying the user that the secondary personal verification code has been activated for providing dual personal verification codes when verifying the user.

In an illustrative embodiment of the system of the invention, the invoking platform is configured to comprise: activating a registration secondary personal verification code of the user; creating by the user of a secondary personal verification code, and; accepting by the user of an offered secondary personal verification code.

An illustrative embodiment of the system of the invention, further comprises: a) an emailing platform for the user to email from a predetermined internet protocol address to a predetermined web site; b) a data-entering platform configured for the user to enter the personal verification code; c) an invoking platform configured for the user to invoke a secondary personal verification code, and; d) a notification platform for notifying the user that the secondary personal verification code has been activated for providing dual personal verification codes when verifying the user.

In an illustrative embodiment of the system of the invention, the invoking platform is configured to comprise: activating a registration secondary personal verification code of the user; creating by the user of a secondary personal verification code, and; accepting by the user of an offered secondary personal verification code In an illustrative embodiment of the system of the invention, the verification platform is configured to further comprise the bid personal verification code and the bid secondary personal verification code, both provided directly by the user to the user interface apparatus, being electronically compared with a registration personal verification code and a registration secondary personal verification code, to make a matching determination for verifying the user's authority to access the rule-module nexus.

In an illustrative embodiment of the system of the invention, the limited basis comprises: a predetermined time period; predetermined financial account access when using the secondary personal verification code; predetermined frequency for usage for using the secondary personal verification code, and; predetermined geographic area for using the secondary personal verification code.

In an illustrative embodiment of the system of the invention, the secondary personal verification code comprises: an alpha-numeric sequence selected by the user; an alpha-numeric sequence selected by the rule-module nexus; an alpha-numeric sequence selected by an account issuer; a visible image; an audible sound.

In an illustrative embodiment of the system of the invention, the financial transaction platform is configured to comprise: a credit transaction; a debit transaction; a scrip transaction; a rewards transaction; an electronic check transaction; a private label transaction; a stored value transaction; an electronic benefits transfer transaction; a brokerage trade transaction; invoking a surcharge to a transaction based on predetermined criteria; a buyer-seller exchange wherein a user's financial account balance is adjusted and a payee's financial account is correspondingly adjusted; an intra-account transfer transaction between financial accounts of the user without a buyer-seller exchange; redeeming a pre-paid ticket transaction for venue admittance without a buyer-seller exchange, and; redeeming a pre-paid membership benefit transaction for venue admittance without a buyer-seller exchange.

In an illustrative embodiment of the system of the invention, the venue comprises: a concert hall; a sports stadium; a movie theatre; a live-action theatre; an airplane; a train; a bus; a boat; a dance club; a restaurant; a garage; an office building; a health club; an apartment building; a medical facility; a toll booth, and; a dining club.

In an illustrative embodiment of the system of the invention, venue admittance comprises displaying a facial photograph of the user, wherein upon the verification platform making a positive matching determination that the user is authorized to access the rule-module nexus, the rule-module nexus transmits the user's registered facial photograph for display to a third-party present during the financial transaction for visually verifying that the user's actual face is sufficiently similar to the user's displayed facial photograph to permit venue admittance.

In an illustrative embodiment of the system of the invention, the account registry platform is configured to comprise: querying data associated with a financial account; retrieving data from a financial account; querying data of a financial account via accessing a third-party computer; accessing a third-party computer to retrieve data from a financial account; presenting a visible electronic image of a financial account; presenting visible electronic text communication of a financial account; presenting a visible J2ME-enabled communication; presenting an audible electronic signal of a financial account; adjusting the balance in a financial account by making a credit to a financial account; transmitting an electronic positioning system communication; transmitting an electronic navigating system communication; transmitting an electronic mapping communication; an electronic guiding system communication; transmitting an electronic text message of a financial account, and; adjusting the balance in a financial account by making a debit from a financial account.

In an illustrative embodiment of the system of the invention, the nexus access token is configured to further comprise: storing no data which uniquely and directly identifies a specific financial account of the user; storing no live financial account data, and; storing no payment-enabling data.

In an illustrative embodiment of the system of the invention, the verification platform is configured to further comprise displaying a facial photograph of the user, wherein upon the verification platform making a positive matching determination that the user is authorized to access the rule-module nexus, the rule-module nexus transmits the registered facial photograph of the user for display to a third-party present during the financial transaction, for visually verifying that the user's actual face is sufficiently similar to the user's displayed facial photograph to permit the financial transaction.

In an illustrative embodiment of the system of the invention, the user interface apparatus is configured to comprise storing a hardware verification code, registered with the rule-module nexus and unique to the user interface apparatus.

In an illustrative embodiment of the system of the invention, the registration platform is configured to further comprise registering a rule-module to a payee, said registered rule-module comprising a pattern data associated with an execution command.

In an illustrative embodiment of the system of the invention, the pattern data comprises: the payee's legal name; a user interface apparatus hardware verification code; an employer identification number; financial account access authorization fields; a payee account registry code; a unique payee code; a payee verification code; a transaction terminal identification code; a user interface apparatus identification code; an emergency code; a financial account; an email address; a telephone number; a mailing address; authority of at least one employee of the payee; a digital certificate; a network credential; an Internet protocol address; a digital signature; an encryption key; electronic audible signature, and; an electronic visible signature.

In an illustrative embodiment of the system of the invention, the execution command comprises: accessing a user's financial account; processing a user's financial transaction; presenting selected data from user's rule-module data, and; alerting an emergency authority.

In an illustrative embodiment of the system of the invention, the verification platform is further configured to verify the payee by electronically comparing bid verification data of the payee with registered verification data of a payee, and makes a matching determination for verifying the payee's authority to access the rule-module nexus, said matching determination comprising: making a positive matching determination verifying that the payee is authorized to access the rule-module nexus, and; failing to make a positive matching determination, wherein making a negative matching determination is automatic, verifying that the payee is not authorized to access the rule-module nexus.

In an illustrative embodiment of the system of the invention, the bid verification data comprises any registered pattern data of the payee enabling the verification platform to verify that the payee is authorized to access the rule-module nexus.

In an illustrative embodiment of the system of the invention, upon the verification platform making a positive matching determination of the payee's authority to access the rule-module nexus, an execution command of the payee is invoked, comprising: authorizing a field for accessing rule-modules in the rule-module nexus; accepting a subordinated payee; authorizing a field for accessing a third-party computer being accessed by the rule-module nexus, and; invoking a processing preference of the payee.

An illustrative embodiment of the system of the invention, further comprises a fraud prevention platform configured to register data of the payee upon a determination by the rule-module nexus that the payee has committed fraud involving the rule-module nexus, said data comprising: a pattern data; an execution command, and; a rule-module.

In an illustrative embodiment of the system of the invention, a platform is a computer-based set of related data subject to electronic processing with software using predetermined criteria associated with the rule-module nexus, said processing comprising: data storage; data queries; data retrieval, and; data modification.

In an illustrative embodiment of the system of the invention, the rule-module nexus is remotely located from the user, the user interface apparatus, and the nexus access token.

In an illustrative embodiment of the system of the invention, the financial transaction processing platform is configured to further comprise accessing the remotely located rule-module nexus via a network, comprising: a cable network; a wireless network; a land-line phone network; the Internet; an intranet; a local area network, a wide area network; an electronic positioning network; a satellite network, and; an X.25 network.

In an illustrative embodiment of the system of the invention, the financial transaction processing platform further comprises transmitting transaction data via the rule-module nexus, said transaction data comprising: pricing information; a list of goods and services; a verification data of the user; a verification data of a payee; a date or time; a location of the user interface apparatus; a location of the nexus access token; an electronic positioning code; a unique payee code; a hardware verification code of the user interface apparatus; the name of a payee; an invoice number, and; transaction settlement instruction.

In an illustrative embodiment of the system of the invention, the payee and the account issuer are identical.

In an illustrative embodiment of the system of the invention, the predetermined time period for settlement comprises: an immediate adjustment of a balance in the user's financial account; a delayed adjustment of a balance in the user's financial account, and; a time interval for repeated adjustment of a balance in the user's financial account.

In an illustrative embodiment of the system of the invention, the account issuer of a financial account comprises: an owner, comprising a party that owns a financial account; a servicer, comprising a party that services a financial account on behalf of an account owner; an agent, comprising a party that acts on behalf of another party associated with a financial account, and; a fiduciary, comprising a party with a fiduciary duty to the financial account.

In an illustrative embodiment of the system of the invention, the account issuer comprises: a bank; a merchant; a scrips provider; credit account organization; the rule-module nexus; a government agency; an insurance company; a brokerage firm; a reward incentives provider; a services provider; a product provider, and; an internet payment provider.

In an illustrative embodiment of the system of the invention, the financial account is a computerized set of related financial data having a predetermined legal monetary value for usage comprising: purchasing a product; purchasing of a service; exchanging a product; exchanging a service, and; exchanging for other financial data of equivalent monetary value.

In an illustrative embodiment of the system of the invention, the financial account comprises any: checking account; credit account comprising Visa®, MasterCard® and American Express®; reward incentives account; insurance account; brokerage account; savings account; scrip incentives account; pre-paid account; pre-paid ticket; membership benefits account; private label credit account; services barter account; product barter to account, and; internet payment account.

In an illustrative embodiment of the system of the invention, an incentives account comprises financial data, comprising: gift certificate units; stored-value units; electronic coupon units having a predetermined monetary value; minutes of telephone calling time; miles towards earning a free airplane flight; accruing units of a predetermined monetary value exchangeable for a product, and; accruing units of a predetermined monetary value exchangeable for a service.

An illustrative embodiment of the system of the invention is configured to further comprise presenting a financial account to the user, comprising: a visible display of an electronic visible signature; a visible text message, and; an audible signal of an electronic audible signature.

In an illustrative embodiment of the system of the invention, the user account registry platform is configured to further comprise ranking the plurality of proprietary financial accounts, wherein predetermined criteria is used for tagging and ranking the plurality of proprietary financial accounts in a certain order.

In an illustrative embodiment of the system of the invention, the predetermined criteria for the ranking further comprises: improving a transaction benefit for an account issuer; improving a transaction benefit for the user, and; improving a transaction benefit for a payee.

In an illustrative embodiment of the system of the invention, improving a transaction benefit further comprises: increasing efficiency; increasing speed; increasing profit; increasing security; decreasing cost; increasing reward incentives, and; invoking a surcharge predetermined by the user.

In an illustrative embodiment of the system of the invention, the ranking further comprises presenting to the user a display comprising: a default financial account; a plurality of financial accounts, with visibly distinct indicators for the respective rankings of the financial accounts, and; a plurality of financial accounts displayed in sequence as a function of their respective rankings.

In an illustrative embodiment of the system of the invention, the electronic visible signature is an electronic visible image comprising: streaming media; a video clip; a moving image; a holographic display; a static display; a dynamic display; an alpha-numeric display, and; a textual display.

In an illustrative embodiment of the system of the invention, ranking proprietary financial accounts further comprises presenting: a plurality of financial accounts, with audibly distinct indicators for the respective rankings of the financial accounts.

In an illustrative embodiment of the system of the invention, the electronic audible signature is an audible signal comprising: a musical fragment; speech; phonation, and; a song.

In an illustrative embodiment of the system of the invention, the surcharge comprises: an additional financial amount debited from the financial account selected by the user, and credited to a different financial account.

In an illustrative embodiment of the system of the invention, the surcharge comprises: a fixed financial amount, and; a variable financial amount.

In an illustrative embodiment of the system of the invention, the variable financial amount comprises a formula for calculating the surcharge as a function of a predetermined factor comprising: income of the user; a credit score of the user; a financial amount of the transaction; time; a purchasing frequency of the user; a balance in a financial account of the user; an economic indicator, and; a financial objective of the user.

In an illustrative embodiment of the system of the invention, the financial transaction processing platform is configured to further comprise the rule-module nexus accessing a third-party computer, comprising: verifying a user; detecting a rule-module nexus fraud; registering a user fraud; registering a payee fraud; registering an account issuer fraud; alerting of an emergency; resolving a compromised code; accessing a financial account; settlement of the financial transaction, and; completing the financial transaction.

In an illustrative embodiment of the system of the invention, the user account registry platform is configured to further comprise verifying resources, wherein upon a selection of a financial account by the user, an electronic determination is made if the selected financial account of the user has sufficient resources for settlement of the financial transaction.

In an illustrative embodiment of the system of the invention, the financial transaction processing platform is configured to further comprise settlement of the financial transaction, comprising: invoking a debit of financial data within the selected financial account of the user, and; invoking a credit of financial data within the selected financial account of the user.

In an illustrative embodiment of the system of the invention, the nexus access token is configured to further comprise: read only memory, and; read and write memory.

In an illustrative embodiment of the system of the invention, the financial transaction processing platform is configured to further comprise: the rule-module nexus accessing a third-party computer; the rule-module nexus accessing the transaction terminal, and; the rule-module nexus accessing the user interface apparatus.

In an illustrative embodiment of the system of the invention, the user account registry platform is configured to further comprise accessing financial accounts, comprising: querying the user's financial account balance; invoking an authorization a field within the rule-module nexus; invoking a user's rewards program; invoking a micro-merchandising advertising and upsell program; invoking an intelligent tracking and extrapolating agent, and; invoking an automated User notification program.

In an illustrative embodiment of the system of the invention, the automated User notification program invokes an outgoing communication comprising: sending a wireless phone text message; mailing a paper notice; sending a fax; a phone number dialing, and; sending a page.

In an illustrative embodiment of the system of the invention, the transaction terminal comprises: a wireless telephone; a wireless pager; a personal computer; a merchant point of sale register; a vending machine; a venue admittance device; a personal digital assistant; an interne kiosk; a land line telephone; a television, and; a digital music player.

In an illustrative embodiment of the system of the invention, the transaction terminal further comprises: a data-entering touch screen; a data-entering key pad; a visible display screen; an audible signal speaker, and; an audio receiver.

In an illustrative embodiment of the system of the invention, the user interface apparatus comprises: a contactless proximity communications interrogator; an electronic positioning system communications element; an electronic navigating system communications element; an electronic mapping system communications element; an electronic guiding system communications element; a contactless proximity communications data-reader and data-writer; a magnetic stripe reader; a magnetic ink character reader; a bar code reader; a data-entering touch screen; a data-entering key pad; a visible display screen; an audible signal speaker; an audio receiver, and; a biometric scanning sensor.

In an illustrative embodiment of the system of the invention, the nexus access token further comprises data communications, comprising: electronically readable bar-code imprint; electronically readable alpha-numeric code; radio signal; infrared signal; digital signal; cellular signal; visible display; and vibrational signal; acoustic sound signal; microwave signal; satellite signal; X-ray signal; pulsar signal; television signal; electronically readable magnetic stripe, and; photo signal.

In an illustrative embodiment of the system of the invention, the nexus access token is conjoined with a device comprising: wireless telephone, key fob; wireless pager; personal digital assistant; wearable ornament; digital media player; refillable container; removeably implantable computer chip; a user interface apparatus, and; door key.

In an illustrative embodiment of the system of the invention, the wearable ornament comprises any of the following: jewelry, and; clothing.

In an illustrative embodiment of the system of the invention, the refillable container comprises any of the following: a beverage container, and; a gasoline container.

In an illustrative embodiment of the system of the invention, the financial transaction processing platform is configured to further comprise measuring the real-time elapsed in which the transaction terminal remains online communicating with the remotely located rule-module nexus from verifying the user to selecting the financial account.

In an illustrative embodiment of the system of the invention, completing the financial transaction comprises: declining the financial transaction, and; settlement of the financial transaction.

In an illustrative embodiment of the system of the invention, declining the financial transaction is invoked by a party comprising: the user; an account issuer; a payee, and; the rule-module nexus.

In an illustrative embodiment of the system of the invention, declining the financial transaction is based upon predetermined criteria comprising: insufficient financial data within the financial account; a credit score of the user; geography; usage frequency; usage recency; demographics of the user; financial amount of the financial transaction; a user fraud; an account issuer fraud; a payee fraud, and; a compromised code.

An illustrative embodiment of the system of the invention further comprises a resource determination platform configured to determining resources of a financial account via an account issuer, comprising: a positive determination wherein the selected financial account has sufficient resources, outputting an approval of the financial account for settlement of the financial transaction; a negative determination wherein the selected financial account has insufficient resources, outputting a decline of the financial account for settlement, whereupon at least one other financial account of the user is automatically displayed to the user by the transaction terminal based upon predetermined criteria.

In an illustrative embodiment of the system of the invention, a rule-module comprises: pattern data associated with a plurality of execution commands; a plurality of pattern data associated with an execution command, and; a plurality of pattern data associated with a plurality of execution commands.

In an illustrative embodiment of the system of the invention, the rule-module nexus is configured to comprise: a master rule-module nexus comprising all pattern data, execution commands, and rule-modules registered by users, by payees, and by account issuers, and; a subset rule-module nexus comprising a subset of all pattern data, execution commands, and rule-modules registered by users, by payees, and by account issuers.

In an illustrative embodiment of the system of the invention, the subset rule-module nexus is configured to comprise a subset of data selected as a function of predetermined criteria, comprising: a credit score of the user; geography; usage frequency; usage recency; demographics of the user; financial amount of the financial transaction; a user fraud; a payee fraud; an account issuer fraud, and; a compromised code.

In an illustrative embodiment of the system of the invention, registering a rule-module further comprises checking user re-registration, wherein the registered rule-module of the user is compared against a previously registered rule-module, wherein a match alerts the rule-module nexus that the user is attempting a re-registration.

In an illustrative embodiment of the system of the invention, the biometric sample is an electronic template scanned directly from a biometric of the user, said biometric comprising: a unique human characteristic, comprising: a finger, a retina, an iris, a voice, a face.

An illustrative embodiment of the system of the invention, further comprises a notification platform configured to present notification of the financial transaction results to the user upon completing the financial transaction, comprising: notification via the transaction terminal of a decline of the financial transaction, and; notification via the transaction terminal of settlement of the one-line financial transaction.

In an illustrative embodiment of the system of the invention, presenting notification comprises: a visible display; an audible signal; and a printed receipt.

In an illustrative embodiment of the system of the invention, the emergency authority comprises: a government agency, and; a private entity.

In an illustrative embodiment of the system of the invention, the rule-module nexus further comprises a financial account aggregating maintenance module configured to aggregate maintenance services for the plurality of proprietary financial accounts of the user, said maintenance services comprising: invoicing the user; collecting invoice payments from the user; reconciling scrip incentive financial data; reconciling reward incentive financial data; being an agent for intelligent data tracking on behalf of the user, and; being an agent for extrapolating data on behalf of the user.

In an illustrative embodiment of the system of the invention, the verification platform is configured to further comprise verifying the user interface apparatus by electronically comparing a bid hardware verification code of the user interface apparatus with a previously registered hardware verification code, to make a matching determination for verifying the authenticity of the user interface apparatus via the rule-module nexus, said matching determination comprising: making a positive matching determination verifying to the rule-module nexus that the user interface apparatus is authentic, and; failing to make a positive matching determination, wherein making a negative matching determination is automatic, verifying to the rule-module nexus that the user interface apparatus is not authentic.

In another illustrative embodiment of the method of the invention, wherein during verifying the user, the verification data further comprises a bid personal verification code provided directly by the user, wherein the verification platform electronically compares the user's bid unique user code and the user's bid personal verification code with a user's registration unique user code and a user's registration personal verification code, and makes a matching determination for verifying the user's authority to access the rule-module nexus, said matching determination comprising: making a positive matching determination verifying that the user is authorized to access the rule-module nexus, and; failing to make a positive matching determination, wherein making a negative matching determination is automatic, verifying that the user is not authorized to access the rule-module nexus.

In another illustrative embodiment of the system the invention, wherein the verification data further comprises a bid personal verification code provided directly by the user, and wherein the verification platform further comprises being configured to electronically compare the user's bid unique user code and the user's bid personal verification code with a user's registration unique user code and a user's registration personal verification code, and make a matching determination for verifying the user's authority to access the rule-module nexus, said matching determination comprising: making a positive matching determination verifying that the user is authorized to access the rule-module nexus, and; failing to make a positive matching determination, wherein making a negative matching determination is automatic, verifying that the user is not authorized to access the rule-module nexus.

In an illustrative embodiment of the method of the invention, the data-storing in the nexus access token further comprises: registering the pattern data of a user via a user interface apparatus; transmitting said pattern data to the rule-module nexus; transmitting a unique user code via the rule-module nexus to a dispensing kiosk co-located, but not conjoined, with said user interface apparatus; data-storing of said unique user code into a nexus access token by the dispensing kiosk, and; dispensing said nexus access token to the user via the dispensing kiosk.

In an illustrative embodiment of the system of the invention, a dispensing kiosk is configured to comprise: being co-located but not conjoined with said user interface apparatus; receiving a unique user code via the rule-module nexus, upon the rule-module nexus having received the pattern data of a user via the user interface apparatus; data-storing said unique user code into a nexus access token, and; dispensing to the user said nexus access token storing the unique user code.

In another embodiment of the method of the invention, a party having fiduciary duty for a financial account of a user has a responsibility comprising: managing financial data within a financial account; adjusting financial data within a financial account, and; reconciling financial data within a financial account.

In another embodiment of the system of the invention, a party having fiduciary duty for a financial account of a user has a responsibility comprising: managing financial data within a financial account; adjusting financial data within a financial account, and; reconciling financial data within a financial account.

In another illustrative embodiment of the method of the invention, a financial account further comprises: an account typing-code specifying the type of financial account; an account name, comprising a text name of the financial account; a currency code, comprising an ISO 4217 code specifying the currency of the financial account.

In another illustrative embodiment of the method of the invention, the type of financial account comprises: savings; checking; money market; rewards; scrips; brokerage; money market; money fund; credit; debit; prepaid, and; insurance.

In an illustrative embodiment of the method of the invention, accessing a financial account comprises: electronically accessing a rule-module associated with a financial account; electronically querying data associated with a financial account; electronically querying data contained within a financial account; electronically invoking data associated with a financial account; electronically invoking data contained within a financial account.

In an illustrative embodiment of the method of the invention, a unique account identifier comprises: a unique code which is electronically associated with only one financial account; a unique code which electronically identifies only one financial account.

In another illustrative embodiment of the system of the invention, a financial account further comprises: an account typing-code specifying the type of financial account; an account name, comprising a text name of the financial account; a currency code, comprising an ISO 4217 code specifying the currency of the financial account.

In another illustrative embodiment of the system of the invention, the type of financial account comprises: savings; checking; money market; rewards; scrips; brokerage; money market; money fund; credit; debit; prepaid, and; insurance.

In an illustrative embodiment of the system of the invention, accessing a financial account comprises: accessing a rule-module associated with a financial account; electronically querying data associated with a financial account; electronically querying data contained within a financial account; electronically invoking data associated with a financial account; electronically invoking data contained within a financial account.

In an illustrative embodiment of the system of the invention, a unique account identifier comprises: a unique code which is electronically associated with only one financial account; a unique code which electronically identifies only one financial account.

In another embodiment of the method of the invention, the portable nexus access token comprises: being dimensionally small enough to be handheld, and; being of a sufficiently light weight as to be handheld.

In another embodiment of the method of the invention, the user interface apparatus comprises: being dimensionally small enough to be handheld, and; being of a sufficiently light weight as to be handheld.

In another embodiment of the method of the invention, the visible electronic text comprises: an instant message (IM); a short message service (SMS), and; a J2ME-enabled message.

In another embodiment of the method of the invention, the visible display is an electronically readable bar code image.

In another embodiment of the method of the invention, a rule-module is registered to a payee, said registered rule-module comprising a pattern data associated with an execution command.

In another embodiment of the method of the invention, the pattern data comprises: the payee's legal name; a user interface apparatus hardware verification code; an employer identification number; a payee's electronic positioning system code; financial account access authorization fields; a unique payee code; a payee verification code; a transaction terminal identification code; an emergency code; a financial account; an email address; a telephone number; a mailing address; authority of at least one employee of the payee; a digital certificate; a network credential; an Internet protocol address; a digital signature; an encryption key; electronic audible signature, and; an electronic visible signature.

In another embodiment of the method of the invention, the execution command comprises: accessing a user's financial account; processing a user's financial transaction; presenting selected data from user's rule-module data, and; alerting an emergency authority.

In another embodiment of the method of the invention, processing the financial transaction further comprises verifying the payee, wherein the verification platform electronically compares bid verification data of the payee with registered verification data of a payee, and makes a matching determination for verifying the payee's authority to access the rule-module nexus, said matching determination comprising: making a positive matching determination verifying that the payee is authorized to access the rule-module nexus, and; failing to make a positive matching determination, wherein making a negative matching determination is automatic, verifying that the payee is not authorized to access the rule-module nexus.

In another embodiment of the method of the invention, the bid verification data comprises any registered pattern data of the payee enabling the verification platform to verify that the payee is authorized to access the rule-module nexus.

In another embodiment of the method of the invention, upon the verification platform making a positive matching determination of the payee's authority to access the rule-module nexus, an execution command of the payee is invoked, comprising: authorizing a field for accessing rule-modules in the rule-module nexus; accepting a subordinated account user; authorizing a field for accessing a third-party computer being accessed by the rule-module nexus, and; invoking a processing preference of the payee.

In another embodiment of the method of the invention, upon a determination by the rule-module nexus that the payee has committed fraud involving the rule-module nexus, data of the payee data is registered with a fraud prevention platform, said data comprising: a pattern data; an execution command, and; a rule-module.

In another embodiment of the method of the invention, a platform is a computer-based set of related data subject to electronic processing with software using predetermined criteria associated with the rule-module nexus, said processing comprising: data storage; data queries; data retrieval, and; data modification.

In another embodiment of the method of the invention, the rule-module nexus is remotely located from the user, the user interface apparatus, and the nexus access token.

In another embodiment of the method of the invention, processing the financial transaction further comprises accessing the remotely located rule-module nexus via a network comprising: a cable network; a wireless network; a land-line phone network; the Internet; an intranet; a local area network, a wide area network; an electronic positioning network; a satellite network, and; an X.25 network.

In another embodiment of the method of the invention, the electronic positioning code, identifying a real-time geographic location and invoking a unique payee code, is provided by a device comprising: a nexus access token; a user interface apparatus, and; a transaction terminal.

In another embodiment of the method of the invention, invoking said unique payee code comprises: invoking a financial account of the payee; invoking an arbitrage rule-module; invoking predetermined criteria for tagging and ranking, in a certain order, a plurality of proprietary financial accounts of a user.

In another embodiment of the method of the invention, the predetermined criteria for the ranking further comprises: improving a transaction benefit for an account issuer; improving a transaction benefit for the user, and; improving a transaction benefit for a payee.

In another embodiment of the method of the invention, improving a transaction benefit further comprises: increasing efficiency; increasing speed; increasing profit; increasing security; decreasing cost; increasing reward incentives, and; invoking a surcharge predetermined by the user.

In another embodiment of the method of the invention, the ranking invokes presenting financial account data to the user, comprising: a default financial account; a plurality of financial accounts, with visibly distinct indicators for the respective rankings of the financial accounts, and; a plurality of financial accounts displayed in sequence as a function of their respective ranking.

In another embodiment of the method of the invention, presenting to the user a default financial account further comprises: presenting to the user a first default financial account; presenting to the user a second default financial account if the first default financial account is declined, and; presenting to the user an "$N^{th}$" default financial account, in the event the "$N^{th}-1$" default financial account is declined.

In another embodiment of the method of the invention, the hardware verification code of the user interface apparatus invokes a unique payee code.

In another embodiment of the method of the invention, invoking said unique payee code comprises: invoking a financial account of the payee; invoking predetermined criteria for tagging and ranking, in a certain order, a plurality of proprietary financial accounts of a user; invoking an arbitrage rule-module; invoking a financial account routing code of the payee; transmitting payee data to the user interface apparatus, and; transmitting payee data to the nexus access token.

In another embodiment of the method of the invention, the predetermined criteria for the ranking further comprises: improving a transaction benefit for an account issuer; improving a transaction benefit for the user, and; improving a transaction benefit for a payee.

In another embodiment of the method of the invention, improving a transaction benefit further comprises: increasing efficiency; increasing speed; increasing profit; increasing security; decreasing cost; increasing reward incentives, and; invoking a surcharge predetermined by the user.

In another embodiment of the method of the invention, the ranking invokes presenting financial account data to the user, comprising: a default financial account; a plurality of financial accounts, with visibly distinct indicators for the respective rankings of the financial accounts, and; a plurality of financial accounts displayed in sequence as a function of their respective ranking.

In another embodiment of the method of the invention, presenting to the user a default financial account further comprises: presenting to the user a first default financial account; presenting to the user a second default financial account if the first default financial account is declined, and; presenting to the user an "$N^{th}$" default financial account, in the event the "$N^{th}-1$" default financial account is declined.

In another embodiment of the system of the invention, the portable nexus access token comprises: being dimensionally small enough to be handheld, and; being of a sufficiently light weight as to be handheld.

In another embodiment of the system of the invention, the user interface apparatus comprises: being dimensionally small enough to be handheld, and; being of a sufficiently light weight as to be handheld.

In another embodiment of the system of the invention, the visible electronic text comprises: an instant message (IM); a short message service (SMS), and; a J2ME-enabled message.

In another embodiment of the system of the invention, the visible display is an electronically readable bar code image.

In another embodiment of the system of the invention, a rule-module is registered to a payee, said registered rule-module comprising a pattern data associated with an execution command.

In another embodiment of the system of the invention, the pattern data comprises: the payee's legal name; a user interface apparatus hardware verification code; an employer identification number; a payee's electronic positioning system code; financial account access authorization fields; a unique payee code; a payee verification code; a transaction terminal identification code; an emergency code; a financial account; an email address; a telephone number; a mailing address; authority of at least one employee of the payee; a digital certificate; a network credential; an Internet protocol address; a digital signature; an encryption key; electronic audible signature, and; an electronic visible signature.

In another embodiment of the system of the invention, the execution command comprises: accessing a user's financial account; processing a user's financial transaction; presenting selected data from user's rule-module data, and; alerting an emergency authority.

In another embodiment of the system of the invention, the financial transaction further comprises verifying the payee, wherein the verification platform electronically compares bid verification data of the payee with registered verification data of a payee, and makes a matching determination for verifying the payee's authority to access the rule-module nexus, said matching determination comprising: making a positive matching determination verifying that the payee is authorized to access the rule-module nexus, and; failing to make a positive matching determination, wherein making a negative matching determination is automatic, verifying that the payee is not authorized to access the rule-module nexus.

In another embodiment of the system of the invention, the bid verification data comprises any registered pattern data of the payee enabling the verification platform to verify that the payee is authorized to access the rule-module nexus.

In another embodiment of the system of the invention, upon the verification platform making a positive matching determination of the payee's authority to access the rule-module nexus, an execution command of the payee is invoked, comprising: authorizing a field for accessing rule-modules in the rule-module nexus; accepting a subordinated account user; authorizing a field for accessing a third-party computer being accessed by the rule-module nexus, and; invoking a processing preference of the payee.

In another embodiment of the system of the invention, upon a determination by the rule-module nexus that the payee has committed fraud involving the rule-module nexus, data of the payee data is registered with a fraud prevention platform, said data comprising: a pattern data; an execution command, and; a rule-module.

In another embodiment of the system of the invention, a platform is a computer-based set of related data subject to electronic processing with software using predetermined criteria associated with the rule-module nexus, said processing comprising: data storage; data queries; data retrieval, and; data modification.

In another embodiment of the system of the invention, the rule-module nexus is remotely located from the user, the user interface apparatus, and the nexus access token.

In another embodiment of the system of the invention, processing the financial transaction further comprises accessing the remotely located rule-module nexus via a network comprising: a cable network; a wireless network; a land-line phone network; the Internet; an intranet; a local area network, a wide area network; an electronic positioning network; a satellite network, and; an X.25 network.

In another embodiment of the system of the invention, the electronic positioning code, identifying a real-time geographic location and invoking a unique payee code, is provided by a device comprising: a nexus access token; a user interface apparatus, and; a transaction terminal.

In another embodiment of the system of the invention, invoking said unique payee code comprises: invoking a financial account of the payee; invoking an arbitrage rule-module; invoking predetermined criteria for tagging and ranking, in a certain order, a plurality of proprietary financial accounts of a user.

In another embodiment of the system of the invention, the predetermined criteria for the ranking further comprises: improving a transaction benefit for an account issuer; improving a transaction benefit for the user, and; improving a transaction benefit for a payee.

In another embodiment of the system of the invention, improving a transaction benefit further comprises: increasing efficiency; increasing speed; increasing profit; increasing security; decreasing cost; increasing reward incentives, and; invoking a surcharge predetermined by the user.

In another embodiment of the system of the invention, the ranking invokes presenting financial account data to the user, comprising: a default financial account; a plurality of financial accounts, with visibly distinct indicators for the respective rankings of the financial accounts, and; a plurality of financial accounts displayed in sequence as a function of their respective ranking.

In another embodiment of the system of the invention, presenting to the user a default financial account further comprises: presenting to the user a first default financial account; presenting to the user a second default financial account if the first default financial account is declined, and; presenting to the user an "$N^{th}$" default financial account, in the event the "$N^{th}-1$" default financial account is declined.

In another embodiment of the system of the invention, the hardware verification code of the user interface apparatus invokes a unique payee code.

In another embodiment of the system of the invention, invoking said unique payee code comprises: invoking a financial account of the payee; invoking predetermined criteria for tagging and ranking, in a certain order, a plurality of proprietary financial accounts of a user; invoking a financial account routing code of the payee; invoking an arbitrage rule-module; transmitting payee data to the user interface apparatus, and; transmitting payee data to the nexus access token.

In another embodiment of the system of the invention, the predetermined criteria for the ranking further comprises: improving a transaction benefit for an account issuer; improving a transaction benefit for the user, and; improving a transaction benefit for a payee.

In another embodiment of the system of the invention, improving a transaction benefit further comprises: increasing efficiency; increasing speed; increasing profit; increasing security; decreasing cost; increasing reward incentives, and; invoking a surcharge predetermined by the user.

In another embodiment of the system of the invention, the ranking invokes presenting financial account data to the user, comprising: a default financial account; a plurality of financial accounts, with visibly distinct indicators for the respective rankings of the financial accounts, and; a plurality of financial accounts displayed in sequence as a function of their respective ranking.

In another embodiment of the system of the invention, presenting to the user a default financial account further comprises: presenting to the user a first default financial account; presenting to the user a second default financial account if the first default financial account is declined, and; presenting to the user an "$N^{th}$" default financial account, in the event the "$N^{th}-1$" default financial account is declined.

In another embodiment of the method of the invention, accessing financial accounts further comprises accessing a financial interchange platform, wherein units of financial data are electronically transmitted, comprising: being transmitted between a plurality of proprietary financial accounts of a user, and; being transmitted between a plurality of proprietary financial accounts of a plurality of users.

In another embodiment of the method of the invention, being transmitted further comprises: converting financial data; trading financial data; exchanging financial data, and; transferring financial data.

In another embodiment, the system of the invention further comprises a financial interchange platform configured to comprise: accessing a financial interchange platform, wherein units of financial data are electronically transmitted, comprising: being transmitted between a plurality of proprietary financial accounts of a user, and; being transmitted between a plurality of proprietary financial accounts of a plurality of users.

In another embodiment of the system of the invention, being transmitted further comprises: converting financial data; trading financial data; exchanging financial data, and; transferring financial data.

In another embodiment, the method of the invention further comprises invoking a rule-module nexus routing code which is electronically stored within, and invoked by, a device comprising: a user interface apparatus, and; a transaction terminal.

In another embodiment, the method of the invention further comprises invoking a rule-module nexus routing code by the device occurs via an event comprising: scanning of a unique user code from a nexus access token, and; instructing the device to process the financial transaction via the rule-module nexus.

In another embodiment of the method of the invention, instructing the device comprises: voice-command; key-punching; and touching a screen.

In another embodiment, the system of the invention further comprises a rule-module nexus routing code platform within a device, said device comprising: a user interface apparatus, and; a transaction terminal.

In another embodiment of the system of the invention, the rule-module nexus routing code platform is configured to comprise: electronically storing the rule-module nexus routing code, and; electronically invoking the rule-module nexus routing code.

In another embodiment of the system of the invention, invoking a rule-module nexus routing code occurs via an event comprising: scanning of a unique user code from a nexus access token, and; data-entering, comprising voice-command, key-punching, and touch-screen.

In another embodiment of the method of the invention, the nexus access token further comprises data-scanning capability, comprising: a radio frequency interrogator, and; a barcode scanner.

In another embodiment, the method of the invention further comprising compiling a virtual shopping platform, wherein electronically scanned data is compiled and stored, said electronically scanned data comprising: product name; product brand; product manufacturer; unique package code; unique product inventory/tracking code, and; product price.

In another embodiment of the method of the invention, the virtual shopping platform resides within a device comprising: the nexus access token; the rule-module nexus, and; a third-party platform.

In another embodiment of the system of the invention, the nexus access token further comprises data-scanning capability, comprising: a radio frequency interrogator, and; a barcode scanner.

In another embodiment of the system of the invention, a virtual shopping platform is configured to comprise: compiling electronically scanned data, and; storing electronically scanned data.

In another embodiment of the system of the invention, the electronically scanned data further comprises: product name; product brand; product manufacturer; unique package code; unique product inventory/tracking code, and; product price.

In another embodiment of the system of the invention, the virtual shopping platform resides within a device comprising: the nexus access token; the rule-module nexus, and; a third-party platform.

In another embodiment of the method of the invention, processing the financial transaction requires no live financial account data being provided directly from the nexus access token, said live financial account data comprising: data which uniquely and directly identifies a specific financial account of the user, and; payment-enabling data.

In another embodiment of the system of the invention, the financial transaction processing platform requires no live financial account data being provided directly from the nexus access token to process a financial transaction, said live financial account data comprising: no data which uniquely and directly identifies a specific financial account of the user, and; no live financial account data.

In another embodiment of the method of the invention, accessing an online user account registry comprises: a) Approving access to an online user account registry via a verification platform comparing a bid verification data, comprising a unique user code provided from a nexus access token, with a registered verification data; b) Accessing the online user account registry via a rule-module invoked from a rule-module nexus, said online user account registry comprising a plurality of financial accounts of the user; Whereby an online account registry, comprising a plurality of financial accounts, is accessed via a unique user code provided from a nexus access token.

In another embodiment of the method of the invention, the unique user code is thin-client, comprising: no financial account identifier; no live financial data; no payment-enabling data; a rule-module nexus routing code; a user account registry code; an electronic positioning system code, and; a network routing instruction for processing the financial transaction via a rule-module nexus.

In another embodiment of the method of the invention, the online user account registry comprises: storing data apart from the nexus access token, and; accessing the stored data via communicating externally to the nexus access token.

In another embodiment of the method of the invention, communicating externally to the nexus access token comprises: using an electronically readable magnetic stripe; using a smart card; using a bar code; using a radio signal; using an infrared signal; using an audible signal; using a USB connection; using a global positioning signal; using a local area network; using a wide area network; using an X.25 network; using an internet connection; using a cellular signal; using a near-field communications signal; using an electronically readable alpha-numeric code; using a digital signal; using an electronically visible display; using an acoustic signal; using a microwave signal; using a satellite signal; using an X-ray signal; using a pulsar signal; using a television signal, and; using a photo signal.

In another embodiment of the method of the invention, accessing the online user account registry further comprises: displaying a financial account; querying a financial account; displaying financial data of a financial account; processing a financial transaction via selecting a financial account; displaying an electronic audible signature of a financial account; displaying an electronic visible signature of a financial account; displaying a statement of a financial account; aggregating a plurality of invoices of a plurality of financial accounts; aggregating billing of a plurality of financial accounts; invoking a rule-module associated with a financial account; displaying a rule-module associated with a financial account; editing a rule-module associated with a financial account; registering a rule-module of a user; registering a financial account of the user.

In another embodiment of the method of the invention, processing a financial transaction comprises: invoking a rule-module via a rule-module nexus; a buyer-seller exchange transaction wherein a user's financial account balance is adjusted and a payee's financial account is correspondingly adjusted, wherein the user and the payee are different parties; transferring financial data from a financial account of the user to another financial account of the user, wherein there is no buyer-seller exchange; redeeming a pre-paid ticket transaction for venue admittance, wherein there is no buyer-seller exchange; redeeming a pre-paid membership benefit transaction for venue admittance, wherein there is no buyer-seller exchange; an electronic benefits transfer, wherein there is no buyer-seller exchange.

In another embodiment of the method of the invention, the buyer-seller exchange further comprises: a credit transaction; a debit transaction; a scrip transaction; a rewards transaction; an electronic check transaction; a private label transaction; a stored value transaction; a brokerage trade transaction.

Another embodiment of the method of the invention comprises registering a rule-module to a user within a rule-module nexus, said registered rule-module further comprising a pattern data associated with an execution command.

In another embodiment of the method of the invention, the pattern data comprises: personal legal name; a private code; a driver's license number; a unique user code; a physical POS unique user code; a virtual POS unique user code; a nexus access token identification code; a personal verification code; a secondary personal verification code; an emergency code; a plurality of financial accounts; demographic information; an email address; social security number; a mother's maiden name; a biometric sample; a facial photograph; an Internet browsing pattern; a telephone number; a mailing address; a purchasing pattern; an authorized subordinated user; electronic data usage patterns; employee status; job title; data on user behavior patterns; a credit score; a digital certificate; a network credential; an Internet protocol address; a digital signature; an encryption key; an instant messaging address; personal medical records; an electronic audible signature, and; an electronic visible signature.

In another embodiment of the method of the invention, the execution command comprises invoking at least one of the following: accessing the rule-module nexus; accessing a user account registry; accessing a financial account; authorizing a subordinated user to access a financial account of the user; displaying a financial account of the user; completing the financial transaction; authorizing settlement of the online transaction; displaying the pattern data; displaying the execution command; displaying the rule-module; notifying an emergency authority upon rule-module nexus receiving an emergency code of the user; accessing a third-party database; accessing an account issuer database, and; accessing a payee database.

In another embodiment of the method of the invention, selecting a financial account comprises: automatically selecting a financial account via invoking a rule-module of a rule-module nexus, and; manually selecting a financial account by the user via a user interface apparatus.

In another embodiment of the method of the invention, manually selecting a financial account, comprises: displaying a plurality of financial accounts to the user in parallel; displaying a plurality of financial accounts to the user in sequence; data-entering by the user via a touch-screen; data-entering by the user via a key pad; data-entering by the user via an audio receiver.

In another embodiment of the method of the invention, invoking a rule-module associated with a financial account comprises: appending a surcharge to a transaction based on predetermined criteria; preserving a processing preference of a party registered with the rule-module nexus, said party comprising: an account issuer; a user, and; a payee.

In another embodiment of the method of the invention, preserving the processing preference of the party comprises: invoking criteria predetermined by the party for declining the financial transaction; invoking criteria predetermined by the party for approving the financial transaction, and; invoking criteria predetermined by the party for a settlement of the financial transaction.

In another embodiment of the method of the invention, accessing the online user account registry further comprises: electronically comparing, via the verification platform, the user's bid unique user code with a user's registration unique user code, and making a to matching determination for verifying the user's authority to access the rule-module nexus, said matching determination comprising: a positive matching determination verifying that the user is authorized to access the user account registry, and; a negative matching determination, verifying that the user is not authorized to access the user account registry.

In another embodiment of the method of the invention, upon a positive matching determination, the verification platform issues a verification approval code invoking a rule-module of a rule-module nexus.

In another embodiment of the method of the invention, the verification approval code invokes a user account registry code identifying a user account registry, said user account registry code comprising: no financial account identifier; no data identifying a primary financial account of the user for all financial transactions of the user; no financial data.

In another embodiment of the method of the invention, the verification data further comprises a bid personal verification code provided directly by the user, wherein the verification platform electronically compares the user's bid unique user code and the user's bid personal verification code with a user's registration unique user code and a user's registration personal verification code, and makes a matching determination for verifying the user's authority to access the rule-module nexus, said matching determination comprising: making a positive matching determination verifying that the user is authorized to access the rule-module nexus, and; failing to make a positive matching determination, wherein making a negative matching determination is automatic, verifying that the user is not authorized to access the rule-module nexus.

In another embodiment of the method of the invention, ranking the plurality of financial accounts of a user account registry comprises predetermined criteria being used for tagging and ranking the plurality of financial accounts in a certain order.

In another embodiment of the method of the invention, the predetermined criteria for the ranking further comprises: improving a transaction benefit for an account issuer; improving a transaction benefit for the user, and; improving a transaction benefit for a payee.

In another embodiment of the method of the invention, an auction rule-module computes the automatic selection of a financial account from among a plurality of financial accounts competing to be offered to the User based up predetermined criteria comprising: improving a transaction benefit for an account issuer; improving a transaction benefit for the user, and; improving a transaction benefit for a payee.

In another embodiment of the method of the invention, the nexus access token identification code comprises: being associated with an account issuer, and; the account issuer receiving a business benefit via the rule-module nexus.

In another embodiment of the method of the invention, the business benefit comprises: a percentage-based fee; a flat fee; a one-time fee; a recurring fee.

In another embodiment of the system of the invention, accessing an online user account registry, comprises: a) A nexus access token, comprising a verification data storage means, said verification data comprising a unique user code; b) An online user account registry, comprising a financial account storage means and a plurality of financial accounts of a user; c) A rule-module nexus, comprising a scalable rule-module storage means and a rule-module; d) A verification platform, comprising comparing means; e) Interconnecting communications means between devices, said devices comprising: the nexus access token; the online user account registry; the verification platform, and; the rule-module nexus.

In another embodiment of the system of the invention, the unique user code is thin-client, comprising: no financial account identifier; no live financial data; no payment-enabling data; a rule-module nexus routing code; a user account registry code; an electronic positioning system code, and; a network routing instruction for processing the financial transaction via a rule-module nexus.

In another embodiment of the system of the invention, the online user account registry comprises: storage means apart from the nexus access token, and; accessibility via communicating externally to the nexus access token.

In another embodiment of the system of the invention, communicating means external to the nexus access token comprises: an electronically readible magnetic stripe; a smart card; a bar code; a radio signal; an infrared signal; an audible signal; a USB connection; a global positioning signal; a local area network; a wide area network; an X.25 network; an internet connection; a cellular signal; a near-field communications signal; an electronically readable alpha-numeric code; a digital signal; an electronically visible display; an acoustic signal; a microwave signal; a satellite signal; an X-ray signal; a pulsar signal; a television signal, and; a photo signal.

In another embodiment of the system of the invention, the online user account registry further comprises: a financial account display means; a financial account querying means; a financial data display means; a financial account selecting means; a financial transaction processing means; a financial account electronic audible signature display means; a financial account electronic visible signature display means; a financial account statement display means; a plurality of financial accounts invoice aggregating means; a plurality of financial accounts billing aggregating means; a rule-module invoking means; a rule-module display means; a rule-module editing means; a rule-module registering means; a financial account registering means.

In another embodiment of the system of the invention, the financial transaction processing means further comprises: a rule-module invoking means via a rule-module nexus; a buyer-seller exchange means wherein a user's financial account balance is adjusted and a payee's financial account is correspondingly adjusted, wherein the user and the payee are different parties; a financial data transferring means, comprising means for transferring financial data from a financial account of the user to another financial account of the user, wherein there is no buyer-seller exchange; a pre-paid ticket redeeming means, comprising means for venue admittance, wherein there is no buyer-seller exchange; a pre-paid membership benefit redeeming means, comprising means for venue admittance, wherein there is no buyer-seller exchange; an electronic benefits transfer means, wherein there is no buyer-seller exchange.

In another embodiment of the system of the invention, the buyer-seller exchange further comprises: a credit transaction; a debit transaction; a scrip transaction; a rewards transaction; an electronic check transaction; a private label transaction; a stored value transaction; a brokerage trade transaction.

Another embodiment of the system of the invention comprises a rule-module registering means via a rule-module nexus, said registered rule-module further comprising a pattern data associated with an execution command.

In another embodiment of the system of the invention, the pattern data comprises: personal legal name; a private code; a driver's license number; a unique user code; a physical POS unique user code; a virtual POS unique user code; a nexus access token identification code; a personal verification code; a secondary personal verification code; an emergency code; a plurality of financial accounts; demographic information; an email address; social security number; a mother's maiden name; a biometric sample; a facial photograph; an Internet browsing pattern; a telephone number; a mailing address; a purchasing pattern; an authorized subordinated user; electronic data usage patterns; employee status; job title; data on user behavior patterns; a credit score; a digital certificate; a network credential; an Internet protocol address; a digital signature; an encryption key; an instant messaging address; personal medical records; an electronic audible signature, and; an electronic visible signature.

In another embodiment of the system of the invention, the execution command comprises: rule-module nexus accessing means; an online user account registry accessing means; a financial account accessing means; a financial account subordinated user access authorizing means; a financial account displaying means; a financial transaction completing means; a financial transaction settlement authorizing means; a pattern data displaying means; an execution command displaying means; a rule-module displaying means; an emergency authority notification means via a rule-module nexus receiving an emergency code; a third-party database accessing means; an account issuer database accessing means, and; a payee database accessing means.

In another embodiment of the system of the invention, the financial account selecting means further comprises: a financial account automatic selecting means invoking a rule-module of a rule-module nexus, and; a financial account manual selecting means via a user interface apparatus.

In another embodiment of the system of the invention, the financial account manual selecting means further comprises: means for displaying a plurality of financial accounts in-parallel; means for displaying a plurality of financial accounts in-sequence; a touch-screen data-entering means; a key pad data-entering means; an audio receiver data-entering means.

In another embodiment of the system of the invention, the rule-module invoking means further comprises: a financial transaction surcharge appending means via predetermined criteria; a financial transaction processing preference preserving means.

In another embodiment of the system of the invention, the financial transaction processing preference preserving means further comprises: a financial transaction declining criteria invoking means; a financial transaction approving criteria invoking means, and; a financial transaction settlement criteria invoking means.

In another embodiment of the system of the invention, the verification platform comparing means further comprises: the user's bid unique user code being electronically compared with a user's registered unique user code; a matching determination means, verifying the user's authority to access the rule-module nexus, said matching determination means further comprising: a positive matching determination means, verifying that the user is authorized to access the user account registry, and; a negative matching determination means, verifying that the user is not authorized to access the user account registry.

In another embodiment of the system of the invention, the positive matching determination means further comprises: a verification approval code invoked via the verification platform; a rule-module invoked via a rule-module nexus.

Another embodiment of the system of the invention comprises an online user account registry identifying means, wherein a user account registry code invoked via the verification approval code, said user account registry code comprising: no financial account identifier; no data identifying a primary financial account of the user for all financial transactions of the user; no financial data.

In another embodiment of the system of the invention, the verification platform comparing means further comprises: the user's bid personal verification code and bid unique user code being electronically compared with a user's registration unique user code and a user's registration personal verification code; a matching determination means, verifying the user's authority to access the rule-module nexus, said matching determination further comprising: a positive matching determination means, verifying that the user is authorized to access the rule-module nexus, and; a negative matching determination means, verifying that the user is not authorized to access the rule-module nexus.

Another embodiment of the system of the invention comprises a plurality of financial accounts ranking means via the user account registry, comprising predetermined criteria being used for tagging and ranking the plurality of financial accounts in a certain order.

In another embodiment of the system of the invention, the predetermined criteria for the ranking further comprises: improving a transaction benefit for an account issuer; improving a transaction benefit for the user, and; improving a transaction benefit for a payee.

Another embodiment of the system of the invention comprises an auction rule-module computing means, wherein automatically selecting a financial account from among a plurality of financial accounts competing to be offered to the User, is based upon predetermined criteria, said criteria comprising: improving a transaction benefit for an account issuer; improving a transaction benefit for the user, and; improving a transaction benefit for a payee.

In another embodiment of the system of the invention, the nexus access token identification code comprises: being associated with an account issuer, and; the account issuer receiving a business benefit via the rule-module nexus.

In another embodiment of the system of the invention, the business benefit comprises: a percentage-based fee; a flat fee; a one-time fee; a recurring fee.

In another embodiment of the method of the invention, accessing an online user account registry, comprises: a) Approving access to an online user account registry via a verification platform comparing a bid verification data, comprising a unique user code provided from a nexus access token, with a registered verification data; b) Accessing the online user account registry via a rule-module invoked from a rule-module nexus, said online user account registry comprising a plurality of financial accounts of the user, wherein accessing further comprises: (i) Displaying a default financial account invoked by a rule-module from a rule-module nexus, and; (ii) Displaying a plurality of financial accounts via a rule-module invoked from a rule-module nexus; Whereby an online account registry, comprising a plurality of financial accounts, is accessed via a unique user code provided from a nexus access token.

In another embodiment of the system of the invention, accessing an online user account registry, comprises: a) A nexus access token, comprising a verification data storage means, said verification data comprising a unique user code; b) An online user account registry, comprising a financial account storage means and a plurality of financial accounts of a user; c) A verification platform, comprising a comparing means; d) A rule-module nexus, comprising a scalable rule-module storage means and a rule-module; e) A display means, comprising: (i) A default financial account display means; (ii) A plurality of financial accounts display means; f) Interconnecting communications means between devices, said devices comprising: the nexus access token; the online user account registry; the verification platform; the rule-module nexus, and; the display means.

In another embodiment of the method of the invention, the nexus access token further comprises: being of a handheld size; being smaller than of a handheld size.

In another embodiment of the system of the invention, the nexus access token further comprises: being of a handheld size; being smaller than of a handheld size.

Another embodiment of the method of the invention comprises: a) Approving access to an online user account registry via a verification platform comparing a bid verification data, comprising a personal verification code (and optionally a secondary personal verification code), with a registered verification data; b) Accessing the online user account registry via a rule-module invoked from a rule-module nexus, said online user account registry comprising a plurality of financial accounts of the user; Whereby an online account registry, comprising a plurality of financial accounts, is accessed via a personal verification code.

Another embodiment of the system of the invention comprises: a) A user interface apparatus, comprising data entry means, wherein said data comprises a personal verification code; b) An online user account registry, comprising a financial account storage means and a plurality of financial accounts of a user; c) A rule-module nexus, comprising a scalable rule-module storage means and a rule-module; d) A verification platform, comprising comparing means; e) Interconnecting communications means between devices, said devices comprising: the user interface apparatus; the online user account registry; the verification platform, and; the rule-module nexus.

Another embodiment of the method of the invention comprises: a) Approving access to an online user account registry via a verification platform comparing a bid verification data, comprising a personal verification code, with a registered verification data; b) Accessing the online user account registry via a rule-module invoked from a rule-module nexus, said online user account registry comprising a plurality of financial accounts of the user, wherein accessing further comprises: (i) Displaying a default financial account invoked by a rule-module from a rule-module nexus, and; (ii) Displaying a plurality of financial accounts via a rule-module invoked from a rule-module nexus; Whereby an online account registry, comprising a plurality of financial accounts, is accessed via a personal verification code.

Another embodiment of the system of the invention comprises: a) A user interface apparatus, comprising data entry means, wherein said data comprises a personal verification code; b) An online user account registry, comprising a financial account storage means and a plurality of financial accounts of a user; c) A verification platform, comprising a comparing means; d) A rule-module nexus, comprising a scalable rule-module storage means and a rule-module: e) A display means, comprising: (i) A default financial account display means; (ii) A plurality of financial accounts display means; f) Interconnecting communications means between devices, said devices comprising: the user interface apparatus; the online user account registry; the verification platform; the rule-module nexus, and; the display means.

In another embodiment of the method of the invention, accessing an online financial transaction via a rule-module nexus comprises the steps of a) registering a user, comprising: (i) registering a plurality of rule-modules to a user within a rule-module nexus, said registered rule-module further comprising pattern data associated with an execution command; (ii) registering to the user within an online user account registry, a plurality of proprietary financial accounts, each comprising an account identifier, said account identifier further comprising: a code identifying an account issuer, as approved by the International Organization for Standardization [(Bank Identification Code, or BIC Code) or (Bank Identification Number, or BIN)]; a code identifying an account issuer, as approved by the Society for Worldwide Interbank Financial Telecommunications (SWIFT Address or SWIFT Code), and; a code identifying an account issuer, as approved by the American Banker's Association (ABA Routing Code); b) processing pan-portfolio analytics, comprising: (i) accessing a plurality of proprietary financial accounts, wherein upon a verification platform verifying a party is authorized to access the online user account registry, the rule-module nexus invokes a rule-module governing the party's access to a plurality of proprietary financial accounts within the online user account registry; (ii) surveying financial data, wherein a pattern in processing a plurality of online financial transactions is detected by an authorized party via surveying financial data residing within the plurality of proprietary financial accounts; (iii) presenting analytics, wherein an analysis of a detected pattern is presented to the authorized party; Whereby, pan-portfolio analytics are presented by an authorized party accessing a plurality of proprietary financial accounts in an online user account registry via a rule-module nexus.

In another embodiment of the method of the invention, the analytics further comprise: a pattern of fraud; a pattern of product purchasing; a pattern of preferences for processing a financial transaction; a pattern of financial account selection; a pattern of rewards redemption; a pattern of user geographic locations; a pattern retailer locations; a pattern of costs in processing a financial transaction.

In another embodiment of the method of the invention, the pattern further comprises: a prior pattern; a real-time pattern; a predictive pattern.

In another embodiment of the method of the invention, a personal verification code (PVC) association step comprises: matching the personal verification code (PVC) with a live personal identification number (PIN) for processing a debit financial transaction of the user, and; translating the personal verification code (PVC) into a live personal identification number (PIN) for processing a debit financial transaction of the user.

In another embodiment of the method of the invention, a personal verification code (PVC) forwarding step comprises: forwarding the PIN to a debit processing network, and authorizing a PIN-enabled debit financial transaction; forwarding the PVC to a debit financial transaction processing network, and authorizing a PIN-enabled debit financial transaction; forwarding the PVC to a financial transaction processing network and authorizing a PIN-enabled financial transaction; forwarding the PVC to a financial transaction processing network and authorizing a non-PIN enabled financial transaction.

In another embodiment of the method of the invention, the debit processing network comprises: Star®; NYCE®; PULSE®, and; Interlink®.

In another embodiment of the method of the invention, the debit financial transaction further comprises: a demand deposit account; an automated clearinghouse (ACH); a cashback to the user at a point of sale.

In another embodiment of the method of the invention, a private code presenting step comprises a private code registered to the user, distinct from a personal verification code and not used in verifying the user, being presented to the user via the user interface apparatus for verifying that the user interface apparatus is authentic.

In another embodiment of the method of the invention, compiling pan-portfolio analytics comprises: a) Approving access to an online user account registry via a verification platform comparing a bid verification data, comprising a unique user code provided from a nexus access token, with a registered verification data; b) Accessing the online user account registry via a rule-module invoked from a rule-module nexus, said online user account registry comprising a plurality of financial accounts of the user; c) Accessing a plurality of proprietary financial accounts registered in the user account registry; d) Detecting patterns via analyzing financial data within said proprietary financial accounts, said patterns comprising: a pattern of preferences for processing a financial transaction; a pattern of financial account selection; a pattern of rewards redemption; a pattern of user geographic locations; a pattern retailer locations; a pattern of costs in processing a financial transaction; Whereby pan-portfolio analytics are compiled via a plurality of otherwise inaccessible proprietary financial accounts being rendered accessible by the rule-module nexus.

In another embodiment of the method of the invention, the analytics further comprise: a pattern of fraud; a pattern of product purchasing; a pattern of preferences for processing a financial transaction; a pattern of financial account selection; a pattern of rewards redemption; a pattern of user geographic locations; a pattern retailer locations; a pattern of costs in processing a financial transaction.

In another embodiment of the method of the invention, the pattern further comprises: a prior pattern; a real-time pattern; a predictive pattern.

In another embodiment of the system of the invention, accessing an online user account registry via a rule-module nexus comprises: a) a rule-module nexus, configured to register a plurality of rule-modules to a user within a rule-module nexus, said rule-module further comprising pattern data associated with an execution command; b) an online user account registry, configured to register a plurality of proprietary financial accounts, each comprising an account identifier, said account identifier further comprising: a code identifying an account issuer, as approved by the International Organization for Standardization [(Bank Identification Code, or BIC Code) or (Bank Identification Number, or BIN)]; a code identifying an account issuer, as approved by the Society for Worldwide Interbank Financial Telecommunications (SWIFT Address or SWIFT Code), and; a code identifying an account issuer, as approved by the American Banker's Association (ABA Routing Code); c) a verification platform, configured to verify a party is authorized to access the online user account registry; d) a pan-portfolio analytics processing platform, comprising: (i) means for accessing a plurality of proprietary financial accounts via the verification platform, the rule-module nexus, and the user account registry; (ii) means for surveying financial data within said proprietary financial accounts, and detecting a pattern in processing a plurality of online financial transactions; e.) analytics presenting means, comprising means for presenting to the authorized party an analysis of a detected pattern; Whereby, pan-portfolio analytics are presented by an authorized party accessing a plurality of proprietary financial accounts in an online user account registry via a rule-module nexus.

In another embodiment of the system of the invention, the analytics further comprise: a pattern of fraud; a pattern of product purchasing; a pattern of preferences for processing a financial transaction; a pattern of financial account selection; a pattern of rewards redemption; a pattern of user geographic locations; a pattern retailer locations; a pattern of costs in processing a financial transaction.

In another embodiment of the system of the invention, the pattern further comprises: a prior pattern; a real-time pattern; a predictive pattern.

In another embodiment of the system of the invention, a personal verification code (PVC) association platform comprises: matching means, wherein the personal verification code (PVC) is matched with a live personal identification number (PIN) for processing a debit financial transaction of the user, and; translating means, wherein the personal verification code (PVC) is translated into a live personal identification number (PIN) for processing a debit financial transaction of the user.

In another embodiment of the system of the invention, a personal verification code (PVC) forwarding platform comprises: forwarding means, wherein the PIN is forwarded to a debit processing network, and a PIN-enabled debit financial transaction is authorized, and; forwarding means, wherein the PVC is forwarded to a debit financial transaction processing network, and a PIN-enabled debit financial transaction is authorized; forwarding means, wherein the PVC is forwarded to a financial transaction processing network, and a PIN-enabled financial transaction is authorized; forwarding means, wherein the PVC is forwarded to a financial transaction processing network, and a non-PIN enabled financial transaction is authorized.

In another embodiment of the system of the invention, the debit processing network comprises: Star®; NYCE®; PULSE®, and; Interlink®.

In another embodiment of the system of the invention, the debit financial transaction further comprises: a demand deposit account; an automated clearinghouse (ACH); a cash-back to the user at a point of sale.

In another embodiment of the system of the invention, the user interface apparatus is configured to present to the user, via the rule-module nexus, a private code registered to the user, distinct from a personal verification code and not used in verifying the user, for verifying that the user interface apparatus is authentic.

In another embodiment of the system of the invention, compiling pan-portfolio analytics comprises: a) a verification platform, configured to compare a bid verification data, comprising a unique user code provided from a nexus access token, with a registered verification data; b) a rule-module nexus, configured to invoke a rule-module registered to a user, said rule-module comprising a pattern data associated with an execution command; c) an online user account registry, configured to comprise a plurality of proprietary financial accounts of the user; c) a pan-portfolio analytics platform, configured to analyze financial data within said plurality of proprietary financial accounts, and to detect patterns, said patterns comprising: a pattern of preferences for processing a financial transaction; a pattern of financial account selection; a pattern of rewards redemption; a pattern of user geographic locations; a pattern retailer locations; a pattern of costs in processing a financial transaction; Whereby pan-portfolio analytics are compiled via a plurality of otherwise inaccessible proprietary financial accounts being rendered accessible by the rule-module nexus.

In another embodiment of the system of the invention, the analytics further comprise: a pattern of fraud; a pattern of product purchasing; a pattern of preferences for processing a financial transaction; a pattern of financial account selection; a pattern of rewards redemption; a pattern of user geographic locations; a pattern retailer locations; a pattern of costs in processing a financial transaction.

In another embodiment of the system of the invention, the pattern further comprises: a prior pattern; a real-time pattern; a predictive pattern.

In another embodiment of the method of the invention, auto-populating a user's pattern data with a plurality of financial accounts, comprises: electronically pulling a credit report of the user; selecting financial accounts contained in said credit report; automatically registering said selected financial accounts via the rule-module nexus.

In another embodiment of the method of the invention, auto-populating communications occur via a network comprising: a cable network; a wireless network; a land-line phone network; the Internet; an intranet; a local area network, a wide area network; an electronic positioning network; a satellite network, and; an X.25 network.

In another embodiment of the system of the invention, the registration platform is configured to auto-populate a user's pattern data with a plurality of financial accounts, comprising: electronically pulling a credit report of the user; selecting financial accounts contained in said credit report; automatically registering said selected financial accounts via the rule-module nexus.

In another embodiment of the system of the invention, the registration platform auto-populates financial accounts via a network comprising: a cable network; a wireless network; a land-line phone network; the Internet; an intranet; a local area network, a wide area network; an electronic positioning network; a satellite network, and; an X.25 network.

In another embodiment of the method of the invention, an on-line financial transaction comprises the steps of: a) registering a user, wherein a rule-module is registered to a user within a rule-module nexus, said rule-modules further comprising pattern data associated with an execution command; b) data-storing in a nexus access token, wherein a unique user code of the user is stored in a portable nexus access token; c) processing an on-line financial transaction, using the nexus access token and a user interface apparatus located remotely from the rule-module nexus, comprising: (i) verifying a user, wherein a user's authority to access the rule-module nexus is verified on-line by a verification platform using verification data provided via the user interface apparatus, said verification data comprising a bid unique user code provided directly from the nexus access token, and; (ii) accessing financial accounts, wherein upon the verification platform verifying the user is authorized to access the rule-module nexus, the rule-module nexus enables concurrent access to a plurality of proprietary financial accounts of the user for completing the on-line financial transaction; Whereby, a nexus access token and a rule-module nexus provide an authorized user concurrent access to a plurality of proprietary financial accounts for processing an on-line financial transaction.

In another embodiment of the method of the invention, registering a user further comprises a plurality of rule-modules being registered to a user.

In another embodiment of the system of the invention, an on-line financial transaction comprises: a) a registration platform, configured within a rule-module nexus to comprise registering a rule-module to a user, said rule-modules further comprising pattern data associated with an execution command; b) a nexus access token, configured to comprise: portability, and; storing a unique user code of the user; c) an on-line financial transaction processing platform, comprising: (i) a nexus access token; (ii) a user interface apparatus located remotely from the rule-module nexus, configured to gather bid verification data of the user, said verification data comprising a bid unique user code provided directly from the nexus access token, and; (iii) a verification platform configured to verify a user on-line using the bid verification data, wherein a user's authority to access the rule-module nexus is verified, and; (iv) a user account registry platform configured to access financial accounts via the rule-module nexus, wherein upon the verification platform verifying the user is authorized to access the rule-module nexus, the user is provided on-line concurrent access to a plurality of proprietary financial accounts of the user for completing the on-line financial transaction; Whereby, a nexus access token and a rule-module nexus provide an authorized user concurrent access to a plurality of proprietary financial accounts for processing an on-line financial transaction.

In another embodiment of the system of the invention, the registration platform is further configured to comprise registering a plurality of rule-modules to a user.

In another embodiment of the method of the invention, the verification platform verifies the user interface apparatus hardware verification code, and the rule-module nexus invokes a rule-module, said rule-module comprising: accessing a financial account of a payee; a default electronic audible signature; a default electronic visible signature; a default financial account of a user; a private code of a user; predetermined criteria for tagging and ranking, in a certain order, a plurality of proprietary financial accounts of a user; a financial account routing code of a payee; transmitting payee data to the user interface apparatus, and; transmitting payee data to the nexus access token; settlement of the financial transaction wherein a financial account of the user is debited and a financial account of a payee is credited; a rewards incentive; an arbitrage rule-module, and; a financial transaction processing preference.

In another embodiment of the system of the invention, the verification platform is configured to verify the user interface apparatus hardware verification code, and to invoke a a rule-module from the rule-module nexus, said rule-module comprising: accessing a financial account of a payee; a default electronic audible signature; a default electronic visible signature; a default financial account of a user; a private code of a user; predetermined criteria for tagging and ranking, in a certain order, a plurality of proprietary financial accounts of a user; a financial account routing code of a payee; transmitting payee data to the user interface apparatus, and; transmitting payee data to the nexus access token; settlement of the financial transaction wherein a financial account of the user is debited and a financial account of a payee is credited; a rewards incentive; an arbitrage rule-module, and; a financial transaction processing preference.

It will be appreciated that the invention illustratively disclosed herein through illustrative embodiments may suitably be practiced in the absence of any element which is not specifically disclosed herein, particularly in an illustrative embodiment.

These and other advantages of the invention will become more fully apparent when the following detailed description of the invention is read in conjunction with the accompanying drawings.

BRIEF DESCRIPTION OF THE DRAWINGS

Additional aspects of the present invention will become evident upon reviewing the non-limiting, illustrative embodiments described in the specification and the claims taken in conjunction with the accompanying figures, wherein like reference numerals denote like elements.

FIG. 3B illustrates an embodiment of the invention, wherein upon associating processing preferences with Financial Account(s), an illustrative embodiment of Rankings is visibly indicated with each associated to their respective Financial Accounts.

FIG. 3E is illustrative of embodiments of a NAT with a Virtual POS UUC and a Physical POS UUC, further comprising: Risk Key data, a USB port; magnetic stripe; bar code; magnetic ink characters; and embedded RFID chip.

FIGS. 4 and 4A-1 show embodiments of the invention wherein the Rule-Module Nexus's network connectivity maintains dedicated frame relay lines to RMN Platforms co-located with Account Issuers' Acquirer sites and Account Issuers' Merchant Network Operation Centers (NOCs) in order to update and backup the RMN's data network. In turn, these RMN Platforms are linked to UIAs in Account Issuers' merchant locations through either the Merchant's in-store dedicated link to the Network Operations Center (NOC), or dial-up connectivity to an Acquirer/Processor.

FIG. 4A shows a flow chart of an embodiment of a verification (or authentication) process.

FIG. 8A-1 shows an embodiment of the invention, depicting wireless modem and networked connections between various UIA's and the RMN, including Subset RMN's, a Master RMN, Redundant Master RMN, and Third-Party Platforms.

FIG. 9 through FIG. 11 shows a system block diagram and system architecture for a Merchant Point-of-Sale connected to a remote RMN.

FIG. 11C illustrates an embodiment wherein a User's credit report enables a UAR to be auto-populated with Financial Account(s) via Internet registration.

FIG. 11D illustrates an embodiment wherein a User activates a NAT using magnetic strip at a physical-world POS.

FIGS. 13 and 13A-1 show RMN financial transactions for rewards.

FIG. 13A illustrates an embodiment wherein the RMN 14 and UAR 15 may convert, translate and/or aggregate financial data via rewards or loyalty programs.

FIGS. 14 and 14A show RMN financial transactions for an electronic check (eCheck).

FIG. 15 and FIG. 16 show RMN financial transactions for Credit and Debit.

FIGS. 15A and 15B illustrate illustrative embodiments of a registration process including a self-serve kiosk.

FIG. 16A, FIG. 16A-1, FIG. 16A-2, FIG. 16A-3, FIG. 16B, FIG. 16B-1, FIG. 16C, FIG. 16C-1, and FIG. 16D show a flow charts of embodiments for accessing a User Account Registry via a Verification Platform.

FIG. 18 and FIG. 18A-1 show flow charts of registration and transaction processing with the Rule-Module Nexus, User Account Registry, and Third-Party Platforms.

FIG. 18A, FIG. 18B, FIG. 18C, FIG. 18D, FIG. 18E, FIG. 18F, FIG. 18G, FIG. 18H, and FIG. 18I show embodiments of the Rule-Module Nexus, the User Account Registry, the Payee Account Registry, and Rule-Modules for financial account selection.

FIG. 22, FIG. 23, FIG. 24, FIG. 25, FIG. 26, FIG. 27, and FIG. 28 show process flow embodiments of Rule-Module Nexus processing of financial transactions.

FIG. 29A, FIG. 29A-1, FIG. 29A-2, FIG. 29A-3, FIG. 29B, FIG. 29C, FIG. 29D, FIG. 29E, FIG. 29F, FIG. 29G, FIG. 29G-1, FIG. 29G-2, FIG. 29 G-3, FIG. 29G-4, FIG. 29G-5, FIG. 29G-6, FIG. 29G-7, FIG. 29G-8, and FIG. 29H show embodiments of financial transactions using mobile payments, the Nexus Access Token, and the Rule-Module Nexus.

FIG. 30, FIG. 30A, FIG. 30B, FIG. 30C, and FIG. 30D show further embodiments of financial transactions using mobile payments, the Nexus Access Token, and the Rule-Module Nexus.

FIG. 32A, 32B-1, 32B-2, 32C-1 and 32C-2, shows embodiments of financial transactions which are processed via a centralized National/International (or Global) Gateway Platform and co-located Master Rule-Module Nexus and/or Master User Account Registry.

GLOSSARY

Figure 1:
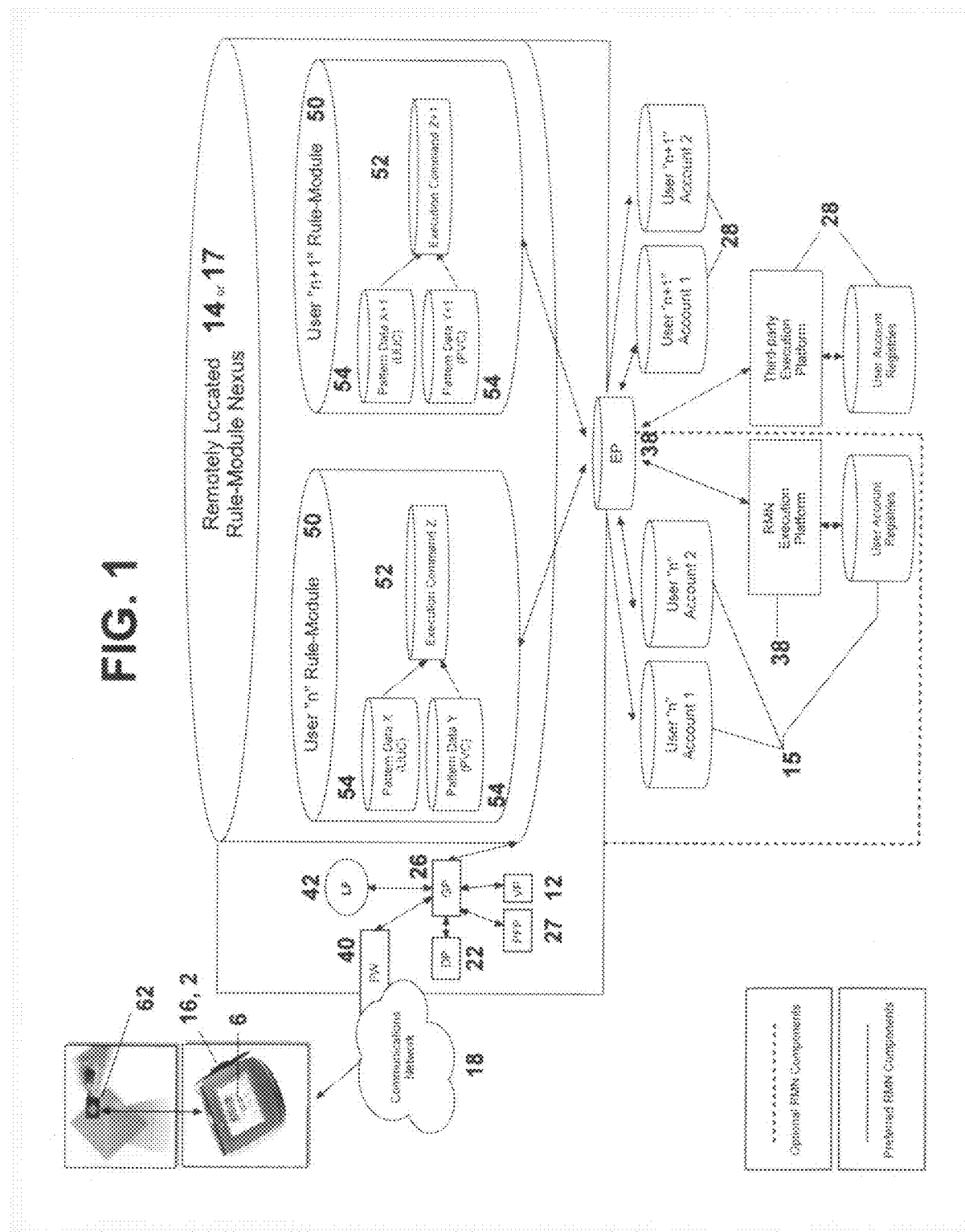
FIG. 1 shows an illustrative embodiment of the Rule-Module Nexus (RMN or Nexus), with a Nexus access token (NAT) and a User interface apparatus (UIA).

Authorized Issuer (ACCOUNT ISSUER) [or FA (Financial Administrator) or AA (Account Administrator)] comprises: an owner, comprising a party that owns a Financial Account; a servicer, comprising a party that services a Financial Account on behalf of an account owner; an agent, comprising a party that acts on behalf of another party associated with a Financial Account; a change-agent, comprising a party authorized to influence or change the selection of a Financial Account, and/or a party authorized to influence or change the use of Financial Data of a Financial Account or of a Financial Account itself, and; a fiduciary, comprising a party with a fiduciary duty to the Financial Account. An Account Issuer may comprise: a party administering Financial Data within the Financial Account, and; a party reconciling the Financial Data within the Financial Account upon settlement of a financial transaction. An Account Issuer may comprise: a bank; a retailer or merchant; a payee; an educational institution; an affinity group such as The Johns Hopkins University and The Sundance Institute®; a branding and marketing agent; an insurance company; and a processor such as First Data Corporation®, General Electric Capital (GE Capital®), and, Total® Processing.

ACCOUNT ISSUER BATCH: A collection of "add" and "delete" instructions complete with UUC-IDs, financial asset accounts, and account index codes verified and submitted by an account issuer to the RMN.

Authorized IssuerP (Account Issuer Platform): Platform comprising data for account issuers that are allowed to add and delete financial asset account numbers with the RMN or RMN-authorized Third-Party platforms.

Authorized IssuerT (Account Issuer Transaction Terminals): Provides a batch connection to the RMN or third-party platforms for account issuers to add and remove (their own) financial asset account numbers from specific individual's UUC records.

AOD (or AOP): Apparatus Owner Database (or Apparatus Owner Platform): stores information about the owners of UIA devices.

ASCII American Standard Code for Information Interchange

ATM (Automated Teller Machinery): Uses encoded UUC packet (or optionally UUC-PVC packet) verification information to obtain access to an account issuer or third-party platform, including authorizing cash dispensing and account management.

BRT (Banking Retail Transaction Terminal-UIA): UUC Registration and Re-Coding UIA's, located at retail banking outlets, BRT's utilizes UUC registration information with personal verification data to register individuals with the RMN or third-party platforms.

BRT-SP: Banking Retail Transaction Terminal-Subset Platform

CBC (Cipher Block Chaining): an encryption mode for the DES.

CCD: Charged-Coupled Device

CPT (Cable-TV Point-of-Sale UIA): Transaction terminal combining an onscreen display simulcast digital signal informing TV-top cable box of product information with product video, and an UIA controller remote which performs the UUC (or optionally UUC-PVC) validation using the CATV communications network. Order/autho/mailing-address/item-id forwarded to merchant. Results of authorization are displayed on the TV.

CST (Customer Service Transaction Terminals): Provide RMN or third-party platforms User service personnel with varying degrees of access (based on access privilege) the ability to retrieve and modify information on individuals in order to help people with account problems.

DUAL SEALING STEP: The conversion of plain text to cipher text (known as "encryption") in combination with the encrypted check-summing of a message that allows information to remain in plain text while at the same time providing a means for detecting any subsequent modification of the message.

DES (Digital Encryption Standard): A standard for the cryptographic protection of digital data. See standard ANSI X3.92-1981.

DETERMINATION: the status of the command processed during the execution step.

DSP (Digital Signal Processor): a class of integrated circuits that specialize in the mathematical operations required by the signal processing applications.

DUKPT (Derived Unique Key Per Transaction): See standard ANSI/ABA X9.24-1992.

EMERGENCY CODE: The alpha-numeric sequence, visible image or audible signal selected by an individual which, when accessed, will result in a transaction being associated by the RMN or third-party platforms as an emergency alert, potentially causing the display of false screens and/or the notification of emergency authorities that said individual has been coerced into performing a transmission or transaction. An emergency authority may comprises: the RMN; a governmental agency (e.g., fire, medical, police, sheriff), and; a private third-party company (e.g., Brinks™, Bay Alarm™).

EP: Execution Platform (or ECP: Execution Command Platform).

ESP (Electronic Signature Platform): Platform comprising all MD5 and electronic signatures of all documents signed by anybody, referenced by authorization number.

EST (Electronic Signature Transaction Terminal): Uses UIA to verify, computer calculates checksum on document, sends checksum to RMN or third-party platforms, RMN or third-party platforms validates, timestamps, saves checksum, and returns with sig-code. Uses Internet as transport. EST also verifies signatures given a sig code and an MD5 calculation.

EXECUTION COMMANDS: A program or subroutine residing in Rule-Modules of the RMN that performs a specific task, activated by a request message sent from a UIA-conjoined Transaction Terminal.

FAR (False Accept Rate): The statistical likelihood that one user's UUC (or optionally UUC-PVC) algorithmic verification will be incorrectly verified as the UUC-PVC of another user.

FALSE SCREENS: Displays of information which has been intentionally pre-determined to be subtly inaccurate such that a coercing party will not illegally obtain accurate data about an individual's financial assets, all the while remaining unaware of the alteration of the information.

FDDI (Fiber Digital Device Interface): a networking device that utilizes a fiber optic token ring.

FS: Field Separator.

FW (Firewall Platform): The network—Local or Subset net router that regulates traffic into and out of the RMN.

FINANCIAL ACCOUNT (or online FINANCIAL ACCOUNT or ACCOUNT or ASSET ACCOUNT), comprises: a plurality of related online Financial Data electronically stored apart from a Nexus Access Token (NAT); a unique identifier ("Financial Account-Identifier" or "Financial Account-ID") distinguishing the plurality of related Financial Data from all other pluralities of related Financial Data, and; storage means apart from the NAT and electronically accessible from the NAT via communications means (or interconnecting communications means) external to the NAT. A Financial Account further comprises: a credit account; a micropayment account; a pre-paid account; a debit account; a rewards/loyalty account; a scrips account; a checking account; a savings account; an investment account; a brokerage account; and an insurance account. However, it should be noted that the invention may not be so limited, and other Financial Accounts may be contemplated to be within the scope of the present invention, including a Financial Account enabling a review of Financial Data, a transfer of Financial Data, and a financial transaction comprising an exchange of Financial Data, and an exchange, purchase or sale of goods and/or services.

FINANCIAL ACCOUNT-ID (Financial Account Identifier or Account Identifier or Account-ID): Financial Account-ID, wherein a unique code identifies a specific Financial Account and is associated with only said specific Financial Account.

FINANCIAL DATA (or LIVE FINANCIAL ACCOUNT DATA or ACTIONABLE-ACCOUNT DATA or FUNDING-ACCOUNT DATA or PAYMENT-ENABLING DATA): Any unit of electronic data comprising: monetary value as currency or currency-equivalent; legal tender or legal tender-equivalent. As such, a display of these units may provide a User with: a balance in a Financial Account of the User; a history of financial transactions involving a Financial Account of the User; a history of activity of a Financial Account of the User. Further, a User's purchase, expenditure, transfer, exchange or usage of these units may comprise: a credit of said units to a Financial Account; a debit of said units from a Financial Account; a purchase, sale, transfer, discounted cost, or exchange of goods, services or currency involving an Account Issuer. Financial data further comprises units of: currency; rewards; loyalty; incentive; discount; and scrips points. Examples include: dollars; discount points; insurance credits; minutes of telephone calling time; miles towards earning a free airplane flight, points towards a gallon of gas, and the like. However, it should be noted that the invention may not be so limited, and other Financial Data may be contemplated to be within the scope of the present invention.

FINANCIAL INTERCHANGE PLATFORM (FIP): A computing platform, optionally within the Rule-Module Nexus, comprising means for converting, trading, exchanging, transferring and/or interchanging Financial Data between or among a plurality of proprietary Financial Accounts of a User or of a plurality of Users.

FINANCIAL TRANSACTION: comprises any electronic transfer, exchange or use of Financial Data in a Financial Account accessed via an online User Account Registry, wherein Financial Data has a predetermined monetary or monetary-equivalent unit value which is legal tender or a legal tender-equivalent. As such, a Financial Transaction further comprises: debiting Financial Data from a Financial Account; crediting Financial Data to a Financial Account; a transfer of Financial Data between a plurality of Financial Accounts from a User Account Registry; a transfer of Financial Data between a Financial Account from a User Account Registry and a Financial Account of an Account Issuer. In the latter instance, a financial transaction further comprises a User's purchase, expenditure or usage of said Financial Data results in the User's purchase or sale of goods, services or currency involving an Account Issuer. Note that a user's approving a Financial transaction comprises: a user signalling consent via selecting a financial account from a plurality of financial accounts displayed to the user in parrallel; a user signalling consent via selecting a financial account from a plurality of financial accounts displayed to the user in sequence, and; a user signally consent via accepting a financial account automatically selected by the rule-module nexus and displayed to the user based upon predetermined criteria.

GEC (Global Execution Command): In an illustrative embodiment customized to the user. Note that in an illustrative embodiment of this invention, a GEC does not require all financial transactions of all users to automatically comprise any of the following: being linked to any particular account issuer; invoking a specific online transaction processing preference for all Financial Accounts for all users; being appended to any particular product or service, and; being diverted from any predetermined processing preferences of an account issuer which would otherwise apply to a Financial Account selected by a user during a financial transaction.

GP (Gateway Platform): the main communications directing platforms in the RMN; which direct the flow of electronic messages to other platforms within the RMN and with third-party platforms.

INTERMEDIARY PLATFORM (or Intermediary Computer): Both defined the same, as computer hardware and software storing a more complete set of data than the Subset Platform, but storing less data than the Master Platform.

IPT (Internet Point-of-Sale Transaction Terminal): Communicates product/services data and merchant code from the internet, appends UUC (or optionally UUC-PVC) via UIA for validation and sends to RMN using Internet, wherein autho/order/PO # forwarded to merchant. RMN response using internet as well, displaying results on screen of the Transaction Terminal.

ITT (Internet Teller UIA): Authorizes network UIA session using encrypted credential obtained from RMN using UUC-ID.

LCD (Liquid Crystal Display): A technology used for displaying text and visible images.

MAC (Message Authentication Code): an encrypted checksum algorithm, the MAC provides assurance that the contents of a message have not been altered subsequent to the MAC calculation. See standard ANSI X9.9-1986

MACP (or MACM): Message Authentication Code Platform (or Message Authentication Code Module): a software platform in the RMN that handles MAC validation and generation for inbound and outbound packets.

MDP (or MDM): Message Decrypt Platform (or Message Decrypt Module): a software module in the RMN that encrypts and decrypts packets from or destined to an UIA device.

MPP (or MDM): Message Processing Platform (or Message Processing Module): a software module in the RMN that performs the processing of request packets.

MASTER PLATFORM (or Master Computer): Both defined the same, as computing hardware and software storing a complete set of all data being used in the invention.

MERCHANT (or Retailer or Payee): A party retailing or selling services or goods via financial transactions to other parties or entities by means of the Internet or a physical storefront.

MPU (Merchant Point-of-Sale UIA) or (RPU: Retailer Point-of-Sale UIA): a combines encoded UUC verification information with retail transaction information (possibly from an electronic cash register) and formulates authorization requests of the RMN or third-party platforms using X.25 networks, modems, etc.

MSP (Merchant Subset Platform) or (RSP: Retailer Subset Platform): A Platform residing with a Merchant, comprising a subset of all data in the RMN pertaining to a user MDP (Message Decrypt Platform): A software platform in the RMN that encrypts and decrypts packets from or destined to an UIA device.

MPP (Message Processing Platform): A software platform, optionally in the RMN, that performs the processing of request packets.

NAT (Nexus Access Token): In an illustrative embodiment, the NAT is a portable token, of a convenient size and weight to be handheld, or smaller. The NAT comprises: data storage means, and; a UUC stored therein. In an illustrative embodiment, the NAT further comprises communications means (or interconnecting communications means). Embodiments of NAT storage means comprise: magnetic strip; bar code; imprinting; printing; encoding; embossing; an integrated chip (IC); a memory chip. Embodiments of NAT communications means (or interconnecting communications means) comprise: contact-based scannable data; contactless scannable data; radio frequency; infrared beam; audible signal; USB port connection; global positioning signal; cellular phone signal; near-field communications like Bluetooth. Embodiment of NAT tokens comprise: a plastic card; a key fob; a cell phone; a personal digital assistant, and; a pager. The NAT may be conjoined with another conveniently portable device, such as a wireless phone, a personal digital assistant, or a wristwatch. In an illustrative embodiment, while the NAT may be temporarily and removeably conjoined with a UAR, the NAT does not directly store or permanently connect to a UAR. Further, the NAT, in an illustrative embodiment, electronically transmits a "thin-client" UUC for processing a financial transaction via the RMN. In an illustrative embodiment, but not required, the NAT itself may be a "thin-client" token, comprising no stored data which directly identifies and directly accesses a specific online Financial Account of a user, such as a Financial Account-ID.

NETWORK CREDENTIAL: Both the user and the account issuer are identified by the RMN to create the network credential. The credential includes the individual's identification as well as the context of the connection (i.e., the TCP/IP source and destination ports). RMN creates a network credential using the individual's account id, the time of day, and the bank code. The RMN signs this credential using Public Key Encryption and the RMN's Private Key.

PAN-PORTFOLIO ANALYTICS: Analytics for fraud-detection, rewards programs, micro-merchandising, data-mining, and the like, comprising financial data compiled via the RMN accessing a plurality of Proprietary Financial Accounts. As such, pan-portfolio analytics are enabled via a plurality of otherwise inaccessible Authorized Issuer-PFAs being rendered accessible as a function of the RMN.

PAYEE: A party receiving an electronic payment via the RMN from a User, wherein a payee comprises: an account issuer; a merchant (internet, point-of-sale), and; a user.

PAR (Payee Account Registry): a platform, in an illustrative embodiment, within the rule-module nexus, comprising Financial Accounts of a payee, identified by a PAR-Code, said PAR-Code, in an illustrative embodiment, comprising: no "live" financial account data; no "funding" account data; no payment-enabling data; no data directly identifying any specific or primary Financial Account of a payee. The PAR may also comprise rule-modules invoking preferences, tagging, rankings, and/or default Financial Account(s) of a payee. The PAR may also comprise a rule-module of a payee, said payee rule-module further comprising: a payee name; a payee financial depository account; a payee Financial Account; a payee financial depository account routing code, and; payee geographic positioning data.

PARTY: An entity or individual comprising: a user; an account issuer; the rule-module nexus; a payee, and; a third-party.

PFP (Prior Fraud Platform): A platform for UUCP records which have had prior fraud associated with them. Every new User's UUCs and biometrics are checked against all PFP records with the intent of reducing recidivism.

PGL: Personal Verification Code—Group List

PVC (Personal Verification Code): an optional code or a data sequence or data packet for protecting access to an individual's account through secret knowledge, formed from either numbers, symbols, or alphabetic characters (or alphanumeric-symbolic characters), which can be provided via keypad, touch screen, audio commands or instructions, and the like. A Personal Verification Code may be selected by the User, the Rule-Module Nexus, or an authorized third-party.

POS (Point-Of-Sale): A physical place where goods or services are sold.

PPU (Phone Point-of-Sale UIA): Transaction terminal combining phone number with merchant price and product information to authorize a transaction over a UIA-equipped telephone. Order/authorization/mailing-address/PO forwarded to merchant. Resulting authorization is displayed on phone LCD, or "spoken", along with the individual's private code.

PROPRIETARY Financial Account: a Financial Account, accessed via the User Account Registry, wherein an Account Identifier comprises: a code identifying an account issuer, as approved by the International Organization for Standardization [(Bank Identification Code, or BIC Code) or (Bank Identification Number, or BIN)]; a code identifying an account issuer, as approved by the Society for Worldwide Interbank Financial Telecommunications (SWIFT Address or SWIFT Code), and; a code identifying an account issuer, as approved by the American Banker's Association (ABA Routing Code). The Account Identifier of a Proprietary Financial Account further comprises an 8 or 11 alphanumeric characters long code, comprising: Four characters—Account Issuer code; Two characters—ISO 3166-1 alpha-2 country code; Two characters—location code; Three characters—Account Issuer branch code, optional ('XXX' for Account Issuer's primary office). Where an 8-digit code is given, it may refer to the primary office. The ABA Routing Number, (a.k.a. ABA number; Routing Transit number) is devised by the American Bankers Association (ABA), serves to identify the specific account issuer responsible for the payment of a negotiable instrument, and may also designate participants in automated clearinghouses, electronic funds transfer, and on-line banking. In other embodiments, a Financial Account is Proprietary to a specific Account Issuer (Account Issuer—Proprietary Financial Account, or Authorized Issuer-PFA), such that accessing a PFA of a first Account Issuer (1° Authorized Issuer-PFA) with accessing a PFA of a second Account Issuer (2° Authorized Issuer-PFA) is enabled as a function of the RMN and/or the UAR. Alternatively, absent interconnectivity via the RMN and/or the UAR, accessing the 1° Authorized Issuer-PFA in concurrently with accessing the 2° Authorized Issuer-PFA may not be possible. As used herein, "concurrently" refers to proprietary Financial Accounts intersecting at the same point, said same point being a User Account Registry and/or the Rule-Module Nexus. Alternatively, a plurality of otherwise concurrently inaccessible Authorized Issuer-PFAs may be rendered concurrently accessable via the RMN and/or the UAR. In an examplary embodiment, a 1° Authorized Issuer is a bank named Wells Fargo® with which a User has a Proprietary Financial Account (e.g., a credit account), whereby this 1° Authorized Issuer-PFA is registered in said User's UAR, and; a 2° Authorized Issuer is a bank named Chase® with which said User has a Proprietary Financial Account (e.g., a checking account), whereby this 2° Authorized Issuer-PFA is also registered in said User's UAR. As such, accessing the 1° Authorized Issuer-PFA concurrently with accessing 2° Authorized Issuer-PFA is enabled via the RMN. Absent the RMN, said 1° Authorized Issuer-PFA and said 2° Authorized Issuer-PFA may not be concurrently accessible.

RAM: Random Access Memory

RC: Routing Code wherein the UUC is electronically transmitted to either the online VP or the online UAR for accessing a Financial Account from the UAR.

RF (Radio Frequency): Generally refers to radio frequency energy emitted during the normal operation of electrical devices.

REGISTERS: Memory reserved for a specific purpose, data set aside on chips and stored operands to instructions REGISTRY FINANCIAL ACCOUNT comprises: an online Financial Account of a User stored within an online User Account Registry of the User, and; a Registry Financial Account-ID, unique to each Registry Financial Account. A plurality of Registry Financial Accounts, are two or more Registry Financial Accounts have in common at least their association with the same designated User of the User Account Registry.

REGISTRY FINANCIAL ACCOUNT IDENTIFIER (or Registry Financial Account-ID): Uniquely and directly identifies and accesses a Registry Financial Account, said Financial Account-ID comprises: message; indicia; number; alpha-numeric sequence; electronic signal; symbol; digital certificate; digital signal; analog signal; a complete bank routing and complete account number.

REQUESTS: Electronic instructions from the UIA to RMN instructing the RMN to verify the individual and thereby process the individual's command in the event the identification or verification is successful.

RM (Rule-Module): Comprising software an association between a Pattern Data and an Execution Command, invoked by a Positive Matching Determination, and governing access to a User Account Registry.

RMN (Rule-Module Nexus): A subset or master Rule-Module Nexus is a platform comprising: a rule-module, and; capability of comprising a plurality of rule-modules. A Rule-Module Nexus, in an illustrative embodiment, communicates with, and may be integrated with, a User Account Registry and/or a Verification Platform, and optionally is capable of communicating with a plurality of Account Issuers and their associated networks, and communicates with a transaction terminal and a User Interface Apparatus. The RMN is optionally integrated with a UUC (or optionally UUC-PVC) verification platform, and invokes a Rule-Module to access and process financial transactions. During a financial transaction, the RMN may be stored directly on or within a NAT, or the RMN may be temporarily and removeably conjoined with a NAT. In an illustrative embodiment, the Rule-Module Nexus is online and stored apart from the NAT ("Online-RMN"), wherein the UUC is transmitted from the NAT to the Online-RMN via communications means (or interconnecting communications means) external to the NAT. In one embodiment, during a financial transaction, the RMN is remotely located such that it is not physically accessible to the user, either by physical distance or by physical barrier. In an illustrative embodiment, to commence processing a financial transaction, the RMN initially relies only on a thin-client data packet, or electronic message, transmitted from a NAT, a NAT-UIA, a UIA, and/or a UIA-Terminal. In an illustrative embodiment, this thin-client packet comprises: no Financial Account-ID; no user "live" financial account data; no user payment-enabling data; no user funding account data; a unique user code; a rule-module nexus routing code; positioning data, and; over-the-air provisioning data.

RMN-RC (Rule-Module Nexus Routing Code): Data comprising network instructions for routing a financial transaction via the Rule-Module Nexus for processing. Electronic storage of a RMN-RC may comprise: storage on a NAT; storage in a UIA, and; storage on a third-party platform. Invoking a RMN-RC may comprise:

RMP (Remote Merchant Platform): Comprises all merchant identification codes for merchant telephone and Cable TV order shops; indexed by merchant ID. Comprises per-merchant encryption codes as well.

SNP (Sequence Number Platform): A software platform in the RMN that handles the DUKPT sequence number processing for inbound request packets. Sequence number processing protects against replay attacks.

SUBSET PLATFORM (or Local Computer): Both defined the same, as computing hardware and software storing a set of related data which represents only a portion of all data stored in the Master Computer or Master Platform.

TRANSACTION TERMINAL (or TERMINAL): A transaction device, in an illustrative embodiment, conjoined (permanently or removeably) with a UIA, communicating with a UIA, making data available for the RMN; gathers encrypted UUCs (and optionally PVCs) from UIAs to form request messages that are subsequently sent to the RMN for authorization and execution. Transaction Terminals optionally appends ancillary transaction information to request messages, such as Financial Data and purchasing data, verifying counterparties and the like. In the embodiment where the User Interface Apparatus and Transaction Terminal are conjoined without being fully integrated, the two devices each remain operationally and functionally separate from each other, but can communicate to exchange data. In the embodiment where the UIA and the Transaction Terminal are fully integrated, the two devices are operationally and functionally united as one device. Optionally, the Transaction Terminal may also electronically store the RMN-RC for invocation upon the Transaction Terminal scanning a UUC from a NAT, or upon the Transaction Terminal being instructed by User or an attendant via data-entry comprising voice-command, keypad, touch screen, and the like.

TITLE INDEX CODE: Alpha-numeric sequence uniquely verifying an individual's authorized role or capacity within the context of his employment TRACKING CODE: An alpha-numeric sequence assigned to data stored in or transmitted by the RMN, such that said sequence may be used to recall the data or obtain a report on the status of the transmission of the data.

UAP (UIA Authorization Platform): Comprises the list of parties, whether users, individuals or account issuers, authorized to use modify and issue UIA devices.

UAR (User Account Registry or Online User Account Registry): an online platform comprising: a UAR-Code; a plurality of Registry Financial Accounts of a User; a plurality of Registry Financial Accounts associated with a User, and; storage means apart from the NAT and electronically accessible from the NAT via communications means (or interconnecting communications means) external to the NAT. The UAR may comprise: a plurality of co-located Registry Financial Accounts; a plurality of Registry Financial Accounts conjoined on a distributed basis. In an illustrative embodiment, the UAR is accessible to the User via a UUC stored on a NAT, wherein the UUC comprises no Registry Financial Account-ID. In an illustrative embodiment a UAR is not dependant on a primary Registry Financial Account. The UAR may also comprise: being wholly integrated with a Rule-Module Nexus; being conjoined and co-located with a Rule-Module Nexus; being conjoined but not co-located with a Rule-Module Nexus. While a UAR may be stored apart from, or external to, the NAT, the UAR may be stored within a UIA or UIA-Terminal temporarily and removeably conjoined with a NAT. The UAR is, in an illustrative embodiment, not stored directly or permanently on a NAT.

UAR-CODE (User Account Registry Code): Uniquely identifies a User Account Registry, said User Account Registry comprising a plurality of Financial Accounts of the User. The UAR-Code, in an illustrative embodiment, comprises no Registry Financial Account-ID. In an illustrative embodiment said User Account Registry Code is unique for each user, and, in an illustrative embodiment, does not directly identify or depend upon any specific Financial Account of the User or require designating a specific primary Financial Account of a User. While the UAR-Code is unique to each UAR, a plurality of Users be registered with the RMN to be authorized to access a single UAR.

UIA (User Interface Apparatus): A device which, during a financial transaction, gathers UUC (and optionally PVC) data directly from user, encoding, encrypting, communicating said UUC (and optionally PVC) data to a Transaction Terminal, making data available for the RMN. Comes in various hardware models and software embodiments, including those comprising: a magnetic stripe reader for reading, the UUC stored on a magnetic stripe on the NAT; a bar-code reader for electronically reading the UUC on a bar-code imprinted on the NAT, and; a reader or reader/writer for interrogating, or on a contactless proximity NAT when the NAT is in a prescribed short-range to the UIA. The UIA is, in an illustrative embodiment, conjoined (permanently or removeably) with a Transaction Terminal, wherein conjoined may optionally include being fully integrated with a Transaction Terminal. In the embodiment where the User Interface Apparatus and Transaction Terminal are conjoined without being fully integrated, the two devices each remain operationally and functionally separate from each other, but can communicate to exchange data. In the embodiment where the UIA and the Transaction Terminal are fully integrated, the two devices are operationally and functionally united as one device. Optionally, the UIA may also electronically store, invoke and append a UIA-VC and/or a RMN-RC to the encrypted message from the UIA's scanning of a UUC from a NAT, or upon the UIA being instructed by User or an attendant via data-entry comprising voice-command, key-pad, touch screen, and the like.

UIA-SP: User Interface Apparatus-Subset Platform

UIA-VC (User Interface Apparatus Verification Code, or User Input Apparatus hardware Verification Code): a unique code which is assigned to a UIA unit, which is appended to a financial transaction and transmitted to the Rule-Module Nexus in order to verify the authenticity of the UIA to the Rule-Module Nexus. The RMN may associate the UIA-VC with additional verifying data, such as a merchant location, a merchant identity, a Unique Payee Code, and the like.

UOP (User Interface Apparatus Owner Platform): A platform comprising the geographic and contact information on the owner of each UIA.

UPC (A unique payee code): Stored in a PAR (payee account registry), in an illustrative embodiment, within the rule-module nexus, the UPC is distinct for each payee of the RMN or Third-Party Platforms, said UPC an illustrative embodiment, comprising: no UPC-identifier (UPC-ID) which uniquely identifies and directly accesses a UPC; no "live" financial account data of a payee; no "funding" Financial Account data of a payee; no payment-enabling Financial Account data of a payee; no stored data which uniquely and directly identifies a specific online Financial Account of the payee; a rule-module nexus routing code, and; stored data which is unique to the payee.

UPP (UUC-PVC Platform): a software platform in the RMN maintains a registry of which UUCs are assigned to which PVC's, including a registry of algorithmically dissimilar UUCs linked to the same PVC.

UST: User Support Terminal

UUC (A unique user code): In an illustrative embodiment stored in a nexus access token, the UUC is any code unique to a User, comprising: message; indicia; number; alpha-numeric sequence; electronic signal; symbol; digital certificate; digital signal, and; analog signal. In an illustrative embodiment, the UUC may comprise a RMN-RC and should compel processing of a financial transaction via a UAR-Code to access a Financial Account. Further, while the UUC itself may comprise a UAR-Code and/or Financial Data, in an illustrative embodiment of the invention, the UUC contains neither. In an illustrative embodiment, the UUC may also be "thin-client", wherein the UUC comprises: no Financial Account-ID which directly identifies or directly accesses a Registry Financial Account; no user "live" financial account data; no user "payment-enabling" data; no user "funding-account" data.

UUC-ID (A unique user code identification): An identifier used by the RMN to uniquely verify an individual's UUC record (IRID—Individual Record ID), which, in an illustrative embodiment, comprises no data directly identifying any specific online Financial Account of a user.

UUCP (Unique User Code Platform): A platform for unique user codes. Queries against the UUCP are used to verify authority for financial transactions.

VAP (or VAD): Valid Apparatus Platform (or Valid Apparatus Database): A platform in which each UIA (with associated unique encryption codes) is identified, along with the owner of the UIA.

VAC (Verification Approval Code): A message, indicia, number or alpha-numeric sequence, electronic signal (and the like) invoked as Pattern Date from a Rule-Module Nexus upon the Verification Platform making a Positive Matching Determination. The VAC invokes access to the UAR. The VAC may comprise a UAR-Code to identify a user's User Account Registry while, in an illustrative embodiment, not directly identifying or directly accessing any specific Financial Account of the user. Further, the VAC may be unique to each Positive Matching Determination for a User; may be common to all Positive Matching Determinations made for a User; may be common among a plurality of Positive Matching Determination made for a plurality of Users.

VP (Verification Platform): a platform comprising: a registered Unique User Code; a registered user personal verification code (PVC), or primary PVC; a registered user private code; a unique payee code; a user interface apparatus verification code; a registered user secondary PVC. The VP, in an illustrative embodiment, communicates with, and may be integrated with, a User Account Registry and/or a RMN, and optionally is capable of communicating with a plurality of Account Issuers and their associated networks, and communicates with a transaction terminal and a User Interface Apparatus. The VP invokes a Rule-Module from the RMN to access and process financial transactions via the UAR. During a financial transaction, the VP may be stored directly on or within a NAT, or the VP may be temporarily and removeably conjoined with a NAT. In an illustrative embodiment, the VP is online and stored apart from the NAT ("Online-VP"), wherein the UUC is transmitted from the NAT to the Online-VP via communications means (or interconnecting communications means) external to the NAT. In an illustrative embodiment, the VP may also comprise: being wholly integrated with a Rule-Module Nexus; being conjoined and co-located with a Rule-Module Nexus; being conjoined but not co-located with a Rule-Module Nexus. While a VP may be stored apart from, or external to, the NAT, the VP may be stored within a UIA or UIA-Terminal temporarily and removeably conjoined with a NAT. The VP is, in an illustrative embodiment, not stored directly or permanently on a NAT. The VP, being online, requires communications means (or interconnecting communications means) external to the NAT for receiving the UUC from the NAT. Receives incoming bid verification data, compares said bid verification data to registered verification data, making a matching determination and, if successful, in an illustrative embodiment, outputs or invokes a VAC enabling access to a UAR.

DETAILED DESCRIPTION OF THE INVENTION

It should be noted that as used herein, the article "a", or "an", means "one or more" of anything to which it refers, such as a platform, component, feature, element, process, step, method, system or the like of the invention. For example, "a platform" means "one or more platforms". It should also be noted that as used herein, the term "plurality" means "two or more" of anything to which it refers. For example, "plurality of Financial Accounts" means "two or more Financial Accounts". It should also be noted that the term "comprising" (or "comprises") means "including, but not limited to" any one thing to which it refers, inclusive of meaning singularly, in combination, in any combination, and/or in any order. For example, "Financial Accounts comprising: debt, credit, and stored value" means "any one of the Financial Accounts of debt, credit and/or stored value, including Financial Accounts which not limited to debt, credit, and/or stored value". It should be further noted that the phrase "of a Financial Account" means "relating to, or associated with a Financial Account". It should also be noted that the term "communication" includes an electronic message, whether presented, transmitted, received, or a combination thereof.

It should also be noted that "via", as used herein, means "by the use of", "by the agency of" or "by the instrumentality of". Further, it should be noted that "conjoin", as used herein, means to join, connect, associate and/or combine, whether in physical proximity or remotely. It should also be noted that "presenting", as used herein, means "displaying", and vice-versa. Further, it should be noted that "scalable" comprises the capability of storing, using and/or invoking a plurality of data, such as a plurality of rule-modules, or a plurality of software programs.

As used herein, "invoke" comprises activating or calling up a computer or communications code, function or method, any of which may be static or dynamic. In one embodiment, an existing, reusable code may be repeatedly invoked, or a dynamic code, instantly formulated and possibly non-reusable, may be invoked.

It should further be noted that, as used herein, unless otherwise specified, the terms "navigating system", "mapping system", "guiding system", and "positioning system" are deemed to have similar and at times identical meanings, for the purposes of describing systems which electronically identify the geographic location of a mobile device. Other definitions and meanings shall be referred to in the glossary and elsewhere herein.

The method and system of the present invention may be described herein in terms of functional block components, flow charts, screen shots, optional selections and various processing steps. It should be appreciated that such functional blocks may be realized by any number of hardware and/or software components configured to perform the specified functions. For example, the present invention may employ various platforms comprising software and hardware components (e.g., memory elements, processing elements, logic elements, look-up tables, and the like), which may carry out a variety of functions under the control of one or more microprocessors or other control devices. Accordingly, functional blocks of the block diagrams and flowchart illustrations support combinations of means for performing the specified functions, combinations of steps for performing the specified functions, and program instruction means for performing the specified functions.

It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Similarly, the platforms of the present invention may be implemented with any programming or scripting language such as C, C++, Java, COBOL, assembler, PERL, or the like, with the various algorithms being implemented with any combination of data structures, objects, processes, routines or other programming elements. Further, it should be noted that the platforms of present invention may employ any number of conventional techniques for data transmission, signaling, data processing, network control, and the like. For a basic introduction of cryptography, please review a text written by Bruce Schneier which is entitled "Applied Cryptography: Protocols, Algorithms, And Source Code In C," published by John Wiley & Sons (second edition, 1995), which is hereby incorporated by reference. Protocols, as known in the art, are computing languages or computing instructions.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

It should be appreciated that the particular implementations shown and described herein are illustrative of the invention and its best mode and are not intended to otherwise limit the scope of the present invention in any way. Indeed, for the sake of brevity, conventional data networking, application development, methods of populating data onto platforms, including databases and other functional aspects of the methods and systems herein (and components of the individual operating components of the systems) may not necessarily be described in detail herein. Furthermore, the connecting lines shown in the various figures contained herein are intended to represent illustrative functional relationships and/or physical couplings between the various elements. It should be noted that many alternative or additional functional relationships or physical connections may be present in a practical electronic transaction system.

It should be appreciated that the particular implementations shown and described herein are illustrative of the invention and its best mode and are not intended to otherwise limit the scope of the present invention in any way. Indeed, for the sake of brevity, conventional data networking, application development, and other functional aspects of the systems (and components of the individual operating components of the systems) may not be described in detail herein. Furthermore, the connecting lines shown in the various figures contained herein are intended to represent illustrative functional relationships and/or physical couplings between the various elements. It should be noted that many alternative, equivalent, or additional functional relationships or physical connections may be present in a practical electronic transaction system. It should further be noted that the order of the steps denoted in the attached drawings are not intended as limitations and the steps may be accomplished in other orders without deviating from the scope of the present invention. Still further, the actors denoted as performing individual steps in the disclosed process should not be interpreted as limiting in any way as one with ordinary skill in the art appreciates that the steps may be performed by actors different from those disclosed herein without deviating from the spirit and scope of the present invention.

The method and system of the present invention may be described herein in terms of various functional elements as depicted in the attached drawings, configurations and described embodiments. It should be appreciated that such functional elements may be realized by any number of similar elements configured according to this invention to perform the specified functions. Thus, it should be appreciated that the particular implementations shown and described herein are illustrative of the invention and its preferred mode and are not intended to otherwise limit the scope of the present invention in any way. Indeed, for the sake of brevity, conventional elements of underpants may not be described in detail herein. Furthermore, the various figures contained herein are intended to represent illustrative functional embodiments of the invention, and that many alternative or equivalent configurations, elements, and structures are intended to be within the scope of the present invention. It should further be noted that the order of the elements in the attached drawings, specification and claims are not intended as limitations and the drawings, specification and claims may be configured in other orders without deviating from the scope and spirit of the present invention.

In the following detailed description of an illustrative embodiments, reference may be made to the accompanying drawings, which form a part hereof, and within which are shown by way of illustration specific embodiments by which the invention may be practiced. It is to be understood that other embodiments may be utilized and structural changes may be made without departing from the scope of the invention.

It will be appreciated that the methods, systems, and their comprising elements of this invention, may be practiced in any order, in any timeframe or time delay with respect to other steps, other systems and their comprising elements. It will further be appreciated that the invention illustratively disclosed herein suitably may be practiced in the absence of any element which is not specifically disclosed or required herein.

It will be appreciated, that many applications and embodiments of the present invention could be formulated. One skilled in the art will appreciate that a network may include any system for exchanging data or transacting business, such as the Internet, an intranet, an extranet, WAN, LAN, satellite or wireless communications, and/or the like. Moreover, although the invention and its platforms use protocols such as TCP/IP to facilitate network communications, it will be readily understood that the invention could also be implemented using IPX, Appletalk, IP-6, NetBIOS, OSI or any number of existing or future protocols. Moreover, the method and the system contemplate the use, sale, exchange, transfer, or any other distribution of any goods, services or information over any network having similar functionality described herein.

Further still, the terms "Internet" or "network" may refer to the Internet, any replacement, competitor or successor to the Internet, or any public or private network, intranet or extranet that is based upon open or proprietary protocols. Specific information related to the protocols, standards, and application software utilized in connection with the Internet may not be discussed herein. For further information regarding such details, see, for example, DILIP NAuthorized IssuerK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); LOSHIN, TCP/IP CLEARLY EXPLAuthorized IssuerNED (1997). All of these texts are hereby incorporated by reference.

As used herein, a Platform may include local or remote database(s) for storing, associating, and retrieving information for accessing a User Account Registry, Rule Module Nexus, and/or Verification Platform. Any databases discussed herein may be any type of database, such as relational, graphical, hierarchical, object-oriented, and/or the like. Common database products that may be used to enable the Platforms include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. The database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is, in an illustrative embodiment, the same. However, data tables having similar, though not identical, data in the key fields may also be merged by using AGREP, for example.

Communication between the parties (e.g., an Account Issuer, a User, merchant, and/or third-party computer) and the rule-module nexus of the present invention may be accomplished through any suitable communication means, such as, for example, a telephone network, intranet, Internet, pointof-interaction device (point-of-sale device, personal digital assistant, cellular phone, kiosk, etc.), online communications, offline communications, wireless communications, and/or the like. One skilled in the art will also appreciate that, for security reasons, any databases, systems, or components of the present invention may consist of any combination of databases or components at a single location or at a plurality of locations, wherein each database or system includes any of various suitable security features, such as firewalls, access codes, encryption, decryption, compression, decompression, and/or the like.

Referencing the computer networked aspect of an illustrative embodiment of this invention, each party is equipped with a computing system to facilitate online commerce transactions. The computing units may be connected with each other via a data communication network. The network is a public network and assumed to be insecure and open to eavesdroppers. In illustrative embodiment, the network is embodied as the Internet. In this context, the computers may or may not be connected to the Internet at all times. For instance, the computer may employ a modem to occasionally connect to the Internet, whereas the rule-module nexus might maintain a permanent connection to the Internet. It is noted that the network may be implemented as other types of networks, such as an interactive television (ITV) network.

The merchant computer and the transaction Account Issuer or provider computing systems may be interconnected via a second network, referred to as a payment network. The payment network represents existing proprietary networks that presently accommodate transactions (or "Xact's") for credit, debit, loyalty/rewards, and other types of financial/banking transactions. The payment network is a closed network that is assumed to be secure from eavesdroppers. Examples of the payment network include the American Express™, VisaNet™ and the Verifone™ network.

The User may interact via the rule-module nexus with a transaction system or a merchant using any transaction terminal such as a telephone, magnetic stripe card reader, radio frequency interrogator, keyboard, mouse, kiosk, personal digital assistant, touch screen, voice recognition device, transponder, biometrics device, handheld computer (e.g., Palm Pilot™), cellular phone, web TV, web phone, blue tooth/beaming device and/or the like. Similarly, the invention could be used in conjunction with any type of personal computer, network, computer, workstation, minicomputer, mainframe, or the like, running any operating system such as any version of Windows, Windows NT, Windows2000, Windows 98, Windows 95, MacOS, OS/2, BeOS, Linux, UNIX, MVS, OS, or the like.

As will be appreciated by one of ordinary skill in the art, the present invention may be embodied as a method, a data processing system, a platform for data processing, and/or a computer program product, wherein the steps and/or processes may be performed in a variety of sequences and/or orders, without restricting the scope of this invention. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, flash card memory and/or the like.

The transaction Account Issuer (Authorized Issuer) (or Account Provider) platform 28 includes any provider of products and/or services that facilitates any type of transaction. As contemplated by an illustrative embodiment of the present invention, the Account Issuer platform 28 establishes and maintains account and/or transaction information for the User. The Account Issuer platform 28 may issue products to the User and may also provide both the User and the Merchant platform 28 with the processes to facilitate the transaction system of the present invention. The Account Issuer platform 28 includes banks, credit unions, credit, debit or other transaction-related companies, telephone companies, or any other type of card or account issuing entities, such as card-sponsoring companies, incentive rewards companies, or third-party providers under contract with financial entities. Unless otherwise specifically set forth herein, although referred to as "Account Issuer," this term should be understood to mean any entity issuing any type of account to facilitate any transaction, exchange or service, and should not be limited to companies possessing or issuing physical cards. In an illustrative system, the Account Issuer platform 28 may be any transaction facilitating company such as a credit account providers like American Express™, VISA™, Mastercard™, Discover™, and the like. In another embodiment, the Account Issuer platform 28 could be any membership organization or union. In some instances, the Account Issuer platform 28 and the Merchant platform 28 may be the same, for example, where the credit account is issued by the same entity that provides the product or service. A phone card using a credit account issued by a telephone company, where the credit account is associated to the User's home telephone account is one such occasion.

Although the present system for facilitating transactions may exist within one transaction Account Issuer system, illustrative embodiments contemplate use with other third-party authorization and settlement systems and networks.

The authorization and settlement processes may occur as separate steps or as a single step. In one embodiment, referred to herein as an electronic data capture (EDC) system, the Merchant platform 28 sends an authorization request to an Account Issuer platform 28 and if the authorization request is approved, a receipt of charges is created and submitted for the Merchant platform 28. Separate sequences of file transmissions or messages are therefore not required. Various embodiments, hybrids, and modifications of these processes should be apparent to one skilled in this art.

It will be appreciated that the invention illustratively disclosed herein suitably may be practiced in the absence of any element which is not specifically disclosed herein, particularly in an illustrative embodiment.

The invention is a financial transaction system which uniquely enables a User to, in an illustrative embodiment, present a single "thin-client" token and benefit from centralized Financial Account access, Financial Account aggregation and Financial Account presentation by means of a secure, remotely located Rule-Module Nexus 14.

A financial transaction is any electronic transfer or exchange of Financial Data having a predetermined monetary or monetary-equivalent unit value which is legal tender or a legal tender-equivalent, and which is honored by an Account Issuer, such that a User's purchase, expenditure or usage of these units results in the User's purchase or sale of goods, services or currency involving an Account Issuer. Financial data can also include units of currency, minutes of telephone calling time, miles towards earning a free airplane flight, points towards a gallon of gas, and the like.

A "Financial Account number" or "transaction number" as used herein, may include Financial Account-ID, comprising any identifier for a Financial Account 65 (e.g., credit, charge debit, checking, savings, reward, loyalty, travel or the like)

which may be maintained by a transaction Account Issuer (e.g., payment authorization center) and which may be used to complete a financial transaction. A typical account number (e.g., account data) may be correlated to a credit or debit account, loyalty account, travel or rewards account maintained and serviced by such entities as American Express, Visa and/or MasterCard, such as reward points as currency wherein a User can use reward or scrip points (e.g., Star Alliance™, eScrip™) as currency to pay for purchases). For ease in understanding, the present invention may be described with respect to a credit card account. However, it should be noted that the invention may not be so limited and other accounts permitting an exchange of goods and services for an account data value may be contemplated to be within the scope of the present invention.

In an illustrative embodiment, RMN may refer to Master and/or Subset platforms, e.g., RMN 14 and Subset RMN 17, unless otherwise specified. Similarly, a Payee may refer to an Account Issuer, unless otherwise specified.

An Account Issuer as defined herein is the named entity with primary fiduciary duty for administering a Financial Account 65 of a User, said fiduciary duty comprising: managing the Financial Data within the Financial Account 65, and; reconciling the Financial Data within the Financial Account 65 upon settlement of a financial transaction. An Account Issuer comprises any of the following: a bank, a merchant, a scrips provider, credit account organization, a government agency, an insurance company, a brokerage firm, a reward incentives provider, a services barter provider, a product barter provider, an interne payment provider, and the rule-module nexus of this invention. A Financial Account 65, storing related Financial Data, resides with an Account Issuer if said Account Issuer has the primary responsibility to store, administer and reconcile the Financial Data within the User's Financial Account 65.

The Account Issuer may be within the RMN 14 or may be within a RMN-authorized Third-Party Platform 28.

In an illustrative embodiment, once the User makes an account selection from a plurality of proprietary accounts presented, the RMN 14 does not universally "stand-in" for Account Issuers, nor automatically invoke a default program or Global Execution Command (GEC) 55, to cause financial transactions of all RMN 14 Users to bypass, supersede, divert or switch an already-existing interchange fee, discount rate, or other settlement process which would otherwise apply to a Financial Account 65 selected by the User, or which would otherwise apply to the selected Financial Account's 65 associated Account Issuer (Authorized Issuer). Alternatively put, the RMN 14 is, in an illustrative embodiment, designed wherever possible to compliment, not contravene, the already-existing interchange fee, discount rate, or settlement process of the User's selected Financial Account 65 and its associated Account Issuer(s). In an illustrative embodiment, the RMN 14 maintains, wherever possible, a Financial Account's 65 already-associated transaction processors (issuing banks, credit associations, national automated clearinghouse association ("NACHA®"), merchant banks), their respective proprietary networks (VisaNet®, Pulse®, Nova®, Interlink® and the like), and their respective processing fees (interchange fees, discount rates), protocols, and procedures. Similarly, in an illustrative embodiment, the RMN 14 does not act to "stand-in" or "mirror" the transaction processing of an Account Issuer (Authorized Issuer) which has a pre-existing association with a Financial Account selected by a User.

In an illustrative embodiment, it is an objective of the present invention to compliment, not contravene, the already-existing interchange fee, discount rate, or settlement process of the User's selected Financial Account 65 and its associated Account Issuer(s). Alternatively put, the invention herein is, in an illustrative embodiment, designed not to universally "stand-in" for an existing Account Issuer, nor to cause all financial transactions of the invention herein to bypass, divert or switch an already-existing interchange fee, discount rate, or settlement process which would otherwise be applied by the Account Issuer(s) of the User's selected Financial Account 65 and its associated transaction processing.

It is will be appreciated that an illustrative embodiment of this invention maximizes security of the Rule-Module Nexus (RMN) 14 transactions and minimize the size and cost of the nexus access token, by employing a "thin-client", passive RFID-based Nexus Access Token (NAT) 62. As used herein, "thin-client", in an illustrative embodiment, means that to complete a financial transaction using the RMN 14, the NAT 62 transmits a "thin-client" packet which is not required to be transaction-enabled by containing any "live" financial account data or "finding" account data which can directly identify or directly access a specific online Financial Account 65 of a user. Thus, during processing of a financial transaction, the NAT 62 does not require use of any stored data on a User's Nexus Access Token 62 which may directly identify or directly access an online Financial Account 65 of the User.

Further, the NAT 62 is designed, in an illustrative embodiment, to be of a sufficiently convenient size and weight as to be hand-holdable (e.g., hand-held) or smaller: small, lightweight and readily mobile for daily use, or having physical dimensions sufficiently small to be hand-held or at most, palm-sized. In an illustrative embodiment, the NAT 62 is compact enough also to be used and/or operated while being held in the hand or hands.

Further, as a passive RFID-based token, the "thin-client" NAT, in an illustrative embodiment, does not require a battery power supply, nor does it require an integrated circuit chip. In one embodiment, a purely passive or "reflective" NAT 62 may rely upon the electromagnetic energy radiated by a UIA 16 reader to power the RF integrated circuit that makes up the RFID tag within the NAT 62. As such, in this embodiment, the NAT 62 may be said to be "beam powered". This "thin-client" NAT may be low-cost, high-security, and miniaturized for conjoining with other conveniently portable tokens, such as a wearable finger ring or a house key. For high security, it is preferred that stored data on a User's NAT 62 comprises a User's Unique User Code (UUC) 200, which may also comprise a RMN-Routing Code (RMN-RC) 61. In one embodiment, the NAT 62 does not store the User's User Account Registry Code (UAR-Code) 59. The UAR-Code 59 identifies a User Account Registry 15 of the RMN 14 which comprises the Financial Accounts 65 of a User, even though, in an illustrative embodiment, said UAR-Code 59 does not itself directly identify any specific Financial Account 65 of the User, nor, in an illustrative embodiment, does the UAR-Code 59 depend upon the designation of any Financial Account 65 of the User as a primary account. In this embodiment, in an illustrative embodiment, no stored data on the NAT 62 can be read or copied off-line which could provide direct access to a specific Financial Account 65 of the User. As such, if a User's NAT 62 is stolen, lost or copied, the NAT 62 and its stored data would not provide an unauthorized User with direct access to a Financial Account 65 of an authorized User of the RMN 14. In an illustrative embodiment, there are a plurality of different UAR-Codes 59, each identifying a User Account Registry (UAR) 15 of the User, comprising: a Master UAR 15 within the RMN 14; a Master UAR 15 within a Third-Party Platform 28; a Subset UAR 19 within a Subset RMN 17; and the like.

Therefore, an illustrative NAT 62 or UUC 200 in this embodiment contrasts with a standard "fat-client" token requiring stored data which directly identifies, or enables direct access to, a specific Financial Account 65 of a User. For example, a standard "fat-client" magnetic stripe card stores a credit card number in a sixteen-digit format as four spaced sets of numbers, represented by a number like "1234 5678 9101 1213". The first five to seven digits are reserved for processing purposes and identify the issuing bank, card type, etc. In this example, the last (sixteenth) digit is used as a sum check for the sixteen-digit number. The intermediary eight-to-ten digits are used to uniquely identify the consumer. A merchant account number may be, for example, any number or alpha-numeric characters that identifies a particular merchant for purposes of card acceptance, account reconciliation, reporting, or the like. In an illustrative embodiment, a NAT 62 embodiment uses a magnetic stripe or a bar-code imprint, optionally in combination with another connectivity or communications capability like RFID, wherein the data stored on the NAT 62 may only include a UUC 200, optionally including a RMN-RC 61.

The invention provides a Rule-Module Nexus (RMN) 14 method and system for a financial User to authorize a financial transaction using Financial Accounts 65 either at the merchant point of sale or over the Internet. A Rule-Module Nexus 14 and a Verification Platform 12 are used to accomplish these goals.

A Unique User Code (UUC) 200 is defined as any data string, unique to a User, which is stored into a User's Nexus access token (NAT) 62, and comprises any of the following: a dynamic code which changes periodically based on predetermined criteria synchronized with the verification platform, and; a static code which remains constant based on a predetermined code synchronized with the verification platform. The UUC 200, in an illustrative embodiment, does not store any data which directly identifies a specific online Financial Account 65 of a User. The UUC 200 may also comprise a RMN-RC 61. One such UUC is registered for the User with the Rule-Module Nexus 14.

A Personal Verification Code (PVC) 202, distinct from the Unique User Code 200, comprises any alpha-numeric sequence or data string, not necessarily unique to a User, which is optionally input by the User during a financial transaction. Optionally, at least one such PVC 202 is registered for the User with the Rule-Module Nexus 14.

A Rule-Module 50 is defined as any Pattern Data 54 associated with an Execution Command 52. At least one such Rule-Module 50 is registered for the User with the Rule-Module Nexus 14.

The Components of the Computer System of this Invention Comprises any of the Following:
  Nexus access token (NAT);
  User Interface Apparatus (UIA);
  Communication lines for a Network;
  Rule-Module Nexus (RMN);
  These components together allow a financial transaction to occur without requiring the User to use a plurality of financial cards, paper coupons, credit cards, debit cards, or other physical objects.

Nexus Access Token (NAT)

The NAT 62 is, in an illustrative embodiment, capable of communicating and/or connectivity with a UIA 16—Terminal 2 and/or the RMN 14 via at least one mode, including magnetic stripe (Magstripe), bar code imprint, radio frequency identification (RFID), near-field communications (NFC), cell phone network, and the like. In an illustrative embodiment of the invention, the UIA 16 electronically scans an RFID signal, a bar-code imprint, or a magnetic stripe from a NAT 62, via the data reader attached to the UIA 16. In one embodiment, NAT 62 is encoded with a UUC 200, optionally further comprising a RMN-RC 61.

The UUC 200 may be stored with a NAT 62 via processing comprising; embossing, printing, labelling, encoding or encrypting in an electronic memory unit; storing in an unencrypted memory unit.

In an illustrative embodiment of a NAT 62 using Magstripe (or Magnetic Strip, or Magnetic Swipe, or Magnetic Stripe), the NAT 62 may use a unique DCVC3 (Dynamic card validation code); a unique Static CVC (card validation code); a unique DCVV (Dynamic card validation value), and/or; a unique Static CVV (card validation value).

In an illustrative embodiment of a NAT 62 using a bar code imprint, the NAT 62 may be imprinted with an electronically readable bar code, and optionally a visibly readable imprint, and/or a raised imprint, of alpha-numeric code.

In an illustrative embodiment of a NAT 62 using RFID, would, in an illustrative embodiment, include a portable transponder using passive contactless proximity technologies, in an illustrative embodiment, compatible with close proximity standards ISO 14443 and 13.56 Mhz, wherein either: the NAT 62 reflects energy from the User Interface Apparatus 16, or; the NAT 62 absorbs and temporarily stores a very small amount of energy from the UIA 16 signal to generate its own quick response. In either case, in this preferred embodiment, the NAT 62 requires strong signals from the User Interface Apparatus 16, and the signal strength returned from the NAT 62 is constrained to very low levels by the limited energy.

In an illustrative embodiment of a cell phone NAT 62 embodiment, a plasma display may display a bar-code image, readable by a UIA 16 (or UIA 16—Terminal 2) bar code reader, in an illustrative embodiment, displaying a thin-client data packet comprising: no user "live" financial account data; no user payment-enabling data; no user funding account data; a unique user code; a rule-module nexus routing code; positioning data, and/or; over-the-air provisioning data.

In illustrative embodiments of a NAT 62 using NFC, the NAT 62 is capable of wireless internet detection (WiFi), Bluetooth, and IEEE 802.11 communications.

It will also be appreciated that in an illustrative embodiment of the invention, the "thin-client" NAT 62 of the invention permits optimal miniaturization, in an illustrative embodiment, enabling the NAT 62 to be embedded in a User's most-conveniently portable token, such as a watch, a ring, a door key, a PDA, a bracelet, a cell phone, or the like. In an illustrative embodiment, the NAT 62 does not require a battery; rather, the power is supplied by the UIA 16 conjoined with a radio frequency identification (RFID) scanner having read/write capabilities. When a NAT 62 encounters radio waves from a UIA 16, a coiled antenna within the NAT 62 forms a magnetic field. The NAT 62 draws power from the magnetic field, energizing the circuits in the NAT 62, enabling the UIA 16 to read the stored data on the NAT 62. In this embodiment of the invention, the thin-client NAT 62 has several advantages, including: not requiring an embedded battery; sustaining its function for twenty years or more; reduced cost; miniaturization to smaller than a grain of rice.

In an illustrative embodiment, a NAT 62 may be single-mode, dual-mode or multi-mode connectivity enabled for communicating with a UIA 16—Terminal 2 and/or with the RMN 14, comprising embodiments such as: Magnetic Stripe (or Magstripe); a bar-code imprint; a bar-code imprint and a Magstripe; radio frequency identification (RFID) and Magnetic Stripe; RFID and near-field communications (NFC); RFID and Bluetooth®; RFID and Cellular phone network;

RFID, NFC and Cellular phone network; instant messaging (IM), short message system (SMS), and RFID. Optionally, the bar-code may be imprinted on a label may be adhesively or removeably attached to the NAT 62. In another embodiment of the invention, the RFID chip may be adhesively or removeably attached to the NAT 62.

In one card embodiment of the NAT 62, the front of the NAT 62 may be reserved for branding by an account issuer; the back may comprise acceptance mark(s), appropriate token numbers (see below), risk items, magnetic stripe, and signature panel for use when a UIA 16 does not have a keypad 70 for PVC 202 entry to validate or authorize the financial transaction. Regarding the data strings, no embossed numbers may be required, since the financial transactions would be authorized online. As such, the token number for the NAT 62, comprising a portion of the UUC 200, can be laser printed. There may also be a "virtual POS" number printed on the back, in full, along with a third number—a risk key of three or four digits. In this way, the NAT 62 can effectively work in all transaction environments, without the need for a separate "Virtual card" NAT 62 which might otherwise be used for internet purchases or physical merchant purchases in the event that a magnetic swipe reader is not available.

In one embodiment, the UUC 200 associated with a NAT 62, is an alphanumeric data string further comprising:

First #'s (is Nexus Xact Flag)
Next ###'s (are the RMN-RC or UAR-RC)
Next #####'s (Unique User data portion)
Next ###'s (NAT originator/distributor identifier: This enables: a) a third-party having originating or distributing a NAT, to be identified with said NAT for purposes of said third-party receiving a royalty or fee from the RMN, potentially as a function of tracking the activation and usage frequency of said NAT; b) the NAT to present a third-party's BIC Code or BIN, for appending to a RMN-bound transaction such that the Terminal 2 and the Network 18 more readily recognize the data packet being transmitted in ISO/IEC 7813 format
Next ###'s (UAR/UUC Expiration date)

Figure 11:
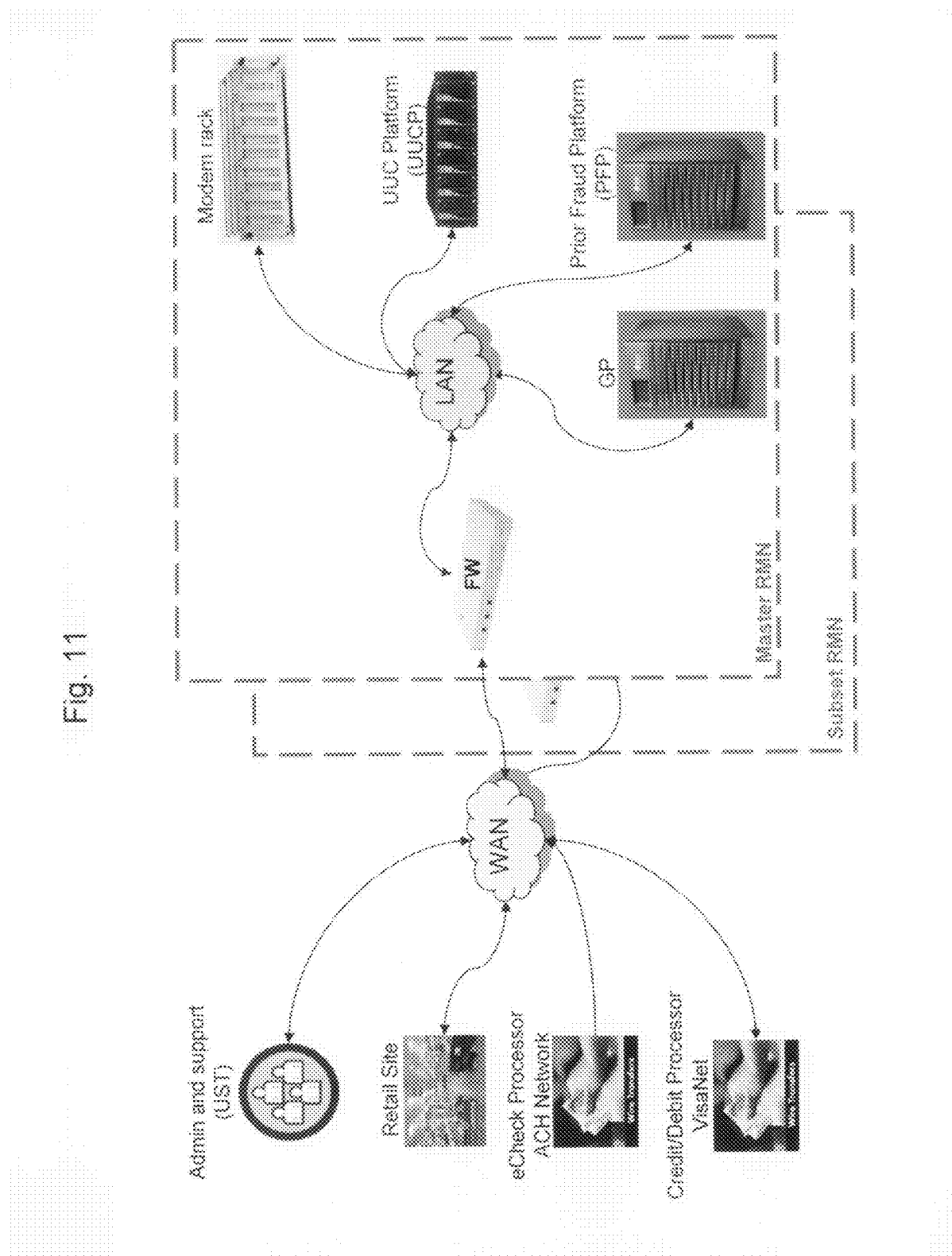

FIG. 11D illustrates an embodiment for activating a magnetic strip NAT 62, optionally including registration of an initial Financial Account 65, at POS in a physical-world retailer using an in-market Verifone® Trans330 unit, comprising: the User swipes the NAT 62 (Step 513); the User swipes their driver's license (Step 514); the User swipes an initial Financial Account 65 card. The data from these cards is transmitted to the RMN 14 to be activated, linked, and stored.

User Interface Apparatus (UIA)

The UIA 16 is a device that gathers or comprises verification information for use in authorizing financial transactions. In one embodiment, the UIA 16 or Transaction Terminal 2 may also store the RMN-RC 61, wherein the RMN-RC 61 may be invoked upon an event comprising: the UIA 16 scanning a UUC 200 from a NAT 62, wherein the NAT 62 need not necessarily store or transmit a RMN-RC 61, and; the UIA 16 or Transaction Terminal 2 being instructed by the User or an attendant to invoke the RMN-RC 61, wherein being instructed comprises key-punching, voice-commands, or touch-screen options.

Each UIA 16 conducts one or more of the following operations:

Gathers UUC 200 input from scanning a NAT 62 of a User, via any of the following: bar-code reader; contactless communications scanner; near-field communications (NFC) scanner; magnetic stripe scanner; magnetic ink character reader (MICR) scanner, and; automated transponder interrogation or scanning for dedicated contactless proximity communications from a NAT 62, using an RFID sensor or scanner, an infrared sensor, or an audio frequency sensor, and the like;

Optionally gathers a PVC 202 code from a User via a keypad, touch screen, or audio microphone;

Secure communications between UIA 16 and its conjoined Transaction Terminal 2, in an illustrative embodiment, using encryption;

Secure storage of secret encryption keys;

Store and retrieve a unique Account Issuer UIA-VC 204;

Secure enclosure & components from unauthorized tampering;

Display information, allow parties to approve or cancel a financial transaction;

Store, verify, and retrieve an Account Issuer's digital verification code;

Allow parties to select, via a conjoined Transaction Terminal, from among choices of Account Issuer and a plurality of a User's Proprietary Financial Accounts.

In an illustrative embodiment, the UUC 200 input is gathered using a UUC 200 sensor or scanner, located within the UIA 16. UUC 200 sensor is a dedicated short range contactless communications sensor, however it is understood that other types of UUC 200 sensors for wireless tokens can be used, such as infrared and the like.

For the optional gathering a PVC 202, the UIA 16 optionally has PVC 202 input means comprising a keypad 70, touch screen or an audio microphone also located securely inside the UIA 16.

Figure 3:
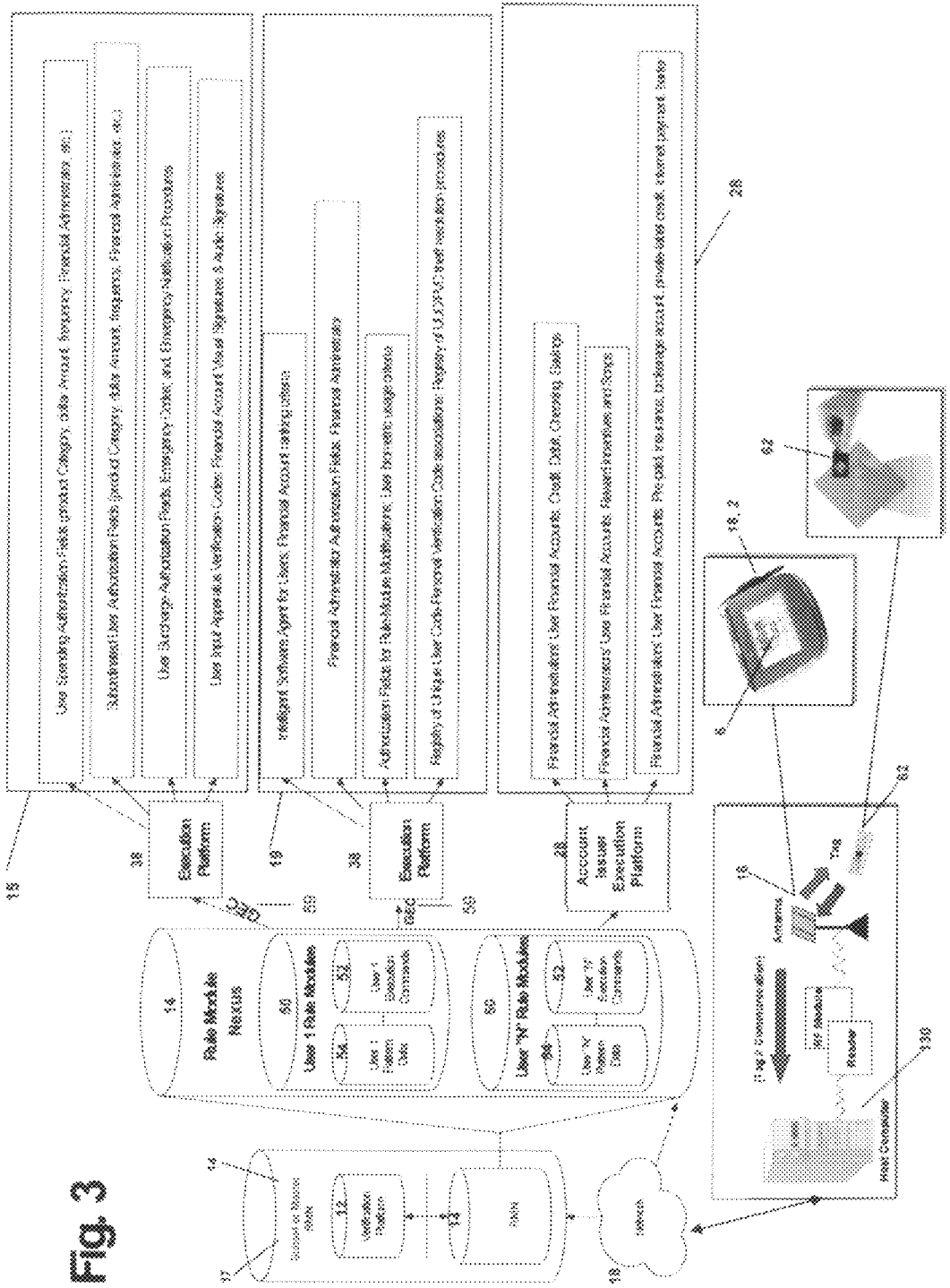
FIG. 3 shows an embodiment of the invention depicting various configurations with an User Account Registry 15, internal Execution Platforms and external Execution Platforms, and Third-Party Platforms.
Figure 3A:
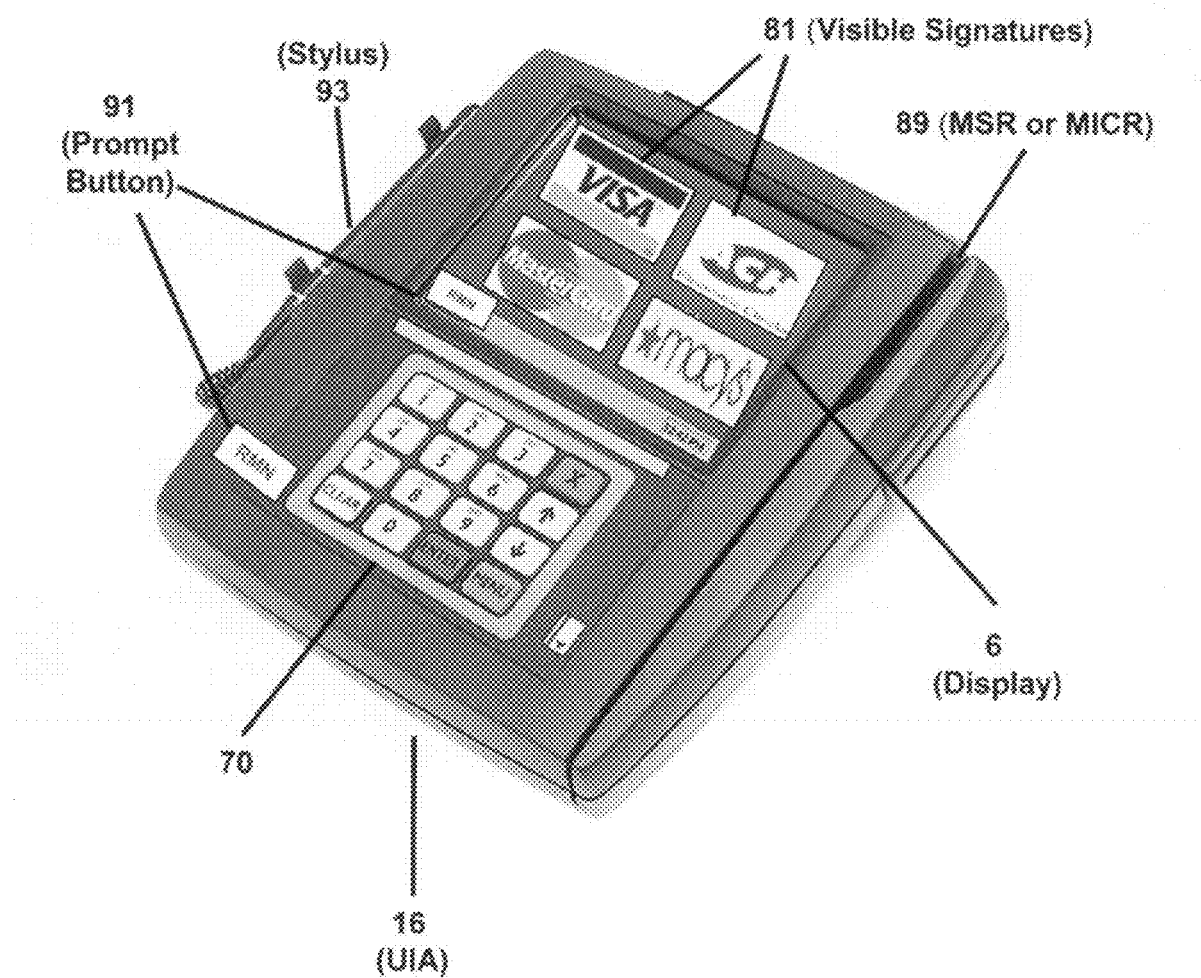
FIG. 3A shows a schematic illustration of an illustrative User Interface Apparatus in accordance with the present invention.

FIG. 3A illustrates an illustrative embodiment of a UIA 16 in accordance with the present invention, with illustrative components for use in gathering a User's bid verification data for a financial transaction via the RMN 14. In general, the operation of UIA 16 may begin when NAT 62 may be presented for payment, and may be interrogated by UUC-scanner within the UIA 16. NAT 62 and UIA 16 may then engage in mutual authentication after which the NAT 62 may provide the UUC 200 and/or RMN-RC 61 to the UIA 16, which may further provide the information to the Transaction Terminal 2 conjoined with the UIA 16.

FIG. 3A also illustrates an embodiment, wherein the operation of UIA 16 may begin when a User registers a Financial Account 65 with the RMN 14, which may include the User swiping a magnetic stripe card (e.g., credit, debit, rewards, stored value, or private label) through a magnetic stripe reader (MSR) 89 or running a paper bank check through a magnetic ink character reader (MICR) 89. The User may register a Primary PVC 200 (not shown) via a keypad 70 or a touch screen Display 6, optionally using a stylus 93 tethered to the UIA 16.

FIG. 3A also illustrates an illustrative embodiment of the invention, wherein a Prompt 91, in an illustrative embodiment, via a visible screen display, a keypad indicator, or audio signal, is provided to the User via a UIA 16 or a Transaction Terminal 2. Said Prompt 91 enables the User, a retailer's live attendant, the Rule-Module Nexus, or an Account Issuer to signal intent to process or route a financial transaction via the Rule-Module Nexus 14. In an illustrative embodiment, employing the Prompt 91 signals intent to process the financial transaction via the RMN 14 invokes a RMN-Routing Code (or RMN-RC) 61 optionally stored with the UIA 16, the Transaction Terminal 2, or on a remote computer, and; an additional Prompt 91 for the User to input their Primary personal verification code (Primary PVC or 1° PVC) 200. In an illustrative embodiment, the RMN-RC 61 contains electronic instructions to a network to process the financial transaction in a manner that routes at least one element or step of the processing to or through the RMN 14.

FIG. 3B illustrates an embodiment of the invention, wherein upon associating processing preferences with Financial Account(s) 65, an illustrative embodiment of Rankings 96 is visibly indicated with each associated to their respective Financial Accounts 65.

Figure 3C:
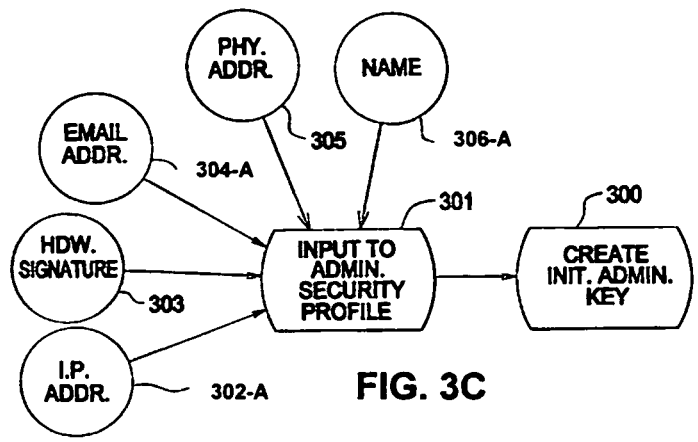
FIG. 3C is a diagram of an Account Issuer or Rule-Module Nexus administrator access key creation process

FIG. 3C is a diagram of an administrator (wherein administrator comprises: Account Issuer; User; Rule-Module Nexus 14) access key creation process. By way of example and not of limitation, administration security profile input 301 may comprise various data including name 306-A, physical address 305, email address 304-A, client hardware identification signature 303, and internet protocol ("IP") address 302-A. All data may be entered via system graphical user interface ("GUI"). After data is entered 301, internal software creates administrator access key 300.

Figure 3D:
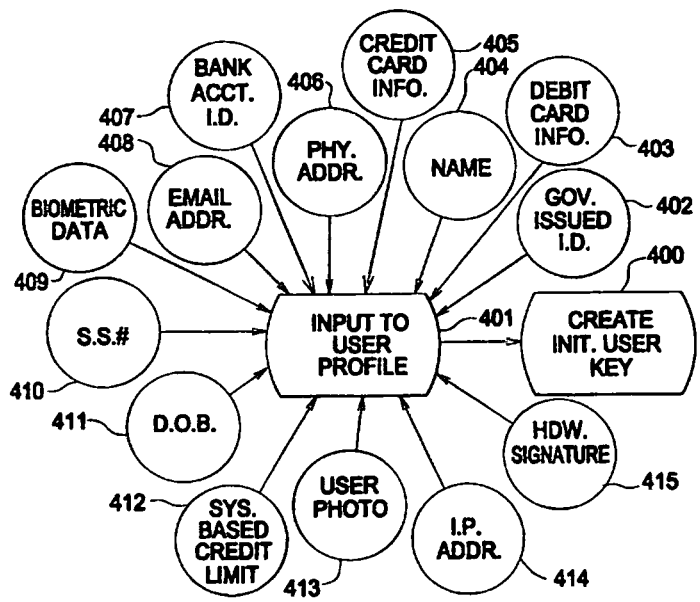
FIG. 3D is a diagram of a User key creation process.

FIG. 3D is a diagram of a User key creation process. Data may be entered 401 into a GUI interface. By way of example and not of limitation, data entry points may comprise data such as name 404, physical mailing address 406, email address 408, social security number 410, date of birth 411, IP address 414, hardware identification signature 415, user photo 413, and/or government issued I.D. 402 which could be swiped as a means of input. FIG. 3D also shows optional information that may be entered such as debit card information 403, credit card information 405, bank account information 407, biometric data 409, and/or system based credit limit 412. For example, biometric data may comprise information such as fingerprints, retina scans, voice recognition, and/or facial recognition. After data is entered 401 into the user profile, initial user key is created 400. The data entry depicted in FIG. 3D may also be used to create subsequent user access keys for enrollment agents, financial agents, merchants and users. In some instances, not all of the inputs are used, whereas in some instances, additional inputs may be desired.

Upon having registered a Financial Account 65, the User may: provide a Primary PVC 200 via a keypad 70 on the UIA 16, and Signal Intent to use (or to process the financial transaction via) the RMN 14 via pressing a preset a Prompt Button 91, or alternatively, tapping a touch screen visible Prompt 91. Signaling Intent to use the RMN 14 may invoke a RMN-RC 61 (not shown) wherein the UIA 16 may encrypt the Primary PVC 200—RMN-Code 61 packet, which may be transmitted to the Transaction Terminal 2 (not shown) conjoined with the UIA 16. In one embodiment, upon the VP 12 (not shown) having made a positive determination that the User is authorized to access the RMN 14, the User may be presented via a touch screen Display 6 with Visible Signatures 81 for a plurality of Financial Accounts 65, from which the User may select a Financial Account 65 for processing the financial transaction.

Although the present invention may be described with respect to a NAT 62, the invention may use a NAT 62 conjoined with a key ring, tag, fob, card, cell phone, hat, shirt, audio entertainment device, wristwatch, clothes (e.g., jackets, raincoats, shoes), or any such form capable of being presented for interrogation.

The UIA 16 may be configured to communicate using a RFID internal antenna 106. Alternatively, UIA 16 may include an external antenna 108 for communications with NAT 62, where the external antenna may be made remote to the UIA 16 using a suitable cable and/or data link 120. UIA 16—Transaction Terminal 2 (conjoined) may be in communication with the RMN 14 via a Network 18. The UIA 16 may be conjoined or wholly integrated with a Transaction Terminal 2, including a point-of-interaction device such as, for example, a merchant point-of-sale (POS) electronic cash register or a computer interface (e.g., User interface). In one illustrative embodiment the UIA 16 is conjoined with the Transaction Terminal 2 via a USB connector. As described more fully below, the UIA 16 may optionally include the keypad 70 or touch screen for data-entry of a bid PVC 202 by the User.

In one embodiment, the UIA 16 may have a serial (RS232) and USB1.1 interface, wherein the device application programming interface (API) allows the RF field to be turned on/off and provide status and version information. The RFD command-set includes block read, block write and NAT 62 inventory (enumerate UUCs 200 of all NATs 62 in range) commands. The UIA 16 can issue addressed commands (affect only one NAT 62) and non-addressed commands (obeyed by all NATs 62 in range). C++ class libraries in the UIA 16 may also support digital signatures, based on strong encryption, to detect tampering with (and corruption of) data on the UIA 16.

Although the UIA 16 may be described herein with respect to being conjoined with a merchant point-of-sale (POS) Transaction Terminal 2, the invention may not be so limited. Indeed, a Transaction Terminal 2 may be used herein by way of example, and the point-of-interaction device may be any device capable of being conjoined with a UIA 16. The UIA 16 conjoined with the Transaction Terminal 2 may also be provided with additional or ancillary transaction data to append to the encrypted packet for transmittal to the RMN 14. Said ancillary transaction data may include the cost of goods, type of goods, UIA-VC 204, and the like. In addition, UIA 16 conjoined with the Transaction Terminal 2 may be in communication with a RSP 130, an Account Issuer host or proprietary Network 18, and/or any other access point for processing any Transaction Request 251. In this arrangement, information may be provided via the UIA 16—Transaction Terminal 2 to the RMN 14 using Network 18.

In one embodiment, the UIA-VC 204 is appended to additional data for verifying the authenticity of the UIA 16, such as its merchant location, merchant identity, UPC 67, payee verification code, and the like. Said data may be transmitted to the VP 12, whereby the bid verification data of the UIA 16 is compared with the registered verification data for the UIA 16. For example, if the bid UIA-VC 204 is appended to a merchant location or UPC 67 which is not registered to that UIA 16, the RMN 14 may invoke a Rule-Module 50 comprising an alert message for presentation via the UIA 16 Display 7 to alert the User or other parties that a potentially fraudulent transaction may be underway. Further, the RMN 14 may decline to process the Financial Transaction Request Packet 251, and not respond with an Audible or Visible Account Signature 81.

FIG. 3A also illustrates a block diagram of an illustrative embodiment of a UIA 16 in accordance with the present invention. UIA 16 includes, for example, an antenna 106, 108 coupled to a RF module 302, which may be further coupled to a control module 304. In addition, UIA 16 may include an antenna 108 positioned remotely from the UIA 16 and coupled to UIA 16 via a suitable cable 120, or other wire or wireless connection.

RF module 302 and antenna 106, 108 may be suitably configured to facilitate communication with NAT 62. Where NAT 62 may be formatted to receive a signal at a particular RF frequency, RF module 302 may be configured to provide an interrogation signal at that same frequency. For example, in one illustrative embodiment, NAT 62 may be configured to respond to an interrogation signal of about 13.56 MHz. In this case, RFID antenna 106, 108 may be 13 MHz and may be configured to transmit an interrogation signal of about 13.56 MHz. That is, NAT 62 may be configured to include a first and second RF module (e.g., transponder) where the first module may operate using a 134 kHz frequency and the second RF module may operate using a 13.56 MHz frequency. The UIA 16 may include two receivers which may operate using the 134 kHz frequency, the 13.56 MHz frequency or both. When the UIA 16 may be operating at 134 kHz frequency, only operation with the 134 kHz module on the NAT 62 may be possible. When the UIA 16 may be operating at the 13.56 MHz frequency, only operation with the 13.56 MHz module on the NAT 62 may be possible. Where the UIA 16 supports both a 134 kHz frequency and a 13.56 MHz RF module, the NAT 62 may receive both signals from the UIA 16. In this case, the NAT 62 may be configured to prioritize selection of the one or the other frequency and reject the remaining frequency. Alternatively, the UIA 16 may receive signals at both frequencies from the NAT 62 upon interrogation. In this case, the UIA 16 may be configured to prioritize selection of one or the other frequency and reject the remaining frequency.

Further, protocol/sequence controller 314 may include an optional feedback function for notifying the User via a Display 6 conjoined with the Transaction Terminal 2 of the status of a particular transaction. For example, the optional feedback may be in the form of a Display 6, such as an audio transmitter of audible signatures, an LED screen, an LCD screen and/or other visual display which may be configured to light up or display a static, scrolling, flashing and/or other message and/or signal to inform the User that the transaction may be initiated (e.g., NAT 62 may be being interrogated), the UUC 200 (or optionally UUC 200—PVC 202) may be valid (e.g., User may be verified for accessing the RMN 14), transaction may be being processed (e.g., UUC 200 may be being read by UIA 16), and/or the transaction may be completed (e.g., transaction approved or disapproved/denied). Such an optional feedback may or may not be accompanied by an audible indicator (or may present the audible indicator singly) for informing the User of the transaction status. The audible feedback may be a simple tone, multiple tones, musical indicator, and/or voice indicator configured to signify when the NAT 62 may be being interrogated, the transaction status, or the like.

RFID antenna 106 may be in communication with a NAT 62 for transmitting an interrogation signal and receiving at least one of an authentication request signal and/or a UUC 200 from NAT 62. RFID communicator 306 may be configured to send and/or receive RF signals in a format compatible with antenna 106, 108 in similar manner as with respect to NAT 62 transponder. For example, where RFID communicator 306 may be 13.56 MHz RF rated antenna 106, 108 may be 13.56 MHz compatible. Similarly, where RFID communicator 306 may be ISO/IEC 14443 rated, antenna 106 may be ISO/IEC 14443 compatible.

RF module 302 may include, for example, RFID communicator 306 in communication with authentication circuitry 308 which may be in communication with a secure internal platform 310. In one embodiment, internal platform 310 may store data corresponding to the NAT 62 being authorized to transact business over the UIA 16. Internal platform 310 may additionally store UIA-VC 204 identifying information for providing to NAT 62 for use in authenticating whether UIA 16 may be authorized to be provided the UUC 200 data stored on NAT 62 to the Transaction Terminal 2.

As may be described more fully below, in one embodiment, NAT 62 and UIA 16 optionally engage in mutual authentication. In this context, "mutual authentication" may mean that operation of the UIA 16 may not take place until NAT 62 authenticates the signal from UIA 16, and UIA 16 authenticates the signal from NAT 62.

Figure 4A:
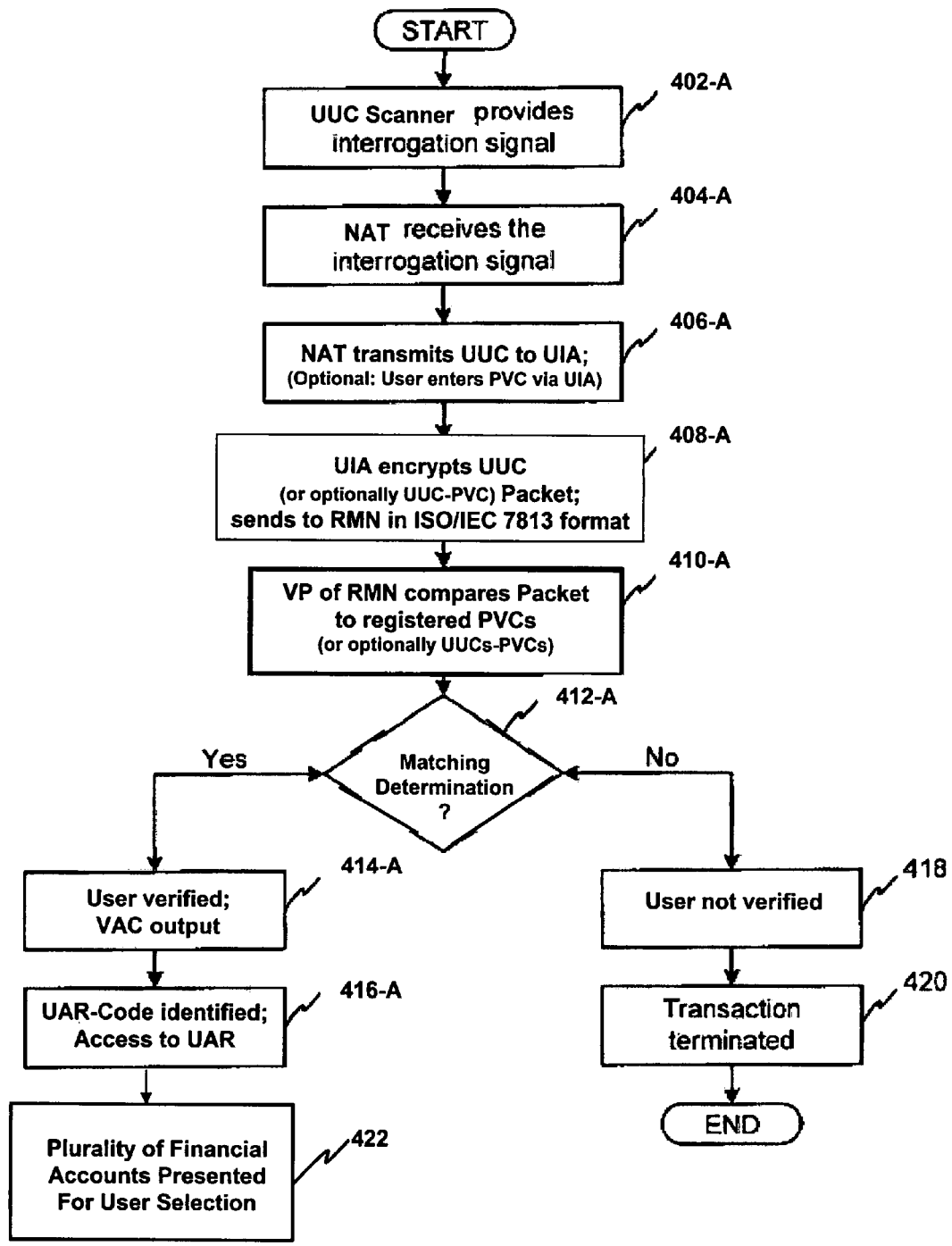
Figures 1, 4A:
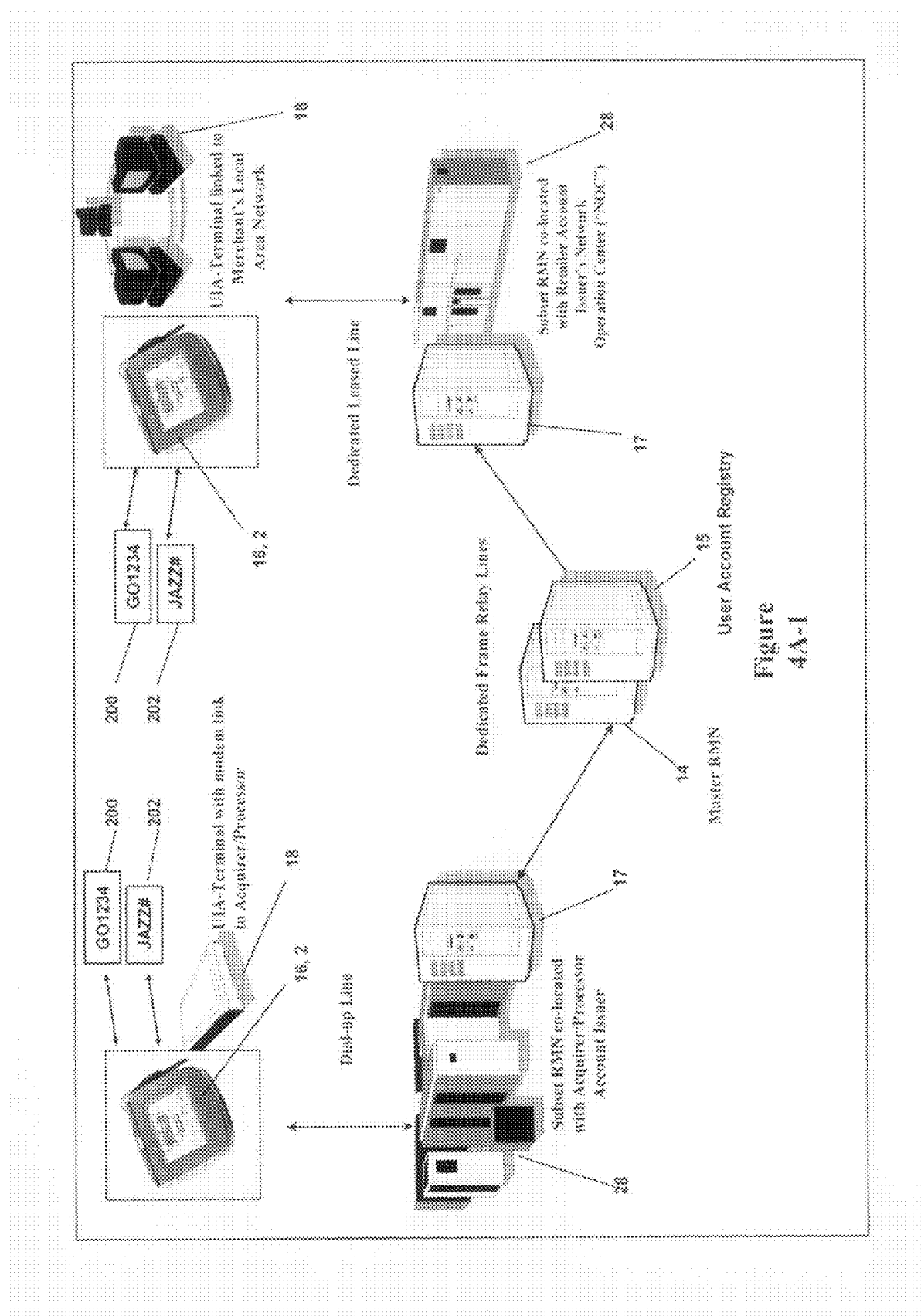

FIG. 4A is a flowchart of an illustrative authentication process in accordance with the present invention. The authentication process of this embodiment may be depicted as one-sided. That is, the flowchart depicts the process of the UIA 16 interrogating the NAT 62, although certain similar steps may be followed in an embodiment wherein the NAT 62 authenticates UIA 16.

As noted, in this embodiment, internal platform 310 may store security keys for encrypting or decrypting signals received from NAT 62. In an illustrative authentication process, the UIA 16 may provide an interrogation signal to NAT 62 (step 402-A). The interrogation signal may include a random code generated by the UIA 16 authentication circuit, which may be provided to the NAT 62 and which may be encrypted using a unique encryption key corresponding to the NAT 62. For example, the protocol/sequence controller 314 may provide a command to activate the authentication circuitry 308. Authentication circuitry 308 may provide from internal platform 310 an interrogation signal including a random number as a part of the authentication code generated for each authentication signal. The authentication code may be an alphanumeric code which may be recognizable (e.g., readable) by the UIA 16 and the NAT 62. The authentication code may be provided to the NAT 62 via the RFID-RF interface 306 and antenna 106 (or alternatively antenna 108).

Figure 25:
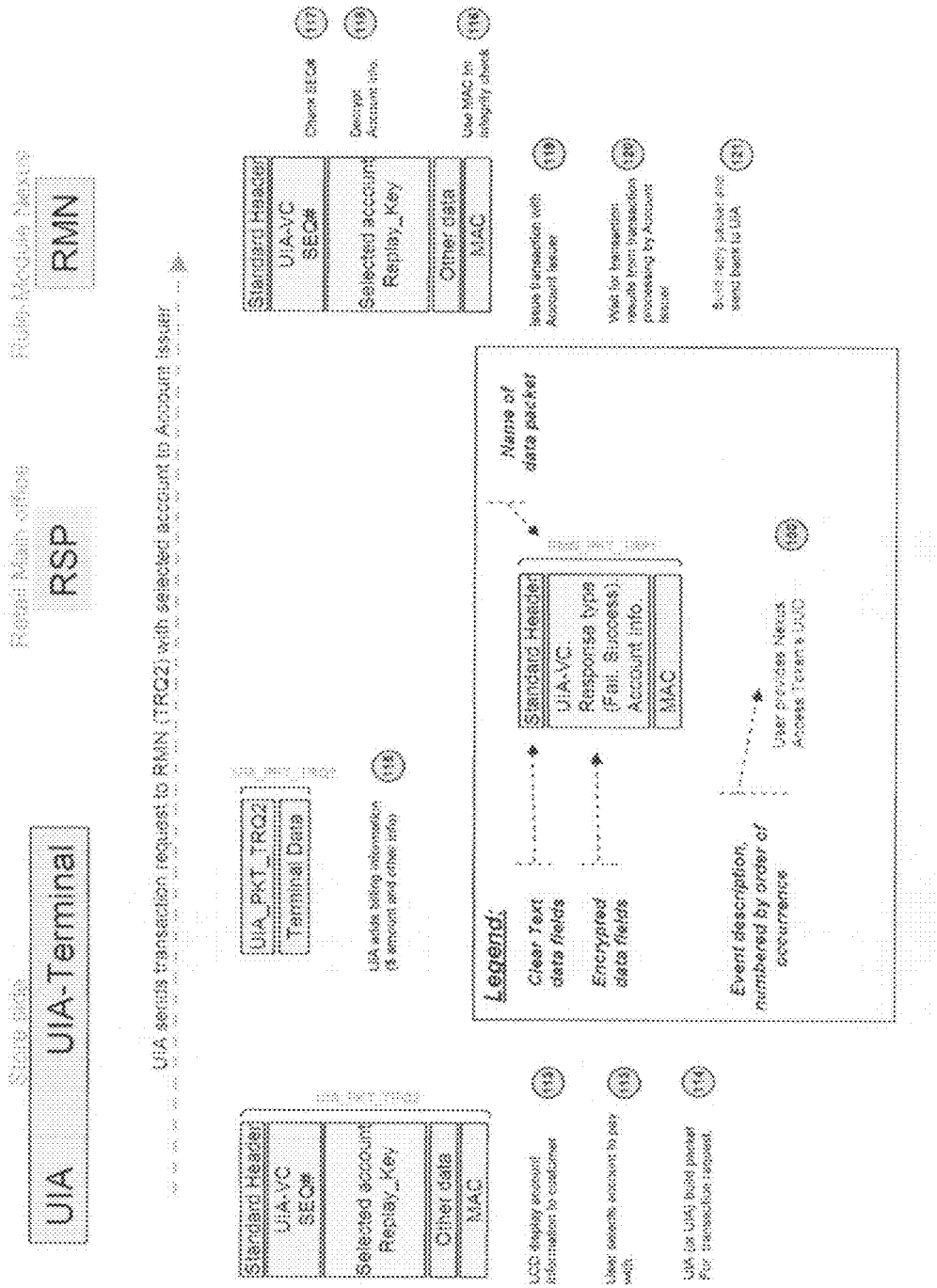
Figure 26:
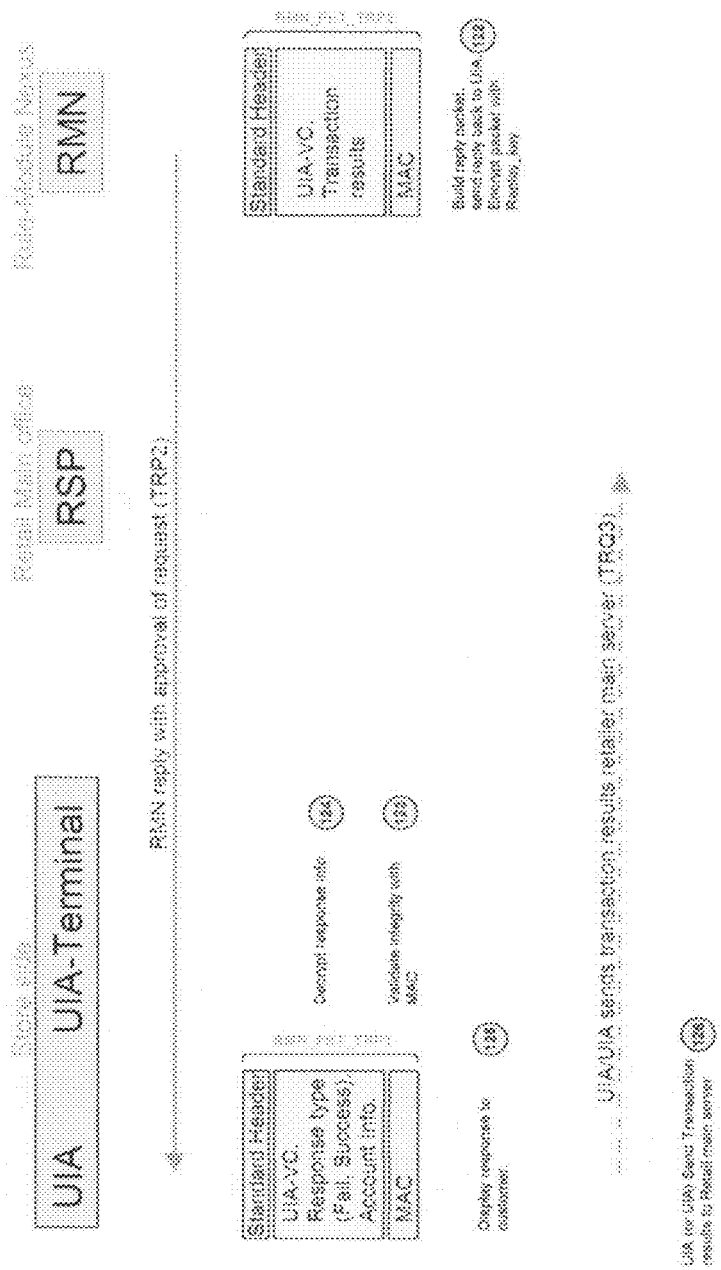
Figure 27:
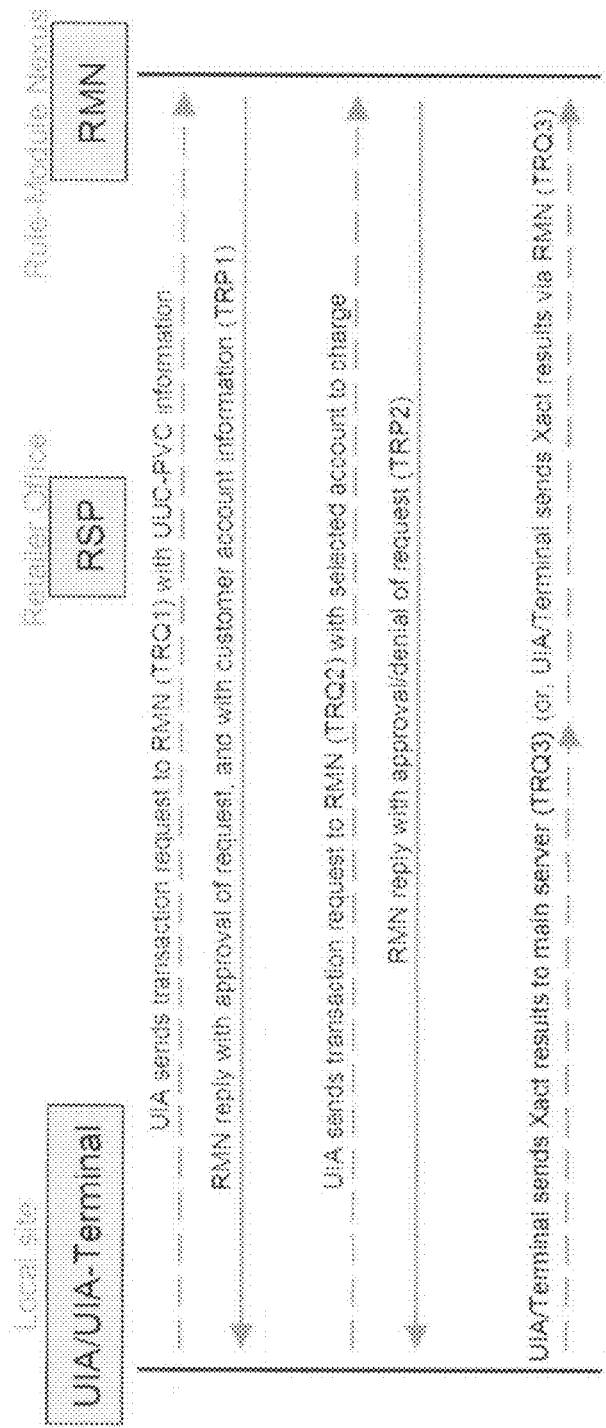

NAT 62 receives the interrogation signal (step 404-A), optionally including the authorization code. Once the NAT 62 is activated, the interrogation signal (step 404-A), optionally including the authorization code, may be provided to a modulator/demodulator circuit within the NAT 62, where the signal may be demodulated prior to providing the signal to protocol/sequence controller 314. Protocol/sequence controller 314 may recognize the interrogation signal as a request for authentication of the NAT 62, and provide the authentication code to authentication circuit 308. The NAT 62 may then encrypt the authentication code. In particular, encryption may be done by authentication circuit 308, which may receive the authentication code and encrypt the code prior to providing the encrypted authentication code to protocol/sequence controller 314. NAT 62 may then provide an encrypted UUC 200 via a response signal to the UIA 16 (step 406). That is, the encrypted UUC 200 may be provided by the NAT 62 to the UIA 16 via modulator/demodulator circuit, RF interface 306 and antenna 106, 108. Optionally, the User also provides a PVC 202 via the UIA 16, optionally by data-entering using a keypad 70 (step 406-A), or by touch screen tapping, or by voice commands. The UIA 16 builds an encrypted packet with the UUC 200 (or optionally UUC 200—PVC 202) and converts the packet into a format compatible with the ISO/IEC 7813 standard for transmitting to the VP 12 associated with, or conjoined within, the RMN 14 via a Network 18 (step 408-A). In one illustrative embodiment illustrated in FIG. 25 and FIG. 27, the UUC 200 (or optionally UUC 200—PVC 202) packet may be forwarded in Track 1/Track 2 format from the UIA 16 conjoined with the Transaction Terminal 2.

Optionally, the PVC 202 may be provided to the UIA 16 conjoined with the Transaction Terminal 2 using a conventional merchant (e.g., POS) key pad 70. For UIA 16 using a biometric sample, the UIA 16 also includes any biometric sensor or scanner known in the art which can electronically read or scan any of the following biometric samples: a fingerprint, an iris, a retina, a voice, a palm, a face.

VP 12 may then receive and decrypt the UUC 200 (or optionally UUC 200—PVC 202) packet for electronically comparing with registered UUCs 200 (or optionally the registered UUCs 200 and PVCs 202) (step 410-A). Once the VP 12 makes the electronic comparison using algorithmic methodologies known in the art, the VP 12 makes either a positive matching determination or a negative matching determination. If the matching determination is deemed to be failed and a negative matching determination is automatically output, wherein the User is not verified (step 418) and User is notified of termination of the financial transaction (step 420), which is deemed to be completed.

Alternatively, if the VP 12 makes a positive matching determination (step 412-A), outputting a VAC 206 (step 414-A), wherein a Rule-Module 50 is invoked, comprising a UAR-Code 59, and a UAR 15 is accessed (step 416-A). Optionally, the VAC comprises a UAR-Code 59. Optionally, the financial transaction is processed via a Registry Financial Account 65 being accessed; Alternatively, the financial transaction is processed via a plurality of Financial Accounts 65 of the User being accessed, wherein the Visible or Audible Signature(s) 81 are retrieved the RMN 14 and transmitted to the UIA 16—Transaction Terminal 2 for presentation to, and selection by, the User (step 422).

Encryption/decryption component 318 may be further in communication with a secure platform 320 which stores the security keys necessary for decrypting the encrypted UUC 200 scanned from the NAT 62. Upon appropriate request from protocol/sequence controller 314, encryption/decryption component (e.g., circuitry 318) may retrieve the appropriate security key, decrypt the UUC 200 and forward to protocol sequence controller 314 in any format readable to the Transaction Terminal 2. Optionally, in one illustrative embodiment, the UUC 200 may be combined with the RMN-RC 61 and PVC 202 received from the keypad 70, wherein the packet is encrypted and converted into a format compatible with the ISO/IEC 7813 standard for transmitting the RMN 14 via Network 18. Further, wherein the UIA 16—Transaction Terminal 2 receives a response from the RMN 14 or an Account Issuer platform 28 via Network 18 (e.g., transaction authorized or denied), the protocol/sequence controller 314 may provide the response for visibly and/or audibly communicating the response to User via Display 6.

UIA 16 may additionally include a USB interface 316, in communication with the protocol/sequence controller 314 and the Transaction Terminal 2. In one embodiment, the USB interface may be a RS22 serial data interface. Alternatively, the UIA 16 may include a serial interface such as, for example, a RS232 interface in communication with the protocol/sequence controller 314 and the Transaction Terminal 2. The USB connector 316 may be in communication with a personalization system (not shown) for initializing UIA 16 to certain application parameters. That is, the UIA 16 may be in communication with personalization system for populating internal platform 310 with a listing of security keys belonging to authorized NATs 62, and for populating internal platform 320 with the security keys to decrypt UUCs 200 scanned from NATs 62, enabling conversion of the UUC 200 into ISO/IEC 7813 format. In this way, UIA 16 may also be populated with a unique identifier (e.g., UIA-VC 204) which may be used by NAT 62 to determine if UIA 16 may be authorized to receive a NAT 62 encrypted UUC 200.

The NAT 62 and the UIA 16 may then engage in mutual authentication. Where the mutual authentication may be unsuccessful, an error message may be provided to the User via Display 6 of the Transaction Terminal 2, and the transaction may be aborted. Where the mutual authentication may be successful, the UIA 16 may optionally prompt the User via the Display 6 of the Transaction Terminal 2, to provide the UIA 16 with a bid PVC 202 via the data-entry keypad 70 or touch screen.

In an illustrative embodiment, the UIA 16 also has secure memory that can store and retrieve the unique secret encryption keys used to enable secure communications with the RMN 14 via the Transaction Terminal 2. In this embodiment, this is battery backed-up RAM that is set up to be erased whenever the tamper-detect circuitry reports that tampering has been detected.

To use encryption keys, a key management system must be employed to assure that both sender and receiver are using the same key. When using DES, an illustrative key management system is DUKPT, which is well known in the industry. DUKPT is designed to provide a different DES key for each transaction, without leaving behind the trace of the initial secret key. The implications of this are that even successful capture and dissection of a UIA 16 will not reveal messages that have previously been sent, a very important goal when the effective lifetime of the information transmitted is years. DUKPT is fully specified in ANSI X9.24. The DUKPT key table is stored in the secure memory.

Each UIA 16, in an illustrative embodiment, has a hardware verification code (UIA-VC) 204, unique to each UIA 16, and this UIA-VC 204 that is registered with the RMN 14 at the time of manufacture or distribution to an authorized Account Issuer. This makes the UIA 16 uniquely identifiable to the RMN 14 in all financial transactions from that device. This UIA-VC 204 is, in an illustrative embodiment, stored in write-once memory.

UIA 16 physical security is assured by standard mechanisms known in the art. In an illustrative embodiment, these comprise tamper-detect circuitry, an enclosure that cannot be easily opened without visibly injuring the enclosure, erasable memory for critical secrets such as encryption keys, write-once memory for hardware verification, tight integration of all components, and "potting" of exposed circuitry.

Information such as the amount of a transaction, the verification of a User, or other transaction-related information is displayed via the conjoined Transaction Terminal 2 using Display 6 with an integrated LCD screen. It is preferable that the Display 6 be connected securely to the other components in the UIA 16 to maintain security.

Approval or cancellation of a financial transaction is done using the UIA keypad 70 or touch screen.

Optionally, the UIA 16 also validates public key digital certificates. In one embodiment, public keys of a particular certifying authority are initially stored in the UIA 16 at the time of construction. This provides the mechanism to verify an Account Issuer's digital certificates that are signed by the certifying authority, or an Account Issuer's digital certificates that are signed by the certifying authority.

Although an illustrative embodiment is described above, there are many different variations on specific UIA 16 implementations. Fundamentally any device that is secure, can verify a User, an Account Issuer or an Account Issuer with a high degree of certainty, and can connect to the Master RMN 14 via some form of communication line can serve as a UIA 16.

In some embodiments, specifically the home use and public use instances, the UIA-VC 204 is not used to verify either the UIA 16 or the Account Issuer.

In one embodiment, the UIA 16—Terminal 2 has an updateable algorithm that selects certain alphanumeric data elements from the data stored on the NAT 62, including the UUC 200. The algorithm may also be synchronized with the RMN 14 (including the VP 12), whereby a User has an additional unique identifier (Adjusted UUC 399) which is an algorithmic function their UUC 200, which may be single-use, multiple-use, or time-dependant based upon the algorithm's criteria, which is synchronized with the RMN 14 (including the VP 12).

For example, a NAT 62 comprising data:
UUC #: 1(2)34(5)6(7)8(9)
J(o)e (V)(e)(r)(n)e(y)
6(9)3 P(a)dding Roa(d)
S(an) Jos(e) Californ(i)(a) (954)32

Adjusted UUC 200 (optionally comprising additional data) transmitted to RMN 14=(2579oVerny9adaneia954)

In one embodiment, the RMN 14 only stores the Adjusted UUC 399 as used by the VP 12 for verification of the User. If the UIA 16—Terminal 2 is tampered with, or if there is the algorithm responsible for the Adjusted UUC 399 is infiltrated, the UIA 16—Terminal 2 transmits an alert to the RMN 14, which may then download an updated algorithm to the UIA 16—Terminal 2. As such, the Adjusted UUC 399 data stored at the RMN 14 may not be reverse-assembled into the original data resident on the NAT 62, or used by an unauthorized third-party.

In one embodiment, such as where the NAT 62 comprises a magnetic strip and interfaces with existing, in-market magnetic strip UIA 16—Terminal 2 units, the RMN 14 downloads algorithm updates via large numbers of distributed UIA 16—Terminal 2 units, and enterprise servers (such as Systems' BankLink, POSway, and NT Connect RMNs 14). As such, the NAT 62 data, including the UUC 200, is received and transmitted by the UIA 16—Terminal 2 in a format compatible with existing payment Network 18 protocols.

The message protocol uses the QTP (Quick Transaction Protocol) over UDP/IP to provide the basic transport mechanism required as QTP combines minimum latency over Internet Protocol ("IP") Networks 18 with light weight connections and a status mechanism designed for networks with large numbers of attached devices.

The RMNs 14 allow IP and non-IP UIAs 16—Terminals 2 such as automatic teller machines (ATMs) and Point of Sale (POS) UIAs 16—Terminals 2 to connect to processors and networks. In a typical non-TA installation, remote ATMs and POS UIAs 16—Terminals 2 are connected directly to the central RMNs 14 through leased line legacy networks. The RMNs 14 then connect to the bank host as well as performing any protocol conversions, message concentration, and message translation. Alternatively, UIAs 16—Terminals 2 communicate with a remote RMN 14 over a leased line, dial, or wireless IP Network 18, thus eliminating the need for the legacy non-IP Network 18.

The UIA 16—Terminal 2 and RMNs 14 communicate with each other via QTP over UDP/IP. This stack may be over any network interface (e.g. router based LAN, dial, wireless, etc.).

The QTP link connecting a UIA 16—Terminal 2 and a RMN 14 consists of two primary types of QTP channels. The first QTP channel established is a supervisory QTP channel over which all management and control information between the UIA 16—Terminal 2 and the RMN 14 flows. Other QTP channels are established for transaction data flow (i.e. data QTP channels) and for the download of new configurations and UIA 16—Terminal 2 software (i.e. the download QTP channel).

The supervisory QTP channel should exist for there to be any data communication between a UIA 16—Terminal 2 and the RMN 14. Messages over the supervisory channel may be of the following basic types:

Information required to properly identify the UIA 16—Terminal 2 to lower level RMN 14 modules (e.g. serial number, UIA 16—Terminal 2 device number, etc.) and to allow access to low level modules where required (e.g. ping).

Module specific statistical, status, and alarm information.

Management control information (e.g. for re-initialisation of the UIA 16—Terminal 2, etc).

Data QTP channels are used for the transfer of transaction data. Each data QTP channel represents a single virtual circuit as seen by the UIA 16—Terminal 2 (e.g. a poll code or station address in the case of multi-drop operation, a line in the case of a single channel point-to-point protocol, a virtual circuit in the case of X.25, etc.).

The download QTP channel is used for transferring new software downloads or configurations to the UIA 16—Terminal 2. It exists only when a download is in progress. A maximum of one download channel and one download can be active at any time.

Downloads are done using the TFTP protocol as per RFC 1350 over the download QTP channel.

Note that downloads may be treated like any other transaction data communications between the UIA 16—Terminal 2 and the RMN 14. New software may be downloaded to a UIA 16—Terminal 2 from a RMN 14, whereby downloaded file consists of a compressed software image for writing directly into the UIA 16—Terminal 2's flash memory. Each download consists of a complete software image, since it is not preferable to do partial updates of the software running on the UIA 16—Terminal 2.

A supervisory QTP channel, optionally comprised within the RMN 14, is used for control of the UIA 16—Terminal 2 and for transfer of informational, statistical, status, and alert information to the RMN 14. The RMN 14 may requests the UIA-VC 204, enabling the RMN 14 to verify the authenticity of the UIA 16-Terminal 2. As such, software updates and downloads from the RMN 14 will not be sent to unauthorized, or trojan-horse, UIAs 16—Terminals 2.

Registration

Parties that wish to either originate or receive financial transactions should, in an illustrative embodiment, first register with the Rule-Module Nexus 14, and its associated Verification Platform 12 and User Account Registry 15. The verification and financial information registered with the RMN 14 or RMN-authorized Third-Party Platform 28 for a given party depends on the mode used to originate or receive settlement. A User, usually an individual person, should, in an illustrative embodiment, register at least one UUC 200 (and optionally a PVC 202), as well as a Rule-Module 50 with Pattern Data 54 such as a plurality of proprietary Financial Accounts 65, associated with at least one Execution Command 52 that can govern the accessing, deposit, display, deducting, and disbursing of Financial Data using at least one Financial Account 65. The Financial Accounts 65 of a User are arranged within a User Account Registry (UAR) 15, said UAR 15 identified by a User Account Registry Code (UAR-Code) 59. In an illustrative embodiment, the UAR-Code 59 does not: identify a specific Financial Account 65 or specific Financial Account Number 65 of the User, nor; depend on a specific Financial Account 65 of the User being tagged as the "primary" account.

For the User, registering verification data and Financial Accounts 65 can occur at home using a personal computer and/or at a merchant's point-of-sale location via a UIA 62-Transaction Terminal 2 using a Network 18 connection to the RMN 14, wherein Financial Account 65 data from magnetic stripe cards, bar-coded cards, paper checks, coupons, smart cards, and the like, are data-entered or electronically scanned. Registration may occur at a merchant's point-ofsale, over the Internet, or through a registration Transaction Terminal 2. Data-entry of registration verification data and Financial Account 65, along with associated data, can occur via: a keypad 70; voice commands spoken into an audio receiver or microphone; swiping the magnetic stripe card; scanning a bar-code; reading a paper check with a magnetic ink character reader, and the like. The User's registration processes links any such data to the User's UUC 200 (and optionally PVC 202) verification data, including the User's Rule-Modules 50, within the RMN 14. The User is assigned and issued a NAT 62, stored with the UUC 200 for that User.

Further data which registered to the User may include: a driver's license number, a passport number, a debit account, a credit account, a checking account, a money-market account, a stored-value account comprising pre-paid financial, and the like. Optionally, a stored value account with a participating Account Issuer may be pre-credited with funds, or financial, from the Account Issuer and for the use of which the User has pre-paid a premium to the Account Issuer.

For verification data, the User registers by being assigned a UUC 200 which is stored into a NAT 62 issued to the User. Optionally, the User may also submit, or be assigned, a registration PVC 202. The UIA 16 optionally confirms that the PVC 202 code is accurate, and in a preferable embodiment, scans the User's NAT 62 to determine that it and its stored UUC 200 are non-fraudulent. The UIA 16 then translates and compresses this UUC 200 (or optionally a UUC 200—PVC 202) encrypted packet into a format suitable for rapid electronic transmittal to the RMN 14. In one embodiment, the User selects and enters a PVC 202 into the UIA keypad 70 or touch screen.

In an illustrative embodiment, the User associates a plurality (or at least two) proprietary Financial Accounts 65 with the registration UUC 200 (and optionally a UUC 200—PVC 202) in the RMN 14 or RMN-authorized Third-Party Platform 28, such as an associated Verification Platform 12. In an illustrative embodiment, as described above, this is accomplished by automatically scanning a bar-code or a magnetic stripe through the data reader attached to the UIA 16. In one embodiment, this bar-code or magnetic stripe comprises not only the User's Financial Account 65, but also the verification of the Account Issuer or financial entity with which this account is associated.

FIG. 11C illustrates an embodiment wherein a User auto-populates an online UAR 15 with Financial Accounts 65 via a sample Internet registration sequence. Alternatively, a telephone registration process may be used, wherein instructions and data-entry may be audible or via the telephone keypad. Via a website, the User enters a UUC 200 (or UUC 200—PVC 202), optionally along with other identifying data such as a social security number (Step 510). In addition, the User may engage in a sequence of challenge-response queries with the RMN 14 in order to more certainly ascertain the User's identity. With the User's consent, the RMN 14 pulls and displays a credit report comprising User's operative Financial Accounts 65 (Step 511), whereby the User may indicate which of said Financial Accounts 65 are to be registered with the UAR 15 (Step 510). The UAR 15 thereby automatically registers the selected Financial Accounts 65 via the RMN 14 (Step 510). In this way, data-entry of "live" account data for each Financial Account 65 is avoided. In addition, the auto-population process may invoke Rule-Modules 50 registered via Account Issuers, manufacturers, and retailers which offer to the User certain rewards incentives, new Financial Accounts 65, and other micro-merchandizing upsell offers to the User for their purchase or acceptance via the UAR 15 registration process. These Rule-Modules 50 may be invoked based on factors comprising: a polling of User's credit report and their credit rating eligibility; an auction or arbitrage in which Account Issuers, manufacturers, and retailers bid via the RMN 14 to present their product/service advertisements or promotional offers via a Display 7 being used by the User during the UAR 15 registration process, or via subsequent email messages to the User with embedded invitations or offers. Similarly, a User may consent to "opt-in" to having another party auto-populate the RMN 14 with Rule-Module(s) 50 on their behalf, wherein the party comprises: a merchant or payee, an account issuer, the RMN 14, and the like. Such an "opt-in" may be accompanied by a rewards incentive to the User.

In an illustrative embodiment, an attendant verifies that the User is the legally authorized signer on the Financial Account 65 by comparing personal, official photo identification such as a driver's license, passport, identification card, and like, to the name listed on the credit card, debit card, paper check and the like being used for registering the accounts.

The UIA 16 transmits the registration data to the RMN 14. In an illustrative embodiment, the Master RMN 14 then inserts the UUC 200 (and optionally a UUC 200—PVC 202) packet into the appropriate Verification Platform 12 and generates an User Verification Approval Code 206 that is unique to the User and is subsequently output by the Verification Platform 12 when issuing a positive matching determination from electronically comparing a User's bid UUC 200 (or optionally a UUC 200—PVC 202) with registered UUCs 200 (or optionally with registered UUCs 200—PVCs 202). From this point on, any time the User is verified by the Verification Platform 12 via submitted a UUC 200 (or optionally a UUC 200—PVC 202) packet, the User Verification Approval Code 206 is forwarded to the Master Rule-Module Nexus 14 where it invokes at least one Rule-Module 50 for that User. In the Master Rule-Module Nexus 14 platform, a Rule-Module 50 is created that is identified by the User Verification Approval Code 206. In one embodiment, the Verification Approval Code 206 identifies a User Account Registry 15. In another embodiment, the Verification Approval Code 206 is identical the UAR-Code 65, but does not: identify a specific Financial Account 65 or a specific Financial Account Number 65.

Before a new UUC 200 (or optionally UUC 200—PVC 202) record is enabled to originate or invoke a Rule-Module 50, the individual's submitted UUC 200 are checked against previously registered UUC 200 in the electronic Verification Platform 12 using the same UUC 200 comparison techniques as those used in the individual verification procedure. If a match is found for the newly submitted UUC 200 record, the UUC 200 record's status is set to "prior registration". If the prior registration check was executed as part of a registration request, the Gateway Platform 26 forwards a "registering individual with prior registration" warning to the Prior Fraud Platform 27, indicating that the person has attempted to register with the RMN 14 or RMN-authorized Third-Party Platform 28 more than once.

Figure 31:
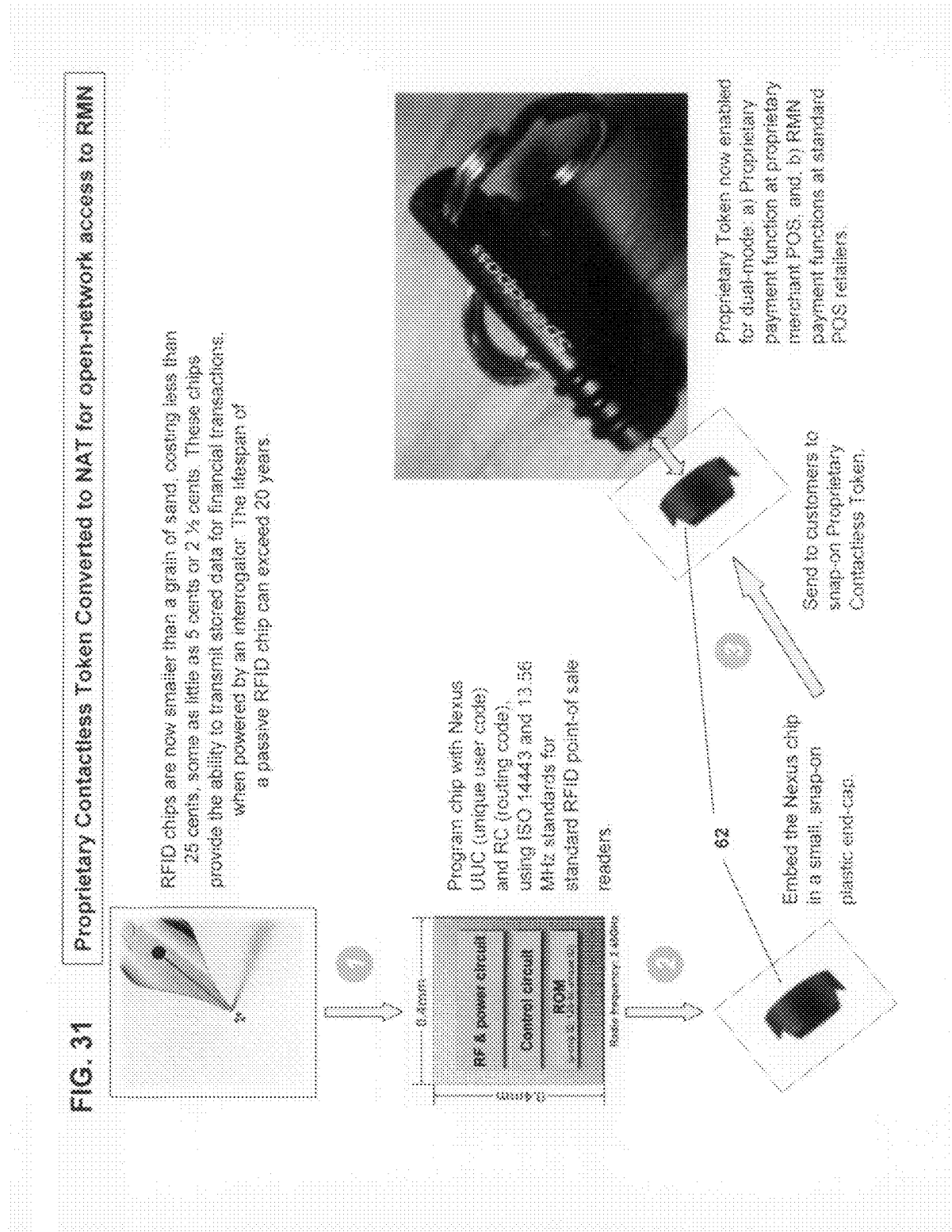
FIG. 31 shows an embodiment of an aftermarket retrofit of the Nexus Access Token onto a legacy token.

FIG. 31 illustrates an illustrative embodiment, the UUC 200 is encoded into a NAT 62, which is mailed to either the User's home address or mailed to a pre-designated address for the User, such as a Federal Express® office. In another illustrative embodiment, the UUC 200 is encoded into a NAT 62 comprising a radio frequency identification chip, wherein said NAT 62 may be conjoined with a token of the User, said conjoining comprising: being conjoined with a token of the User via an adhesive or snap-on attachment; being permanently conjoined with a token of the User via embedding into the token.

FIG. 15A illustrates another illustrative embodiment wherein the User receives a NAT 62 in real-time upon registration at a retail site. In one such example, the User registers verification data and Financial Accounts 65 with the RMN 14 (or Subset RMN 17) via a UIA 16 at the point-of-sale (POS) Transaction Terminal 2 in a retail check-out aisle. As described above, the User's registration verification data and Financial Accounts may be input or scanned via a UIA 16 keypad 70 or the retailer's magnetic ink character reader at the POS Transaction Terminal 2. Upon said registration data being transmitted to, and accepted for registration by, the RMN 14 (or Subset RMN 17), thereby the RMN 14 (or Subset RMN 17) transmits to either the POS Transaction Terminal 2 or the UIA 16, a NAT-Dispensing Code 129 for the User. Said NAT 62-dispensing code may optionally be only for one-time usage. The User may then use said NAT-Dispensing Code 129 at a NAT-Dispensing Kiosk 128 to which the RMN 14 (or Subset RMN 17) has transmitted the User's UUC 200. In an illustrative embodiment, the NAT-Dispensing Kiosk 128 may be co-located at, or proximally located to, the UIA 16 by which the User has registered Financial Accounts 65 and verification data. When the User inputs the NAT-Dispensing Code 129 into the NAT-Dispensing Kiosk 128, the User may be given the option to select a NAT 62 into which the User's UUC 200 may be data-stored by the NAT-Dispensing Kiosk 128, said NAT 62 comprising: an adhesively attacheable NAT 62 for being conjoined with a token of the User; a temporary NAT 62; a NAT 62 embedded into a token for the User, and; an embeddable NAT 62 which the User may have subsequently embedded into a token of the User.

FIG. 15B illustrates an illustrative embodiment of a registration process, wherein the User registers Pattern Data 54, including a Primary PVC 200 (and optionally a Secondary PVC 202) and a Financial Account 65 with the RMN 14 via a UIA 16 at the point-of-sale (POS) Transaction Terminal 2 in a retail check-out aisle. As described above, the User's registration verification data and Financial Accounts 65 may be input or scanned via a UIA 16 keypad 70 or the retailer's magnetic ink character reader at the POS Transaction Terminal 2. Upon said registration data being transmitted to, and accepted for registration by, the RMN 14, the RMN 14 transmits to either the POS Transaction Terminal 2 or the UIA 16, an approval code verifying that the User has been successfully registered with the RMN 14. The User may then use the Primary PVC 200 at a Self-Serve Kiosk (or Kiosk) 128 to which the RMN 14 has transmitted the User's Primary PVC 200. In an illustrative embodiment, the Self-Serve Kiosk (or Kiosk) 128 may be co-located at, or proximally located to, the UIA 16 by which the User has registered Pattern Data 54. When the User provides a bid Primary PVC 200 (or optionally, a bid Primary PVC 200—Secondary PVC 202) via a keypad 70 conjoined with the Self-Serve Kiosk (or Kiosk) 128, the User may then continue registering Pattern Data 54.

In another illustrative embodiment of the invention, the User may register pattern data with the Rule-Module Nexus 14 (or Subset RMN 17) via the internet or telephone, as described above, whereby the User may select a specific NAT-Dispensing Kiosk 128 in a particular location for receipt of the User's Unique User Code 200, whereby the User may receive a NAT-Dispensing Code 129 from the Rule-Module Nexus 14 (or Subset RMN 17) via email or telephone. The User may then go to said NAT-Dispensing Kiosk 128 for receipt of a NAT 62 into which the User's Unique User Code 200 has been data-stored.

In another illustrative embodiment of the invention, the NAT-Dispensing Kiosk 128 may be used for dispensing a replacement NAT 62 for a User in the event that a User's NAT 62 or a User's UUC 200 has been compromised.

In one embodiment, the Master RMN 14 validates the Account Transaction Data (or Transaction Data) 172 submitted during registration. This involves making certain that the Financial Account 65 being registered is a valid account and that the User is an authorized signer.

In an illustrative embodiment wherein an Account Issuer or Payee Platform 28 receives electronic transfers of Financial Data and/or Account Transaction Data 172, the Account Issuer or Payee, usually a corporate entity, must also register rule-modules with the RMN 14, comprising a pattern data associated with an execution command.

Pattern Data, in an illustrative embodiment, further comprises:verification data unique to that Payee, such as a digital certificate: their Payee UIA-VC 204; processing preferences for a Financial Account 65 of the User; a Master PAR (Payee Account Registry) 46; a Subset PAR 47; a PAR-Code 48; rule-modules invoking preferences, tagging, Rankings 96, and/or default Financial Account(s) of a payee; a payee legal name; a payee financial depository account; a payee Financial Account 65; a payee financial depository account routing code, and; payee geographic positioning data; a private code; a unique payee code (UPC); the payee's legal name; a user interface apparatus hardware verification code; an employer identification number; Financial Account access authorization fields; an payee verification code; a a transaction terminal identification code; an emergency code; a Financial Account 65; an email address; a telephone number; a mailing address; authority of at least one employee of the payee; a digital certificate; a network credential; an Internet protocol address; a digital signature; an encryption key; electronic audible signature, and; an electronic visible signature.

In an illustrative embodiment, execution commands) further comprise invoking at least one of the following: accessing the rule-module nexus; accessing a user account registry; accessing a payee depository Financial Account 65; presenting a Financial Account 65 of the payee; completing a financial transaction; authorizing settlement of the online transaction; presenting pattern data; presenting an execution command; presenting a rule-module; notifying an emergency authority upon rule-module nexus receiving an emergency code of the payee; accessing a third-party database; over-the-air provisionings; updating payee geographic positioning data, and; accessing a payee database.

In an illustrative embodiment, accessing a UAR 15 comprises: displaying a Financial Account 65; querying a Financial Account 65; editing a Rule-Module 50 associated with a Financial Account 65; viewing Financial Data of a Financial Account 65; a user manually selecting a Financial Account 65 for processing a financial transaction; a Rule-Module 50 from a Rule-Module Nexus 14 automatically selecting a Financial Account 65 for processing a financial transaction; Approval of a financial transaction; Settlement of a financial transaction; electronically querying data associated with a financial account; displaying an electronic audible signature of a Financial Account 65; displaying an electronic visible signature of a Financial Account 65; displaying an activity statement or account balance for a Financial Account 65; aggregating invoices and billing statements for a Financial Account 65; electronically querying data contained within a financial account; electronically invoking data associated with a financial account; electronically invoking data contained within a financial account; processing a financial transaction using a Financial Account 65; transferring Financial Data from or to a Registry Financial Account 65 from or to another Registry Financial Account 65; transferring Financial Data from or to a Registry Financial Account 65 from or to a Financial Account 65, comprising a buy-sell; a gift; a scrip; intra-Financial Account 65 transfers between or among Financial Accounts 65 owned by same user, wherein there is no buyer-seller financial transaction or payment processing as may required with a standard purchase.

Further, processing preferences may include: invoking a proprietary network; invoking a discount rate; invoking an interchange fee; invoking a settlement protocol; invoking a surcharge; invoking a processing partner, and; invoking a time period for settlement.

Any Account Issuer may register also additional data that is unique to itself, comprising: an alpha-numeric verification code, an Audible or Visible Signature 81, a digital certificate, or a UIA-VC 204 to verify itself to the RMN 14. Digital certificates are available from certifying authorities, and they provide the assurance that the entity with the certificate is the authentic owner of that verifier. These certificates comprise readable text and other information that describes the entity. This can include an Account Issuer the address, as well as the company name.

This entity verification data is then linked to at least one User Financial Account 65 or an Account Issuer Account.

UIA-VC's 204 are unique numbers assigned to UIA 16 devices at the time of manufacture. A participating Account Issuer installing UIA 16 devices at the point of sale can register a User Interface Apparatus 16 with the RMN 14. In an illustrative embodiment, this causes any transaction, either registration or purchase, flowing through those registered User Interface Apparatus 16 to automatically verify to the RMN 14 the participating Account Issuer which owns the UIA-VC 204.

Network Communications

As used herein, "online" requires communications or communications means (or interconnecting communications means) external to a Nexus Access Token, comprising: contact-based; contactless-based; wired, and; wireless. Contact-based communications comprise: magnetic stripe reading; smart card reading; magnetic ink character reading; radio frequency transmission, and; the like. Contactless-based communications comprise: radio frequency transmission; near-field communication (i.e., Bluetooth); bar-code reading; infrared transmission, and; the like. Wired communications comprise: X.25 network; land-line phone network; cable network; and the like. Wireless communications comprise: local area network ("LAN"); wide area network ("WAN"); cellular network; WiFi network; global positioning network; satellite communications, and; the like.

Communications via a Network 18 between the UIA 16 and a conjoined Transaction Terminal 2, and the Verification Platform 12 associated with the RMN 14 occur via many different communication methods. Most depend on the particular communication networks already deployed by the organization or merchant that deploys the transmission authorization system. Communication security over the Network 18 is provided by encryption using unique secret keys known only to that specific UIA 16 and the RMN 14, and the DES encryption algorithm, in an illustrative embodiment, triple-encrypted. Triple encryption means successive encrypt/decrypt/encrypt operations using two distinct 56-bit DES keys. This provides significantly higher security than a single encryption operation with one 56-bit DES key. Alternately, a public/private key system may also be used to encrypt information that passes between UIA 16 and RMN 14. Both DES and public key encryption is well known in the industry.

In an embodiment the User Interface Apparatus 16 are connected via Ethernet 18 to a Local or Subset router 18, which is itself connected to a network operations center (NOC) via frame relay lines. At least one Verification Platform 12 is located at the NOC. Messages are sent from UIA 16 to the Verification Platform 12 using TCP/IP over this network. In another embodiment, the User Interface Apparatus 16 are connected via a cellular digital packet data (CDPD) modem to a CDPD provider, who provides TCP/IP connectivity from the UIA 16 to an intranet 18 to which at least one Verification Platform 12 is attached.

In yet another embodiment, a UIA 16 is connected via the Internet, as is at least one Verification Platform 12. TCP/IP is used to transmit messages from UIA 16 to Verification Platform 12. There are many different ways to connect UIA 16 to Verification Platform 12, both tethered and wireless, that are well understood in the industry, including but not limited to: the Internet 18; an intranet 18; an extranet 18; a Local or Subset area network ("LAN") 18; and a wide area network ("WAN") 18.

Verification Platform

The electronic Verification Platform (VP) 12 serves to verify the User in an electronic financial transaction. The Verification Platform 12 compares a User's bid UUC 200 scanned from the User's NAT 62 (or optionally from the User's bid UUC 200—PVC 202 provided to the UIA 16) with previously stored registration UUCs 200 (or with previously stored registration UUCs 200—PVCs 202) packets from registered Users, in order to verify the User. If a bid UUC 200 (or optionally a bid UUC 200—PVC 202) packet is successfully matched against a registered UUC 200 (or optionally a registered UUC 200—PVC 202) packet, and the Verification Platform makes User makes a positive matching determination, the User Verification Approval Code 206 which had been assigned to the User during initial registration is output and forwarded to the Master Rule-Module Nexus 14. The User Verification Approval Code transmitted by the Verification Platform 12 is used by the Master Rule-Module Nexus 14 to locate the Rule-Modules 50 that are customized to that User, including the User Account Registry 15

As seen in FIG. 1, a Firewall machine 40 connects the Verification Platform 12 to the Internet 18 or intranet 18. Messages are sent to a Gateway Platform 26, which is responsible for overseeing the steps required to process the financial transaction, including forwarding the financial transaction to the Verification Platform 12 and the Master Rule-Module Nexus 14.

In an illustrative embodiment, electronic messages transmitted between the UIA 16 and the Master RMN 14 are encrypted. For this, the financial transaction processor uses the Decryption Platform (DP) 22, which utilizes the UIA-VC 204 of the UIA 16 to verify the encryption codes that is required to decrypt messages from the UIA 16. Once decrypted, the verification of the User is determined using Verification Platform 12, which provides storage, retrieval and comparison of UUC 200 (or optionally a UUC 200—PVC 202) packet.

In another embodiment, the Verification Platform 12 provides periodic User re-verification queries. In this embodiment, in order for a User to extend an online session, the User is requested by the Verification Platform 12 to re-verify themselves using a User bid UUC 200 (or optionally a User bid UUC 200—PVC 202).

In another embodiment, an Account Issuer is also verified by the Verification Platform 12 using verification data comprising: a digital certificate, an Internet protocol ("IP") address, a UUC 200, a UIA-VC 204, or any other code, text or number that uniquely identifies the entity. In this way, the Verification Platform 12 is enabled to provide the User with confirmation that the correct Account Issuer participated in the electronic financial transaction. Examples include confirming that the correct Account Issuer web site or remote Third-Party Platform 28 was accessed by the User, that the correct entity designee received the User's email or instant message, and the like.

In another embodiment, the Verification Platform 12 platform is integrated with the Master Rule-Module Nexus 14 platform.

In an illustrative embodiment, more than one Verification Platform 12 provides fault tolerance from either natural or man-made disasters. In this embodiment, each Verification Platform 12 uses a backup power generator, redundant hardware, mirrored platforms, and other standard fault tolerant equipment known in the industry.

In one embodiment, the Verification Platform 12 compares bid verification comprising a Nexus Access Token Identifier (NAT-ID) and a UUC 200 of the user, with a registered NAT-ID and its associated UUC 200, to determine if the UUC 200 has been stored on a NAT 62, or is being used with a NAT, with which the UUC 200 is not associated. This may be used to prevent storing an authorized UUC 200 with an unauthorized NAT 62. Alternatively, this may be used to prevent storing an unauthorized UUC 200 on an authorized NAT 62.

Verification of the User occurs using different methods, depending on the verification information that is provided by the UIA 16. The Verification Platform 12 has subsystems for each type of information that is received by the Verification Platform 12, and each subsystem is highly optimized to provide rapid verification as outlined below.

In an illustrative embodiment, Verification Platform 12 comprises subsystems that can verify parties from the following information:

UUC 200 data (or optionally, UUC 200—PVC 202 data);
digital verification (digital certificates);
UIA-VC 204;
Biometric Identification Subsystem (BID).

In an illustrative embodiment, the Verification Platform (VP) 12 further comprises at least two Subset VP's 12, all being are capable of verifying parties from their UUC 200 (or optionally a UUC 200—PVC 202).

In one embodiment, the records of parties identifiable from UUCs 200 (or optionally a UUC 200—PVC 202 combinations) are distributed equally across all Subset VP's 12. In one embodiment, one Subset Verification Platform 13 is responsible for verifying Users with UUCs 200 (and optionally Users with PVCs 202) numbered 1-10, another Subset Verification Platform 13 is responsible for verifying Users with UUCs 200 (or optionally PVCs 202) numbered 11-20, and a third Subset Verification Platform 13 is responsible for verifying Users with UUCs 200 (or optionally PVCs 202) numbered 21-30. For example, all messages from the UIA 16 comprising a UUC 200 (or optionally a PVC 202) numbered 30 would be routed to Verification Platform 12 for verification of the User.

In an illustrative embodiment, wherein a Verification Platform 12 receives a bid UUC 200 (or optionally a UUC 200—PVC 202) packet from the Transaction Terminal 2 conjoined with a UIA 16, for verification, a processor searches through its platform, retrieving all registered UUCs 200 that correspond to that particular bid UUC 200 (or correspond to that particular bid UUC 200—PVC 202). Once all corresponding registered UUCs 200 are retrieved, the Verification Platform 12 compares the bid UUC 200 (or optionally the bid UUC 200—PVC 202) obtained from the electronic financial transaction to all retrieved registered UUCs 200 (or optionally registered UUCs 200—PVCs 202). If a match occurs, the Verification Platform 12 makes a positive matching determination and outputs the User Verification Approval Code 206 to access the User Account Registry 15 and associated Rule-Modules 50 of the User. If no match is found, the Verification Platform transmits a "not identified" message back to Gateway Platform 26 and to the logging facility 42.

In one embodiment, there is a UUC 200 theft resolution step, wherein the User's UUC 200 is changed if the User's UUC 200 is determined to have been compromised or fraudulently duplicated.

Figure 5:
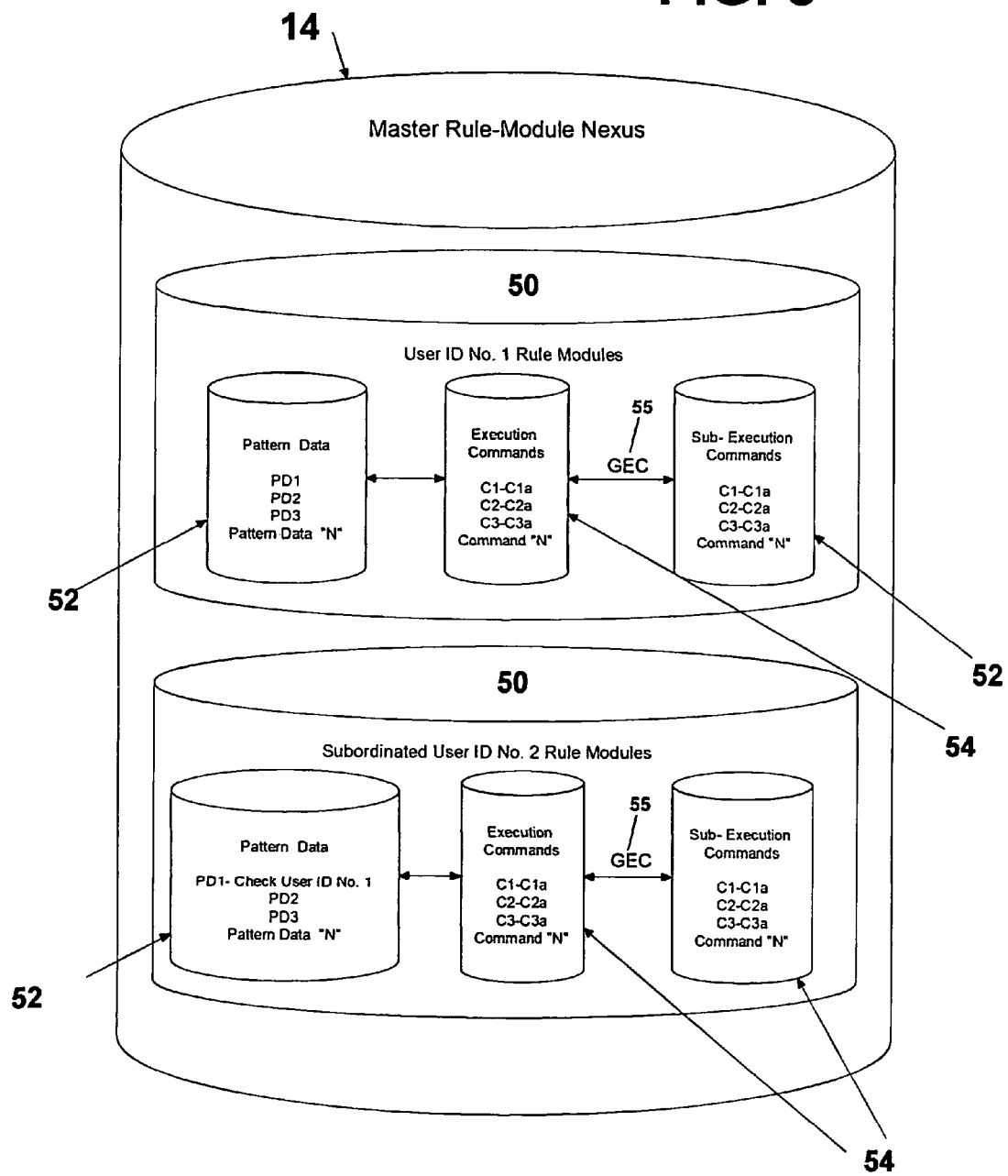
FIG. 5 shows an embodiment of the Rule-Modules for a plurality of Users within the Rule-Module Nexus.
Figure 5A:
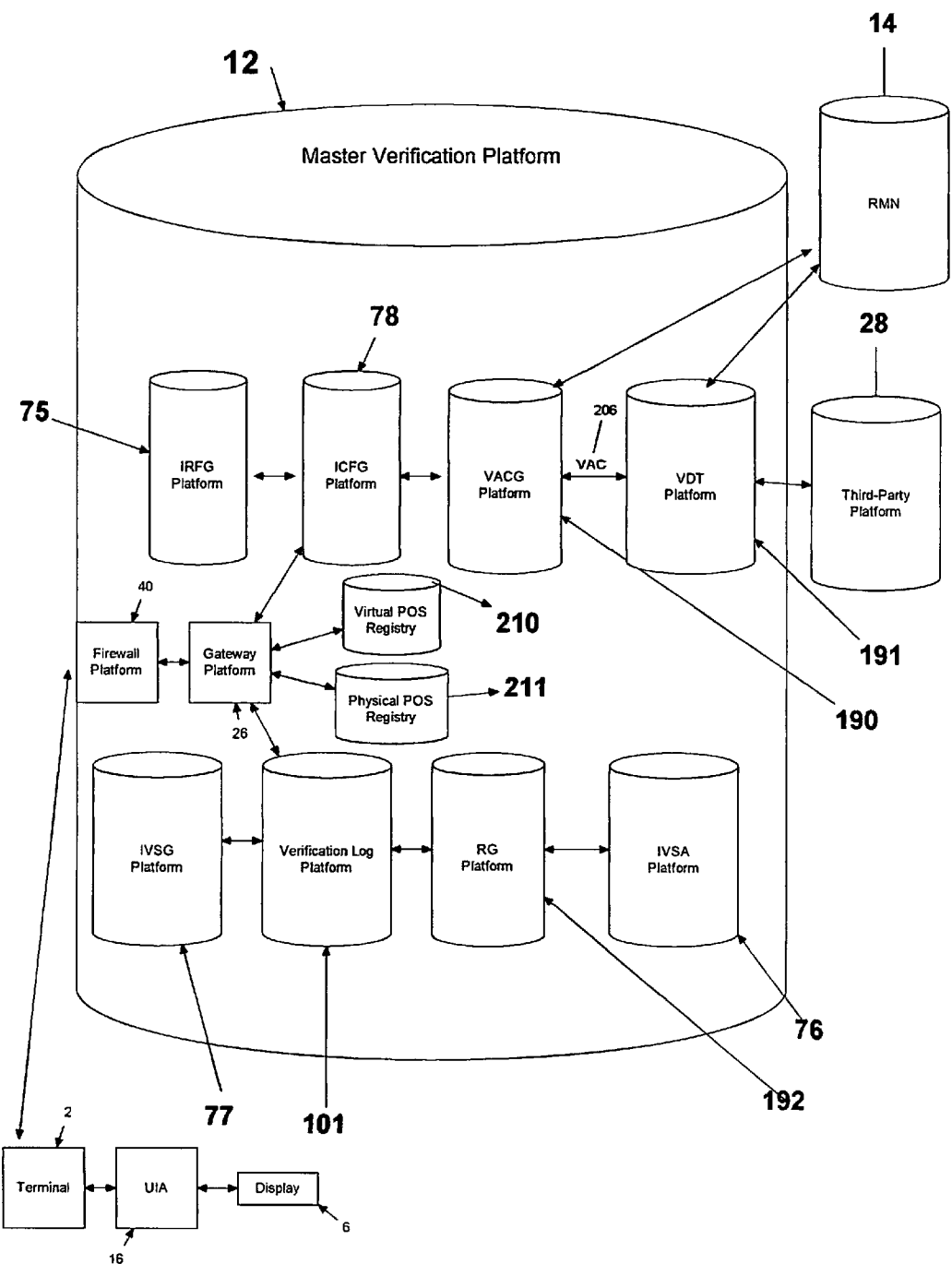
FIG. 5A shows an embodiment of the Verification Platform.

FIG. 5A is illustrative of an embodiment of the VP 12. In this embodiment of the VP 12, the Verification Platform 12 comprises an Identity Risk Factor Generation (IRFG) Platform 75. The IRFG Platform 75 may optionally be configured to generate an identity risk factor associated with the User. The identity risk factor may optionally be associated with a level of risk of theft of the identity of the User by identity thieves. The graphical User interface may optionally be configured to provide access to and management of identity verification Rule-Module(s) 50 associated with the User.

FIG. 5A also illustrates that a verification data may optionally comprises a driver's license of the User. According to an alternative illustrative embodiment of this embodiment, a verification data may optionally comprise a birth certificate of the User. The identity verification score assigned to each of a verification data may optionally be based upon a reliability of a verification data. The predetermined function may optionally comprise, for example, a summing function, a weighted summing function or the like. The VP 12 may optionally comprise a data storage device. Rule-Module 50 data of the User may optionally be stored in the data storage device. The total identity verification score may optionally be associated with Rule-Module 50 data of the User. The VP 12 may optionally comprise a Rule-Module 50 comprising a predetermined VAC 206 for the User. Alternatively, the VP 12 may comprise a Verification Access Code Generation (VACG) Platform 190. The VACG Platform 190 may optionally be configured to generate a unique VAC 206 associated with the User for a single authorization to access a UAR 15. Alternatively, the VACG 190 may optionally be configured to generate a unique VAC 206 associated with the User to authorize a Third-Party Platform 28 to access a RMN 12 or UAR 15 associated with the User. The VP 12 may optionally comprise a verification data transmission (VDT) Platform 191. The VDT Platform 191 may optionally be configured to transmit at least the total identity verification score of the User externally to a Third-Party Platform 28 upon outputting or invoking a VAC 206. The VDT Platform 191 may optionally be configured to transmit at least the total identity verification score of the User to the Third-Party Platform 28 upon further verification of a User VAC 206 of the User. The User VAC 206 may optionally comprise a social security number of the User.

FIG. 5A also illustrates that the VP 12 may optionally comprise a Verification Log Platform 101. The Verification Log Platform 101 may optionally be configured to record access attempts associated with the total identity verification score of the User by the Third-Party Platform 28. The VP 12 may optionally comprise a Report Generation (RG) Platform 192. The RG Platform 192 may optionally be configured to generate reports for displaying the record of access attempts associated with the total identity verification score of the User. Rule-Module 50 data of the User associated with the User may optionally be transmitted to the Third-Party Platform 28 upon outputting or invoking a VAC 206. Rule-Module 50 data of the User associated with the User may optionally be transmitted to the Third-Party Platform 28 upon further verification of a VAC 206 of the User. The User VAC 206 may optionally comprise a social security number of the User.

The VP 12 may optionally comprise: being online, apart from the NAT 62; being stored on a NAT 62. The NAT 62 may optionally be configured to securely contain identity verification Rule-Module(s) 50 associated with the User. The NAT 62 may optionally comprise, for example, a smart card. The identity verification Rule-Module(s) 50 associated with the User may optionally be encrypted on the NAT 62. Uses of the identity verification Rule-Module(s) 50 securely contained on the NAT 62 may optionally be restricted by the User. Locations of where the identity verification Rule-Module(s) 50 is used may optionally be restricted by the User. Times of when the identity verification Rule-Module(s) 50 is used may optionally be restricted by the User. Types of transactions for which the identity verification Rule-Module(s) 50 is used may optionally be restricted by the User. Use of the identity verification Rule-Module(s) 50 for the transaction may optionally be prohibited when the identity verification Rule-Module(s) 50 is restricted by the User for the transaction. The identity verification Rule-Module(s) 50 for the transaction may optionally be used when the identity verification Rule-Module(s) 50 is not prohibited by the User for the transaction.

FIG. 5A also illustrates that the VP 12 may optionally comprise approving access to a UAR 15 via a VAC 206 and a Rule-Module 50 gating or governing access to the UAR 15. The Rule-Module 50 may optionally be configured to control parameters for accessing a UAR 15 order using the total identity verification score of the User. Additional Rule-Module 50 data of the User may optionally be accessed or invoked via the VAC 206, to enable access to the UAR 15.

The VP 12 may communicate with a Display 6 to display communications to the User associated with the VP 12 or the RMN 14.

The VP 12 may optionally comprise the IRFG Platform 75. The IRFG Platform 75 may optionally be configured to generate an identity risk factor associated with the User. The identity risk factor may optionally be associated with a level of risk of theft of the identity of the User by identity thieves. According to illustrative embodiments of this embodiment, the transaction may optionally comprise, for example, an application for credit, a purchase transaction or the like. The VP 12 may optionally comprise a graphical User interface. The graphical User interface may optionally be configured to provide access to and management of identity verification Rule-Module(s) 50 associated with the User.

FIG. 5A also illustrates another embodiment of the VP 12, wherein the Verification Platform 12 is configured to receive at least one verification data of the User. The VP 12 comprises an Identity Verification Score Assignment (IVSA) Platform 76 configured to assign an identity verification score to each of a verification data. The VP 12 comprises a total IVSA Platform 77 in communication with the IVSA Platform 76. The VP 12 comprises an Identity Verification Score Generation (IVSG) Platform 77 configured to generate a total identity verification score of the User from the identity verification scores of each of a verification data and a predetermined function. The total identity verification score of the User is associated with a level of verification of the identity of the User. Alternatively, the total identity verification score of the User is compared to a minimum identity verification score associated with approving access to a UAR 15. The VP 12 comprises an Identity Confidence Factor Generation (ICFG) Platform 78 in communication with the total IVSA Platform 77. The ICVP 78 is configured to generate an identity confidence factor associated with the User in accordance with a validity of the identity of the User. The VP 12 comprises a Verification Platform 12 configured to compare the total identity verification score of the User to a minimum identity verification score associated with approving access to a UAR 15. The VP 12 also comprises approving access to a UAR 15 via making a positive matching determination and outputting, or invoking, a VAC 206, wherein said VAC 206 may comprise a UAR-Code 59. The VP 12 is configured to make a positive matching determination when: the total identity verification score of the User is one of greater than and equal to the minimum identity verification score; the identity confidence factor of the User is greater than a predetermined identity threshold value. Additional verification data of the User may be received before making the matching determination when at least one of the total identity verification score is less than the minimum identity verification score; the identify confidence factor of the User is less than the predetermined identity threshold value. The VP 12 is configured to generate a request for additional verification data of the User before making a positive matching determination when the total identity verification score is less than the minimum identity verification score.

Optionally, the VP 12 may be conjoined, co-located and/or integrated with the RMN 14 and/or the UAR 15, in any combination thereof.

Digital Identification Subsystem

In an illustrative embodiment of the Verification Platform 12, the Digital Identification subsystem comprises a plurality of processors, each of which is capable of verifying an entity, such as an Account Issuer, from their digital certificates. In this embodiment, digital certificates are used to perform digital verification of an entity. In an illustrative embodiment, these include corporate web site addresses and certifying authorities only.

Where possible, computers provide digital certificates for verification of the Account Issuer, including a UIA-VC 204 for two-factor verification.

Verifying that a particular digital certificate is valid requires a public key from the certifying authority that issued that particular digital certificate. This requires that the digital verification subsystem have a list of certifying authorities and the public keys used to validate the digital certificates they issue. This table must be secure, and the keys stored therein must be kept up to date. These processes and others relating to the actual process for validating digital certificates are well understood in the industry.

UIA Hardware Verification (or Identification) Subsystem (UHV or UHI)

In an illustrative embodiment of the Verification Platform 12, UIA-VC's 204 are translated into entity verification by the UHI subsystem. This subsystem maintains a list of all User Interface Apparatus 16 manufactured. In an illustrative embodiment, when a particular User uses a UIA 16, that User's geographic location is identified by their use of that particular UIA 16 during that electronic financial transaction session.

In another embodiment, the UIA-VC 204 does not serve to verify either the User or an entity. This is the case in User Interface Apparatus 16 installed in public venues such as airport Transaction Terminals 2, Automated Teller Machines in banks, or computers with User Interface Apparatus 16 for home use.

User Verification Approval Code

A User Verification Approval Code (VAC) 206 is an electronic message output by the Verification Platform 12 upon a positive matching determination of the User. In illustrative embodiments, the VAC 206 comprises: a static code identifying the user account registry; a dynamic code comprising a unique code, such as a unique digital signature per transaction a for storage and retrieval of data relating to processing of the financial transaction, and; a static code and a dynamic code. The VAC 206 informs the Master Rule-Module Nexus 14 that a User has been successfully identified, and instructs the Master Rule-Module Nexus 14 to invoke the Rule-Modules 50 for that particular User. In an illustrative embodiment, any time the User is verified by the Verification Platform 12 via submitted a UUC 200 (or optionally a UUC 200—PVC 202) packet, the User Verification Approval Code 206 is forwarded to the Master Rule-Module Nexus 14 where it identifies a UAR-Code 65, invoking access to a User Account Registry 15 and invoking at least one Rule-Module 50 for that User. In the Master Rule-Module Nexus 14 platform, a Rule-Module 50 is created that is identified by the User Verification Approval Code 206. In an illustrative embodiment, the Verification Approval Code 206 is identical to the UAR-Code 65, but does not: identify a specific Financial Account 65, identify a specific Financial Account Number 65.

Biometric Identification Subsystem (BID)

In one embodiment of the Verification Platform 12, a User registers with the RMN 14 a biometric template, the BID subsystem comprises at least two BID processors, each of which is capable of verifying Users only from their scanned biometric sample, comprising any of the following biometrics: finger, retina, voice, face, hand, palm, iris.

In one embodiment, each BID processor comprises the entire platform of registered biometrics. To distribute the financial transactions evenly across processors without undue effort, the Verification Platform 12 determines randomly which BID processor will be used for a given electronic financial transaction, and delegates the verification request to that BID processor. That BID processor performs a search of its BID platform in order to find a matching registered biometric sample. In another embodiment, there is a financial User re-registration check step, wherein the User's registration biometric is compared against previously registered biometrics wherein if a match occurs, the Rule-Module Nexus 14 is alerted to the fact that the User has attempted to re-register, and a warning message is sent to the Prior Fraud Platform (PFP) 27.

In another embodiment, other information is present that assists the BID processor in searching the platform. For finger images, this includes information such as the classification of the image (whirl, arch, etc.), and other information about the finger ridge structure that is useful for selecting out biometrics that are not likely to match, or information on biometrics that are likely to match. Such biometric-based sorting and classification systems using mathematical algorithms, are known in the art for fingerprints and for other biometrics such as retina of the eye, voice print, and face vascular patterns.

In an illustrative embodiment, other information is present that assists the BID processor in searching the platform, including a User's primary PVC 202 (on a limited basis) or a User's UUC 200. In one embodiment, the User's biometric may be stored in a basket associated with the User's UUC 200 or primary PVC 202, which may be non-unique. The PVC 202-associated basket may comprise a plurality of registered biometrics of a plurality of distinct Users, all of whom happen to have the same PVC 202. A biometric basket associated with a PVC 202 may comprise a subset of all biometrics registered with the RMN 14, and therefore is more efficient, more cost-effective and more accurate to search. This is known as a "one-to-some" or "one-to-many". Alternatively, a biometric basket may be associated with the User's UUC 200, which is unique to the User, wherein the only biometric(s) in that basket are of the User. This is known as a "one-to-one" search. Thus UUC-associated basket can comprise only one User's registered biometric(s), and conducting a search with the aid of the UUC-associated basket can be the most efficient and accurate. By contrast, conducting a "cold search" of all the biometric records stored in the RMN 14 or RMN-authorized Third-Party Platform 28, without the aid of a PVC-associated basket, can be far more expensive, slower and less accurate. This is known as a "one-to-all" search.

In one embodiment, the User is enabled to provide, on a limited basis, dual PVCs 202 for verification, wherein two PVCs 202 (a PVC 202 and a secondary PVC 202) of the User are provided to the UIA 16 in the event that the User's UUC 200 and/or NAT 62 has been comprised (e.g., lost, stolen, damaged, or copied), said PVCs 202 comprising any combination of the following: an alpha-numeric PVC 202; an alpha-numeric secondary PVC 202; a visible image; and audible sound.

Rule-Module Nexus

Rule-Module Nexus (RMN) 14 serves to verify the Account Issuer and the User in a transaction, retrieve for verified parties a plurality of proprietary Financial Accounts 65, and optionally Account Transaction Data (or Transaction Data or Ancillary Transaction Data) 172, and perform the execution that will result in facilitating completing financial transactions, including settlement of transactions. The Rule-Module Nexus 14 is comprised of an electronic Verification Platform 12, a Master Rule-Module Nexus 14, an internal Execution Platform 38, a Firewall 40, a Decryption Platform 22, a Gateway Platform 26, and a Logging Platform 42.

Figure 2:
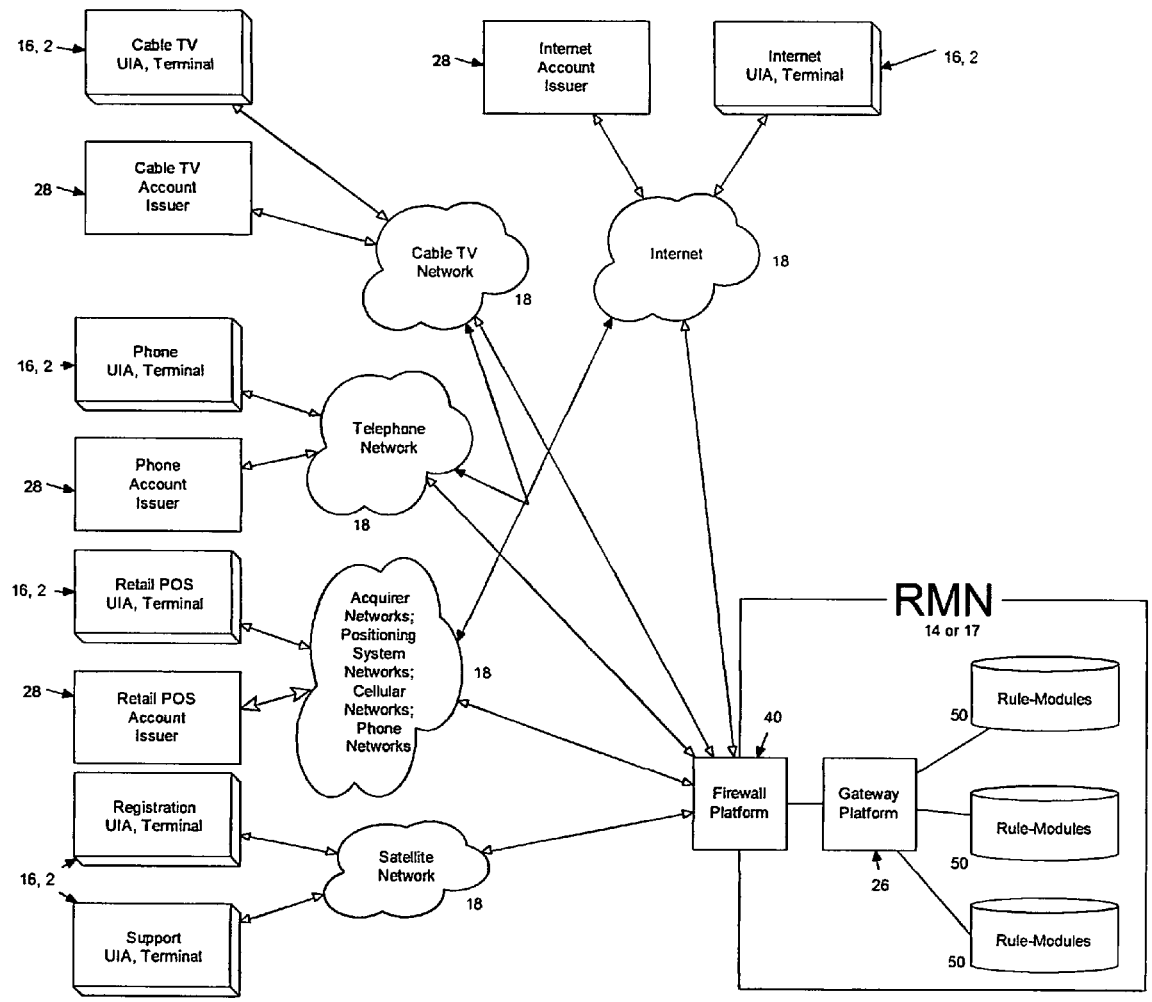
FIG. 2 shows an illustrative embodiment of the Rule-Module Nexus, showing the network connections with various Account Issuers (Authorized Issuer).

As seen in FIG. 2, the Master RMN 14 is connected to a network, like the Internet 18 or intranet 18, using a Firewall Machine (FW or FM) 40 that filters out all messages that are not from legitimate UIA 16 devices.

In an illustrative embodiment, the messages are decrypted. For this, the transaction processor uses the Decryption Platform (DP) 22, which utilizes the UIA-VC 204 of the UIA 16 to verify the encryption codes that is required to decrypt the message from the UIA 16.

Once decrypted, the verification of parties to the transaction is determined using the electronic Verification Platform 12.

Optionally, the RMN 14 may be conjoined, co-located and/or integrated with the VP 12 and/or the UAR 15, in any combination thereof. Elements of the RMN 14 and/or the VP 12 may be conjoined, co-located and/or integrated with a NAT 62, a UIA 16, and/or a Terminal 2.

In an illustrative embodiment, once the User is identified by the Verification Platform 12, the User Verification Approval Code 206 is forwarded to the Master Rule-Module Nexus 14. The Master Rule-Module Nexus 14 instructs the Execution Platform 38 to take the necessary steps for executing the Execution Commands 52 that are associated with the Pattern Data 54 of the User registered with the Master Rule-Module Nexus 14.

Upon the VP 12 having made a positive matching determination regarding a User's authorization to accessing the RMN 12, the User may view and edit Rule-Modules 50.

Rule-Modules

The Master Rule-Module Nexus 14 is comprised of at least one Rule-Module 50 which comprises Pattern Data or an Execution Command which is "distinct" or "unique" to one registered User (hence, "User-Unique"). In an illustrative embodiment, at least one Rule-Module 50 is unique and exclusive to an individual User. In the event that a Rule-Module comprises pattern data and an execution command that is indexed to one or more registered Users, said Rule-Module is deemed "customized" to a User but not unique to that User (hence, "User-Customized"). As defined herein, User-customized does not necessarily mean that any Pattern Data 54 or the Execution Command 52 is unique to a User, but rather that they are indexed to or are assigned to a specific User. As such, the same Pattern Data 54 or Execution Command 52 may be assigned to several specific Users, and hence would not be unique to any one User.

The Master Rule-Module Nexus 14 functions as a central storage facility for registering, indexing, updating, and invoking various Rule-Modules 50, whereby the Rule-Modules 50 govern the deposit, the display, the deducting, and the dispensing of financial. In an illustrative embodiment, each of these Rule-Modules 50 is composed of at least two Pattern Data 54 which is associated with or electronically linked to at least one Execution Command. In an illustrative embodiment, said Pattern Data 54 minimally comprise: a UUC 200 and a plurality of proprietary Financial Accounts 65. Optionally, said Pattern Data may also comprise a PVC 202.

The Master Rule-Module Nexus 14 optionally stores User-customized Pattern Data 54 that is unassociated with any User-customized Execution Commands 52 and optionally stores User-customized Execution Commands 52 that are not associated with any User-customized Pattern Data 54. Therefore, such unassociated Pattern Data 54 or Execution Commands 52 are optionally stored within the Master Rule-Module Nexus 14 until they are associated with a Pattern Data 54 or an Execution Command 52 together thereby forming an executable Rule-Module 50.

Once the Verification Platform 12 outputs a positive matching determination for a User, the User Verification Approval Code 206 is forwarded to the Master Rule-Module Nexus 14. The Master Rule-Module Nexus 14 takes the User Verification Approval Code 206, optionally along with the UIA-VC 204, the UIA 16 location data and the Financial Transaction Request Message (or Transaction Request or Transaction Request Message) 251, and searches among the User's customized Rule-Modules 50 to invoke Pattern Data 54 and associated Execution Commands 52 relevant to the financial transaction being undertaken.

Pattern Data (PD)

As previously noted, Pattern Data 54 may be provided by the User, by the Master Rule-Module Nexus 14, or by an authorized financial entity 28, while the User provides at least one associated Execution Command 52, to form a single Rule-Module 50.

Pattern Data 54 of a User is stored electronic data, which is customized to at least one User. For example, Pattern Data 54 may include any stored User-customized and User-unique electronic data, comprising: a primary Personal Verification Code (PVC) 202, which is optionally alpha-numeric; demographic information; an email address; a plurality of proprietary Financial Accounts 65; a stored-value account comprising pre-paid or pre-earned financial; the User's date of birth; a secondary PVC 202; a telephone number; Account Transaction Data 172; a mailing address; purchasing patterns; a UUC 200. The UUC 200 is unique to each User and is not shared between Users.

Any such Pattern Data 54 may be provided to the Master Rule-Module Nexus 14 by: a User; a Master Rule-Module Nexus 14; or an authorized third-party 28 such as an Account Issuer.

Account Transaction Data 172 associated with a Financial Account 65 is any information pertaining to a User Account or an Account Issuer Account (respectively, User Account Data and Account Issuer Account Data). Such data includes any of the following: a number which uniquely locates or routes a transaction to a Financial Account 65; a number which uniquely identifies the Financial Account 65; User usage location; User usage frequency; User usage recency; User usage demographics, and; User usage volume of electronic financial transactions; a financial transaction processing preference of the Account Issuer associated with the Financial Account 65.

In an illustrative embodiment, within the Rule-Module Nexus 14, a User Account Registry (UAR) 15, which is identified by a User Account Registry Code (UAR-Code) 59, contains a plurality of proprietary Financial Accounts 65 of a User, including associated Account Transaction Data (or Transaction Data) 172, and associated Rule-Modules 50. For example, in the event that the Financial Account 65 is a incentives account for rewards or scrip (e.g., a rewards incentives account), the value for each unit of Financial Data could be a dollar amount, a number of minutes of telephone calling time, points towards the purchase of a product or service, a percentage discount on current or future purchases, and the like. For rewards transactions, the Account Issuer then designates the number of financial to be disbursed to Users based upon the occurrence of predetermined criteria. This criteria may include a credit or debit of financial in the User's Financial Account 65 based on the User's purchasing patterns as a function of any of the following: time; demographics; frequency; recency, and; amount of expenditure.

In another embodiment, within a User Account Registry 15, the Master Rule-Module Nexus 14 stores and manages Financial Accounts 65 for participating Account Issuers, Users, and counter-party entities. Further, The Master Rule-Module Nexus 14 may comprise Execution Commands 52 to display the Financial Account 65 status, calculations, and adjustments, and the like for participating Account Issuers, counter-party entities, and Users.

Execution Commands (ECs)

An Execution Command 52 may be invoked by Pattern Data 54 with which it is associated. Execution Commands 52 stored within the Rule-Module Nexus 14 and executed by the Execution Platform 38, may transmit electronic messages necessary for depositing, displaying, deducting, and/or disbursing Financial Data associated with Financial Accounts 65 of a User and, optionally, an Account Issuer. For example, the Execution Commands 52 may also include instructions or commands pertaining to the preserving the preferences of an Account Issuer for processing and/or completing of a financial transaction, comprising: invoking criteria predetermined by the Account Issuer for declining the financial transaction; invoking criteria predetermined by the Account Issuer for approving the financial transaction; invoking criteria predetermined by the Account Issuer for settlement of the financial transaction; invoking a proprietary network; invoking a discount rate; invoking an interchange fee; invoking a settlement protocol; invoking a surcharge; invoking a processing partner, and; invoking a time period for settlement. A processing partner is a Third-Party Platform 28, in an illustrative embodiment, registered with the RMN 14, comprising: an Account Issuer (e.g., Wells Fargo Bank™); a merchant private label (e.g., Nordstrom's™); an aquirer (e.g., First Third Bank™); a credit association (Visa™); an intermediary (e.g., First Data Corporation™, GE Capital™); a debit processor (e.g., Interlink™), and; a credit company (e.g., American Express™).

Another illustrative embodiment of the invention includes a Financial Account 65 being used under predetermined circumstances comprising: the number of units of Financial Data to be debited from a Financial Account 65 under which circumstances and the number of units of financial to be credited to an Account Issuer Account under which circumstances. Such Execution Commands 52 may include: a pre-calculated formula for surcharging a User's Financial Account 65 during a financial transaction, such that said surcharge is automatically disbursed to a financial counter-party (e.g., a non-profit charity or a checking account of a subordinated User) or deposited into another Financial Account 65 of the User (e.g., a savings account or brokerage account); a pre-designation that Financial Accounts 65 are to be displayed to the User such that the User can select which Financial Account 65 to invoke for the financial transaction; a pre-designation that Audible or Visible Signatures 81 are presented to the User on a UIA Display 6 or Transaction Terminal Display 6 such that the User may select which entity will be the counter-party of the financial transaction disbursement; a pre-designation that purchases from certain participating Account Issuers will automatically invoke a financial disbursal to at least one certain financial counter-party; a pre-designation that upon accumulation of certain types of financial, such as frequent-flyer miles or free phone minutes, such types of financial will be automatically disbursed to a predetermined financial counter-party; a pre-designation that upon accumulation of certain amounts of financial, there will be a disbursal to at least one predetermined financial counter-party; a pre-designation that upon one financial counter-party having received a certain quantity of financial transactions from the User, perhaps even within a certain timeframe, the User will be notified or further financial disbursal will automatically transfer to a different counter-party.

In one embodiment of a scrip transaction, a Rule-Module 50 from the Master Rule-Module Nexus 14 comprises an Execution Command 52 which permits a merchant to contribute financial directly to a non-profit charity based upon a User's purchases. In such transactions, units of financial are electronically debited from the merchant account, and corresponding units of financial are electronically credited to the Financial Account 65 of the non-profit charity.

The Execution Commands 52 in the Rule-Module Nexus's 14 may further provide several predetermined designations including any of the following: immediate cash discounts or premium charges to a User's Financial Account 65 during a commercial transaction; a deduction of financial units from a User's Financial Account 65, and an immediate transaction thereof via electronic funds transfer (EFT) to an Account Issuer; a recurring debit based upon a predetermined interval of time, and; an accrual of financial which are credited towards a User's future purchase of a product or service.

FIG. 5 is illustrative of an embodiment, wherein Rule-Modules 50 are registered to a User and a subordinated User, each having a plurality of Pattern Data 54 are associated with a plurality of Execution Commands 52, including Global Execution Commands 55.

Figure 6:
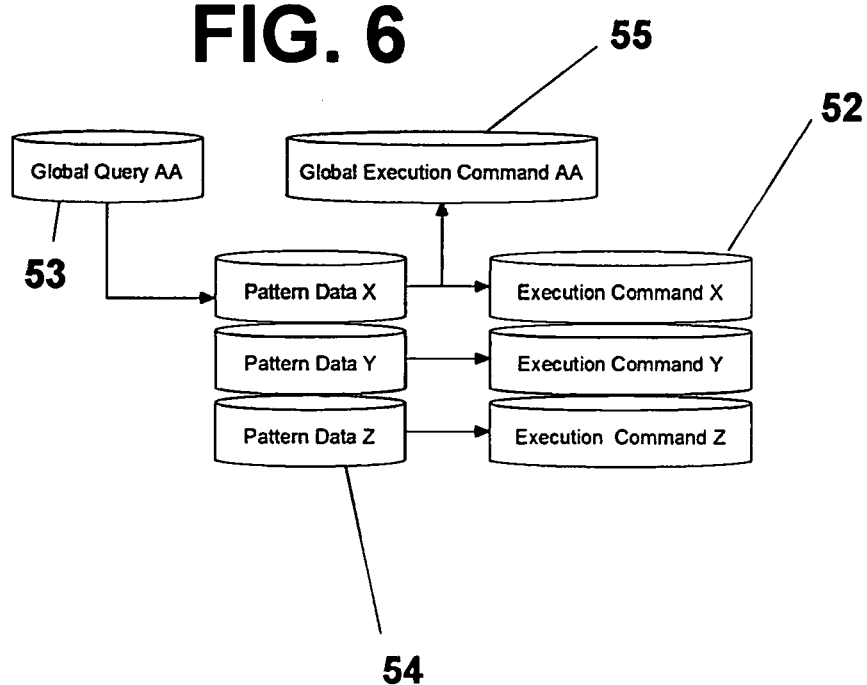
FIG. 6, FIG. 7A, FIG. 7B, and FIG. 7C show various embodiments of Rule-Modules, with various associations between Pattern Data and Execution Commands, including Global Queries and Global Execution Commands.

FIG. 6 shows another embodiment wherein only one Pattern Data 45 associated with one Execution Command 52.

Figure 7A:
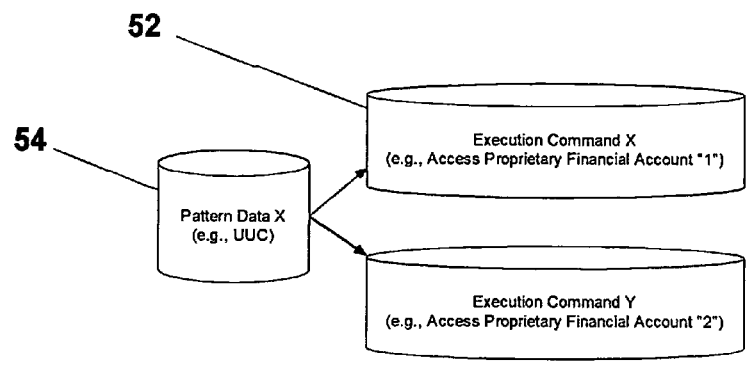

FIG. 7A is illustrative of an embodiment wherein a Pattern Data 54 is associated with a plurality of Execution Commands 52, thereby forming a plurality of Rule-Modules 50. In this embodiment, the Pattern Data 54 comprises a UUC 200 associated with Execution Commands 52 comprising access to a plurality of proprietary Financial Accounts 65. In one embodiment, accessing a proprietary Financial Account 65 comprises accessing a Rule-Module 50 associated with said proprietary Financial Account 65.

Figure 7B:
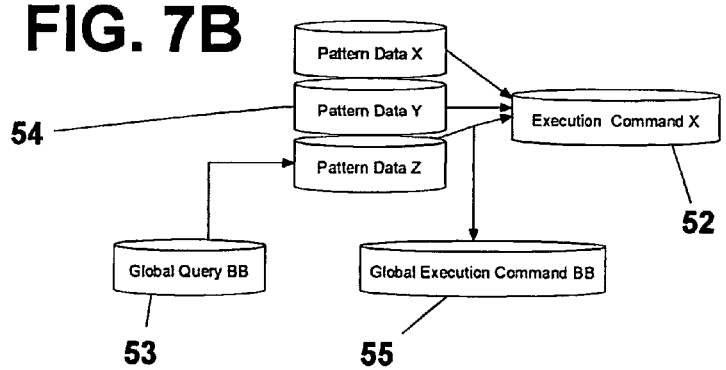

FIG. 7B shows another embodiment, wherein a plurality of Pattern Data 54 are associated with an Execution Command, again forming a plurality of Rule-Modules 50.

Figure 7C:
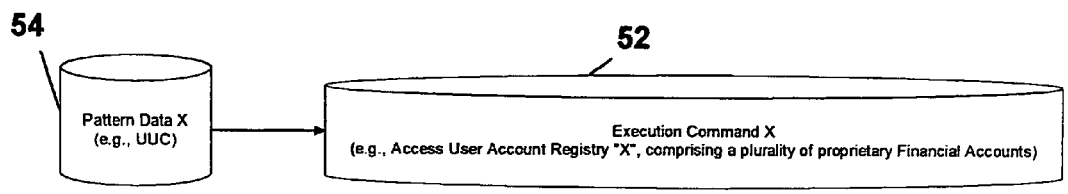

FIG. 7C shows another embodiment, wherein a Pattern Data 54 comprising a UUC 200 is associated with an Execution Command 52 comprising accessing a UAR 15, said UAR 15 comprising a plurality of proprietary Financial Accounts 65.

Any User-customized Execution Command 52 may be provided to the Nexus 14 by a party comprising: the User, the Nexus 14, or an authorized third-party.

Global Queries and Global Execution Commands

In an illustrative embodiment of this invention, a Global Execution Command (GEC) 55 does not automatically compel or require all financial transactions of all Users to: be linked to any particular Account Issuer, and/or merchant, and/or product, and/or service, and/or; bypass or be diverted from the Account Issuer or Network 18 which might otherwise apply to a Financial Account 65 selected by any User during a financial transaction. As such, in an illustrative embodiment, there are no "default" GECs 55 governing all of the Financial Accounts 65 of all Users.

An example would be as follows: upon the Verification Platform 12 making a positive matching determination from comparing the User's bid UUC 200 (or optionally a bid UUC 200—PVC 202) packet with registered UUCs 200 (or optionally registered UUCs 200—PVCs 202), the User's unique Verification Approval Code 206 is output to the Rule-Module Nexus 14, matching Global Queries 53 and invoking User-customized Rule-Modules 50. In an illustrative embodiment, the Verification Approval Code 206 matches the User Account Registry Code (UAR-Code) 59 which uniquely identifies the User Account Registry 15 of a User.

In an illustrative embodiment, the submitted Verification Approval Codes 206 automatically matches to a set of Global Queries 53 in the Rule-Module Nexus 14. For example, when a Verification Approval Code 206 is submitted, it may match automatically with Global Queries 53 such as the following: "What is the User's home zip code?"; "What that the User's most frequently used merchant?"; "What is the status of the User's Financial Account(s)?". The answers to these Global Queries 53 are contained in the User-customized Pattern Data 54 which are statements that comprise data customized to the User. In this example, the Pattern Data 54 responses to the above Global Queries 53 are, respectively, as follows: "95401"; "Macy's"; "All payments are current". In this embodiment, these Pattern Data 54 responses invoke Global Execution Commands (GEC) 55 which govern automatic response programs such as, respectively: "Notify the User to re-new subscription to Santa Rosa Symphony"; "Email the User an electronic coupon for discounted apparel and sports accessories at Macy's in Santa Rosa, Calif."; "Mail the User an offer for reduced credit card interest rates because account is in good standing". In this embodiment, therefore: Global Queries 53 and the Global Execution Commands 52 are actually non-specific, or non-customized, to any particular User; however, the Pattern Data 54 and Execution Commands 52 are unique to, or customized to, the specific User whose Verification Approval Code 206 has been submitted. This illustrative embodiment renders a platform architecture for the Rule-Module Nexus 14 that has: User-customized sub-modules with User-customized Pattern Data 54 and Execution Commands 52; while the Global Queries 53 and the Global Execution Commands 55 sub-modules are not required to be customized to any one single User.

Processing Financial Transactions Via a RMN and a UAR

A financial transaction comprises a transfer of financial data from a Financial Account 65 to at least one other Financial Account 65, and may comprise: invoking a rule-module via a rule-module nexus; a buyer-seller exchange transaction wherein a user's financial account balance is adjusted and a payee's financial account is correspondingly adjusted, wherein the user and the payee are different parties; transferring financial data from a financial account of the user to another financial account of the user, wherein there is no buyer-seller exchange; redeeming a pre-paid ticket transaction for venue admittance, wherein there is no buyer-seller exchange; redeeming a pre-paid membership benefit transaction for venue admittance, wherein there is no buyer-seller exchange; an electronic benefits transfer (EBT), wherein there is no buyer-seller exchange.

In one embodiment, a buyer-seller exchange comprises the User buying a product or service from a seller, wherein the User's Financial Account 65 is debited and the seller's Financial Account 65 is correspondingly credited, with the seller being the payee. The seller may comprise an Account Issuer.

Figure 37:
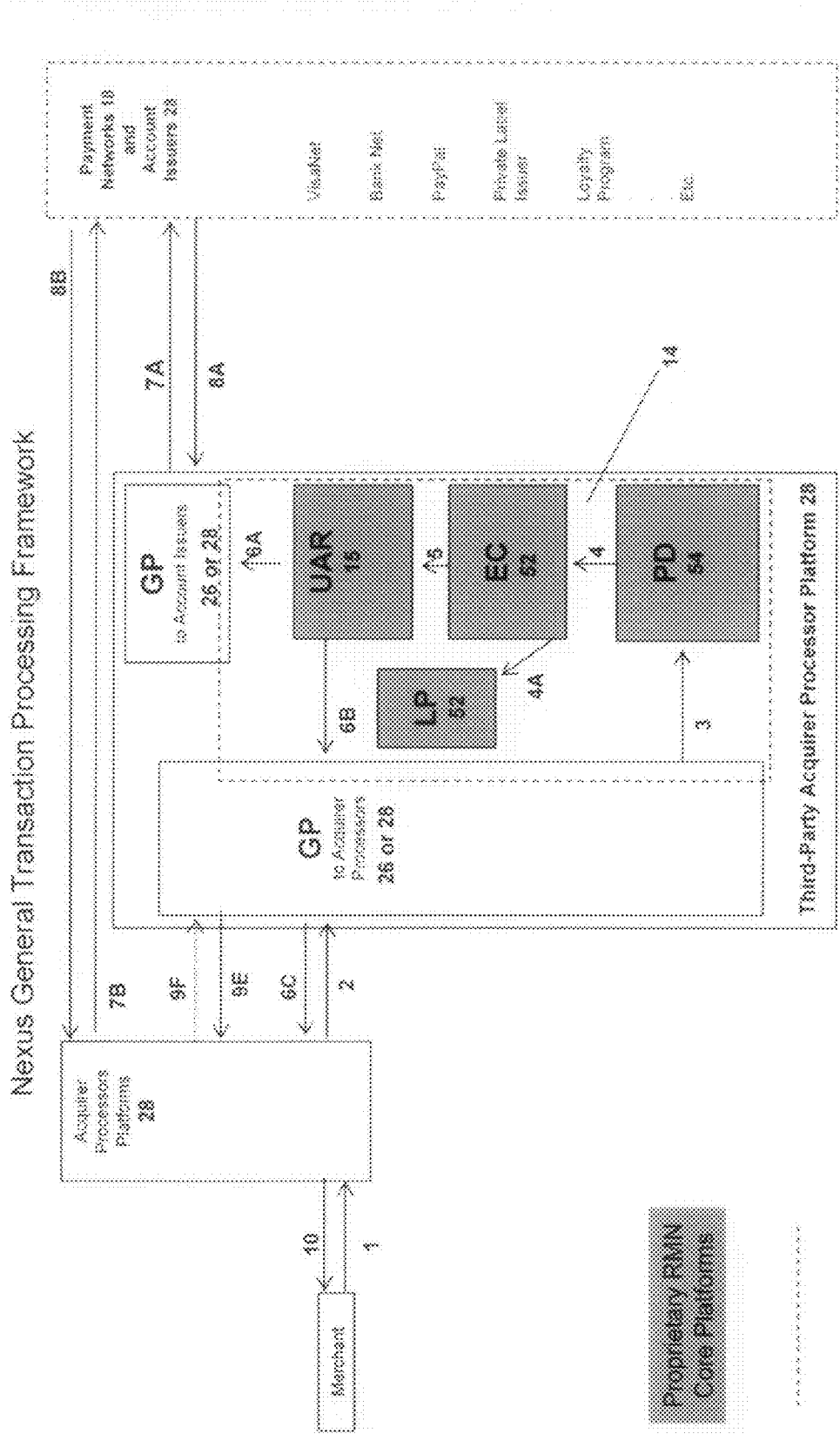
FIG. 37 illustrates an overview of an embodiment of financial transactions via the Rule-Module Nexus and the User Account Registry.

FIG. 37 illustrates an overview of an embodiment of financial transactions via the RMN 14 and the UAR 15, comprising: Upon a User's consent, the Merchant Platform 28 sends a transaction authorization message to their Acquirer Processor 28 via existing telecommunications infrastructure Network 18 (Step 1); The Acquirer Processor 28 determines that the authorization is a financial transaction bound for the RMN 14, and forwards it via existing telecommunications infrastructure Network 18 to an Acquirer Processor Gateway Platform 26 or 28 (Step 2); The Gateway Platform 26 or 28 routes the transaction to the RMN 14 which determines the Pattern Data 54 operative pursuant to the data of the transaction taking place, said transaction data comprising merchant name, location, time, products being purchase, transaction size, etc. (Step 3); The RMN 14 then determines which Execution Commands 52 are operative to the transaction is taking place, comprising the appropriate live Financial Account(s) 65 to use given the Pattern Data 54 and the Execution Commands 52 registered to that User (Step 4), and the Logging Platform (LP) 42 logs all elements of the transaction for future analysis (Step 4A); The RMN 14 sends the information to the UAR 15 which reformats the original data into the appropriate live Financial Account 65 number (Step 5); The UAR 15 either: delivers the message to the hosted Account Issuer Gateway 26 or 28 (Step 6A), or if the Acquirer 28 leverages their own Account Issuer 28 Network 18 connectivity, back to the hosted Acquirer Gateway 26 or 28 (Step 6B), which returns the reformatted message to the Acquirer Processor 28 (Step 6C); The Live Financial Account 65 Authorization is forwarded to the appropriate Account Issuer Platform 28 by the hosted Issuer Gateway 26 or 28 (Step 7A), or the proprietary Acquirer Processor's Gateway 28 (Step 7B); The Account Issuer 28 returns the authorization message via the Network 18 channel that it received the request (Step 8); If the transaction is returned to the hosted Issuer gateway then the information travels back through the Network 18 infrastructure in the same way it was originated (Steps 9A-9E), If the transaction was routed by the Account Issuer 28 back via the Acquirer Processor 28, then the Acquirer Processor 28 sends an information-only message to the RMN 14 as a record of the response from the Account Issuer 28 (Steps 9F-9H).

An overview of several example embodiments of financial transactions via the RMN 14 and the UAR 15, comprises:

Example 1

Auto-Account Selection at Physical-World POS, without Keypad 70

The User's NAT 62 interfaces with the POS UIA 16—Terminal 2 via magnetic swipe or contactless enablement. Because the User's NAT 62 contains information such as the RMN-RC 61 that identifies the transaction packet as bound for the RMN 14, the UIA 16-Terminal 2 packages the available information regarding User, transaction, and merchant (such as the UIA-VC 204) into a standardized message and forwards the Financial Transaction Authorization Request 251 to the RMN 14. In many embodiments, the Financial Transaction Authorization Request 251 is a "thin-client" packet, comprising no live Financial Account 65 number or live Financial Account 65 financial data. The RMN 14 automatically determines by the Rule-Modules 50 registered to a User, the appropriate Financial Account 65 to select and invoke (e.g.: all grocery store transactions should be Visa® Debit, or all airline tickets should be American Express® Gold, etc.). The necessary information is translated by the RMN 14, appended to the transaction packet, and passed along to Third-Party Platforms 28 further processing of the financial transaction. Upon receiving an Financial Transaction Authorization Response 252 from a Third-Party Platform 28, the RMN 14 re-translates the transaction information into an "account number blind" (or a "blind", or "thin-client" Financial Account 65 number which is not a Live Financial Account 65 number) Financial Transaction Authorization Response 252, which is forwarded to the Merchant 28. To aid the User and merchant in record keeping, a Visible Signature 81, and the last four digits of the live Financial Account 65 number could be passed along to the UIA 16—Terminal 2, and printed on the receipt.

Example 2

Auto-Account Selection at Physical-World POS, with Keypad 70

The User's NAT 62 interfaces with the POS UIA 16—Terminal 2 via magnetic swipe or contactless enablement. Additionally the User enters a PVC 202 via the Keypad 70 to secure the transaction. Because the User's NAT 62 contains information such as the RMN-RC 61 that identifies the transaction packet as bound for the RMN 14, the MA 16-Terminal 2 packages the available information regarding User, transaction, and merchant (such as the UIA-VC 204) into a standardized message and forwards the Financial Transaction Authorization Request 251 to the RMN 14. RMN 14 determines: via the VP 12 if the User is authorized to access the RMN 14, and; via the Rule-Modules 50 registered to a User, the appropriate Financial Account 65 to invoke. The necessary information is translated by the RMN 14, appended to the transaction packet, and passed along to Third-Party Platforms 28 further processing of the financial transaction. Upon receiving an Financial Transaction Authorization Response 252 from a Third-Party Platform 28, the RMN 14 re-translates the transaction information into an "account number blind" Financial Transaction Authorization Response 252, which is forwarded to the merchant. To aid the User and merchant in record keeping, a Visible Signature 81, and the last four digits of the live Financial Account 65 number could be passed along to the UIA 16—Terminal 2, and printed on the receipt.

Example 3

At Physical-World POS, with Keypad 70 and Manual-Account Selection

The User's NAT 62 interfaces with the POS UIA 16—Terminal 2 via magnetic swipe or contactless enablement. Additionally the User enters a PVC 202 via the Keypad 70 to secure the transaction. In addition, the User enters an Audible/Visible Signature 81 via the Keypad 70 to identify a Financial Account 65 they are manually selecting for the RMN 14 to invoke. For example, the User could keypunch a two digit code via the Keypad 70, comprising: a "00" entry could mean, "Use the Default"; a "01" entry could mean Wells Fargo® Visa® debit; a "MC" could mean, "MasterCard®", while all other options could be sequentially enrolled. The Audible/Visible Signature 81 is encrypted like the PVC 202. Because the User's NAT 62 contains information such as the RMN-RC 61 that identifies the transaction packet as bound for the RMN 14, the UIA 16—Terminal 2 packages the available information regarding User, transaction, and merchant (such as the UIA-VC 204) into a standardized message and forwards the Financial Transaction Authorization Request 251 to the RMN 14. RMN 14 determines: via the VP 12 if the User is authorized to access the RMN 14, and; via the Rule-Modules 50 registered to a User, the appropriate Financial Account 65 to invoke. The necessary information is translated by the RMN 14, appended to the Financial Transaction Authorization Request 251, and passed along to Third-Party Platforms 28 further processing of the financial transaction. Optionally, as determined by the RMN 14, the PVC Association Platform 909 may also forward the PVC 202, comprising: forwarding the PIN to a debit processing Network 18, and authorizing a PIN-enabled debit financial transaction; forwarding the PVC 202 to a debit financial transaction processing Network 18, and authorizing a PIN-enabled debit financial transaction; forwarding the PVC 202 to a financial transaction processing Network 18 and authorizing a PIN-enabled financial transaction; forwarding the PVC 202 to a financial transaction processing Network 18 and authorizing a non-PIN enabled financial transaction. Upon receiving an Financial Transaction Authorization Response 252 from a Third-Party Platform 28, the RMN 14 re-translates the transaction information into an "account number blind" Financial Transaction Authorization Response 252, which is forwarded to the merchant. To aid the User and merchant in record keeping, a Visible Signature 81, and the last four digits of the live Financial Account 65 number could be passed along to the UIA 16—Terminal 2, and printed on the receipt.

Example 4

At Physical-World POS, with Keypad 70 and Dynamic Display 7 for Manual-Selection a. Return Message The User's NAT 62 interfaces with the POS UIA 16—Terminal 2 via magnetic swipe or contactless enablement. Additionally the User enters a PVC 202 via the Keypad 70 to secure the transaction. Because the User's NAT 62 contains information such as the RMN-RC 61 that identifies the transaction packet as bound for the RMN 14, the UIA 16—Terminal 2 packages the available information regarding User, transaction, and merchant (such as the UIA-VC 204), etc., into a standardized message and forwards the Financial Transaction Authorization Request 251 to the RMN 14. RMN 14 determines: via the VP 12 if the User is authorized to access the RMN 14, and; via the Rule-Modules 50 registered to a User, the appropriate Financial Account(s) 65 to invoke. The invoked Financial Accounts 65, optionally in ranked order of preference based upon the Rule-Modules 50 which the User, the merchant, and other authorized parties (e.g., Third-Parties 28, such as product manufacturers, rewards providers, etc.) have registered to the User, are presented via Audible/Visible Signatures 81 on a dynamic screen Display 7, from which the User selects their Financial Accounts 65. The necessary information is translated by the RMN 14, appended to the Financial Transaction Authorization Request 251, and passed along to Third-Party Platforms 28 for further processing of the financial transaction. Optionally, as determined by the RMN 12, the PVC Association Platform 909 may forward the PVC 202, comprising: forwarding the PIN to a debit processing Network 18, and authorizing a PIN-enabled debit financial transaction; forwarding the PVC 202 to a debit financial transaction processing Network 18, and authorizing a PIN-enabled debit financial transaction; forwarding the PVC 202 to a financial transaction processing Network 18 and authorizing a PIN-enabled financial transaction; forwarding the PVC 202 to a financial transaction processing Network 18 and authorizing a non-PIN enabled financial transaction. Upon receiving an Financial Transaction Authorization Response 252 from a Third-Party Platform 28, the RMN 14 re-translates the transaction information into an "account number blind" Financial Transaction Authorization Response 252, which is forwarded to the merchant. To aid the User and merchant in record-keeping, a Visible Signature 81, and the last four digits of the live Financial Account 65 number could be passed along to the UIA 16—Terminal 2, and printed on the receipt.

b. Merchant Host Matching

The User's NAT 62 interfaces with the POS UIA 16-Terminal 2 via magnetic swipe or contactless enablement. Additionally the User enters a PVC 202 via the Keypad 70 to secure the transaction. Because the User's NAT 62 contains information such as the RMN-RC 61 that identifies the transaction packet as bound for the RMN 14, the UIA 16—Terminal 2 packages the available information regarding User, transaction, and merchant (such as the UIA-VC 204) into a standardized message and forwards the Financial Transaction Authorization Request 251 to a Subset RMN 17 located at the Merchant Host Platform 28 for available payment options. Earlier the RMN 14 has distributed a file to the Merchant Host Platform's 28 Subset RMN 17, said file comprising registered UUCs 200, and associated RMs 50. In one embodiment, no Live Financial Account 65 numbers are distributed; only their associated Audible/Visible Signatures 81. The RMN 17 of the Merchant Host Platform 28 responds to the Terminal 2—UIA 16, presenting the operative Audible/Visible Signature(s) 81 via Display 7, determined pursuant to the transaction data, said transaction data comprising UPC 67, merchant name, location, time, products being purchase, transaction size, etc. The User makes their selection of Audible/Visible Signature(s) 81 from the dynamic screen Display 7, whereby the POS Terminal 2—UIA 16's packages an Financial Transaction Authorization Request 251, comprising User data (comprising UUC 200, or UUC 200—PVC 202), transaction data, and merchant data, and forwards the Financial Transaction Authorization Request 251 to the Master RMN 14. The RMN 14 determines: via the VP 12 if the User is authorized to access the RMN 14, and; via the Rule-Modules 50 registered to a User, the appropriate Financial Account(s) 65 to invoke. The necessary information is translated by the RMN 14, appended to the Financial Transaction Authorization Request 251, and passed along to Third-Party Platforms 28 for further processing of the financial transaction. Optionally, as determined by the RMN 12, the PVC Association Platform 909 may forward the PVC 202, comprising: forwarding the PIN to a debit processing Network 18, and authorizing a PIN-enabled debit financial transaction; forwarding the PVC 202 to a debit financial transaction processing Network 18, and authorizing a PIN-enabled debit financial transaction; forwarding the PVC 202 to a financial transaction processing Network 18 and authorizing a PIN-enabled financial transaction; forwarding the PVC 202 to a financial transaction processing Network 18 and authorizing a non-PIN enabled financial transaction. Upon receiving an Financial Transaction Authorization Response 252 from a Third-Party Platform 28, the RMN 14 re-translates the transaction information into an "account number blind" Financial Transaction Authorization Response 252, which is forwarded to the merchant. To aid the User and merchant in record-keeping, a Visible Signature 81, and the last four digits of the live Financial Account 65 number could be passed along to the UIA 16—Terminal 2, and printed on the receipt.

Example 5

Handheld Device NAT 62 a. Handheld Device NAT 62 Comprises No Audible/Visible Signature 81 Functionality Same as Example 1, Example 2, Example 3, Example 4a, and Example 4b, depending upon POS Terminal 2—UIA 16 and Merchant Platform 28 capabilities. The contactless chip, IR device or bar code functionality is read by the POS Terminal 2—UIA 16 using an RFID interrogator or appropriate scanning functionality.

b. Handheld Device NAT 62 Comprises Audible/Visible Signature 81 Functionality Same as Example 1 or Example 2 with additional capabilities. The User, before reaching the checkout line, selects from their PDA/cell phone NAT 62, the stored Audible/Visible Signature(s) 81 they wish to use. No Live Financial Account 65 data need be stored on or access from the NAT 62. This User selection is relayed to the RMN 14 via a wireless Network 18, so that the RMN 14 is updated for this one-time selection and appends the Financial Account 65 upon receiving the subsequent Financial Transaction Authorization Request 251 to come from the POS Terminal 2—MA 16. Depending upon the NAT 62 and its data-storage and communicating capabilities, the User may be prompted for Payee data, comprising: a unique Payee code (UPC) 67, a Payee's name, a Payee's depository account, and/or a Payee's bank routing code. In one embodiment, the NAT 62 may provide GPS coordinates, which are registered to a particular merchant location. Because the initiating Financial Transaction Authorization Request 251 is coming from a NAT 62, it is possible that this transaction will be secured via any number of NATs 62 in the User's possession: using a fob NAT 62, using a handheld cell/PDA NAT 62, using a PIN-access code controlled cell/PDA NAT 62 access, and/or using the PVC 202 to append to the Financial Transaction Authorization Request 251. After the User's NAT 62 is scanned via the POS Terminal 2, the procedures for the Financial Transaction Authorization Request 251, per the Example 1 through Example 4, apply. If the POS Terminal 2—UIA 16 has a Keypad 70 or a touch-screen Display 7, a PVC 202 can be used also. The RMN 14 is thus expecting the additional Financial Transaction Authorization Request 251, comprising the transaction-related data from the POS Terminal 2—UIA 16, and thereby appends the Financial Account 65 to Financial Transaction Authorization Request 251, as the User has requested via the NAT 62. Thereafter, the procedures for processing the financial transaction follow per the Example 1 through Example 4. If the POS Terminal 2—UIA 16 has a Keypad 70 or a touch-screen Display 7, a PVC 202 can be appended also.

c. Wallet Functionality, Dynamic Contactless Data

Same as Example 1 or Example 2 with additional capabilities. The User, before reaching the checkout line, selects from their PDA/cell phone NAT 62, the stored Audible/Visible Signature(s) 81 they wish to use. No Live Financial Account 65 data need be stored on or access from the NAT 62. This User selection updates the Subset RMN 17 residing on the NAT's 62 integrated chip and the Subset RMN 17 is updated for this one-time selection. When User's NAT's 62 data, comprising the UUC 200 and the User's selected Audible/Visible Signature 81, is scanned via POS Terminal 2—UIA 16, the procedures per the Example 1 through Example 4 for processing the Financial Transaction Authorization Request 251, are applicable. If the POS Terminal 2—UIA 16 has a Keypad 70 or a touch-screen Display 7, a PVC 202 can be appended also.

Example 6

Unattended POS Terminals (e.g.: Vending Machines)

a. Online Connected

Same as Example 1 through Example 5c. Note that regardless of POS Terminal 2 capabilities, transactions are likely to be batched in order to reduce payment expense to the vending machine operator. Therefore the RMN 14 is likely to have a Rule-Module 50 that limits the number of batch transactions that can be generated without an update to the Third-Party Merchant Platform 28. This limitation is likely to be mirrored by the vending machine's own separate limitation on multiple transactions from a single NAT 62.

b. Intermittent Connection

Same as Example 1, Example 5a, Example 5b, and Example 5c In this embodiment, the POS Terminal 2 is not capable of online PVC 202 validation via a remote VP 12. However, using Example 5b enables the RMN 14 database to update its UAR 15 even before the unattended Terminal 2—UIA 16 has presented the batched Financial Transaction Authorization Request 251.

Example 7

Transaction Graphics

Similar to Example. In this embodiment, the User wishes to purchase from something comprising a magazine, wall poster (e.g.: tickets to a concert) or the like. The handheld NAT 62 (e.g., cell phone, PDA, iPOD, etc.) either scans product/offering data from the magazine/wall poster/etc., or the User inputs said data derived from the magazine/wall poster/etc. via a Keypad 70 or touch screen Display 7 on the NAT 62. The NAT 62 packages this data, appending the Audible/Visible Signature(s) 81 which the User's has selected from the stored options on the NAT 62. The NAT 62 then forwards the Financial Transaction Authorization Request 251 to the RMN 14 for processing the transaction per Example 1 through Example 7 above. The RMN 14 responds to the NAT 62 with an electronic notification if the transaction is complete.

Example 8

E-Commerce a. Direct to Website

If the Terminal 2—UIA 16 has scanning capabilities, a NAT 62 may be scanned for the UUC 200 (or, optionally the UUC 200—PVC 2020) at the website's checkout web page, which invokes a hyperlink to the RMN 14. Alternatively, at the website's checkout web page, via Display 7 on the Terminal 2—UIA 16 (comprising computer screen, television screen, cell phone screen, etc.), the User selects an icon or text which hyperlinks to the RMN 14. In one embodiment, when prompted, whether being scanned from the NAT 62 or entered by the User via a Keyboard 70 or touch screen Display 7, the entered UUC 200 is one reserved for virtual POS, or e-commerce internet, transactions. A Private Code 79 may be returned by the RMN 14 for presentation to the User via the Display 7 to validate to the User that the authentic RMN 14 has been contacted. In the event that Audible/Visible Signature(s) 81 are stored in a NAT 62 itself, or in a NAT 62 conjoined with the Terminal 2—UIA 16 (such as a home computer), the User may select an Audible/Visible Signature(s) 81 either via entry on Keypad 70, touch screen Display 70, or audio input. Alternatively, the RMN 14 may return Audible/Visible Signature(s) 81 for presentation to the User, for the User's selection. In another embodiment, upon activating the hyperlink to the RMN 14, the Rule-Module(s) 50 invoked pertaining to the data (comprising UPC 67, merchant name, location, time, products being purchase, transaction size, etc.) in the Financial Transaction Authorization Request 251 arriving from the website, may include invoking a default or preferred Audible/Visible Account Signature 81 or Financial Account 65, whereby processing of the financial transaction proceeds as in Example 1 through Example 7. Alternatively, the Financial Transaction Authorization Request 251 arriving from the website, may invoke a menu of a plurality of Visible Signatures 81 from the RMN 14 for presentation to the User via the Display 7, from which the User can select to designate the Financial Account 65 which the RMN 14 should invoke upon receiving the Financial Transaction Authorization Request 251 with transaction data. Thereafter, processing of the financial transaction proceeds as in Example 1 through Example 7.

b. Via Home Banking

The User's home banking website validates the User's identity before shopping begins. At the time of Virtual POS shopping, this User's identity validation may be forwarded to the VP 12 of the RMN 14, comprising the UUC 200, if the home banking website is appropriately validated to the VP 12 of the RMN 14. Thus the home banking website may provide a portal through which the User shops on an e-commerce website, and/or a hyperlink to communicate directly with the RMN 14. The e-commerce site might prompt the User for a one-time only, or short duration, PVC 202 provided to the User by RMN 14 via the home banking site, optionally along with a Private Code 79 to validate the RMN 14 to the User. Alternatively, the User's may be prompted to re-validate his identify by the RMN 14 in the event the User signals an intention to shop online, an alteration to their default or preferred Financial Account 65 as might otherwise apply to the transaction pursuant to Rule-Modules 50, or a time limit expiration of the original banking site's User identity verification. As in Example 8a, subsequently the RMN 14 may invoking a default Financial Account 65, or the presentation of Visible Signatures 81 via the Display 7 for selection of a Financial Account 65. The merchant's website shopping cart could then proceed with processing the financial transaction via the RMN 14 per Example 1 through Example 8a.

c. Via Handheld Device

The same as Example 8b, except that the User communicates with, validates their identify through, and receives any short duration PVCs 202, directly from the RMN 14.

Example 9

Via Landline Phone (VRU, Telephone Order)

Same as Example 8b or Example 8c with the exception that the User's UUC 200 and PVC 202 may be entered via options comprising the telephone's Keypad 70, audio receiver, touch screen Display 7.

Figure 17:
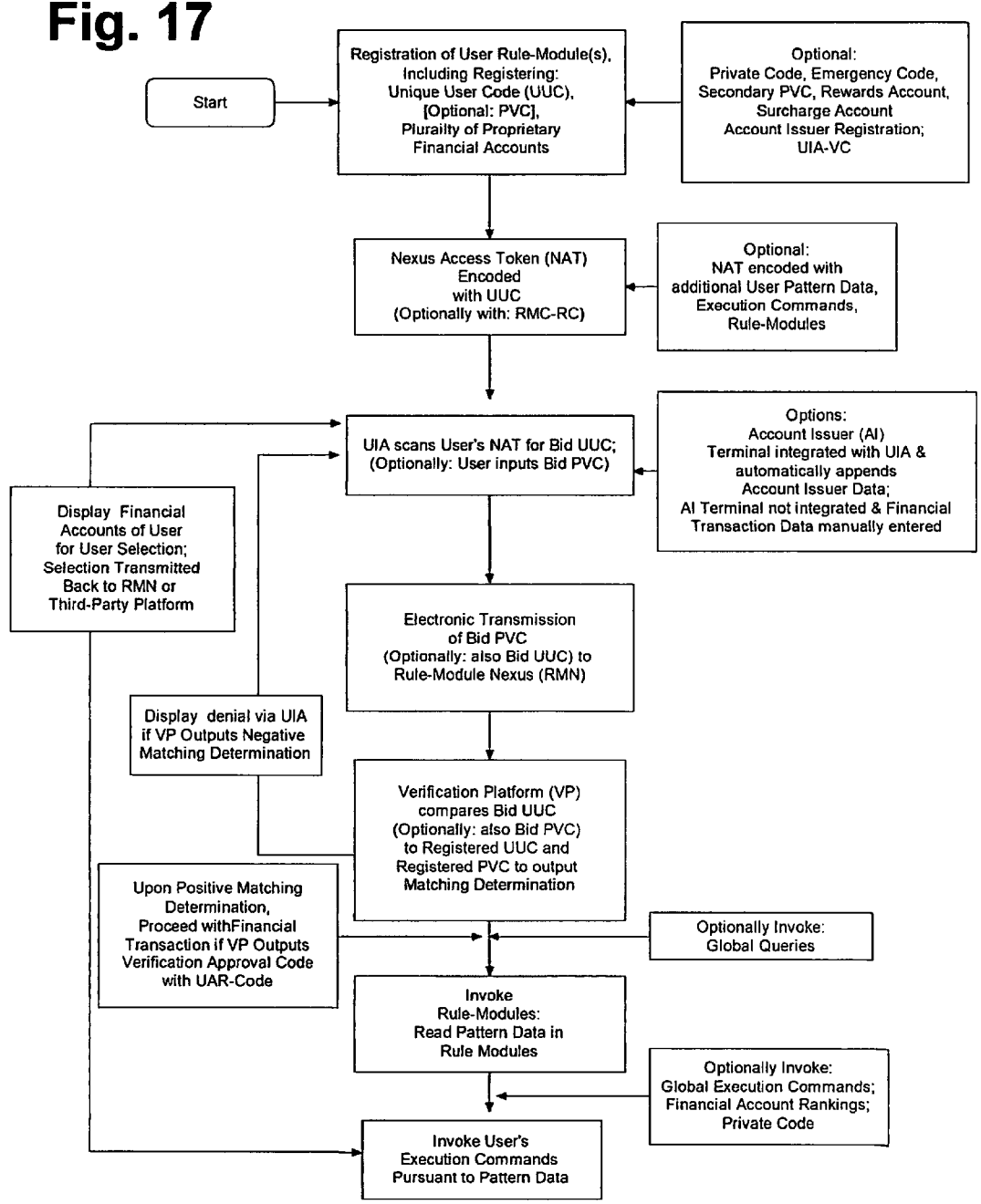
FIGS. 17 and 17A show flow charts of registration and transaction processing with the Rule-Module Nexus.
Figure 17A:
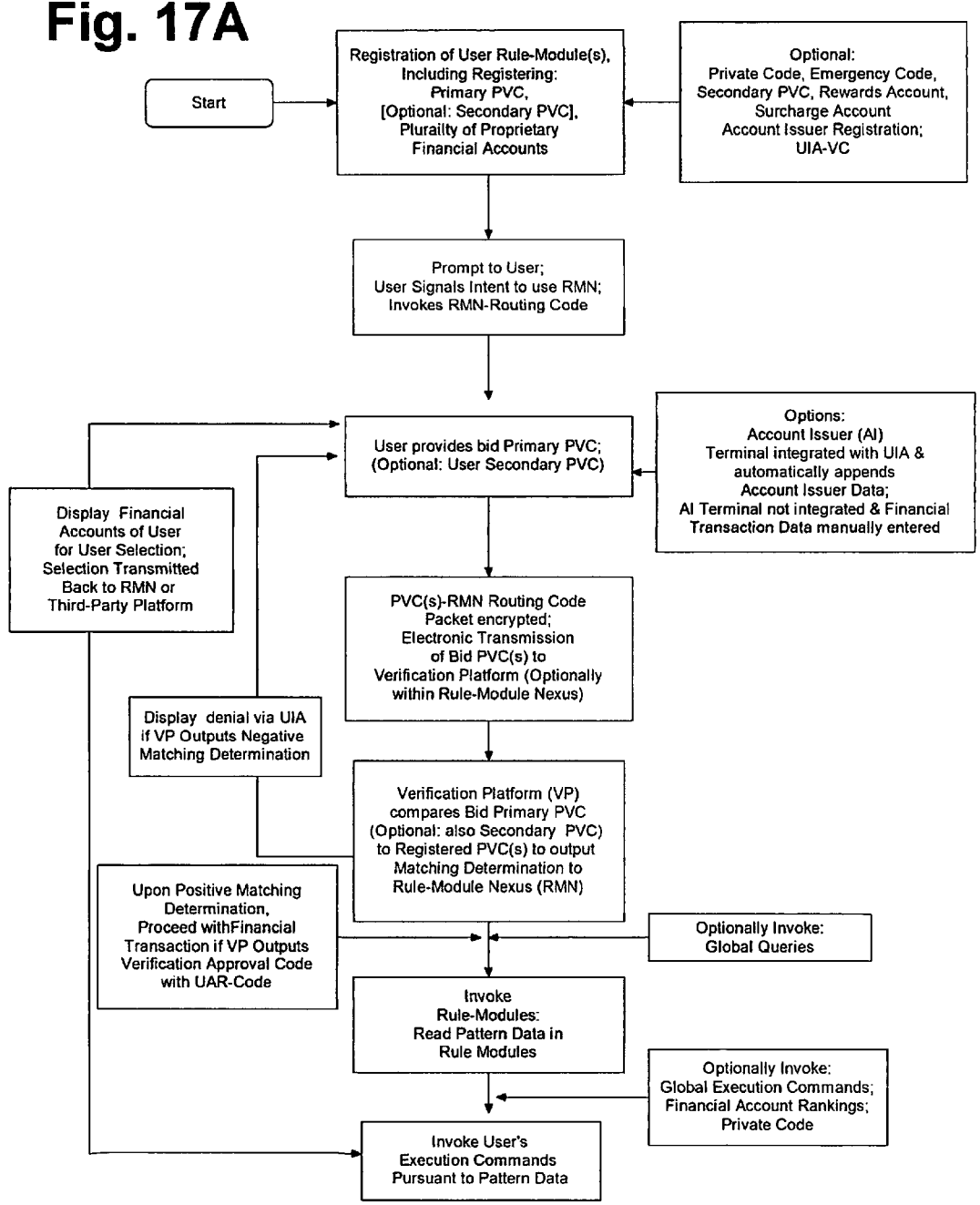

FIG. 17 illustrates an illustrative financial transaction, characterized by verifying the User providing a bid UUC 200 from a scanned NAT 62 (and optionally a bid PVC 202 entered via a keypad 70) via the UIA 16 of an Account Issuer. The UIA 16—Transaction Terminal 2 transmits the UUC 200 (or optionally a UUC 200—PVC 202) packet to the Master RMN 14 for verification, along with the UIA-VC 204. The User is thus verified (or identified) through the bid UUC 200 (or optionally a UUC 200—PVC 202) packet submitted to the Verification Platform 12, while the Account Issuer is verified (or identified) through the UIA-VC 204 of the UIA 16.

The VP 12 outputs a VAC 206 upon verifying the User, wherein a UAR 15 is identified and accessed for presenting a plurality of Financial Accounts 65 of the User via a Display 6 on a UIA 16—Transaction Terminal 2.

The User selects a presented Financial Account 65 via the UIA 16—Transaction Terminal 2, wherein Transaction Data 172 is entered and appended via the Transaction Terminal 2 either using an electronic cash register or manually. The User then either authorizes or cancels the transaction using the keypad 70 of the UIA 16—Transaction Terminal 2. Once the financial transaction is authorized, the UIA 16—Transaction Terminal 2 transmits to the Account Issuer platforms 28 via the RMN 14. The Master RMN 14 preserves a forwards the transaction to the financial responsible party(ies) for completing the transaction, optionally including execution and settlement, said party(ies) comprising: the Master RMN 14, a participating Account Issuer platform 28, and the like.

Execution of the transaction may result in a declined transaction due to lack of financial or other problem condition reported by the Account Issuer. If the transaction is declined, the Master RMN 14 or the Account Issuer platform 28 may transmit the decline notification back to the UIA 16—Transaction Terminal 2, canceling the transaction.

Figure 4B:
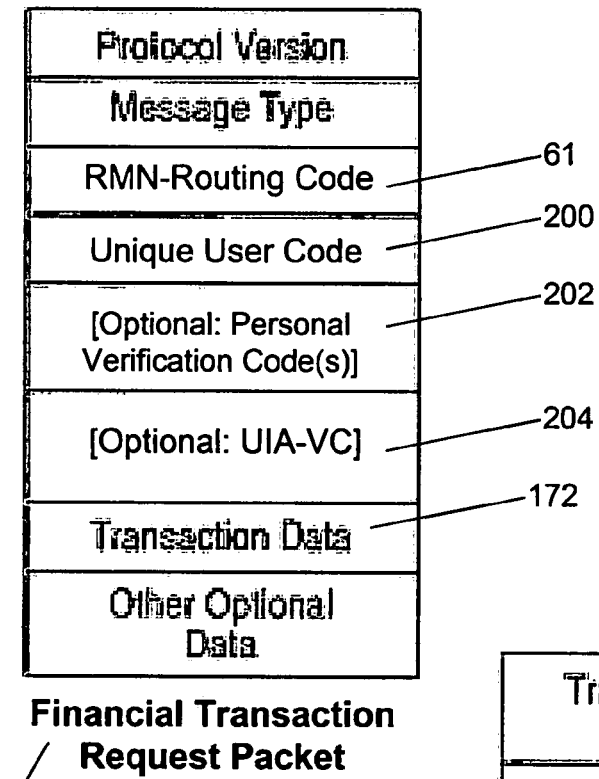
FIG. 4B, FIG. 4C, and FIG. 4D show, respectively: an embodiment of a "thin-client" financial transaction request packet (or message); an embodiment of a financial transaction response packet (or message); an embodiment of the construction of a financial transaction response packet (or message).
Figure 4C:
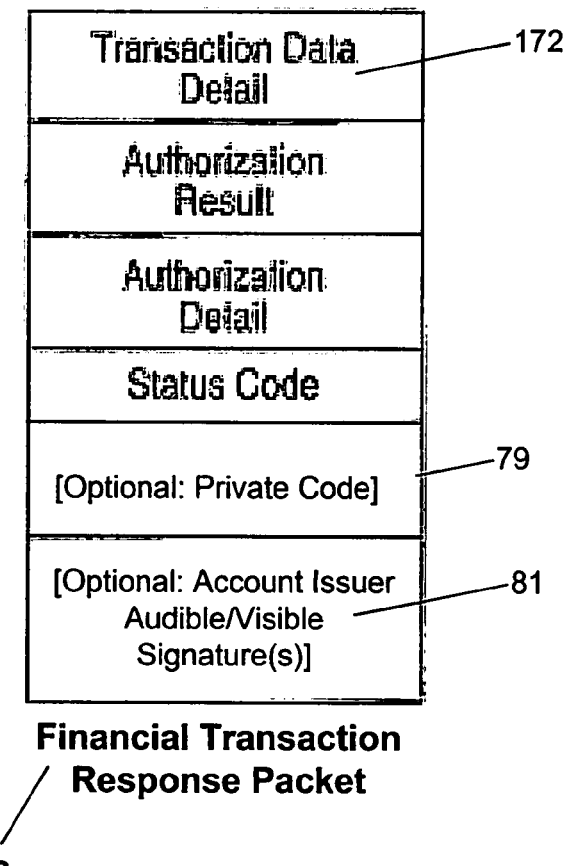
Figure 4D:
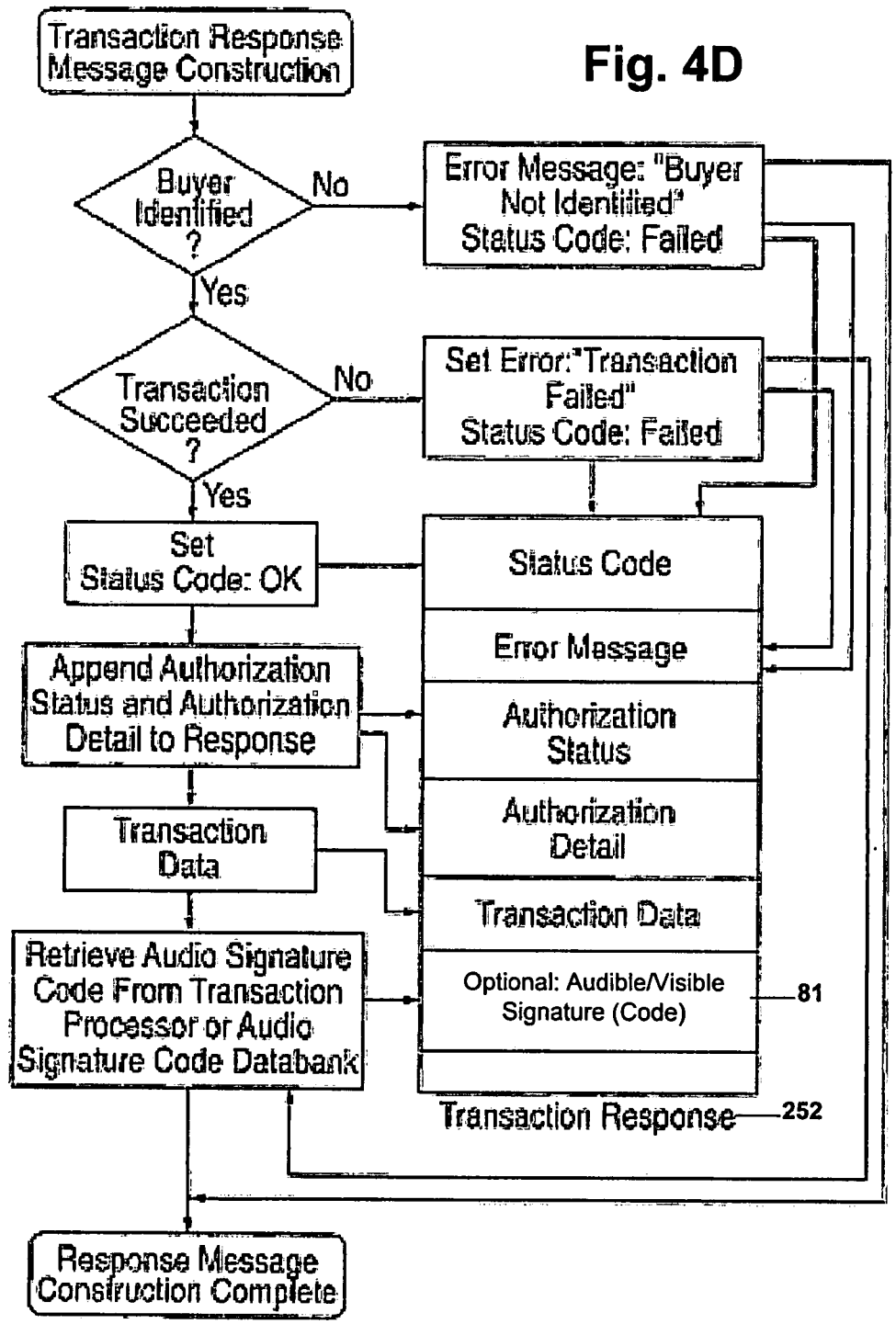

As further described below, FIG. 4B through FIG. 4D show, respectively: an embodiment of a Financial Transaction Authorization Request 251 packet (or message); an embodiment of a financial transaction response packet (or message); an embodiment of the construction of a financial transaction response packet (or message).

FIG. 4B shows an embodiment of a Transaction Request Message (or Transaction Request or Transaction Request Message) 251: A Transaction Request Message 251 originates from the UIA 16—Transaction Terminal 2 and comprises information and data that is required for the processing of an electronic transaction. In one embodiment these data comprise: a bid UUC 200 (or optionally a UUC 200—PVC 202) packet, a RMN-RC 61, and a UIA-VC 204; in an alternative embodiment, the Transaction Request Message 251 includes additional Transaction Data 172, comprising: amount of purchase, the User's selected Financial Account 65, and other instructions.

FIG. 4C shows an embodiment of a Financial Transaction Response Message (or Transaction Response or Transaction Response Message) 252: A Transaction Response Message 252 originates from the RMN or an Account Issuer platform 28 and comprises information and data that confirms the success or failure of a requested electronic transaction, in an illustrative embodiment, also including the Visible or Audile Signature 81 of the Account Issuer.

FIG. 4D shows an embodiment of construction of a Transaction Response Message 252, wherein the User (or Buyer) is verified (or identified). Optionally, this may includes an Account Issuer entity code if the Account Issuer audible or visible signature is already stored on Secure Memory 320 or 310 of the UIA 16, or if a new Account Issuer audible/visible signature is to be stored on Secure Memory 320 or 310 of the UIA 16, and played back or displayed to the User. In one embodiment, a registered Audible Signature 81 of an Account Issuer is a series of notes, such as a MIDI sequence, or a sample audio waveform, such as a 44.1 kHz 16-bit stereo audio stream. Each Audible/Visible Signature 81 is associated with an Account Issuer through an Audible/Visible Signature 81 code. The RMN 14 may thereby present Audible/Visible Signatures 81 to the User via the UIA 16—Transaction Terminal 2 to identify an Account Issuer party or a Financial Account 65 to the User.

Figure 4E:
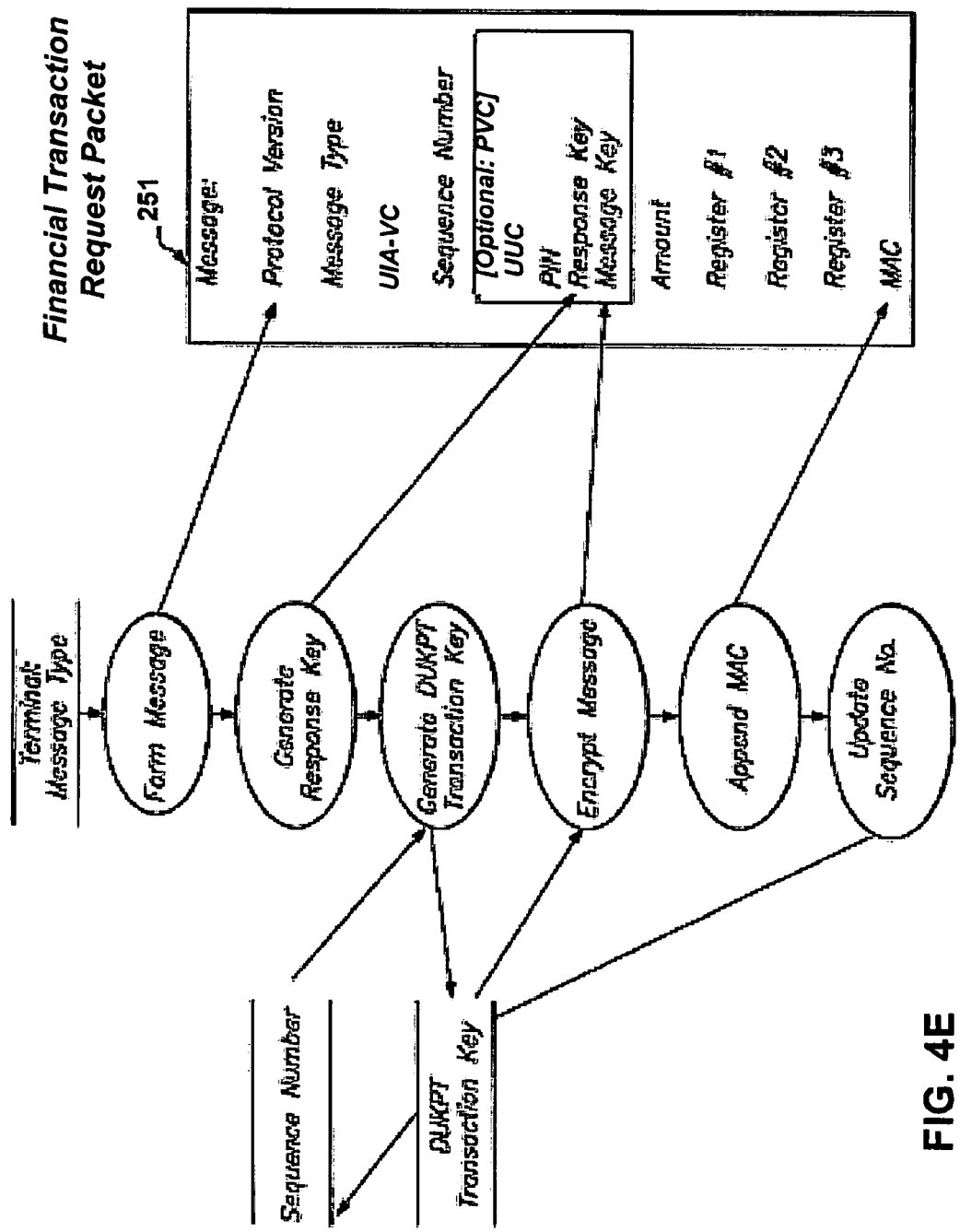
FIG. 4E shows a flow chart of the operation of the User Interface Apparatus and the Transaction Terminal (or Terminal) for generating a request packet.
Figure 4F:
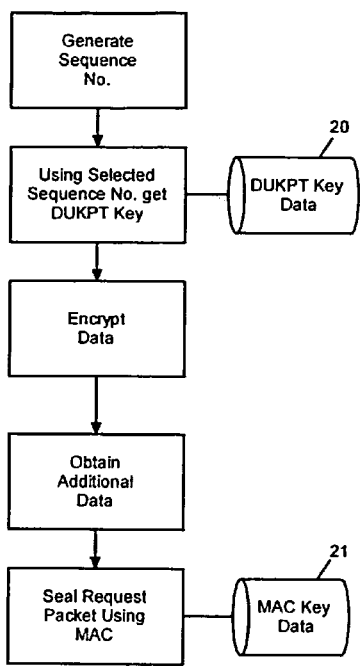
FIG. 4F shows a flow chart depicting the data encryption and sealing process at the User Interface Apparatus.

FIG. 4E shows a flow chart of the operation of the User Interface Apparatus and the Transaction Terminal (or Terminal) for generating a Financial Transaction Authorization Request 251 packet. FIG. 4F shows a flow chart depicting the data encryption and sealing process at the User Interface Apparatus 16.

Figure 4G:
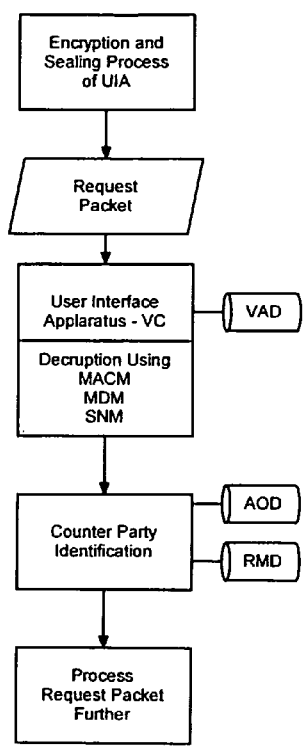
FIG. 4G shows a flow chart depicting the data decryption and counter party identification process at the Rule-Module Nexus.
Figure 4H:
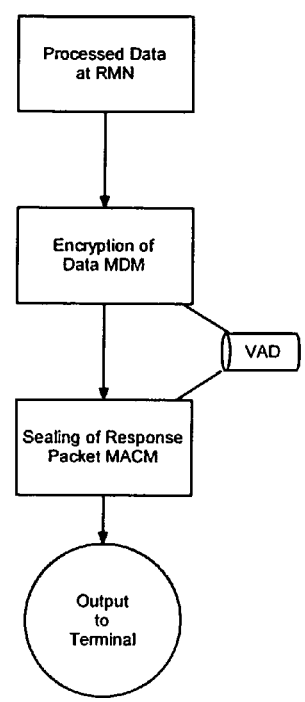
FIG. 4H shows a flow chart depicting the data encryption and sealing process at the Rule-Module Nexus.
Figure 4I:
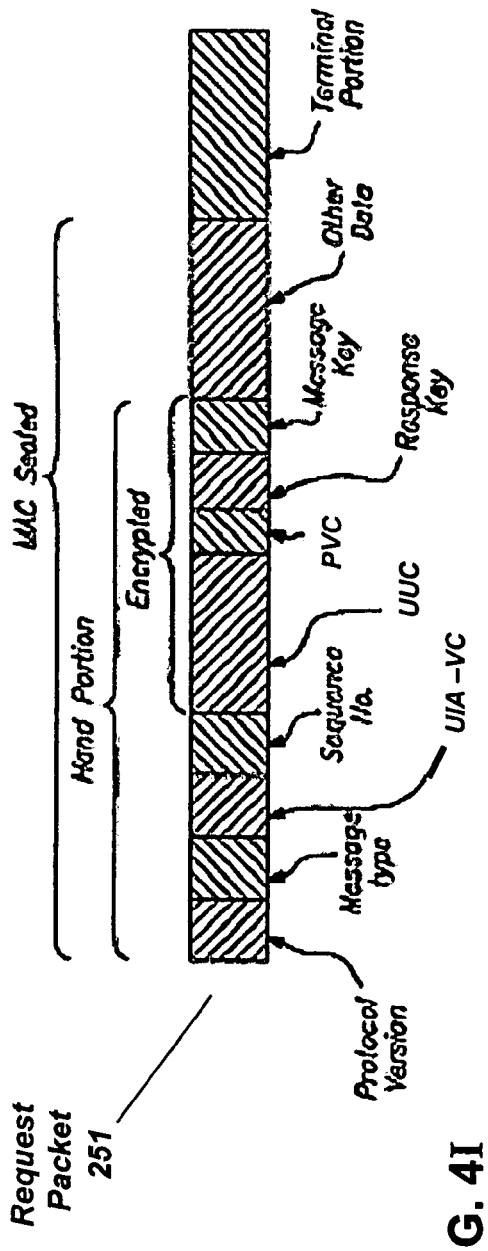
FIG. 4I shows a representational diagram of the request packet and the mandatory and optional data it contains.
Figure 4J:
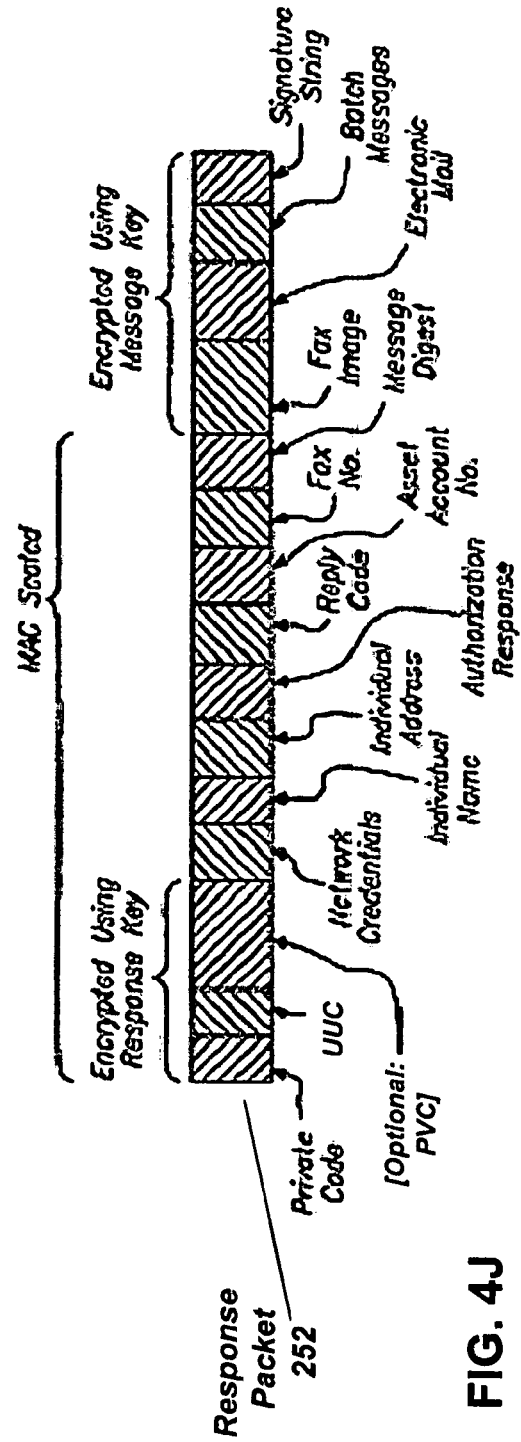
FIG. 4J shows a representational diagram of the response packet and the mandatory and optional data it contains.

FIG. 4G shows a flow chart depicting the data decryption and counter party identification process at the Rule-Module Nexus 14. FIG. 4H shows a flow chart depicting the data encryption and sealing process at the Rule-Module Nexus 14. FIG. 4I shows a representational diagram of the Transaction Request Packet (or Request Message) 251, and the mandatory and optional data it contains. FIG. 4J shows a representational diagram of the Transaction Response Packet (or Response Message) 252, and the mandatory and optional data it contains.

FIG. 13 shows an embodiment of a rewards or coupon transaction executed via the Rule-Module Nexus 14: a transaction is sent from the UIA 16—Transaction Terminal 2 to the RMN 14. Upon a User's UUC 200 (or optionally a UUC 200—PVC 202) packet being verified with a positive matching determination from the VP 12, the VAC 206 is output for accessing the UAR 15 and retrieving the User's rewards Financial Account Number 65 (e.g., Safeway™ Club number), optionally including associated purchasing Financial Account Number 65 (e.g., Visa™ account number) and optionally including related Transaction Data 172 (e.g., Visible Signature 81; list of items recently purchased). In one embodiment, the Visible Signature(s) 81 for the rewards Financial Account 65, and optionally a credit Financial Account 65 for payment, are transmitted to the UIA 16—Transaction Terminal 2 for display to the User. Upon the User's selection of the rewards Financial Account 65, and optionally the credit Financial Account 65 for payment in the event of a purchase, the online transaction is sent to the Account Issuer platforms 28 for further processing. Specifically, portions of the Financial Transaction Request packet (or message) 251 are forwarded to the (Authorized Issuer)-Rewards Processor platform 28, and in the event of a purchase, to the payment account's Account Issuer platform 28 (not shown). The Authorized Issuer-Rewards Processor platform 28 generates predetermined rewards, coupons or incentives; in addition, optionally, the data for the Financial Account 65 for payment is sent to the Authorized Issuer-Acquirer platform 28 for authorization and settlement (not shown).

Processing rewards or loyalty financial transactions via the RMN 14 enables avoiding the restrictions of current loyalty programs which work either: by issuing a new, unique number to a customer, or; by registering an existing number such as a live Financial Account 65 number. Under such current loyalty programs, a lost/replaced card, or even a consumer pulling out a different card each time they checkout creates havoc for the loyalty program.

By contrast, the RMN 14 and the UAR 15 enable access to a plurality of Registry Financial Accounts 65. In one embodiment, if the merchant used the UUC 200, or a portion thereof, as the loyalty account number, while at the same time the consumer used a Registry Financial Account 65 accessed via using the NAT 62, the merchant could always be able to tracking the consumer purchase behavior.

In one embodiment, if the loyalty program is issuing its own unique account numbers, the program could simply register a consumer via their UUC 200, or a portion thereof, in order to integrate with the RMN 14 and the UAR 15. Then the merchant could use this single loyalty program account number on their system for that consumer, and have the RMN 14 aggregate multiple family members transactions to that number, regardless of the payment method or Registry Financial Accounts 65 being used by any of the consumer's family members.

In another embodiment, when the consumer used any payment token that may or may not be a NAT 62 registered to RMN 14, a query could be made to the RMN 14 to determine if that payment token could be matched back to a particular UUC 200.

Figure 14:
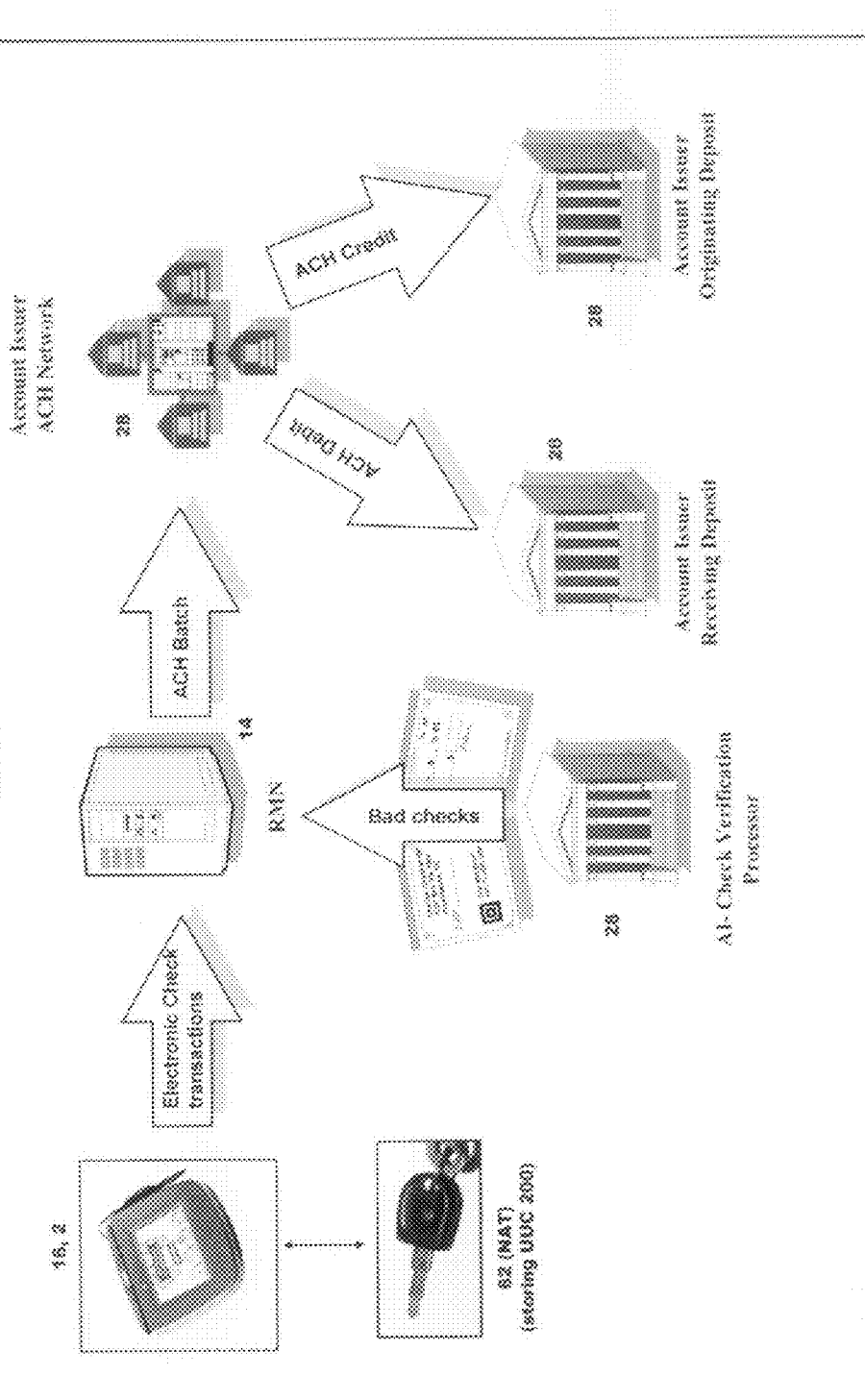

FIG. 14 shows an embodiment of an electronic check transaction executed via the Rule-Module Nexus 14: the merchant UIA 16—Transaction Terminal 2 at point of sale sends a UUC 200 (or optionally a UUC 200—PVC 202) packet to the RMN 14 for a User's verification; a positive matching verification enables the UAR 15 to retrieve the e-Check Financial Account 65 for transmitting the e-Check Visible Signature 81 to the UIA 16—Transaction Terminal 2. Upon the User's selection of the e-Check Financial Account 65, the transaction may be passed along to a Authorized Issuer-Check Verification Processor platform 28 where certain high-risk e-Check transactions are vetted by in order to weed out previously tagged bad check writers, and to avoid a decline at the point of sale; the e-Check transaction may then be batched and sent to the Authorized Issuer-ACH Network platform 28 for processing; the ACH Network platform 28 then doles out ACH credits and debits to the appropriate Originating Depository Account Issuer platforms (ODAuthorized Issuer) 28 and Receiving Depository Account Issuer platforms (RD-Authorized Issuer) 28.

Figure 15C:
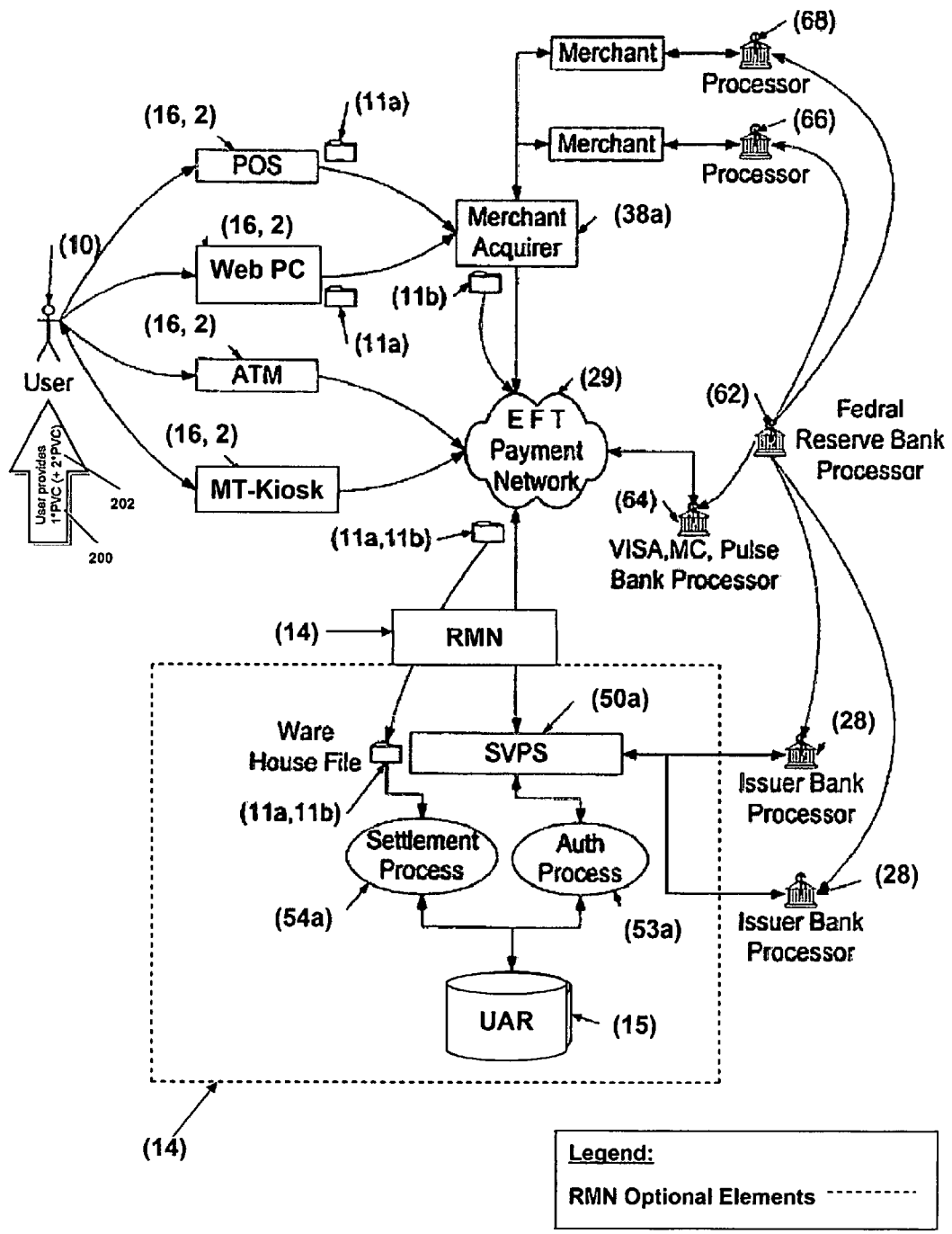
FIGS. 15C and 15D illustrate illustrative embodiments of a settlement process when converting an ATM/POS transaction to an ACH System, using verification data comprising a personal verification code (or primary verification code, or 1° PVC), and optionally, a secondary personal verification code (or 2° PVC).
Figure 15D:
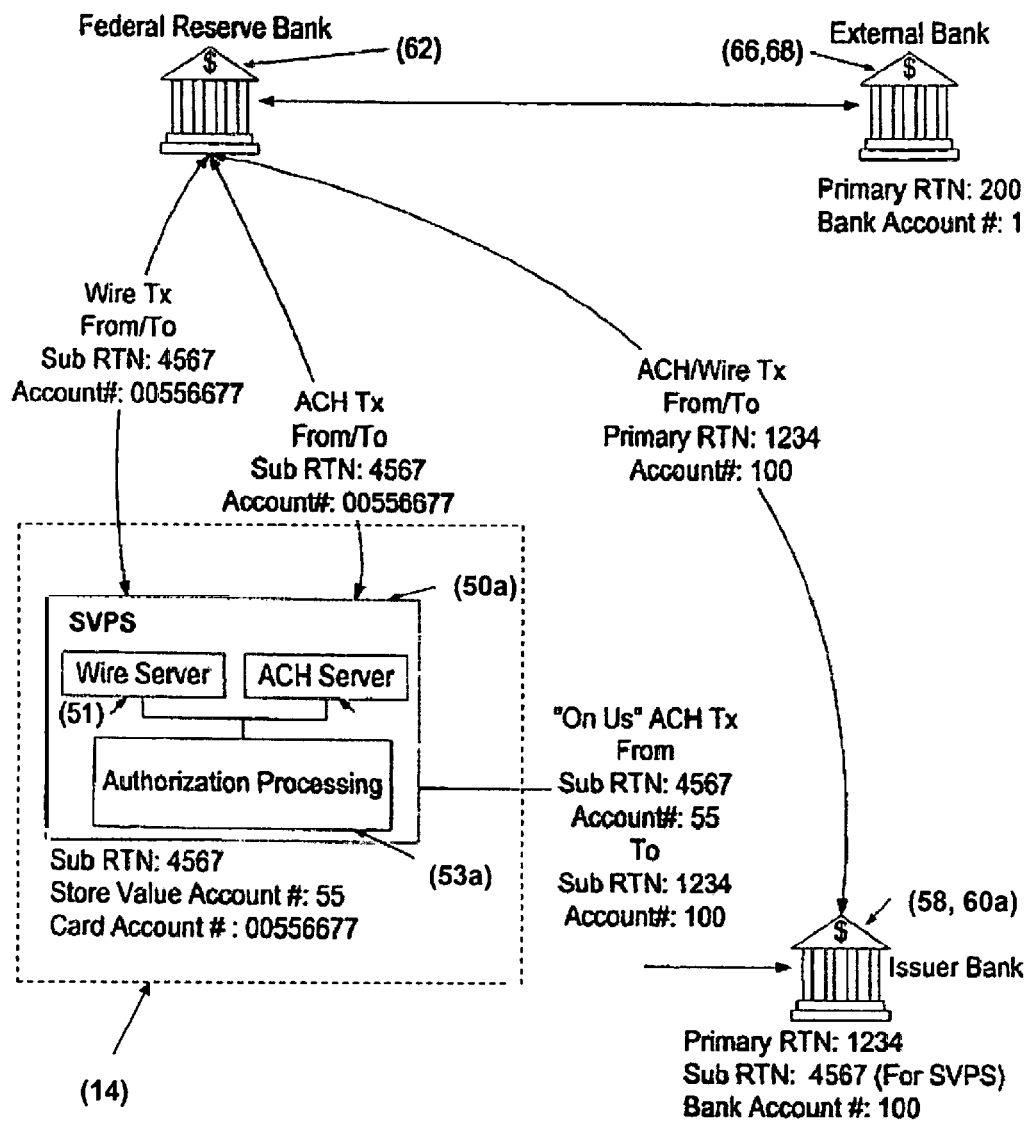
Figure 16:
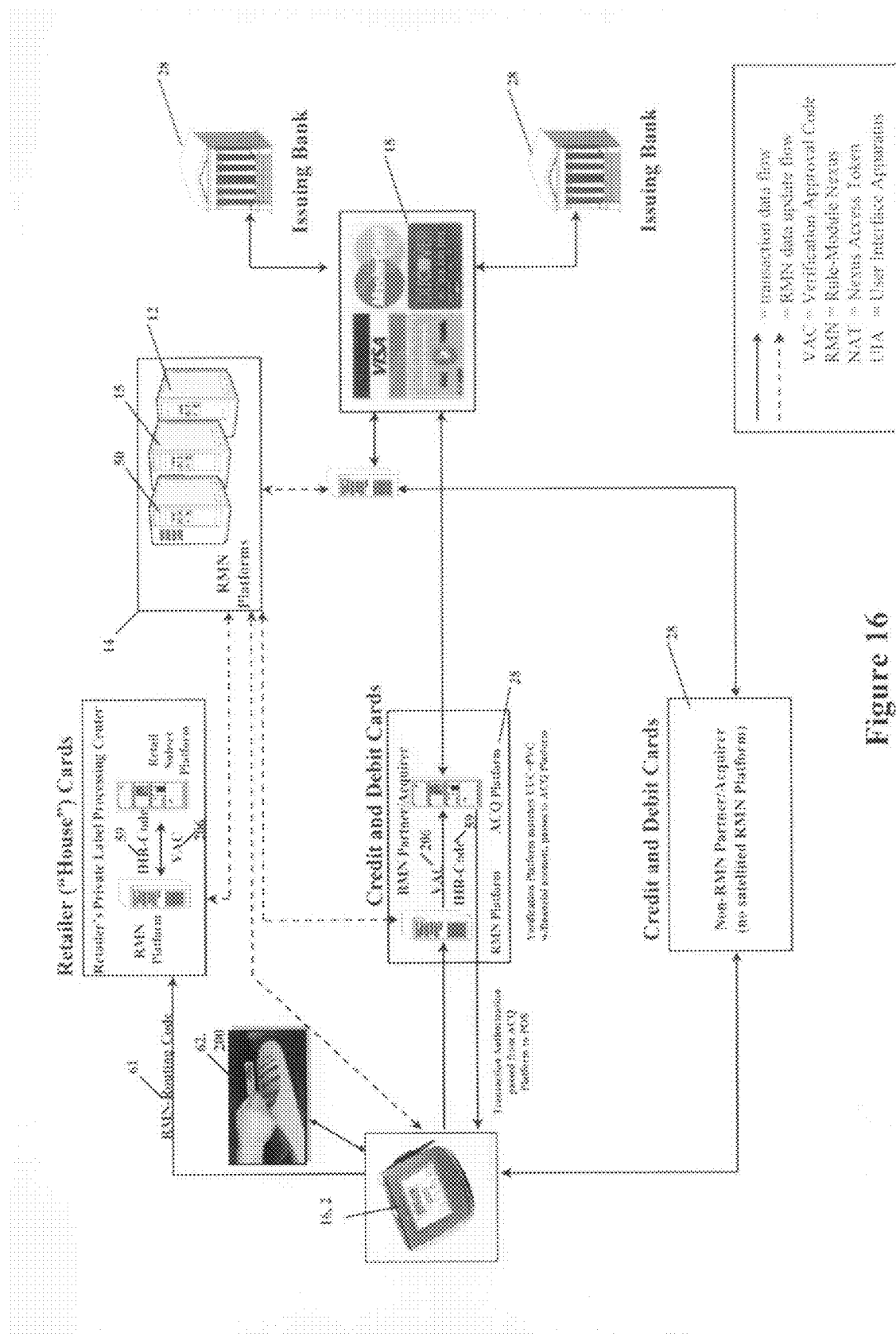
Figure 16A:
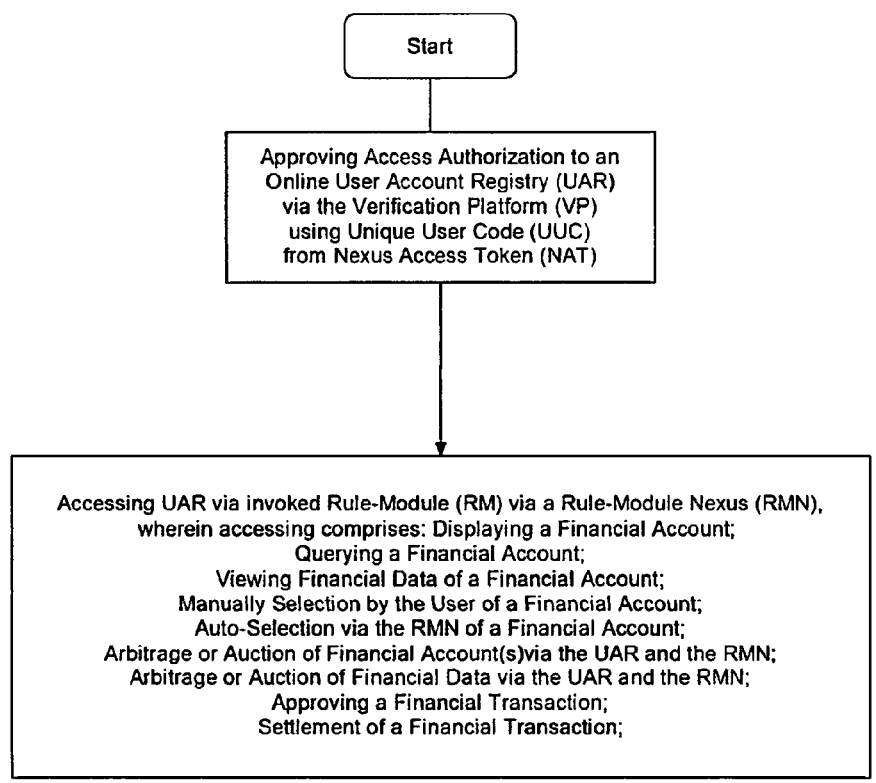
Figures 1, 16A:
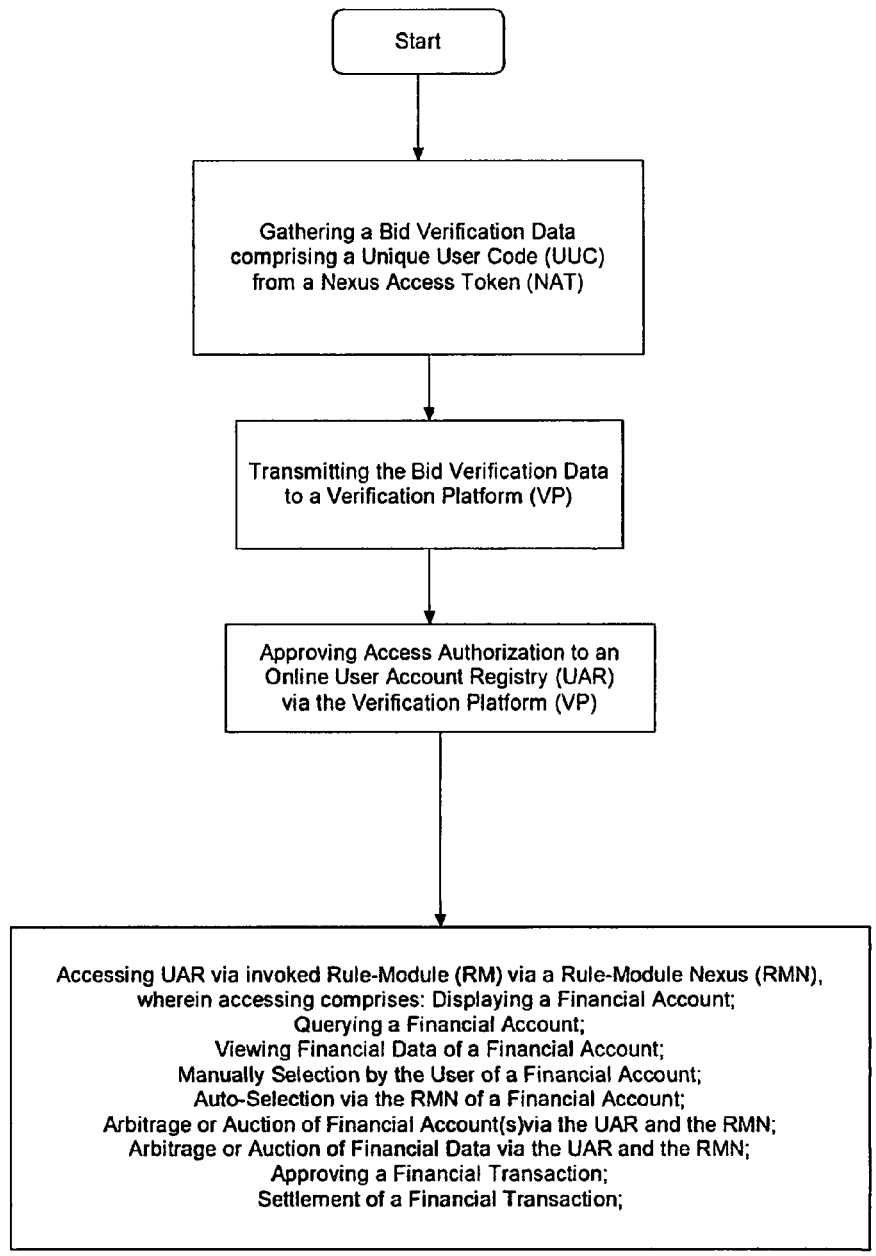
Figures 2, 16A:
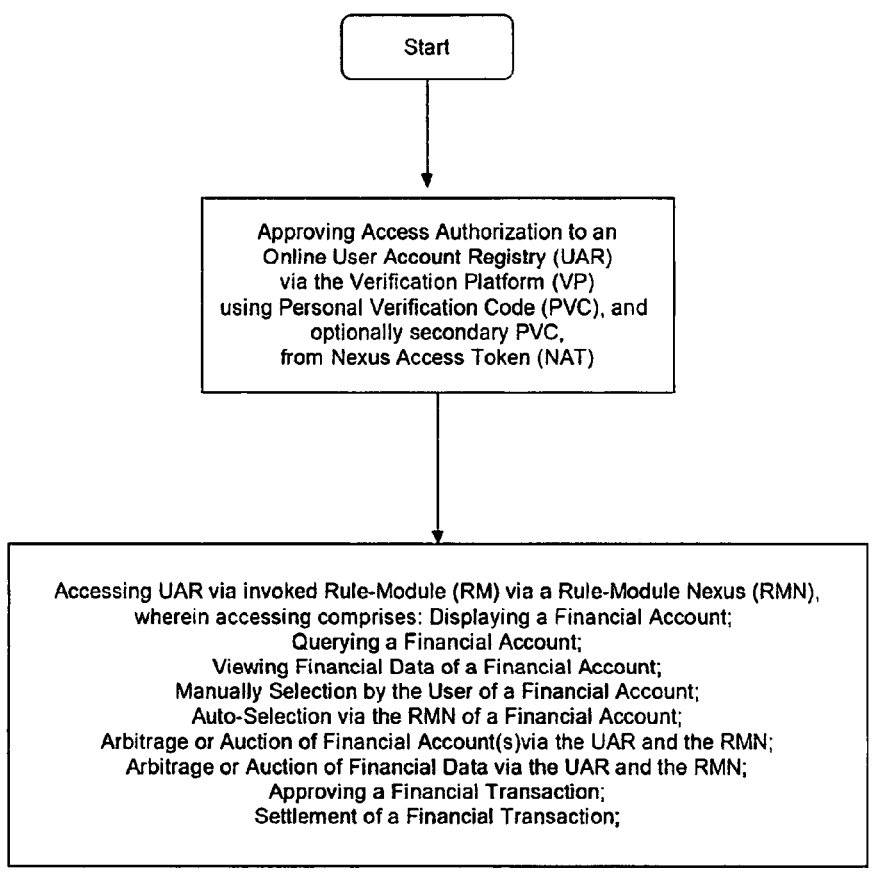
Figures 3, 16A:
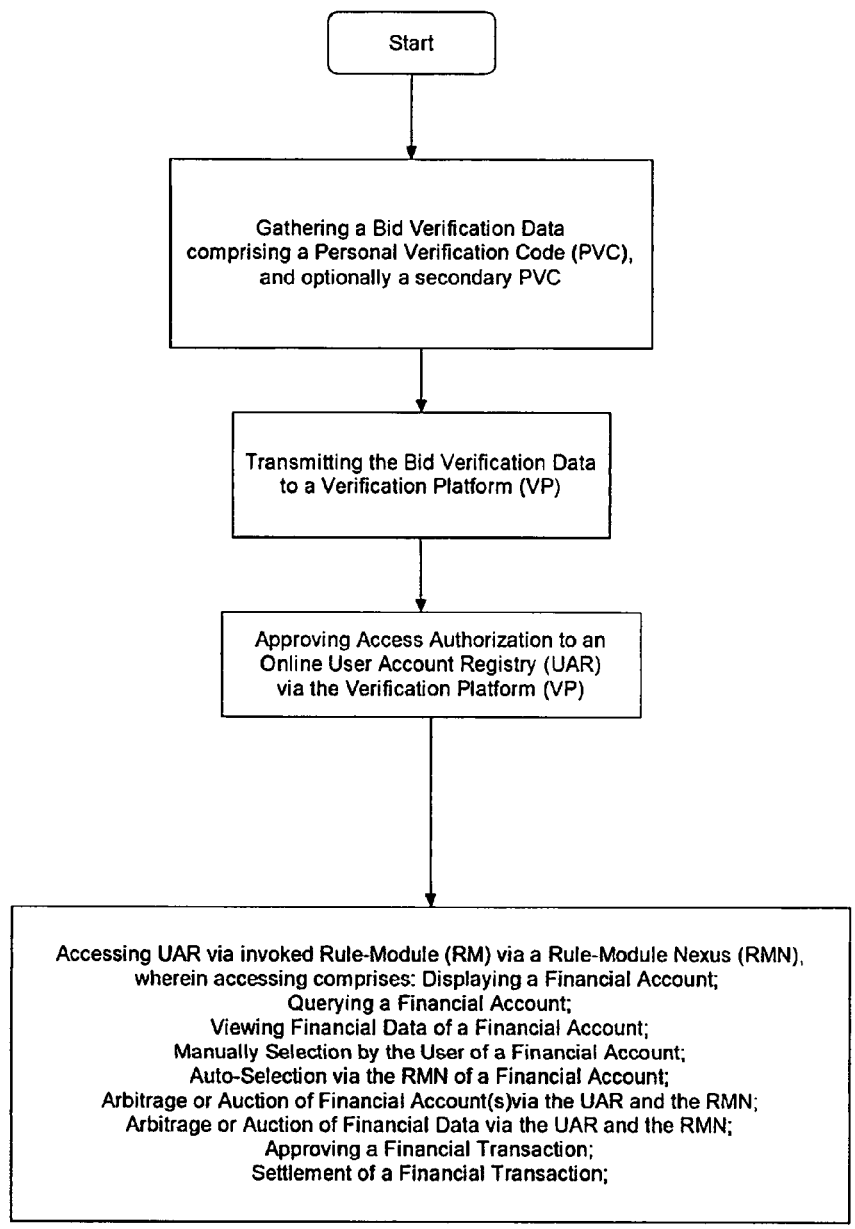

FIG. 15 and FIG. 16 show embodiments of credit and debit transactions executed via the Rule-Module Nexus 14: a User's Unique User Code (UUC) 200 is scanned from a Nexus Access Token (NAT) 62 by the User Interface Apparatus (UIA) 16; optionally, the User enters a Personal Verification Code (PVC) 202 into the UIA 16, wherein the UUC 200 (or optionally a UUC 200—PVC 202) are encrypted; the UUC 200 (or optionally a UUC 200—PVC 202) packet is transmitted to the Rule-Module Nexus (RMN) 14 for User verification and, upon verifying the User, Financial Account 65 access via the User's UAR 15. The RMN 14 invokes Rule-Modules 50 of the User, transmits Visible Signatures 81 of a plurality of proprietary Financial Accounts 65 to the UIA 16, optionally with Account Transaction Data 172 along with the User's name and Private Code 79 for presentation to the User via Display 6. In this embodiment, the User views the Private Code 79 and Financial Accounts 65 on the Display, and selects a Financial Account 65 either by entering an alpha-numeric code, or touching a Visible Signature 81 of a Financial Account 65. The UIA 16—Transaction Terminal 2 constructs a Financial Transaction Request Message 251 either automatically if the UIA 16 is integrated with the Transaction Terminal-Electronic Cash Register (ECR) 2, or; manually by a cashier if the UIA 16 is not integrated directly to the Transaction Terminal-ECR 2, which is then transmitted via the Network 28 to an Account Issuer (Authorized Issuer)—Merchant platform 28. The UIA 6—Transaction Terminal 2 at Authorized Issuer-Merchant either transmits the encrypted financial transaction to a modem bank at the Authorized Issuer-Processor platform 28 which handles Authorized Issuer-Merchant's credit transactions on behalf of Authorized Issuer-Merchant's Acquiring Bank platform 28, or, transmits the encrypted financial transaction to the RMN 14, which then forwards it to the Authorized Issuer-Processor platform 28; the selected Financial Account Data (or Account Transaction Data) 172 tells the Authorized Issuer-Processor platform 28 to route the Transaction Data (e.g., issuing bank code and transaction amount) 172 to the appropriate online Network 18, with a query as to whether the account is valid and the transaction can be authorized; the account data tells the Authorized Issuer-Processor platform 28 to route the query to the Authorized Issuer-Issuing Bank platform 28, which confirms that the account is valid and that the credit balance is sufficient to cover the amount of the transaction, wherein the Authorized Issuer-Issuing Bank 28 platform responds affirmatively to the Authorized Issuer-Processor platform 28; the Authorized Issuer-Processor 28 platform hands off the approval to the Authorized Issuer-Acquirer Bank platform 28, which routes the approval to Authorized Issuer-Merchant platform 28 and marks Authorized Issuer-Merchant's account for settlement.

FIG. 15 also shows an embodiment of User verification further comprising a User facial photograph display, wherein upon the VP 12 outputting a positive matching determination that the User is authorized to access the rule-module database, the RMN 14 transmits the User's registered facial photograph 7 for the UIA 16 or the Transaction Terminal 2 to present via a Display 7 for a third-party present, such as a cashier, in real-time during the financial transaction, to visually compare the User's actual face with the User's displayed facial photograph 7, for affirming or denying that the authentic User is providing the UUC 200 and/or PVC 202. Illustrative embodiments of this transaction include purchasing alcohol, tobacco, and/or medications, where the verifying the identify of the User may be important.

FIG. 16A to FIG. 16D show a flow charts of embodiments for accessing a User Account Registry via a Verification Platform.

Figure 16B:
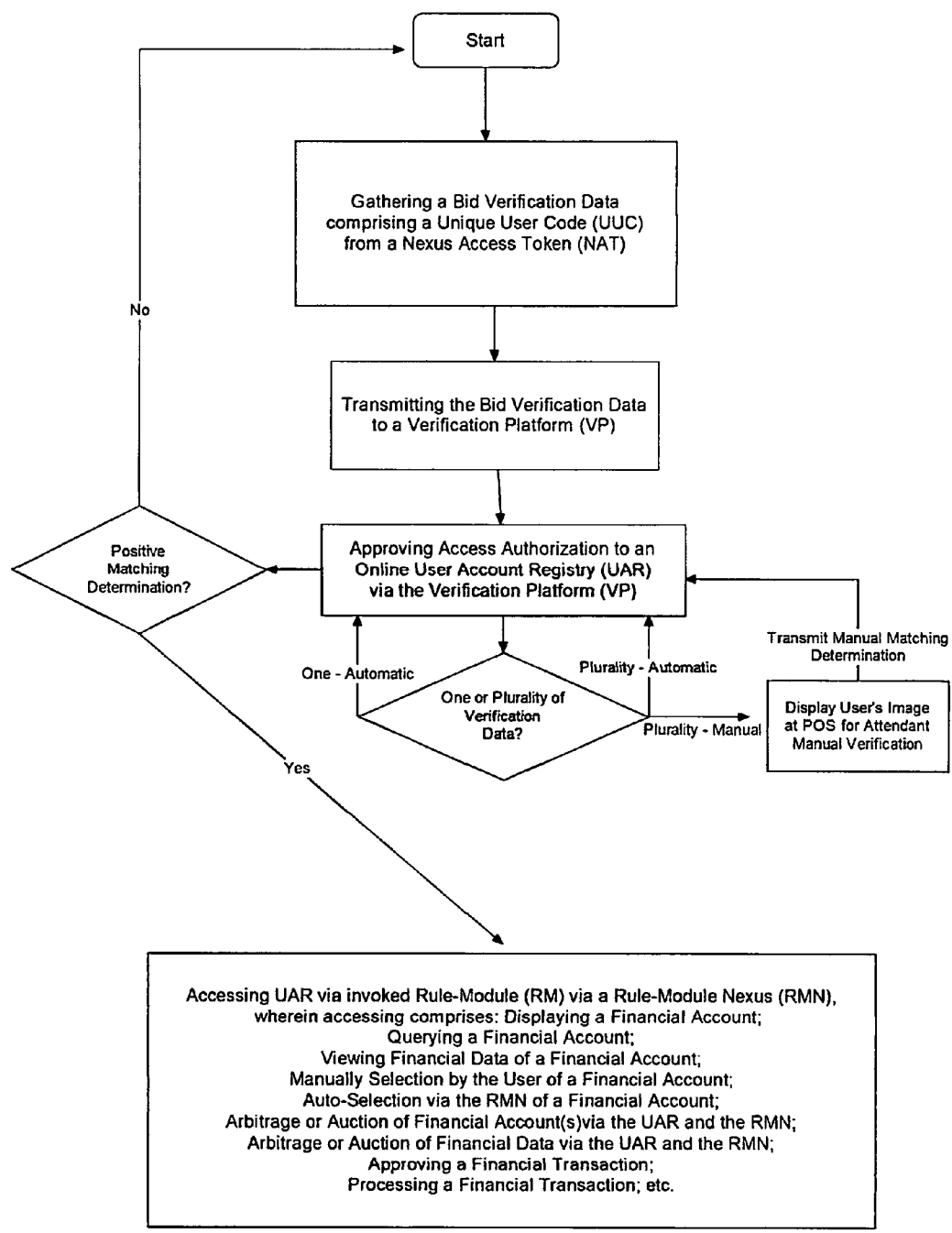
Figures 1, 16B:
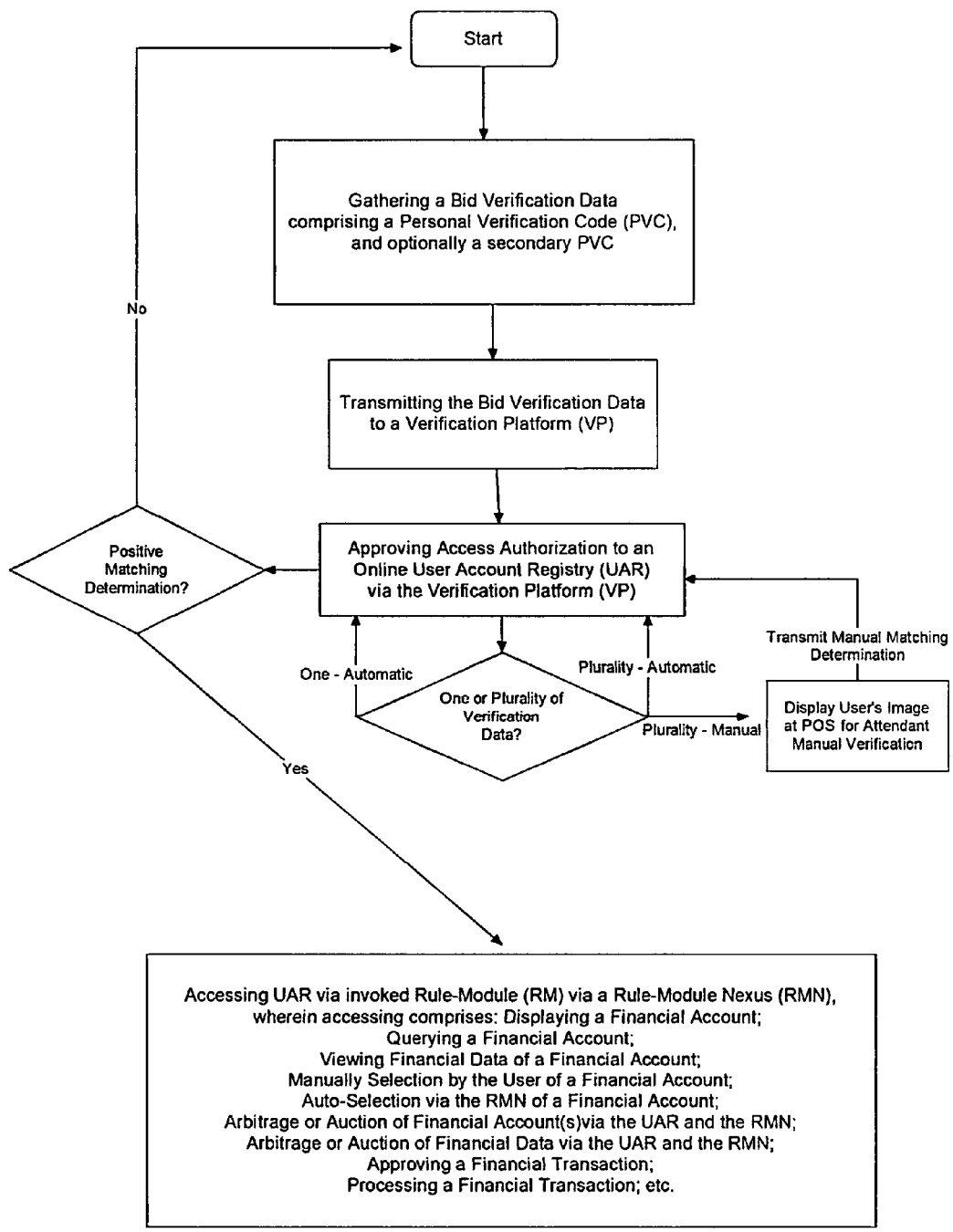
Figure 16C:
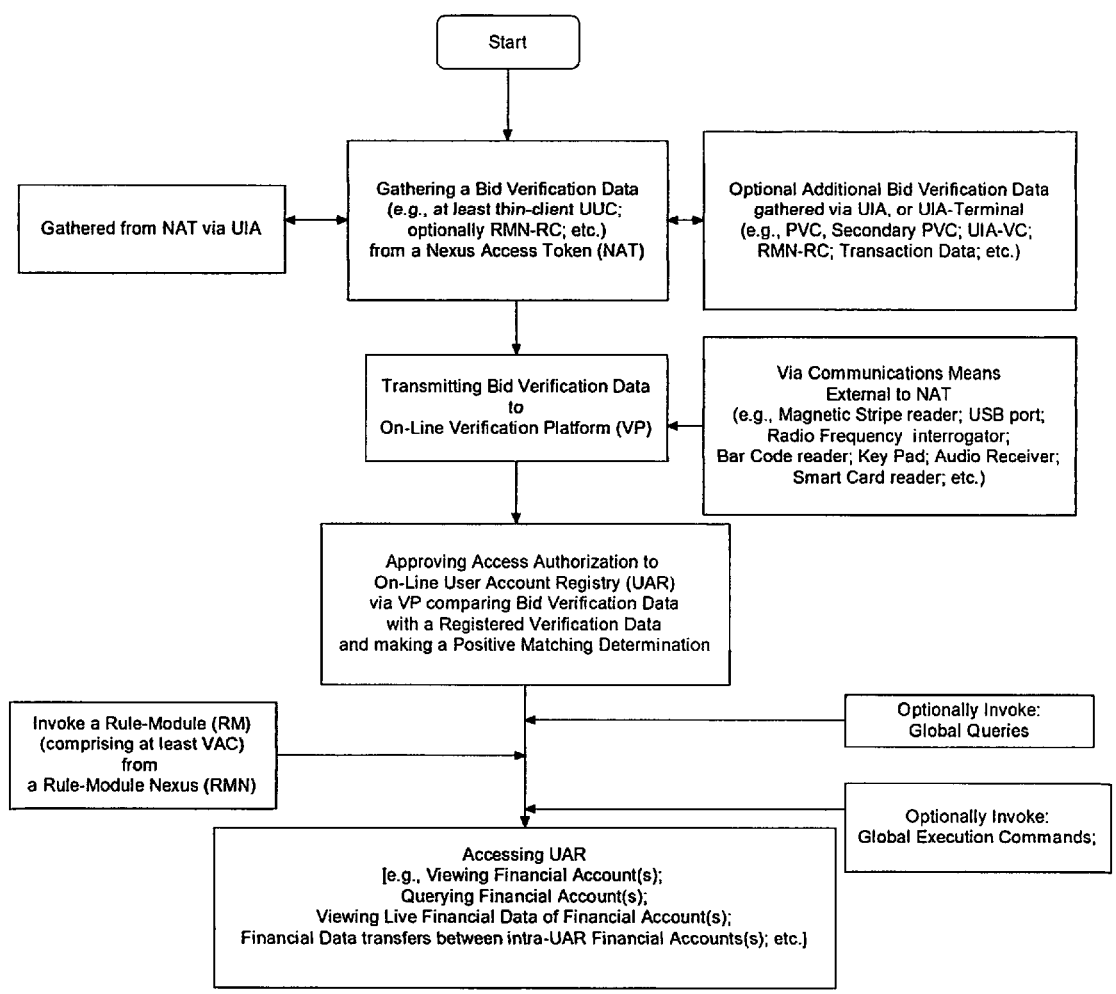
Figures 1, 16C:
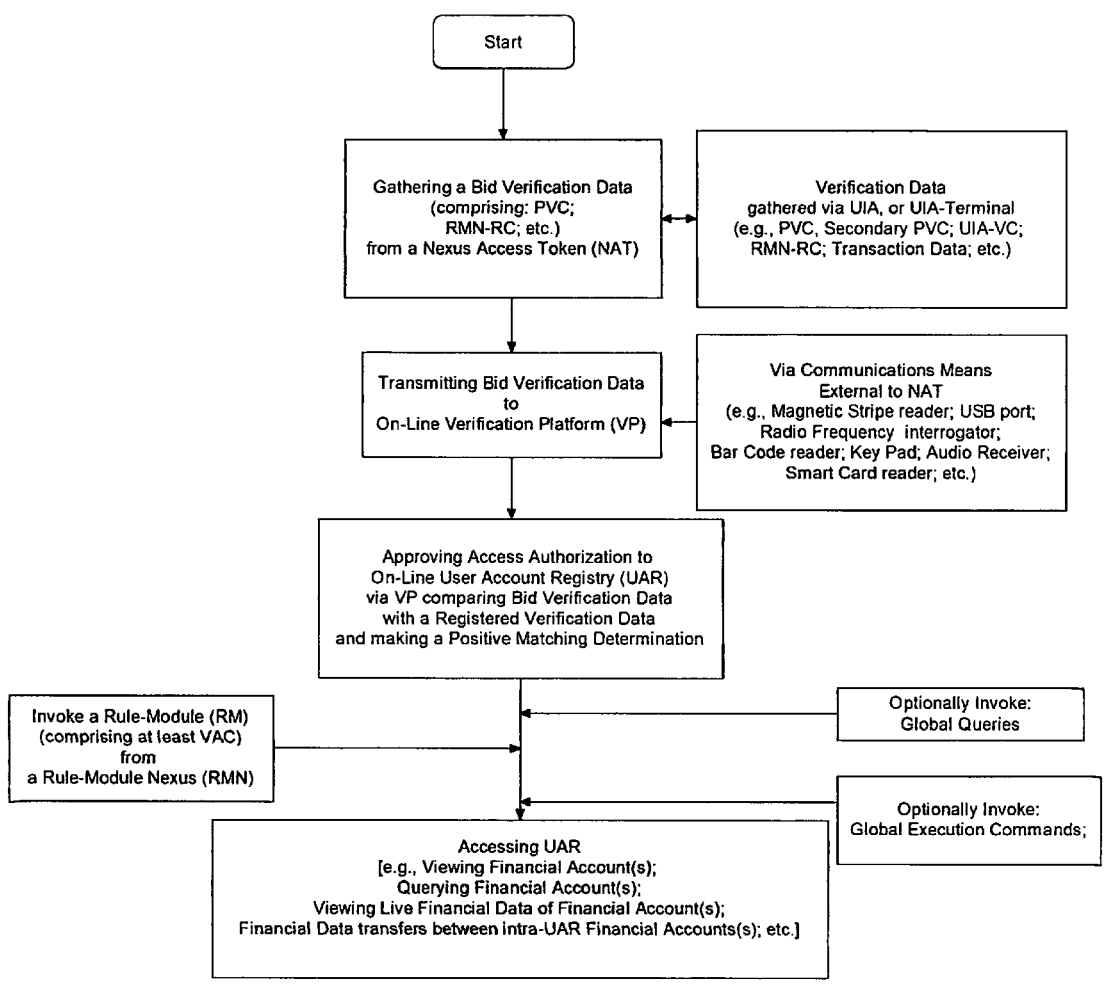
Figure 16D:
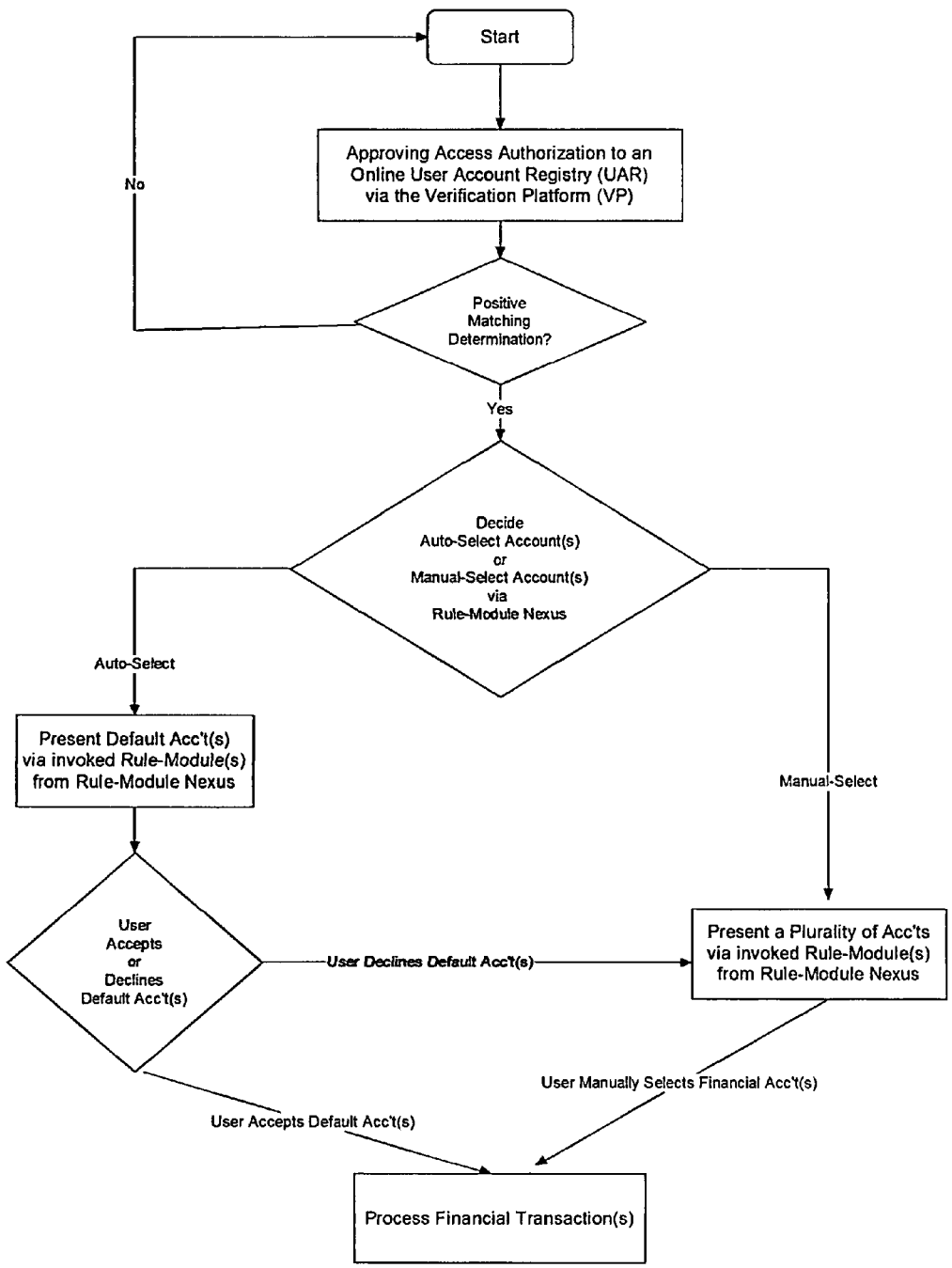

FIG. 16B is illustrative of one embodiment of the Verification Platform 12, comprising: verification via one factor, and; verification via a plurality of factors. Said factors comprise verification data, such as a UUC 200, a PVC 202, a photograph display, and the like. In one embodiment, verifying access authorization is electronic and automatic via Verification Platform 12. In another embodiment, verifying access authorization is electronic and manual, via the RMN 14 transmitting the User's registered facial photograph 7 for the UIA 16 or the Transaction Terminal 2 to present via a Display 7 for a third-party present, such as a cashier, in real-time during the financial transaction, to visually compare the User's actual face with the User's displayed facial photograph 7, and to affirming or denying, via manual data-entry to the Terminal 2, that the authentic User is providing the UUC 200 and/or PVC 202.

In another illustrative embodiment, the invention comprises a method for providing approval of an age-restricted or identity-restricted transaction conducted by a User, comprising: receiving, at an unattended age verification station (UIA 16 or UIA 16-Terminal 2), at least one UUC 200 (or UUC 200—PVC 202) proffered by the User via a UIA 16 (or UIA 16-Terminal 2); sending the at least one UUC 200 (or UUC 200—PVC 202) to at least one RMN 14, wherein the at least one database has at least one UUC 200 (or UUC 200—PVC 202) record stored therein, wherein the at least one UUC 200 (or UUC 200—PVC 202) record contains a reference of the User's age; comparing, at the at least one database, the at least one UUC 200 (or UUC 200—PVC 202) to the at least one UUC 200 (or UUC 200—PVC 202) record stored in the at least one database; making a first determination, at the at least one database, whether the at least one UUC 200 (or UUC 200—PVC 202) matches the at least one UUC 200 (or UUC 200—PVC 202) record stored in the at least one database; in the event the at least one UUC 200 (or UUC 200-PVC 202) matches the at least one UUC 200 (or UUC 200—PVC 202) record stored in the at least one database, making a second determination whether the User's age information in the reference meets at least one system parameter; in the event that the age mapped to the UUC 200 (or UUC 200—PVC 202) record meets the at least one system parameter, approving the age-restricted or identity-restricted transaction at the at least one database; and receiving, at the unattended age verification station (UIA 16 or UIA 16-Terminal 2), confirmation of the age-restricted or identity-restricted transaction approval.

In one embodiment, the at least one system parameter is defined by the age verification station (UIA 16 or UIA 16—Terminal 2).

In one embodiment, the steps of sending and receiving comprise sending and receiving encrypted data.

In one embodiment, sending the at least one UUC 200 (or UUC 200—PVC 202) to the at least one RMN 14 further comprising sending at least one of a location for the unattended age verification station (UIA 16 or UIA 16—Terminal 2), a time of age-restricted or identity-restricted transaction, a transaction type, a reference code, a detailed access record, and blood alcohol content of the User.

In one embodiment, a system user's information is stored in the at least one RMN 14.

In one embodiment, transaction information pertaining to the age-restricted or identity-restricted transaction is compared to the system user information stored in the at least one RMN 14.

In one embodiment, the unattended age verification station (UIA 16 or UIA 16—Terminal 2) is selected from the group consisting of a vending machine, a kiosk, a PC, a wireless device, a computing device, and a storage device.

In one embodiment, the unattended age verification station (UIA 16 or UIA 16—Terminal 2) is an unattended point of sale device.

In one embodiment, the age-restricted or identity-restricted transaction comprises a financial transaction.

In one embodiment, the financial transaction settlement is conducted via a financial transaction system, wherein the financial transaction system comprises the at least one UUC 200 (or UUC 200—PVC 202) being used to authenticate the financial transaction settlement.

In one embodiment, the second determination comprises a reliability determination and includes assessing whether or not the at least one UUC 200 (or UUC 200—PVC 202) is being used fraudulently.

In one embodiment, approval of an age-restricted or identity-restricted transaction conducted by a User, comprises: receiving, at an unattended age verification station (UIA 16 or UIA 16—Terminal 2), at least one UUC 200 (or UUC 200—PVC 202) proffered by the User via a UIA 16 (or UIA 16—Terminal 2); receiving, at the unattended age verification station (UIA 16 or UIA 16—Terminal 2), at least one UUC 200 (or UUC 200—PVC 202) proffered by the User; sending the UUC 200 (or UUC 200—PVC 202) proffered by the User from the unattended age verification station (UIA 16 or UIA 16-Terminal 2) to at least one RMN 14; wherein the at least one database has at least one UUC 200 (or UUC 200—PVC 202) record stored therein, wherein the at least one UUC 200 (or UUC 200—PVC 202) record contains a reference of the User's age, and wherein the at least one database has at least one UUC 200 (OR UUC 200—PVC 202) record; comparing, at the at least one database, the at least one UUC 200 (OR UUC 200—PVC 202) to the at least one UUC 200 (OR UUC 200—PVC 202) record; making, at the at least one database, a first determination whether the at least one UUC 200 (OR UUC 200—PVC 202) matches at least UUC 200 (OR UUC 200—PVC 202) record; in the event the at least one UUC 200 (OR UUC 200—PVC 202) matches the at least one UUC 200 (OR UUC 200—PVC 202) record, making a second determination whether the reference meets at least one system parameter; in the event the reference meets the at least one system parameter, pre-approving, at the at least one database, the at least one UUC 200 (or UUC 200—PVC 202) record as a potential matching UUC 200 (or UUC 200—PVC 202) record; receiving, at the unattended age verification station (UIA 16 or UIA 16—Terminal 2), the potential matching UUC 200 (or UUC 200—PVC 202) record from the at least one database; comparing, at the unattended age verification station (UIA 16 or UIA 16-Terminal 2), the at least one UUC 200 (or UUC 200—PVC 202) with the potential matching UUC 200 (or UUC 200—PVC 202) record; making, at the unattended age verification station (UIA 16 or UIA 16—Terminal 2), a third determination whether the at least one UUC 200 (or UUC 200—PVC 202) matches the potential matching UUC 200 (or UUC 200—PVC 202) record; in the event that the at least one UUC 200 (or UUC 200—PVC 202) matches the potential matching UUC 200 (or UUC 200—PVC 202) record; making, at the unattended age verification station (UIA 16 or UIA 16—Terminal 2), a fourth determination whether the matching UUC 200 (or UUC 200—PVC 202) record was pre-approved at the at least one database; and in the event the matching UUC 200 (or UUC 200—PVC 202) record was pre-approved at the at least one database, approving, at the unattended age verification station (UIA 16 or UIA 16—Terminal 2), the age-restricted or identity-restricted transaction.

In one embodiment, the age verification station (UIA 16 or UIA 16—Terminal 2) sends to the at least one RMN 14 confirmation of completion of the age-restricted or identity-restricted transaction.

In one embodiment, a system user information is stored in the at least one RMN 14.

In one embodiment, a transaction information pertaining to the age-restricted or identity-restricted transaction is compared to the system user information stored in the at least one RMN 14.

In one embodiment, providing approval of an age-restricted or identity-restricted transaction conducted by a User, comprises: receiving, at an unattended age verification station (UIA 16 or UIA 16—Terminal 2), at least one UUC 200 (or UUC 200—PVC 202) proffered by the User via a UIA 16 (or UIA 16—Terminal 2); receiving, at the unattended age verification station (UIA 16 or UIA 16—Terminal 2), at least one age-restricted or identity-restricted action proposal proffered by the User; associating at least one proposal code with the at least one age-restricted or identity-restricted action proposal; sending at least one UUC 200 (or UUC 200—PVC 202) proffered by the User from the unattended age verification station (VIA 16 or UIA 16—Terminal 2) to at least one RMN 14; wherein the at least one database has at least one UUC 200 (or UUC 200—PVC 202) record stored therein, wherein the at least one UUC 200 (or UUC 200—PVC 202) record contains a reference of the User's age, and wherein the at least one database has at least one UUC 200 (OR UUC 200—PVC 202) record; sending the at least one proposal code affiliated with the age-restricted or identity-restricted action proposal proffered by the User from the unattended age verification station (UIA 16 or UIA 16—Terminal 2) to the database; comparing, at the at least one database, the at least one UUC 200 (or UUC 200—PVC 202) to the at least one UUC 200 (or UUC 200—PVC 202) record; making a first determination, at the at least one database, whether the UUC 200 (or UUC 200—PVC 202) matches the at least one UUC 200 (or UUC 200—PVC 202) record; in the event the at least one UUC 200 (or UUC 200—PVC 202) matches the at least one UUC 200 (or UUC 200—PVC 202) record, making a second determination whether the reference meets a parameter, wherein the parameter is indicated by the at least one proposal code; in the event the reference meets the parameter, approving the age-restricted or identity-restricted transaction at the at least one database; and receiving, at the unattended age verification station (UIA 16 or UIA 16—Terminal 2), confirmation of the age-restricted or identity-restricted transaction approval.

In one embodiment, enrolling a system user in a transaction system comprises: providing at least one unattended age verification station (UIA 16 or UIA 16—Terminal 2), wherein the least one unattended age verification station (UIA 16 or UIA 16—Terminal 2) is configured to access at least one RMN 14, wherein the at least one database has at least one UUC 200 (or UUC 200—PVC 202) record stored therein, wherein the at least one UUC 200 (or UUC 200—PVC 202) record is associated with the system user and contains a reference of the User's age; prompting the system user to proffer an enrollment data comprising age information, personal information, and at least one UUC 200 (or UUC 200—PVC 202)s; transmitting to the at least one RMN 14 the enrollment data; and storing in the at least one RMN 14 the enrollment data.

In one embodiment, the reference is a record of at least one of a government issued identification data, a driver's license data, a passport data, a birth certificate data, and a credit data.

In one embodiment, the enrollment data comprises at least one of a driver's license data, a social security number, an address, and a phone number.

In one embodiment, the enrollment data is acquired via a process selected from the group consisting of swiping, scanning and hand-keying.

In one embodiment, the system user additionally proffers a User UUC 200 (OR UUC 200—PVC 202).

In one embodiment, the User UUC 200 (OR UUC 200—PVC 202) comprises at least one of a unique number and a reasonably unique number.

In one embodiment, the enrollment data comprises a digital image of the at least one UUC 200 (or UUC 200—PVC 202).

In one embodiment, the enrollment data comprises a record maintenance UUC 200 (OR UUC 200—PVC 202).

FIG. 15C illustrates an illustrative embodiment using verification data of a 1° PVC (and optionally a 2° PVC), wherein the settlement process is shown in more detail. The User 10 will select a UIA 16 or Transaction Terminal 2 in order to make a Financial Transaction Authorization Request 251, which may include a Money Transfer Kiosk (MT-Kiosk), as may be found in a Western Union retail site. The User verification data, RMN-RC 61 and the Financial Transaction Authorization Request 251 may be encrypted in a Transaction Packet 11a which is transmitted to an EFT (electronic funds transfer) Network 29. A Merchant Acquirer Platform 38a provides identifying and transaction information in an electronic Merchant Packet 11b which is also transmitted, as appropriate to the EFT Network 29. The combined Transaction Packet 11a and Merchant Packet 11b are then transmitted via the RMN 14 for processing by a Stored Value Processing System (SVPS or SVP Systems) 50a, which may optionally be within, or external to, the RMN 14. The SVPS 50a initiates an Authorization Process 53a and a Settlement Process 54a using the User Account Registry (UAR) 15. The Account Issuer(s) Platforms 28 then transmit the funds via electronic transfer via the Federal Reserve ACH System 62 via Third-Party ACH Platform 62, wire transfer via Wire Server (or Platform) 51 or via a proprietary ATM/POS System (e.g., Visa®, MasterCard®, Pulse®) 64 depending on the identity provided by the Account Issuer. The funds are then credited to the Merchant Bank(s) 66, 68.

FIG. 15D illustrates an illustrative embodiment of the sub-routing number and consolidation account data routine. The Issuer Bank 58, 60a may obtain a sub-routing number from the Federal Reserve Bank 62 and create a stored value consolidation Financial Account 65. The SVPS 50a may process transactions which are routed to the sub routing number. Internally the SVPS 50a may maintain a stored value consolidation Financial Account 65 for each Issuer Bank 58, 60a. Both accounts, consolidation accounts at the Issuer Bank 58, 60a and the consolidation account maintained by the SVPS 50a, may tally as stored value processing updates the internal consolidation account in real time upon a transaction processing, sending batch updates to the Issuer Bank 58, 60a. At the end of a processing day, the SVPS 50a may send an "on us" type of ACH transaction to the Issuer Bank 58, 60a. Specifically, the SVPS 50a may maintain account and transaction information, whereas the stored value consolidation Financial Account 65 may represent the total balance of all stored value processing Financial Accounts 65 with limited net daily charge transactions. Optionally, no individual account transactions or balances are reflected in the SVPS 50a.

FIG. 16 also shows an embodiment of the Subset RMN Platforms 17 co-located with an Authorized Issuer-Processor 28, including private label "house accounts", Visa™, MasterCard™, Discover™, Interlink™ and American Express™. Upon the RMN's 14 verification of the User's bid UUC 200 (or optionally the User's bid UUC 200—PVC 202) data, the credit/debit card and merchant point-of-sale financial transactions are processed through both the RMN 14 authorized partner platforms 28 and third-party, non-partner Authorized Issuer-Acquirers platforms 28. The Master RMN Platforms 14 may also update the Subset RMN Platforms 17.

In another illustrative embodiment of the invention, upon the Verification Platform's 12 successful verification of the User from their bid UUC 200 (or optionally from their bid UUC 200—PVC 202), other embodiments of Execution Commands 52 governing electronic transmission access comprise permitting the User: to access their health insurance account and validate their prepaid benefits to a health-care provider prior to being admitted to a hospital; to access their prepaid entertainment account and validate to admittance personnel their eligibility to attend an entertainment event, such as a live music concert on a predetermined day, at a predetermined time and to sit in a predetermined seat; to access their prepaid video club rental account and validate to an Account Issuer their eligibility to rent videos under their pre-paid membership account; to access their dining club privileges at a restaurant using their prepaid membership account for recurring charges.

FIG. 17 shows a flow chart of registration and transaction processing with the Rule-Module Nexus.

Figure 18:
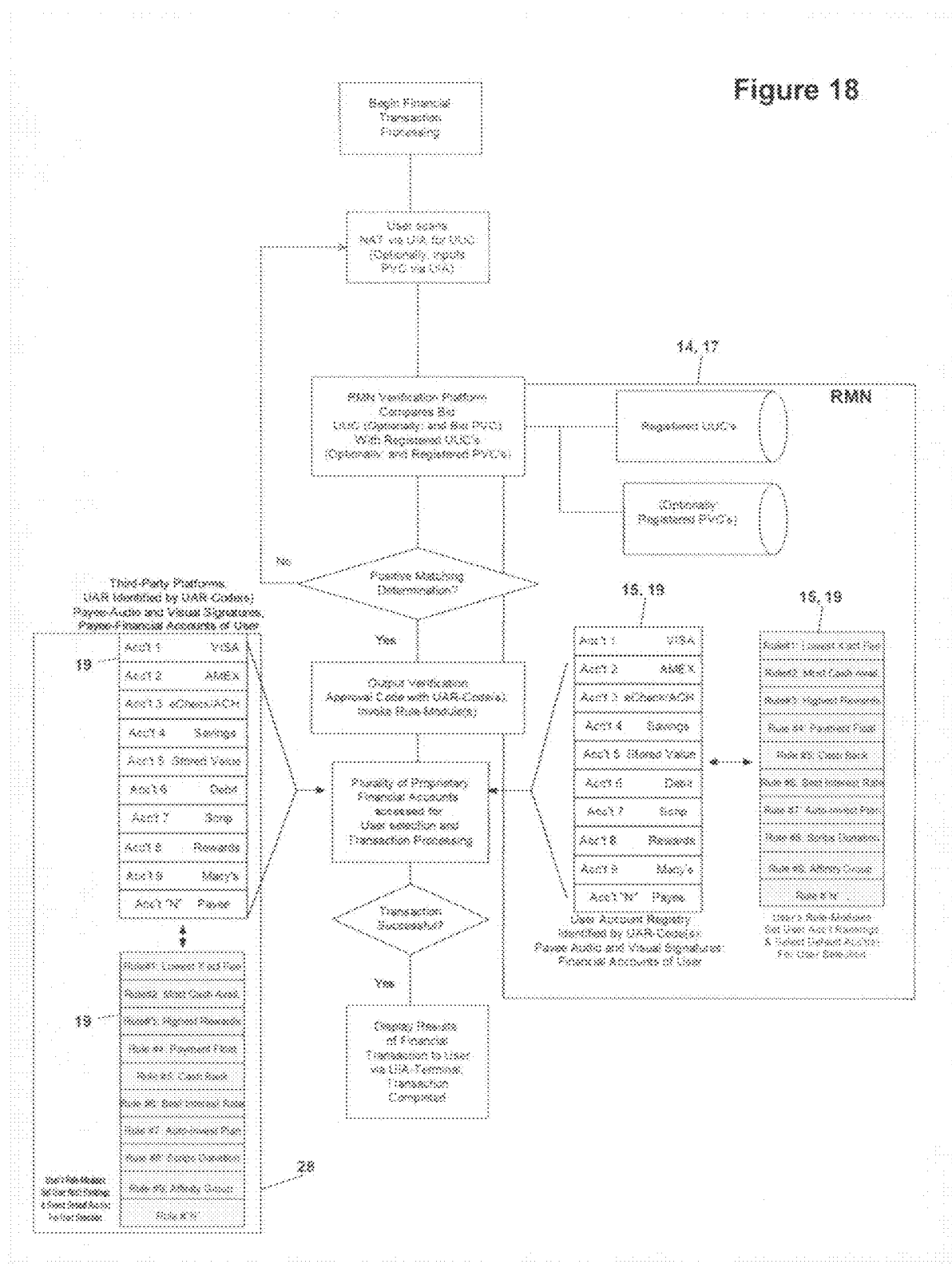
Figure 18A:
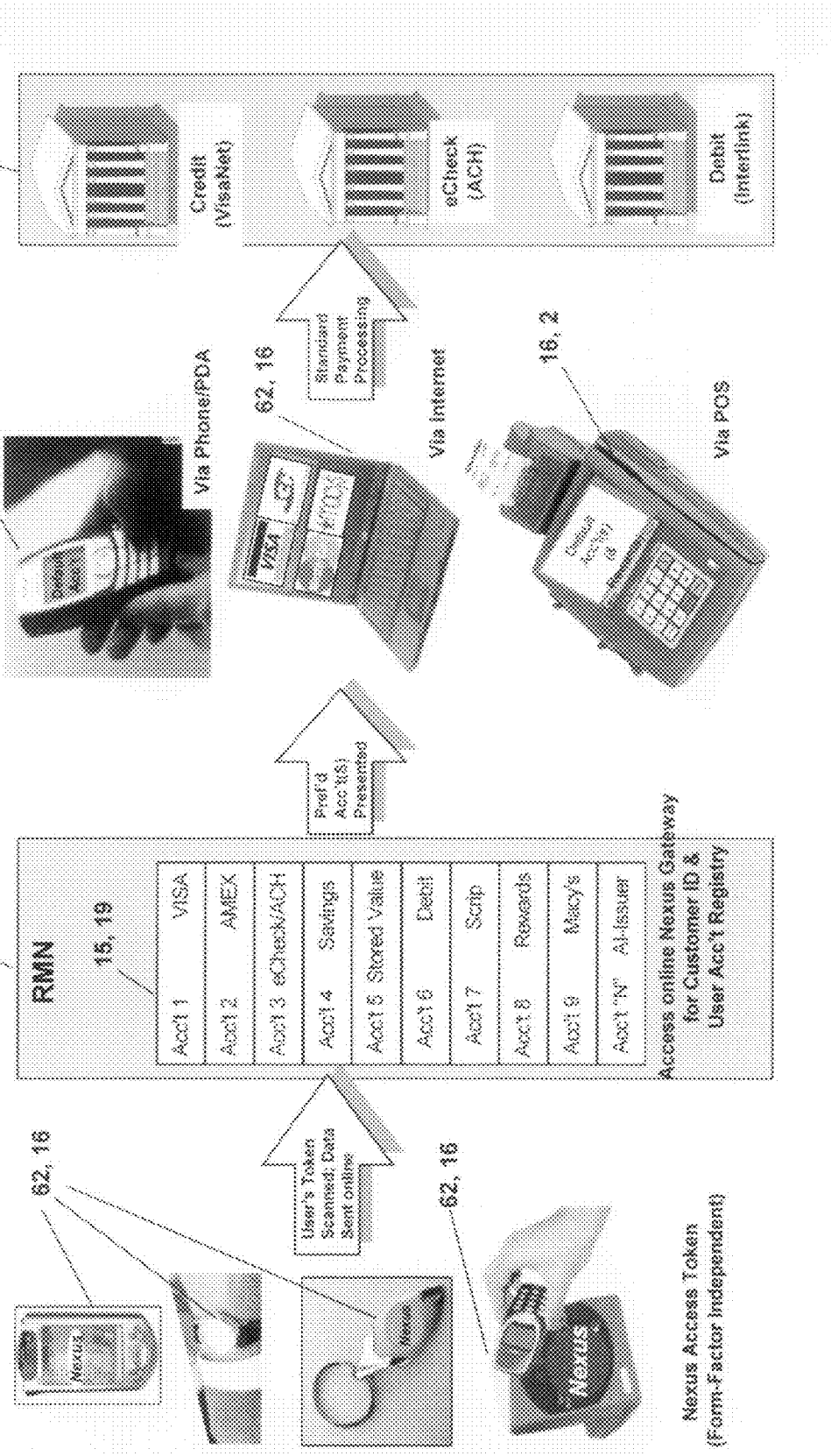
Figures 1, 18A:
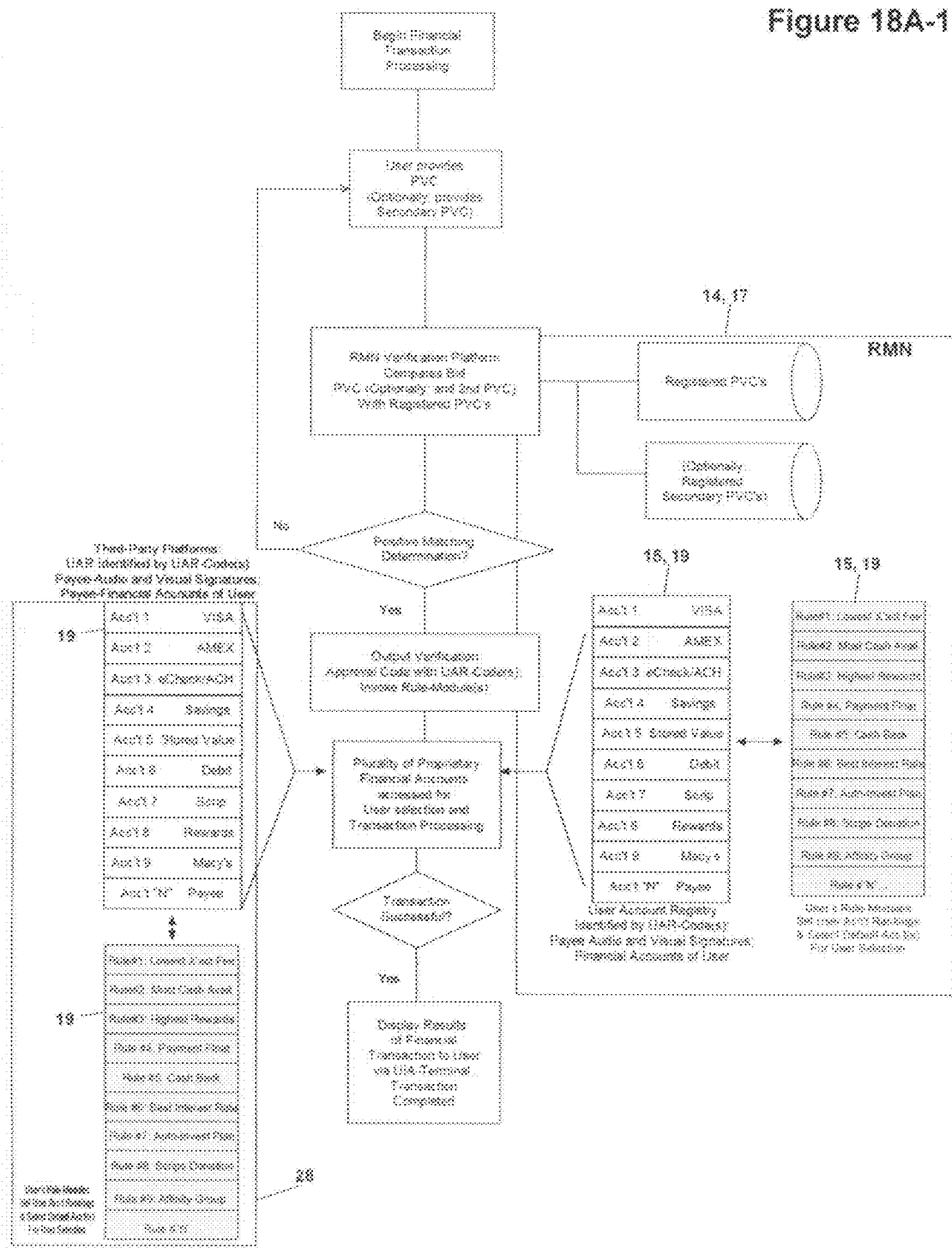
Figure 18E:
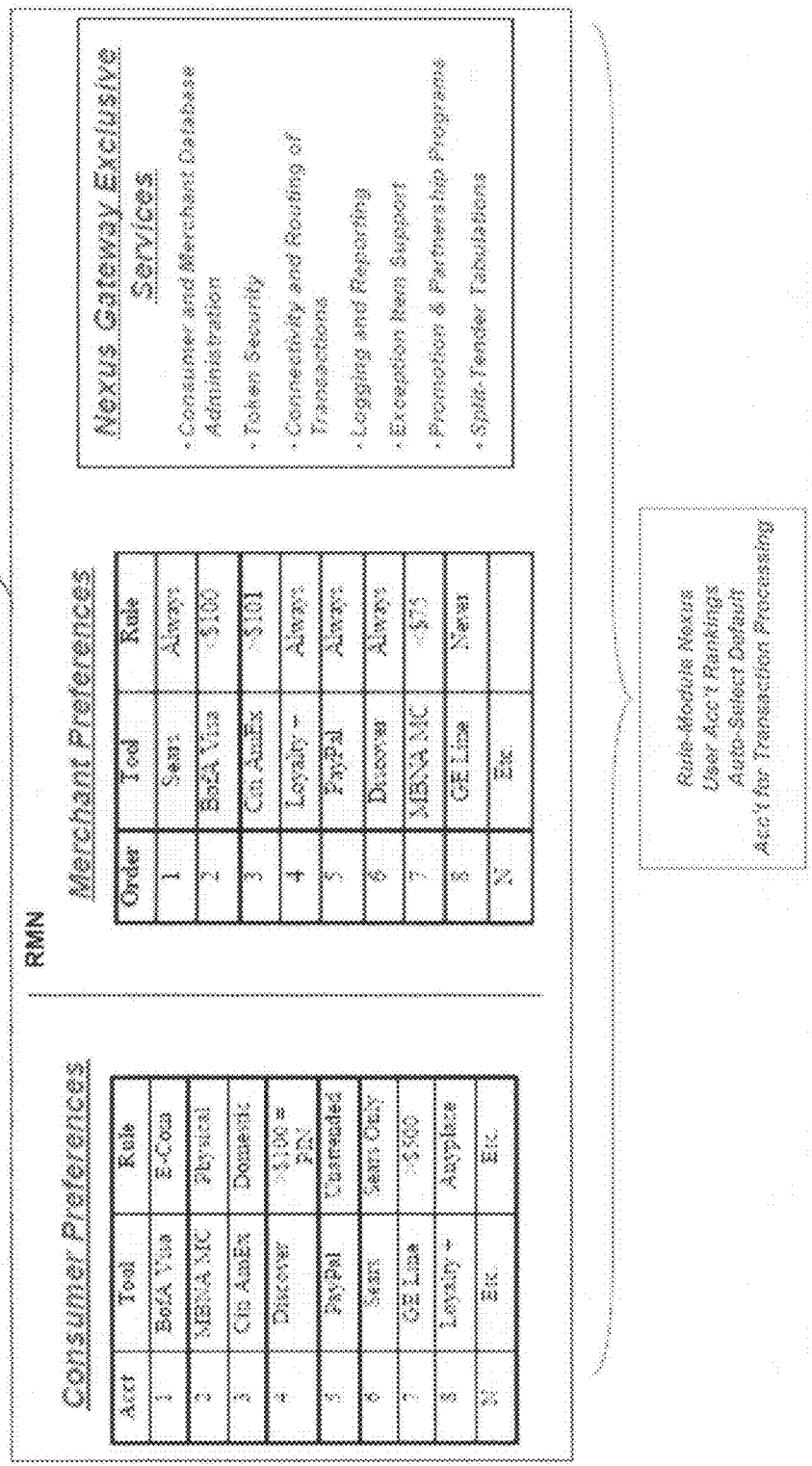
Figure 18L:
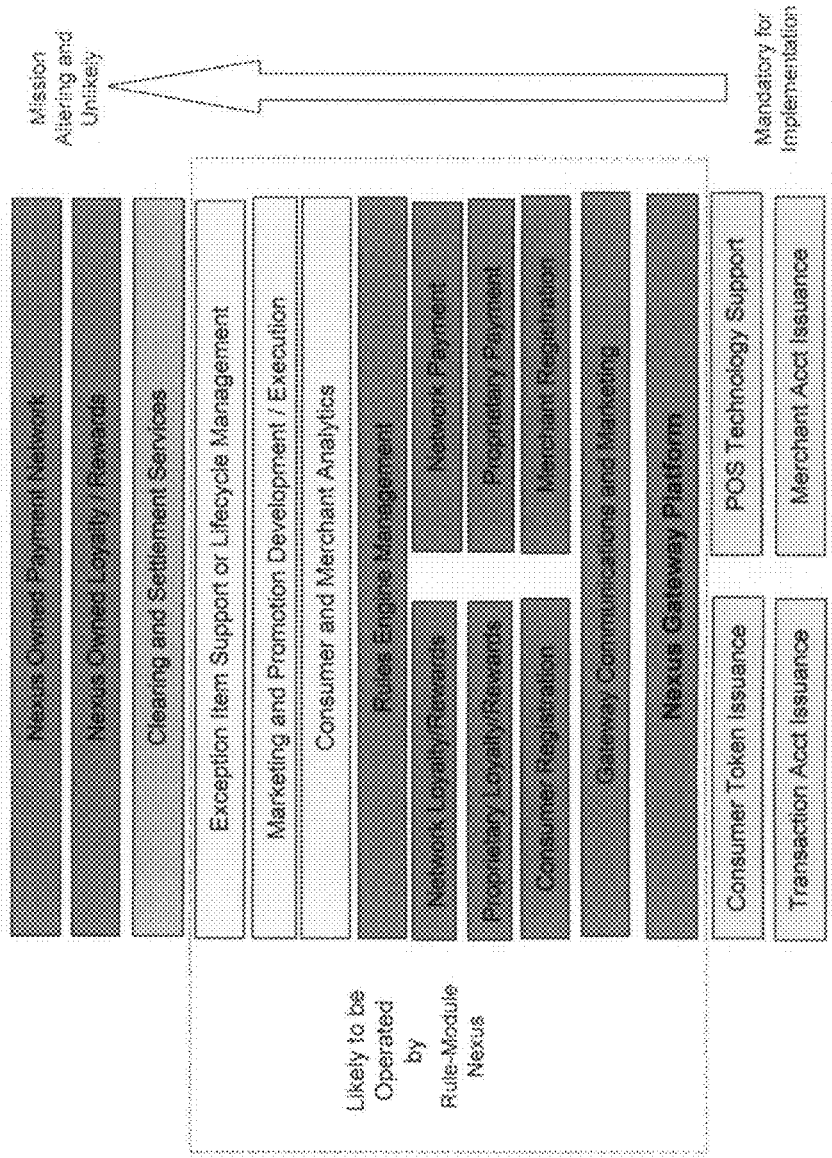

FIG. 18 shows a flow chart of registration and transaction processing with the Rule-Module Nexus 14, User Account Registry 15, and Third-Party Platforms 28.

In another embodiment of the invention, the Execution of a Rule-Module (RM) 50 and/or an Execution Command (EC) 52 by the Execution Platform (Execution Platforms) 38 may result in a declined financial transaction due to unidentifiable data comprising: bid UUC 200; bid UUC 200—bid PVC 202; a lack of an identifiable Account Issuer platform 28; a closed or inoperative participating Account Issuer platform 28; a closed Financial Account 65; a prior fraud record, and/or; some other immediately detectable problem condition. If the transmission is declined, the Master Rule-Module Nexus 14 or the Verification Platform 12 transmits the decline notification back to the UIA 16.

FIG. 23 through 28 show the process flow of a financial transaction via the Rule-Module Nexus 14, including: the User presents a Nexus Access Token (NAT) 62 to the User Interface Apparatus (UIA) 16 for scanning of a bid UUC 200. Optionally, the User also inputs a bid Personal Verification Code (PVC) 202 into a User Interface Apparatus (UIA) 16. The UIA 16, optionally integrated with a POS-Transaction Terminal 2, builds an encrypted packet for a Transaction Request 251, wherein the UUC 200 (or optionally a UUC 200—PVC 202), a UIA Verification Code (UIA-VC) 204 and a reply key are encrypted. Additional Account Transaction Data 172 is appended to the packet from the POS-Transaction Terminal 2, wherein the Merchant Subset Platform (MSP) forwards the encrypted packet to the Rule-Module Nexus 14. The Rule-Module Nexus 14 platforms check the sequence number of the UIA-VC 204, decrypt the UUC 200 (or optionally a UUC 200—PVC 202), using a Message Authentication Code (MAC) for checking the integrity of the encrypted message. The Verification Platform (VP) 12 then compares the bid UUC 200 (or optionally the bid UUC 200—PVC 202) with registered UUCs 200 (or optionally with registered UUCs 200—PVCs 202), to output a matching determination. If there is a positive matching determination, VP 12 issues a Verification Approval Code (VAC) 206, and the RMN 14 invokes at least one Rule-Module 50 of the User, including Pattern-Data 54 and Execution Command 52, to access Financial Account(s) of the User.

In this illustrative embodiment, a transaction is initiated from the UIA 16 when the User's UUC 200 is scanned from his NAT 62 (and optionally, the User also enters his PVC 202) and, along with optionally appending the financial Transaction Data 172 from the POS-Transaction Terminal 2, whereby a Financial Transaction Authorization Request 251 (TRQ1) is transmitted to RMN 14; The RMN 14 transmits a reply packet (TRP1) including User account information is sent back to UIA 16 and POS-Transaction Terminal 2; Once the User has chosen the Financial Account 65, a second Financial Transaction Authorization Request 251 (TRQ2) with transaction amount and selected account is sent to the RMN 14; The RMN 14 will process the transaction with Account Issuer processor, and reply back (TRP2) the results to UIA 16 and POS-Transaction Terminal 2. POS-Transaction Terminal 2 will submit the results to merchant main server (TRQ3).

FIG. 18 through FIG. 18I are illustrative of using Rule-Modules 50 to improve, or optimize, the benefits of financial transactions via the NAT 62 and/or the RMN 14.

In FIG. 18A through FIG. 18E, Rule-Modules 50 within a UAR 15 or a Subset UAR 19 further comprising Ranking 96 the plurality of proprietary Financial Accounts 65, wherein predetermined criteria is used for tagging and Ranking 96 the plurality of proprietary Financial Accounts 65 in a certain order. In an illustrative embodiment, the predetermined criteria for the Ranking 96 further comprises: improving a transaction benefit for a payee (e.g., merchant), an Account Issuer, and/or the user. Improving a transaction benefit further comprises: increasing efficiency; increasing speed; increasing profit; increasing security; decreasing cost; increasing reward incentives, and; invoking a surcharge predetermined by the user.

In an illustrative embodiment, the Ranking 96 further comprises presenting to the user via a UIA 16 a display comprising: a default Financial Account 65; a plurality of Financial Accounts 65, with visibly distinct indicators for the respective Rankings 96 of the Financial Accounts, and; a plurality of Financial Accounts 65 displayed in sequence as a function of their respective Rankings 96.

FIG. 18H illustrates an illustrative embodiment of the RMN 14 (or Subset RMN 17) with a Payee Account Registry (PAR) 46 (or Subset PAR 47), and the Rule-Modules 50 for Ranking 96 the preferences of the Payee for processing a financial transaction, and/or improving the benefits of a financial transaction.

In the event that a Rule-Module 50 is self-conflicting, or is in conflict with another Rule-Module 50, the RMN 14, in an illustrative embodiment, invokes a weighting software formula which sorts the conflicting Rule-Modules 50, weights the conflicting Rule-Modules 50 pursuant to certain criteria, and reconciles any conflicts by determining which Rule-Module(s) 50 will be given greater weight for the processing of the financial transaction.

In embodiments illustrated in FIG. 32A, 32B-1, 32B-2, 32C-1 and 32C-2, transactions are transmitted to centralized National/International (or Global) Gateway Platform 28 and co-located Master RMN 14 (and/or Master UAR 15) in one of two ways: either using an Acquirer Platform 28 or directly from a Merchant Platform 28. The latter scenario is the most common but does not represent the greatest single point of merchant volume.

Figure 32A:
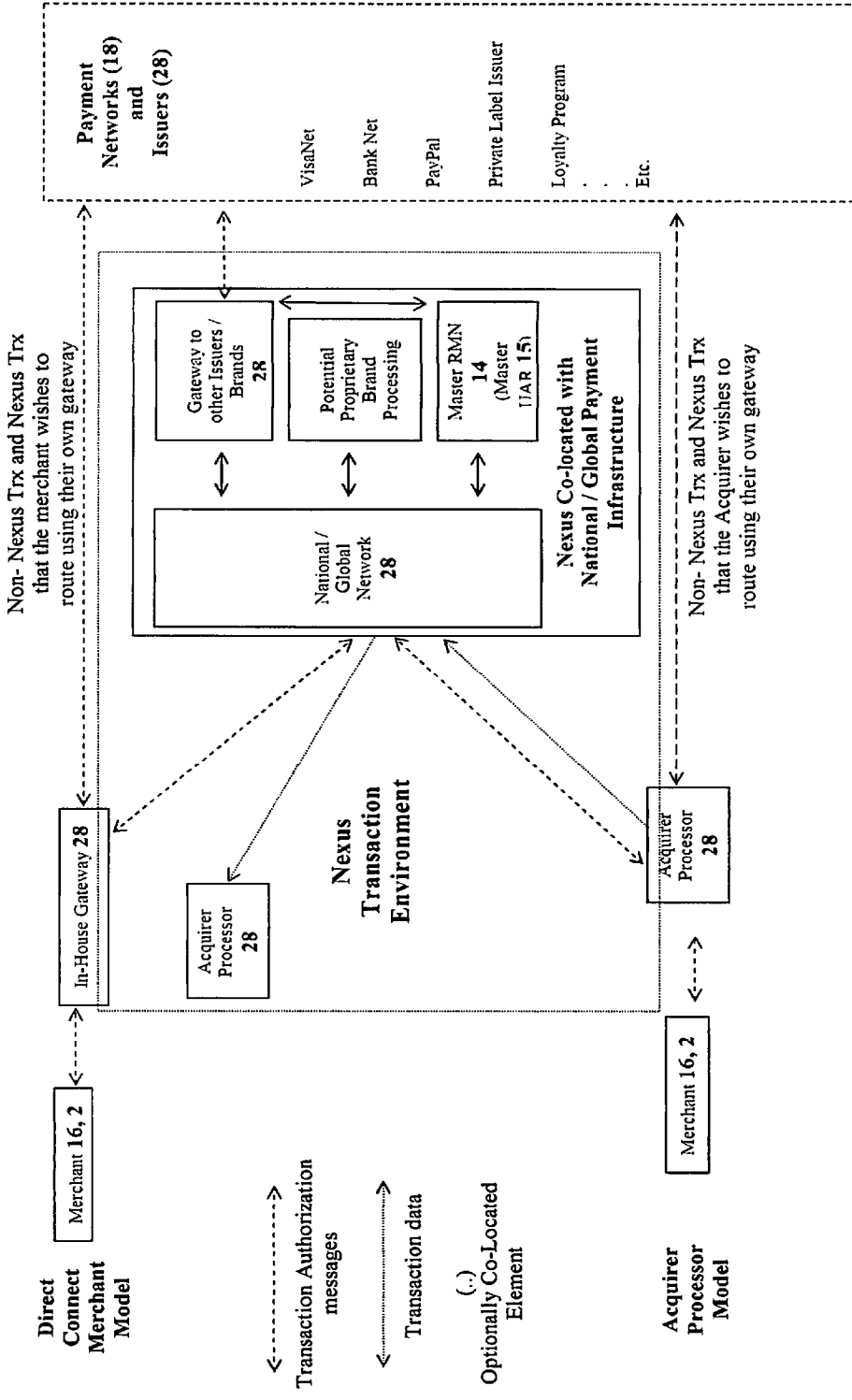

FIG. 32A illustrates an overview of an embodiment of a centralized National/International Gateway Platform 28 and co-located Master RMN 14 system architecture.

FIG. 32B-1 illustrates an embodiment of an Financial Transaction Authorization Request 251 being processed via the Acquirer Platform 28 within a centralized National/International Gateway Platform 28 and co-located Master RMN 14 system architecture, and the following may occur:

The merchant POS system, comprising a UIA 16 and Terminal 2, creates an Financial Transaction Authorization Request 251 (Step 601) based upon a standard message format and presents it to their Acquirer Platform 28. The message format will either be similar to a private label transaction or an existing payment Third-Party Network 18 (e.g. MasterCard®) that has allowed the Master RMN 14 (and/or Master UAR 15) to use a section of their data string, or routing code, series to access their National/International Gateway 28.

In one embodiment, a NAT 62 having a 14-digit UUC 200 with a Bank Identification Number ("BIN") beginning with "79" that can be accepted just like any MasterCard® credit transaction by downloading a UIA 16—Terminal 2 software upgrade with instructions to format a transaction with a UUC 200 beginning with "79" as if the transaction had an data string starting with "5", which is the pre-set routing code to MasterCard®. Acquirer Platforms 28 also arrange routing to MasterCard® so that a "79" is routed as if it were a standard MasterCard® "5".

The Acquirer Platform 28 evaluates the message (Step 602) and: If it is not a transaction for processing via the Master Master RMN 14 (and/or Master UAR 15), the message is routed directly to the Payment Networks 18 and/or the Account Issuer Platforms 28 (Step 602A), or; If the transaction is designated to be further processed via a Master RMN 14 (and/or Master UAR 15), the message is routed to the National/International Gateway Platform 28 (Step 602B) and then to the Master RMN 14 (and/or Master UAR 15) (Step 603B), which may be co-located with the National/International Gateway Platform 28.

The Master RMN 14 (and/or Master UAR 15) further processes and translates the message (Step 604) and transmits the transaction: Back to National/International Gateway Platform 28 with live Financial Account 65 data from the queried UAR 15 (Step 604B), or; Back to the Acquirer Platform 28 with live Financial Account 65 data from the queried UAR 15 (Step 604C), so that the Acquirer Platform 28 can use its own gateway infrastructure to route the transaction onto the Payment Networks 18 and/or the Account Issuer Platforms 28 (Step 605C). This may be an illustrative embodiment for an Acquirer Platform 28 that is attempting to maximize the transaction volume being processed on its gateway infrastructure. Since processing is a scale business with a high proportion of costs fixed, the Acquirer Platform 28 with extensive existing infrastructure is always trying to capture additional transaction volume, or; transmits the financial transaction onto the appropriate Payment Networks 18 and/or the Account Issuer Platforms 28 (Step 605B).

FIG. 32B-2 illustrates an embodiment of an authorization response being processed via the Acquirer Platform 28 within a centralized National/International Gateway Platform 28 and co-located Master RMN 14 system architecture, and the following may occur:

If the Financial Transaction Authorization Request 251 of the financial transaction did not come from the National/International Gateway Platform 28 using the Master RMN 14 (and/or Master UAR 15), the Payment Networks 18 and/or the Account Issuer Platforms 28 transmit the transaction authorization response, comprising live Registry Financial Account 65 data and Master RMN 14 (and/or Master UAR 15) data, optionally comprising the UUC 200, to the Acquirer Platform 28 (Step 701B). The Acquirer Platform 28 strips the live Registry Financial Account 65 data from the return authorization message and provides the set tracking data in the message (Step 702B) before passing it to the merchant. The Acquirer Platform 28 may also send a copy of the authorization response provided by the Payment Networks 18 and/or the Account Issuer Platforms 28 to the Master RMN 14 (and/or Master UAR 15) (Step 703B) for record keeping and risk management.

If the Financial Transaction Authorization Request 251 did indeed come from the National/International Gateway Platform 28 using the Master RMN 14 (and/or Master UAR 15), the authorization response is transmitted to the National/International Gateway Platform 28 (Step 701A), which transmits the transaction authorization response, comprising live Registry Financial Account 65 data and the Master RMN 14 (and/or Master UAR 15) data, optionally comprising the UUC 200, to the Acquirer Platform 28 (Step 702A). The Acquirer Platform 28 may then simply strip the live Registry Financial Account 65 number from the return authorization message and provide the set tracking data in the message (Step 705A) before passing it to the merchant (Step 703A). No copy of the authorization is necessary since the Master RMN 14 (and/or Master UAR 15) would capture that information as part of being in the return path (Step 704A).

In either embodiment above, the Acquirer Platform may build its settlement file (Step 705B) by comparing the clearing messages provided by the merchant (carrying: the UUC 200; a financial transaction tracking number; the last four digits of the live Registry Financial Account 65 number used; and optionally other tracking tools) with the Acquirer Platform's 28 own internal records, which include the live Registry Financial Account 65 number.

FIG. 32C-1 illustrates an embodiment wherein the Merchant Platform 28 is handling its own gateway activities, then the following may occur for the Financial Transaction Authorization Request 251:

The merchant POS system, comprising a UIA 16 and Terminal 2, creates an Financial Transaction Authorization Request 251 (Step 801) based upon a standard message format and presents it to its own Merchant Gateway Platform 28, wherein a determination is made as to whether the transaction is to be processed via a Master RMN 14 (and/or Master UAR 15) (Step 802). In one embodiment, if the transaction is not to be processed via a Master RMN 14 (and/or Master UAR 15), the message may be routed directly to the appropriate Payment Networks 18 and/or the Account Issuer Platforms 28 (Step 802A). In another embodiment, the Financial Transaction Authorization Request 251 may be routed directly to the National/International Gateway Platform 28 (Step 802B), whereby the National/International Gateway Platform 28 determines (Step 803) whether or not the transaction is designated for processing via the Master RMN 14 (and/or Master UAR 15). If the transaction is not to be processed via the Master RMN 14 (and/or Master UAR 15), the message is transmitted to the appropriate Payment Networks 18 and/or the Account Issuer Platforms 28 (Step 803C).

Alternatively, if the transaction is indeed designated for processing via the Master RMN 14 (and/or Master UAR 15), the Financial Transaction Authorization Request 251, comprising a UUC 200, is transmitted from the National/International Gateway Platform 28 to the Master RMN 14 (and/or Master UAR 15) (Step 803B), which may optionally be co-located therein.

The message is then further processed and translated via the Master RMN 14 (and/or Master UAR 15) (Step 804), whereby, post-translation, it may then be: returned to the National/International Gateway Platform 28 (Step 804B) for transmittal to the Payment Networks 18 and/or the Account Issuer Platforms 28 (Step 805B), or; transmitted directly to the Acquirer Platform 28 (Step 804D) and then transmitted to the Payment Networks 18 and/or the Account Issuer Platforms 28 (Step 805D).

FIG. 32C-2 illustrates an embodiment wherein the Merchant Platform 28 is handling its own gateway activities, then the following may occur for the authorization response message:

If the Financial Transaction Authorization Request 251 was sent to the Payment Networks 18 and/or the Account Issuer Platforms 28 via the National/International Gateway Platform 28, then the return authorization message is returned to the National/International Gateway Platform 28 containing the live Registry Financial Account 65 data along with Master RMN 14 (and/or Master UAR 15) data, optionally comprising the UUC 200 (Step 901A). The National/International Gateway Platform 28 strips the return authorization message of the live Registry Financial Account 65 number and inserts the necessary tracking data in the message (Step 903) before transmitting it to back the merchant (Step 903A). Separately a record message is sent to the Master RMN 14 (and/or Master UAR 15) (Step 902B) for record keeping and risk management, and a message is transmitted to the Acquirer Platform 28 (Step 904A) so that clearing files can be matched and settlement calculated.

In another embodiment, if the Financial Transaction Authorization Request 251 was not sent to the Payment Networks 18 and/or the Account Issuer Platforms 28 via the National/International Gateway Platform 28, then the return authorization message is returned to the Acquirer Platform 28 containing the live Registry Financial Account 65 data along with Master RMN 14 (and/or Master UAR 15) data, optionally comprising the UUC 200 (Step 901B). The Acquirer Platform 28 strips the return authorization message of the live Registry Financial Account 65 number and inserts the necessary tracking data in the message (Step 902) before transmitting it to back the merchant (Step 902B). Separately a record message is sent to the Master RMN 14 (and/or Master UAR 15) (Step 903B) for record keeping and risk management.

The Master RMN 14 (and/or Master UAR 15) may be co-located with a National/International Gateway Platform 28 such as MasterCard®, Visa®, American Express®, Discover® Financial Services, FDC® (First Data Corporation), TSYS®, or Certegy®. In this embodiment, This centralized system architecture enables single-site data maintenance and transaction security for the RMN 14 and UAR 15, along with rapid access to a large community of Acquirer Platforms 14, the largest of which are already connected to the major National/International Gateway Platforms 28. This embodiment also offers the opportunity for the RMN 14 to return authorization messages to the Acquirer Platform 28 for it to gateway to the Payment Networks 18 and/or the Account Issuer Platforms 28.

In an embodiment in a physical POS merchant environment, wherein the Terminal 2—UIA 16 has bar-code scanning capabilities, the NAT 62 may comprise a card comprising a barcode presentation of the UUC 200, or a mobile with a dynamic screen Display 7 that presents a barcode image of the UUC 200. In addition, the User may input a PVC 202 into the mobile NAT 62, which then communicates directly with the RMN 14 to verify the User and transmit a one-time UUC 200 or the User's standard UUC 200 to the mobile NAT 62, for presentation as a barcode on the NAT 62 display for scanning by the Terminal 2—UIA 16.

In another embodiment, the User enters via audio receiver or Keypad 70, a Primary PVC 200 (1° PVC 202) and Secondary PVC 202 (2° PVC 202) via the mobile NAT 62, wherein a request is sent to the RMN 14 which returns a single-use UUC 200 for presentation as a barcode via the dynamic Display 7 of the NAT 62, which is scanned by the physical POS Terminal 2—UIA 16.

Processing Financial Transactions Via Physical POS and Via Virtual POS

In one embodiment, the RMN 14 distinguishes between financial transactions at the physical, "brick and mortar" or "real-world" point-of-sale merchant ("Physical POS"), and financial transactions for the remotely located, "virtual-world" point-of-sale merchant via internet, mail order, telephone order ("Virtual POS"). In this embodiment, the RMN 14 enables for a User: a distinct UUC for Physical POS (Physical POS UUC 205), and; a distinct UUC for Virtual POS (Virtual POS UUC 203). This embodiment streamlines logistics, enabling one distribution channel to be used for distributing the Virtual POS UUC 203 and the Physical POS UUC 205, since they could be both associated with the same User and that User's NAT 62. In one embodiment, Virtual POS and/or Physical POS financial transactions may be distinguished via the RMN 14 and/or the VP 12 comparing a bid UIA-VC 204 and/or a bid Payee Verification Code ("Payee-VC 209") with data stored in a Virtual POS Registry 210 and/or a Physical POS Registry 211, at least one said registry comprising: a registered UIA-VC 204; a registered Payee-VC 209; a registered Virtual POS UUC 203; a registered Physical POS UUC 205.

In one embodiment in a Physical POS, a printed receipt for a financial transaction processed via the RMN 14 comprises: the NAT 62 owner's name as provided by the RMN 14; a portion of the UUC 200; a portion of the live Financial Account 65 number which was used for the transaction; the expiration date of the live Financial Account 65 number; the nomenclature for the live Financial Account 65 (e.g.: Chase® Visa®, American Express® Optima® Business Account, etc.), and; the financial transaction identification number.

In one embodiment, a financial transaction via the RMN 14 may default whenever possible to requiring a User to enter a PVC 202 in conjunction with the UUC 200. Similarly, the RMN 14 may default at registration to limit the number or value of financial transactions that can be completed by a User without a PVC 202. When the threshold is hit, the User may either answer an e-mail or an automated phone validation. In one embodiment, the NAT 62 token may be registered by default to domestic United States use only, but could be changed by country code addition.

In one embodiment for Virtual POS, a User may enable their use of the RMN 14 and UAR 15 for financial transactions by: (i) shopping via a RMN 14 affiliated registration/aggregation web portal of an Account Issuer Platform 28 using their proprietary identity control mechanism; (ii) notifying the RMN 14 via a website, or; (iii) notifying the RMN 14 via telephone with live or automated attendant. In the case of (ii) and (iii) the User may provide verification data comprising: part or all of a Virtual POS UUC 203 from the back of the NAT 62; the "risk key" (Risk Key 207); their PVC 202, and; total dollar amount they want to be able to spend in the next chosen time period (e.g., number of hours or until a certain date).

The Risk Key 207 may comprise: a unique DCVC3 (Dynamic card validation code); a unique Static CVC (card validation code); a unique DCVV (Dynamic card validation value), and/or; a unique Static CVV (card validation value). In the embodiment where the Risk Code 207 is a CVV, this is a short data string which User of the NAT 62 provides during a Virtual POS financial transaction number to verify that the NAT 62 is their possession. The Risk Key 207 provides a cryptographic check of the Virtual POS UUC 203 associated with that NAT 62, and may not necessarily be part of the Virtual POS UUC 203 itself.

FIG. 3E is illustrative of embodiments of a NAT 62 with a Virtual POS UUC 203 and a Physical POS UUC 205, further comprising: Risk Key 207, a USB port; magnetic stripe; bar code; magnetic ink characters; and embedded RFID chip.

In another embodiment comprising shopping via Virtual POS, a User may be allowed to make a restricted number of financial transactions worth up to prescribed dollar value without the User invoking a PVC 200. This allows for "an impulse purchase". However, no additional transactions will be allowed until the User's invokes their PVC 200. An automated outreach from the RMN 14 may contact the User via a pre-registered User phone number or User e-mail address to require validation comprising Pattern Data 54 such as a PVC 202.

In another embodiment, for Virtual POS, the following may occur: At checkout via an internet web site, telephone order, or mail order, the User may be asked to provide the Virtual POS UUC 203 in full as located on the NAT 62, including the Risk Key 207. In this fashion the merchant's check out system has to do nothing different for processing a financial transaction via the RMN 14 than it does for every other standard payment device. A merchant may increase their security, if they desired, by: asking for a portion of the Physical POS UUC 205, or PVC 202. This would, in essence provide one more level of validation that the NAT 62 is in the hands of the authorized User.

In another embodiment, the RMN 14 may invert the current internet security approach of some major payment brands which currently invoke monetary penalties on merchants that fail to prove that they have secure systems. Instead, the RMN 14 may decide to only allow merchants with secure systems to even ask for a portion of the PVC 202.

In another embodiment, the merchant Third-Party Platform 28 or the RMN 14 may query for: a Secondary PVC 202 which is designated for Virtual POS shopping only, and/or; an alternative data string designated for Virtual POS use only. Since the Virtual POS UUC 203 is never printed on a Physical POS receipt, the only way it could be collected is if the NAT 62 were stolen or duplicated, whereby any subsequent unauthorized financial transactions could be identified via several means, including by the User notifying the RMN 14, by a software security neural network of the RMN 14 or an Account Issuer Platform 28. In this embodiment, with only the Virtual POS UUC 203 being available for internet, telephone order, and mail order financial transactions, a break-in of a Virtual POS merchant or Account Issuer Platform 28 provides only data strings which the RMN 14 restricts for use in the Virtual POS environment and which cannot be used for Physical POS financial transactions via the RMN 14.

Processing Mobile Financial Transactions Via a RMN and a UAR

As used herein, electronic "Positioning System" may refer to and include electronic positioning communications and systems, electronic navigating communications and systems, electronic tracking communications and systems, electronic mapping communications and systems, and electronic guiding communications and systems. Such systems and their related software and hardware components, known in the art, comprise: Global Positioning System (GPS); Standard Positioning Service (SPS); Differential GPS (DGPS); basic local area DGPS (LADGPS), wide area DGPS (WADGPS) such as WAAS, ARGOS satellite system, Cell phone Networks 18 systems such as Cell-ID, AOA, TDOA, TOA, E-OTD, A-FLT and OTDOA, E-CID, U-TDOA, A-GPS; Matrix, Enhanced-GPS (E-GPS); Polaris Wireless Location Signatures (PWLS); TV-GP; Precision Location Technology (PLT), based on time of arrival (TOA); Ekahau Positioning Engine (EPE); AeroScout; PanGo Locator; AXCESS tracking; Inner-Wireless RF; Ultra Band Width (UWB)-based tracking; Laser Positioning System; Microwave-based tracking systems; Radar/Sonar positioning; Universal Time Coordinated (UTC), and; Acoustic Positioning Systems (APS).

As an overview of several embodiments for mobile financial transactions via the RMN 14, the Financial Account(s) reside remote from the mobile NAT 62 in an online UAR 15, accessible to the NAT 62 via Network 18 connectivity, while the NAT 62 may store a registry of Audible or Visible Signatures 81.

In one embodiment, the User may enter their Primary PVC 200 and Secondary PVC 202 into a "public" cell phone/PDA or other mobile device with Network 18 connectivity, such as when renting a mobile device or borrowing a mobile device of a friend. The Primary PVC 200—Secondary PVC 202 may be transmitted to the RMN 14 using SMS or other message transmitted via Network 18. When the VP 12 verifies the User's authority to access the RMN 14, the RMN 14 may then transmit a single-use, or limited-use, Secondary UUC 200 to the "public" mobile device via SMS, whereby the RMN 14 temporarily enables the "public" mobile device to function, in real-time, as the User's own private NAT 62 by presenting a barcode of the Secondary UUC 200 via the mobile device's Display 7, for scanning by a Terminal 2—UIA 16.

In an alternative embodiment, for additional security, a request for a Secondary UUC 200 or a Secondary PVC 202 may also be generated from a kernel software program running on the mobile device NAT 62, whereby the mobile device NAT 62 generates a Financial Transaction Authorization Request 251 via SMS message transmitted over a Network 18 to the RMN 14. The RMN 14 generates a single-use, or time-limited use, Secondary UUC 200 or Secondary PVC 202 that is time-synchronized between the NAT 62 and the RMN 62, and is transmitted to the NAT 62 over a Network 18 via Financial Transaction Authorization Response 252. In one instance, the User's NAT 62 is scanned by the Terminal 2—UIA 16 for a single-use Secondary UUC 200 which was just SMS-issued by the RMN 14, and presented via barcode image on the NAT's 62 Display 7. In an alternative instance, the User's NAT 62 displays a Secondary PVC 202 which was just SMS-issued by the RMN 14, and which the User then enters via the POS Terminal 2-UIA 16 for that transaction only.

In another embodiment, where neither the User's NAT 62 nor the POS Terminal 2—UIA 16 enables storage of, or direct Keypad 70 entry of, a the User's Audible or Visible (Audible/Visible) Signature 81, the mobile device NAT 62 may transmit a Financial Transaction Authorization Request 251 to the RMN 14, comprising: the PVC 202 inputted using audio commands or Keypad 70 entry on the NAT 62, and; the UUC 200 stored via the NAT's 62 Subscriber Identification Module (SIM Card), whereby the RMN 14 returns a Financial Transaction Authorization Response 252, comprising an Audible or Visible (Audible/Visible) Signature 81 in a barcode image presented via the NAT's 62 dynamic Display 7, for scanning by the POS Terminal 2—UIA 16. The Visible Signature 81 is appended to the Terminal 2—UIA 16 transaction data, and the packet is forwarded as a Financial Transaction Authorization Request 251 and the transaction processing proceeds from there as described elsewhere herein in other embodiments.

FIG. 29A through FIG. 29H are illustrative of illustrative embodiments of financial transactions using mobile payment systems via the RMN 14.

Figure 29A:
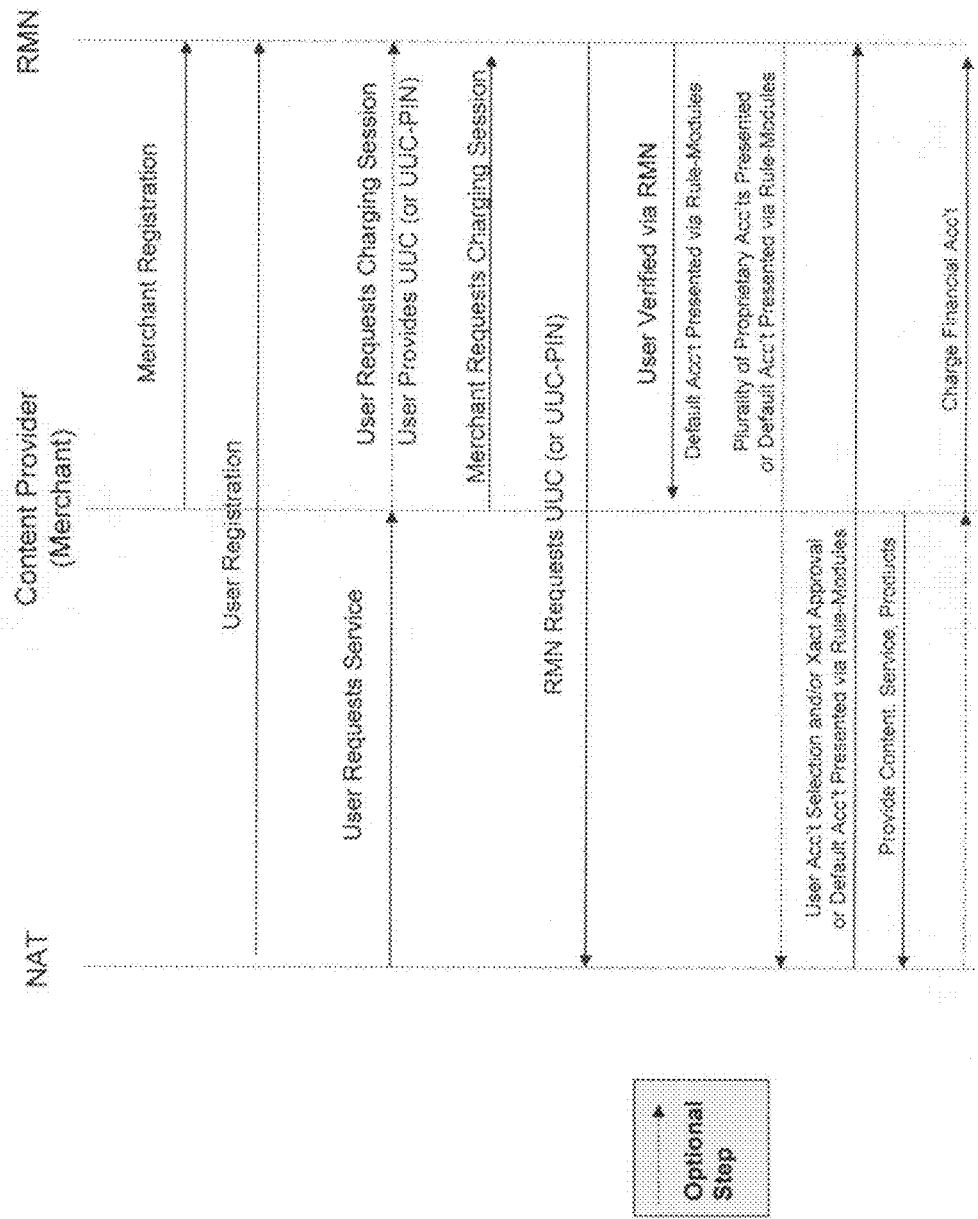
Figures 1, 29A:
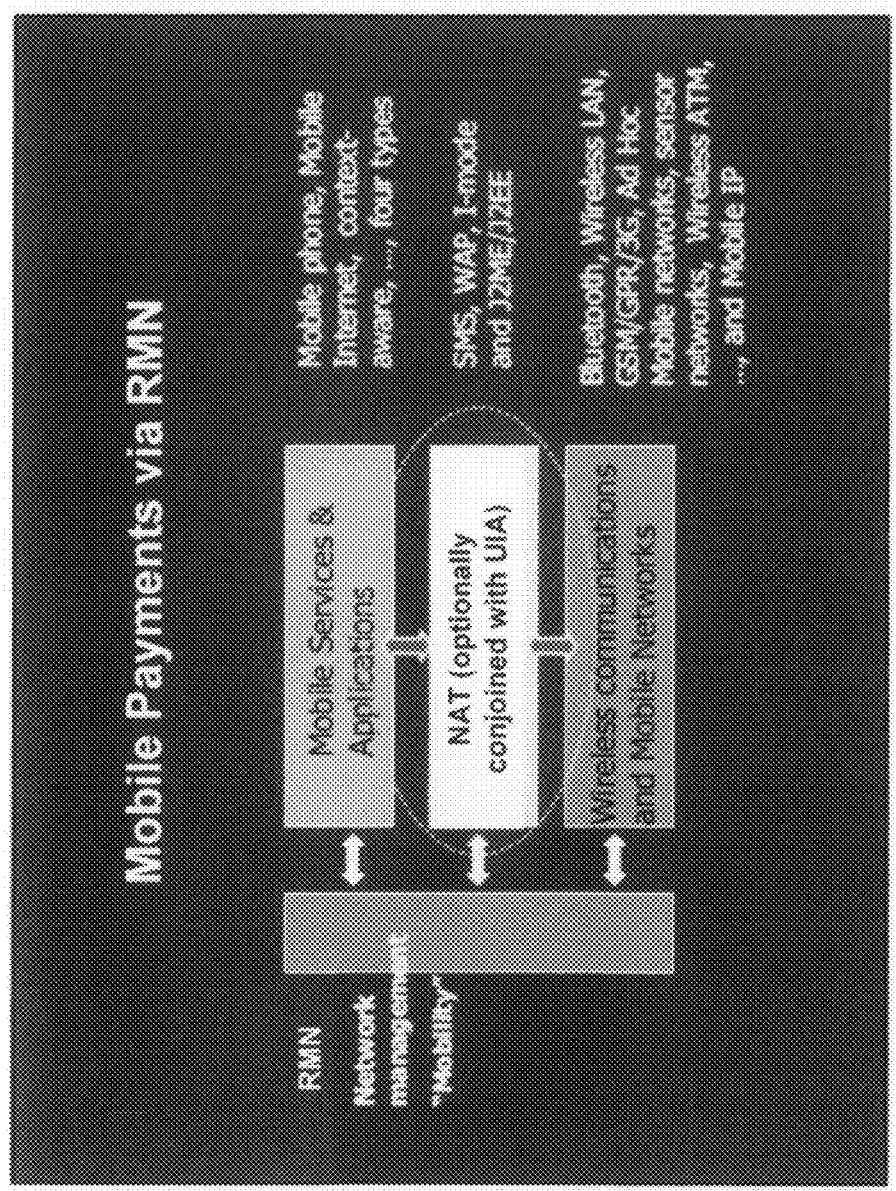
Figures 2, 29A:
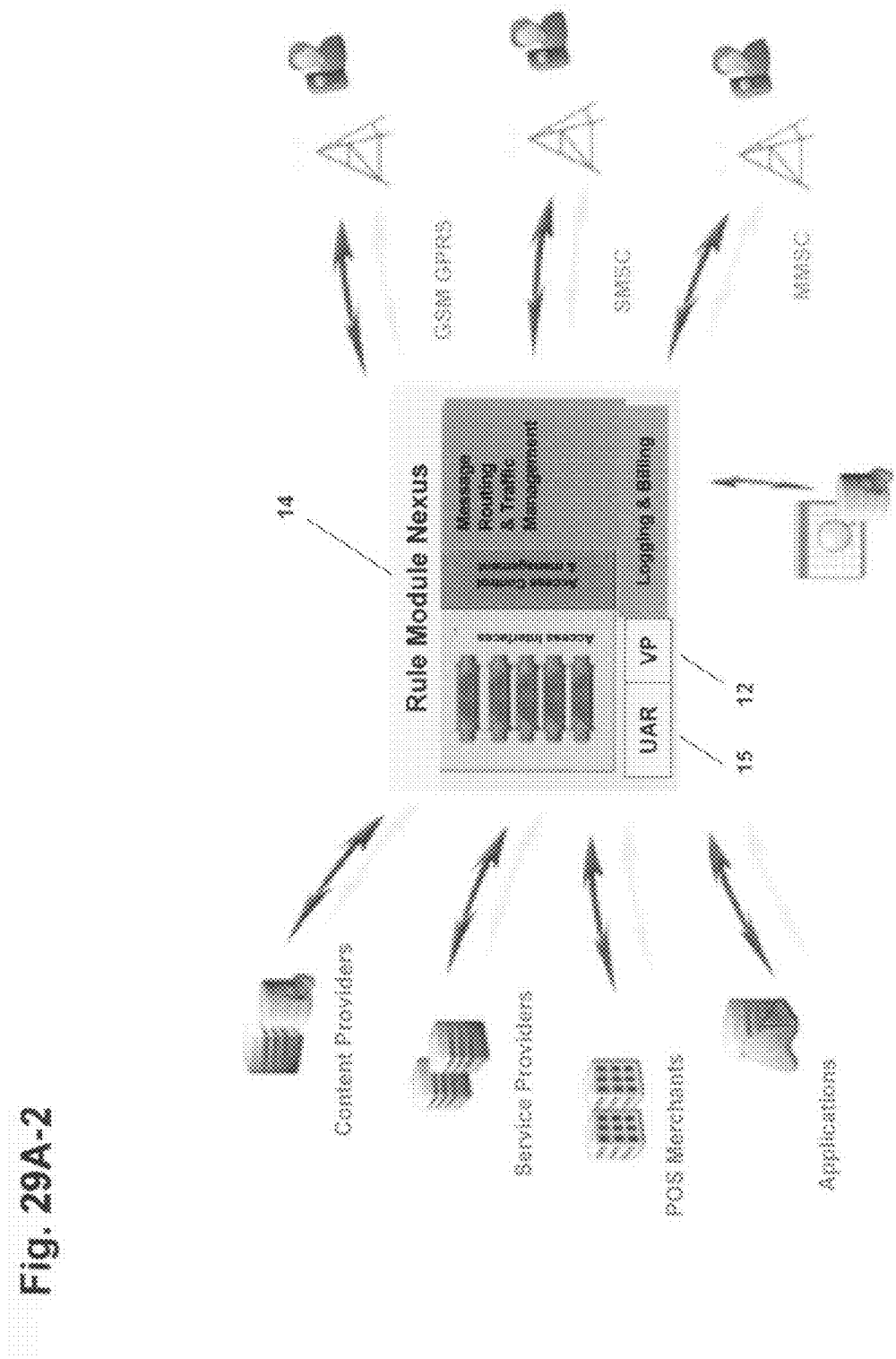
Figures 3, 29A:
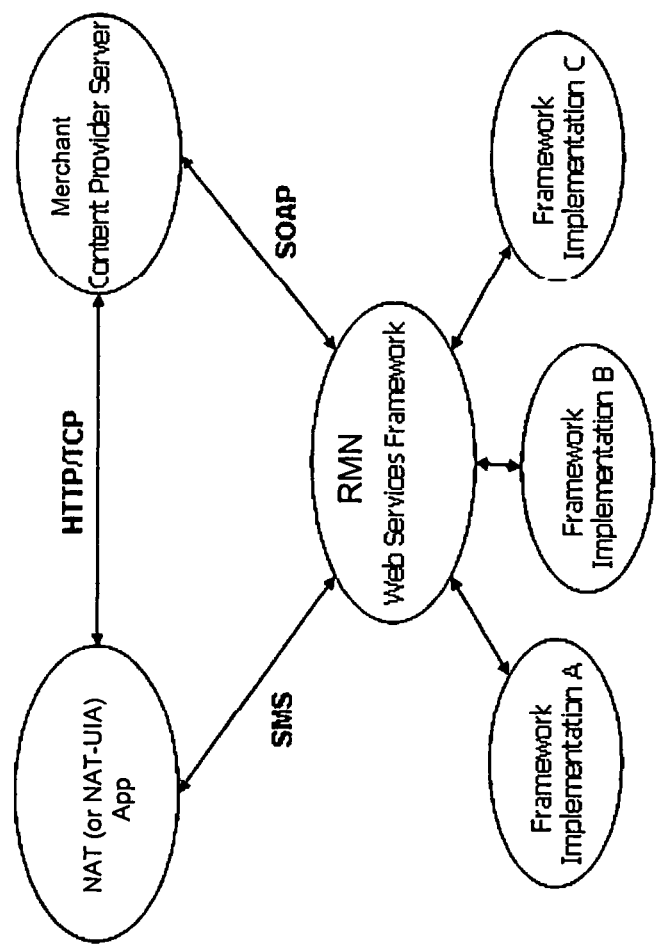

FIG. 29A is an example of steps in a mobile payment system using the RMN 14. A charging session is defined by the time interval starting from when a payment contract is agreed by all parties until the payment agreement is no longer valid. Each charging session can have only one mobile user, one content provider or merchant/payee. There may be numerous payment transactions in a charging session, depending on the transaction type used. A charging session is represented by a unique, persistent session identification data type object, which is related to every operation performed during the life time of a charging session.

The RMN 14 provides an interface for the creation of a charging session contract. The RMN 14 extracts relevant information from the user, the NAT 62 and the UAR 15 to construct the payment agreement between the parties involved, including the settlement type(s) for the payment transaction. The contract is defined by the charging WSDL interface as a complex data type, which may be extended to fit any kind of service and payment scenario. Once a charging session is no longer required, a charge and release operation is performed to charge any remaining amounts and followed by releasing the charging session. All session details are now obsolete and the session id will be invalid, therefore this information will be removed from the payment service persistent storage.

Figure 29B:
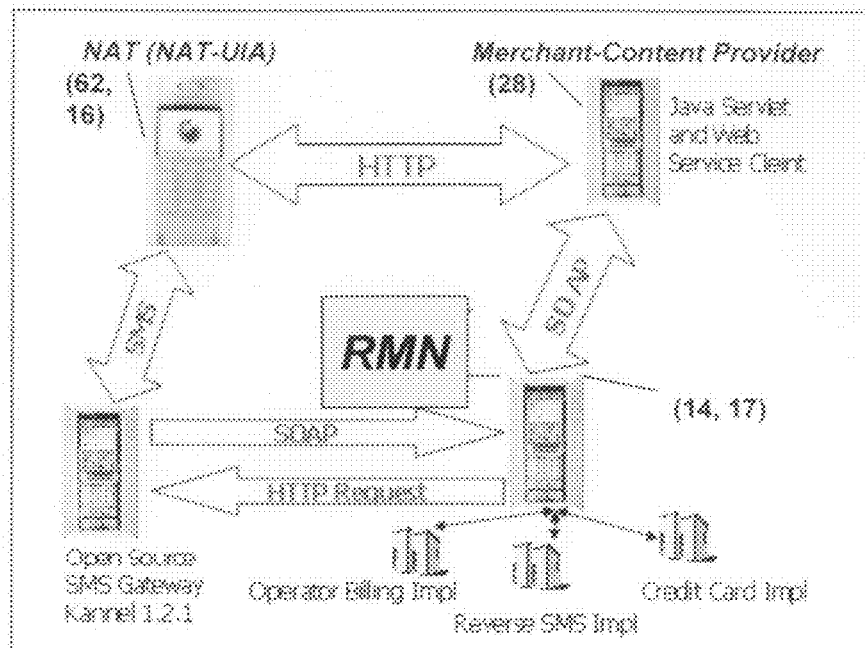

In FIG. 29B, a mobile payment system is illustrated using a real GSM mobile Network 18 for communication. The overall system consists of three distributed systems: the mobile NAT 62 (or NAT 62—UIA 16) operated by the mobile User, the Payee or merchant server and, the RMN 14. Operator billing represents the payment mechanism used by mobile Network 18 operators to acquire payment from their customers for services provided. A Payee using this payment method with the Web Services framework would be requesting that the RMN 14, or the Network 18 operator such as a cell phone service provider, will bill the mobile NAT 62 User according when the service provided in being used. For example, the RMN 14 may provide aggregated billing services to the User, spanning across services and Networks 18 used by the NAT 62. The RMN 14 will then forward that payment on to the Payee after deducting a payment service charge. The amount to be billed may be deducted from a mobile NAT 62 user's pre-paid account or added to their next post-paid billing aggregation invoice from the RMN 14. Alternatively, if the Network 18 operator, such a cell phone company, provides the invoice, costs may be added to the User's phone bill. The RMN 14 in this case may be conjoined with the network operator or may be independent with access to the Network 18 operator's third-party Platform(s) 28 and payment infrastructure. This illustrative embodiment enables NAT 62 Users to use SMS text messaging to anonymously pay for access to digital entertainment and content. Reverse SMS billing via the RMN 14 means that the owner of the recipient NAT 62 phone rather than the message sender is charged for the cost of the SMS message received. This provides an alternative payment option not connected to mobile Network 18 operators' infrastructure, or Account Issuers.

Figure 29C:
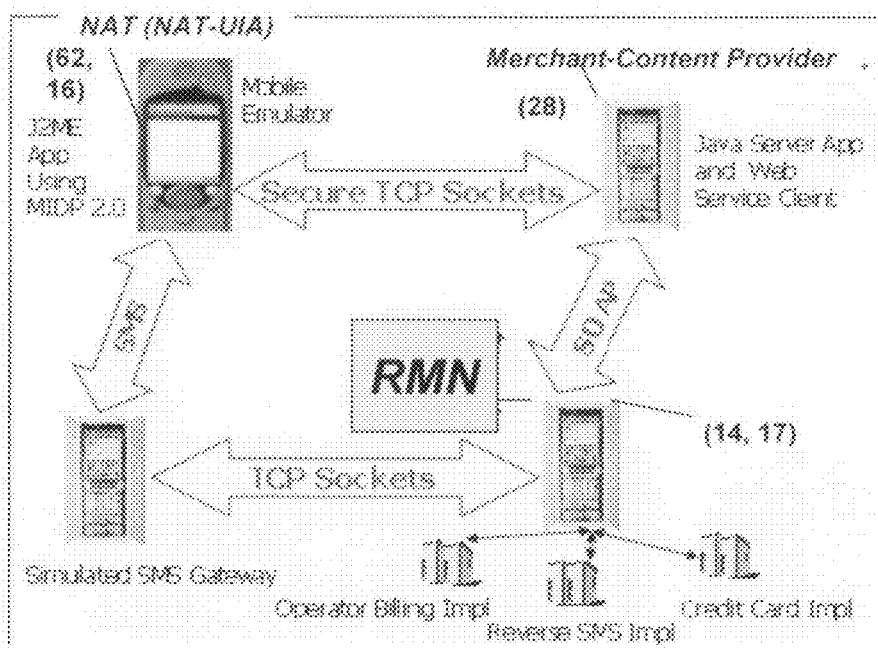

FIG. 29C is illustrative of an alternative mobile payment using the implemented Web Services framework with the additional functionality on the mobile NAT 62 due to the introduction of a J2ME application. This expands the communication capabilities, by using TCP sockets, between the mobile NAT 62 and the Payee Platform 28 via the RMN 14, allowing the integration of more complex services into this payment domain, such as video streaming services.

In another embodiment, the RMN 14 provides aggregated billing services, avoiding the need to send a User an SMS each time a Payee bills a user. Instead, Users are billed when the UUC 200 from a NAT 62 and, optionally, their PVC 202, are verified by the RMN 14. The RMN 14 provides this verification to the Payee(s) pre-registered with the User's UAR 15, whether via a Payee's Internet 18 website or WAP site, or at a Payee physical point-of-sale (POS). Optionally the RMN 14 batches the User's billings for invoicing on a periodic basis.

In a POS merchant environment, the User's NAT 62 may be scanned by the UIA 16—Terminal 2, which transmits the UUC 200 (or UUC 200—PVC 202) packet, a description of the goods and the payment amount to the RMN 14. The RMN 14 verifies the User via the VP 12, invoking a VAC 206 and accessing a plurality of the User's proprietary Registry Financial Accounts 65 via the UAR 15, PAR 46, CCR 30, and/or NRR 31. Upon invoking the Rule-Modules 50, including any Ranking 96 of Financial Accounts 65 to improve a transaction benefit, the RMN 14 may present the User with a plurality of proprietary Financial Accounts 65 from which to select for transaction approval and processing. Alternatively, the RMN 14 may invoke a pre-registered default Financial Account 65, transmitting an Unstructured Supplementary Services Data (USSD) communication to the Account Issuer of the default Financial Account 65, and transmits to the User an "invoice" and amount. The User then may authorize the transaction by data key-entry and/or voice-command(s). The User may then be billed, optionally in an aggregated batched invoice, via a pre-paid account via the RMN 14 or via a Third-Party Platform 28, or; optionally via post-pay against a Financial Account 65 with an Account Issuer. In an illustrative embodiment this embodiment supports Web Services architecture and the open standards; XML, SOAP, WSDL and UDDI.

Figure 29D:
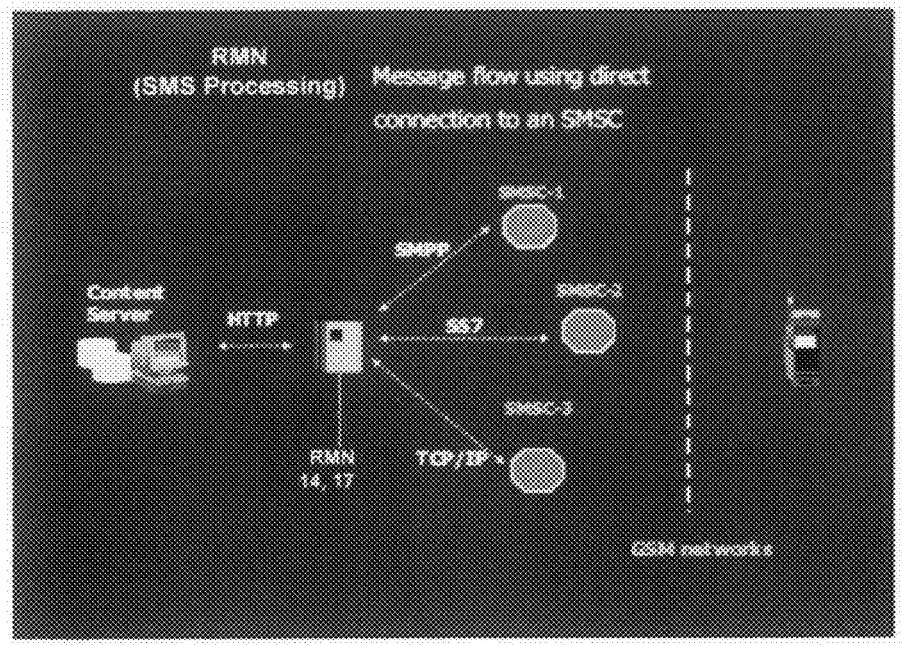
Figure 29E:
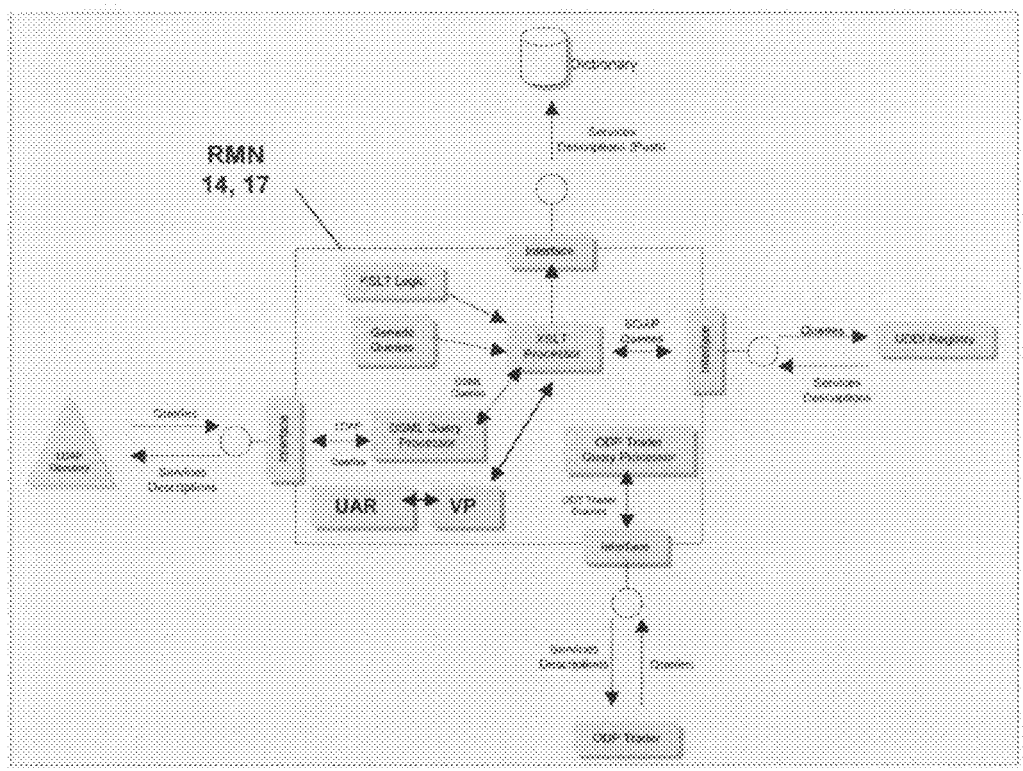
Figure 29F:
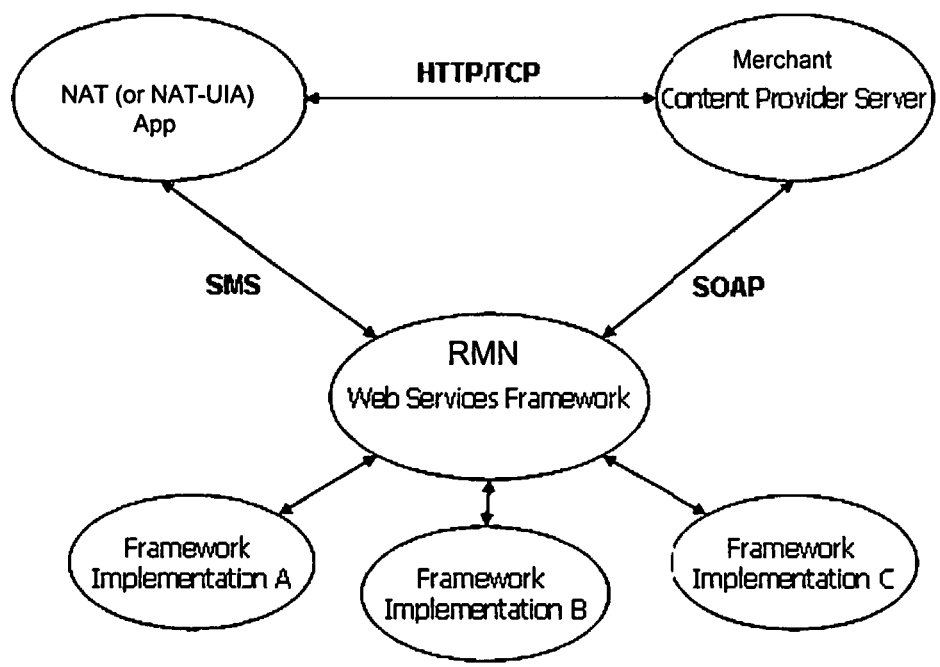

FIG. 29D through FIG. 29F are illustrative of embodiments wherein the RMN 14 manages the flow of identity information between or among the Third-Party Platforms 28, the NAT 62, and/or the UIA 16—Terminal 2, for the purpose of processing a financial transaction using a NAT 62, a UUC 200 (or UUC 200—PVC 202) packet for the RMN 14 verifies the User via the VP 12, thereby invoking a VAC 206 and accessing a plurality of the User's proprietary Financial Accounts 65 via the UAR 15, PAR 46, CCR 30, and/or NRR 31. In SPF, the RMN 14 is assists in creating and maintaining system management models. The RMN 14 makes system management capabilities available to SPF through a publishing/discovery mechanism making transparent the changes in the system management interface, which may come as a result of components reconfiguration and upgrades (static changes) and/or service mobility (dynamic changes). The functionality of the RMN 14 may optionally consist of three tasks: interfacing with Third-Party Platforms 28 information sources, making queries against those information sources, and preparing received data for use in SPF. With its interfacing capabilities, the RMN 14 promotes SPF into a generic (system independent) plugin component. Because the RMN 14 gives essential plug-and-play capabilities to SPF, it is preferable that it supports interactions with various sources of information, including: UDDI Registries, for the discovery of message-based management operations (management services), wherein the management interface will, in an illustrative embodiment, be published in a the RMN 14 private UDDI registry that caters to SPF as the client; ODP Traders, for the discovery of RPC-based management operations; Directory services, which offer generic information storage and discovery facilities for use in implementing UDDI Registries and other mechanisms of resources registration, tracking and discovery.

Figure 29G:
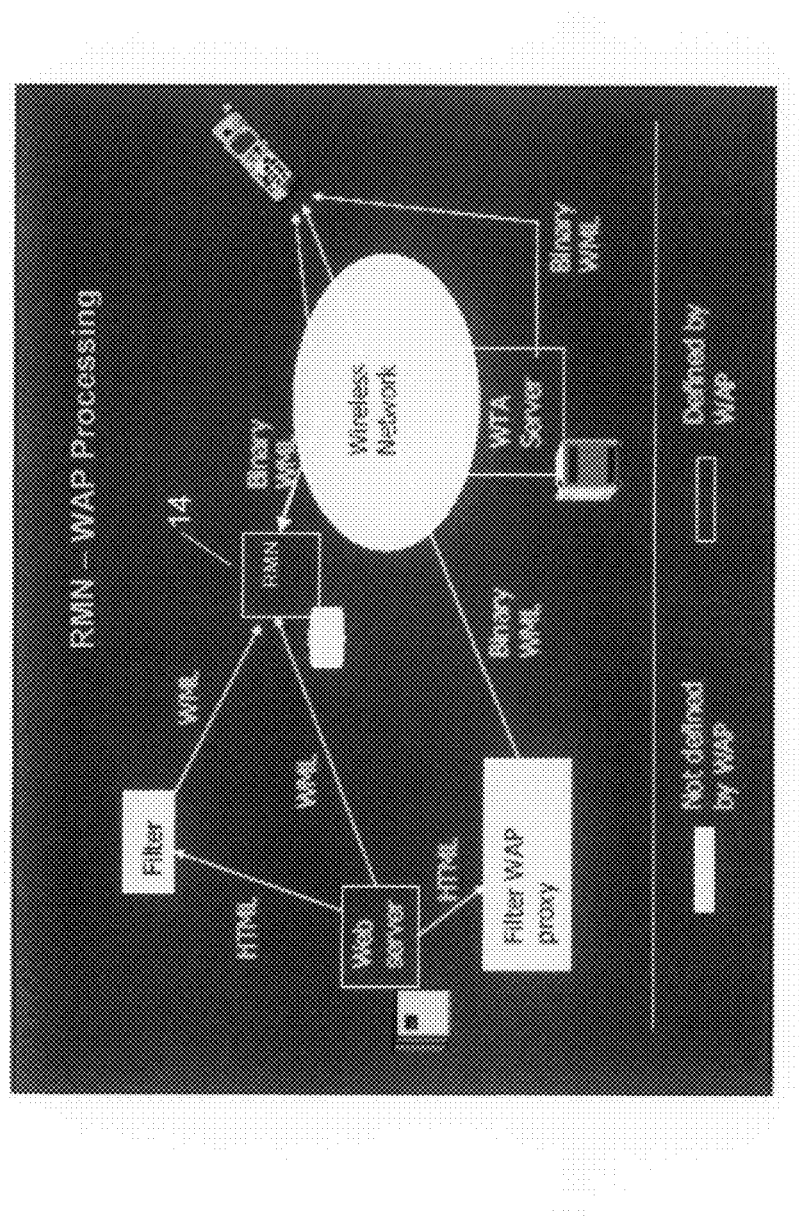
Figures 1, 29G:
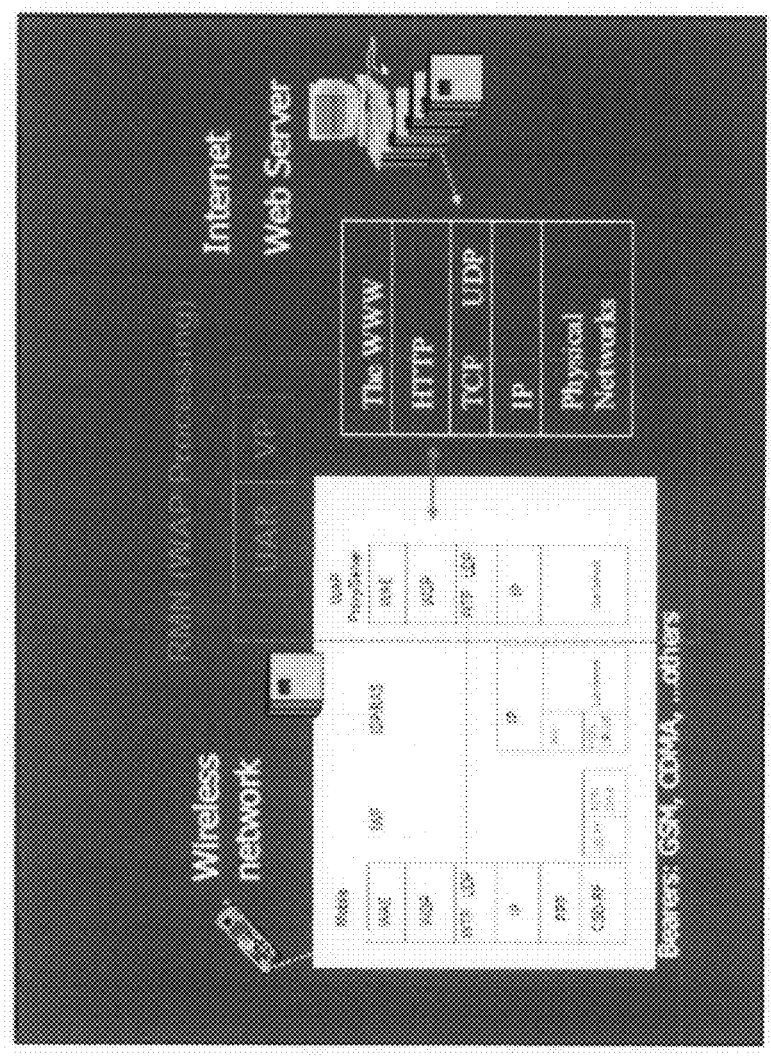
Figures 2, 29G:
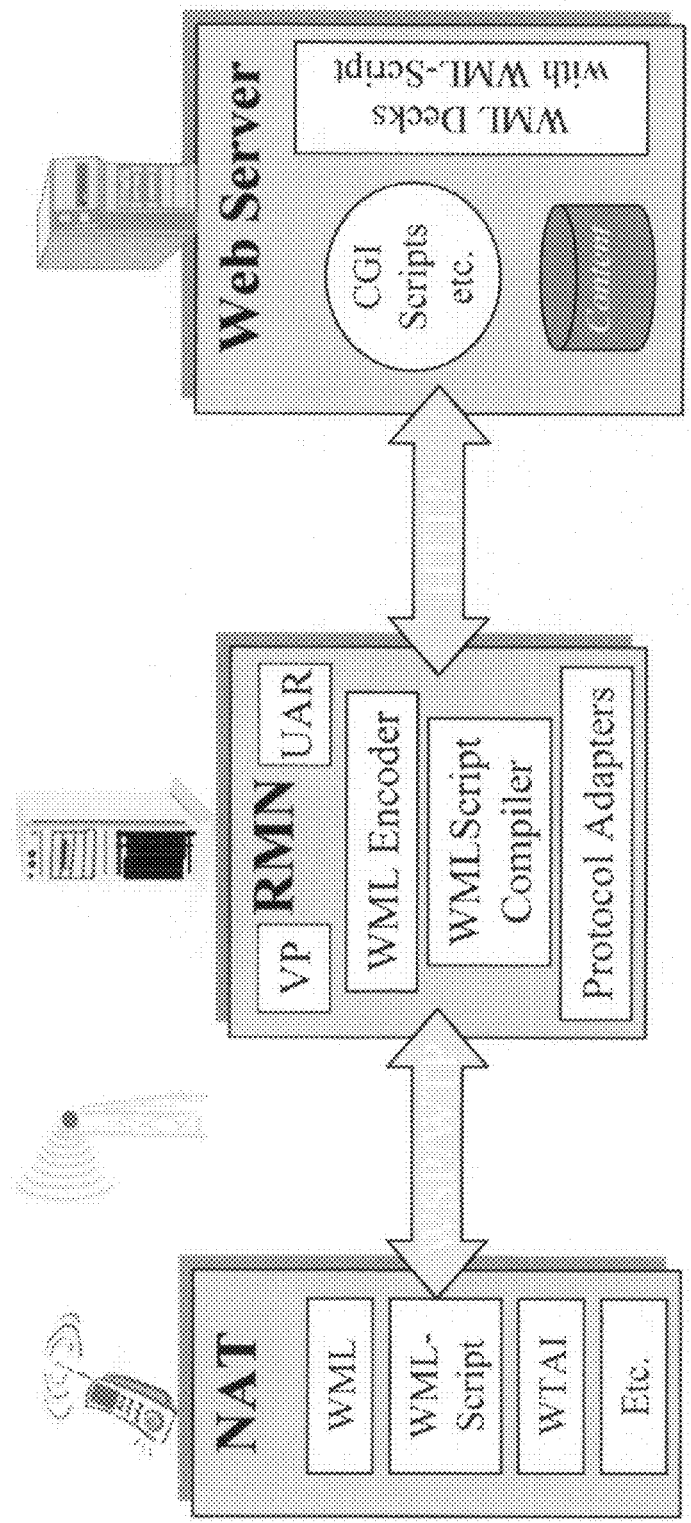
Figures 3, 29G:
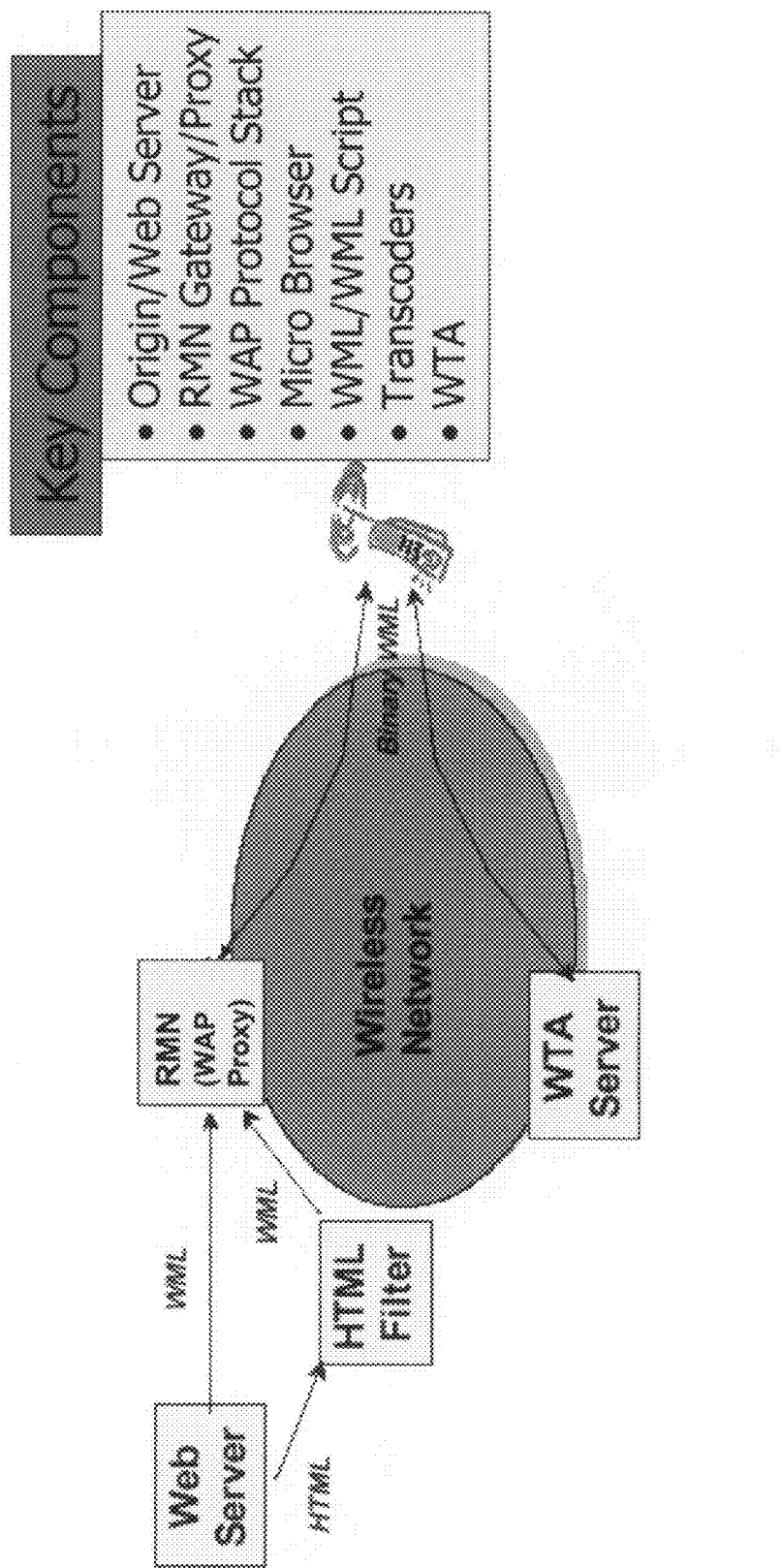
Figures 4, 29G:
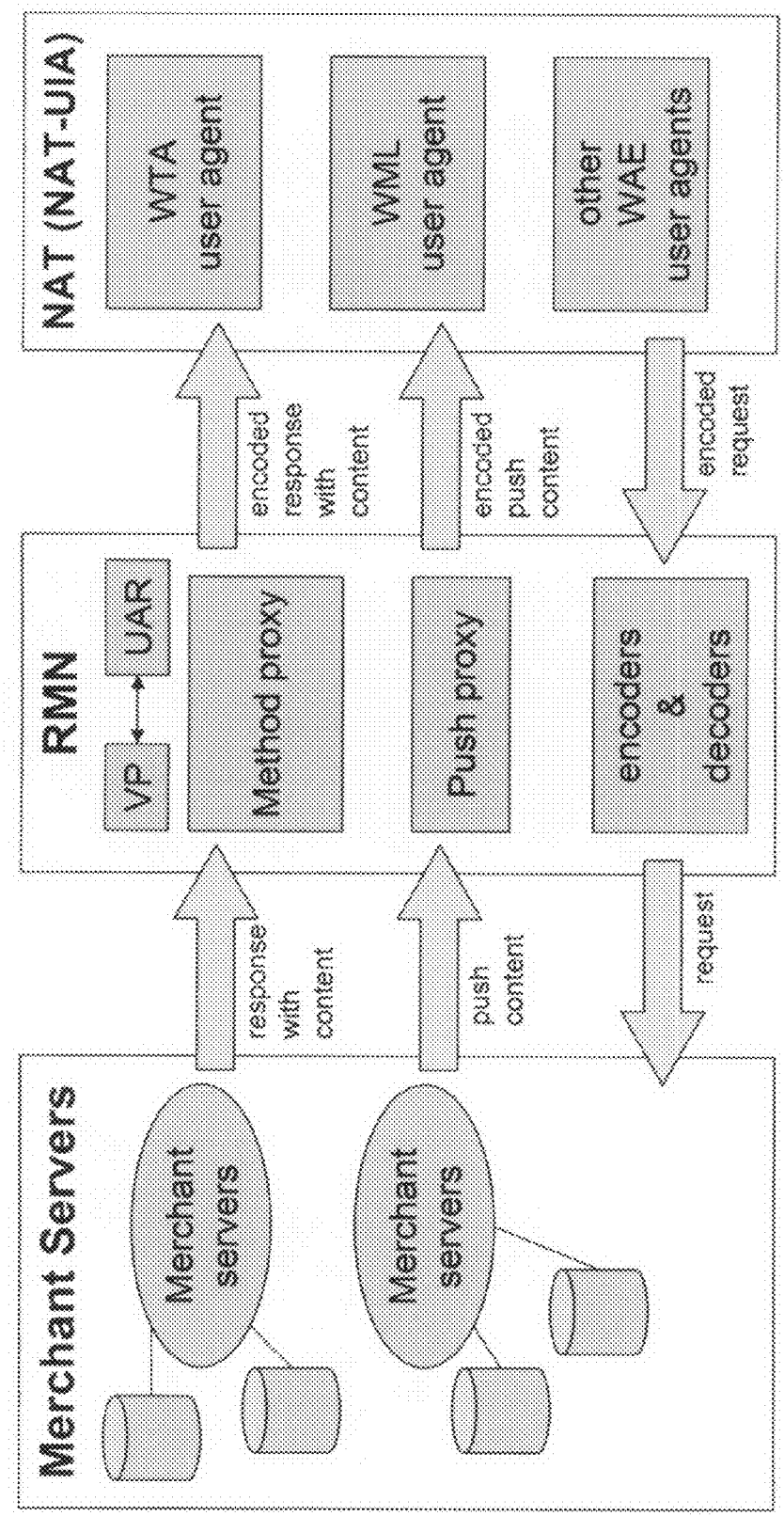
Figures 5, 29G:
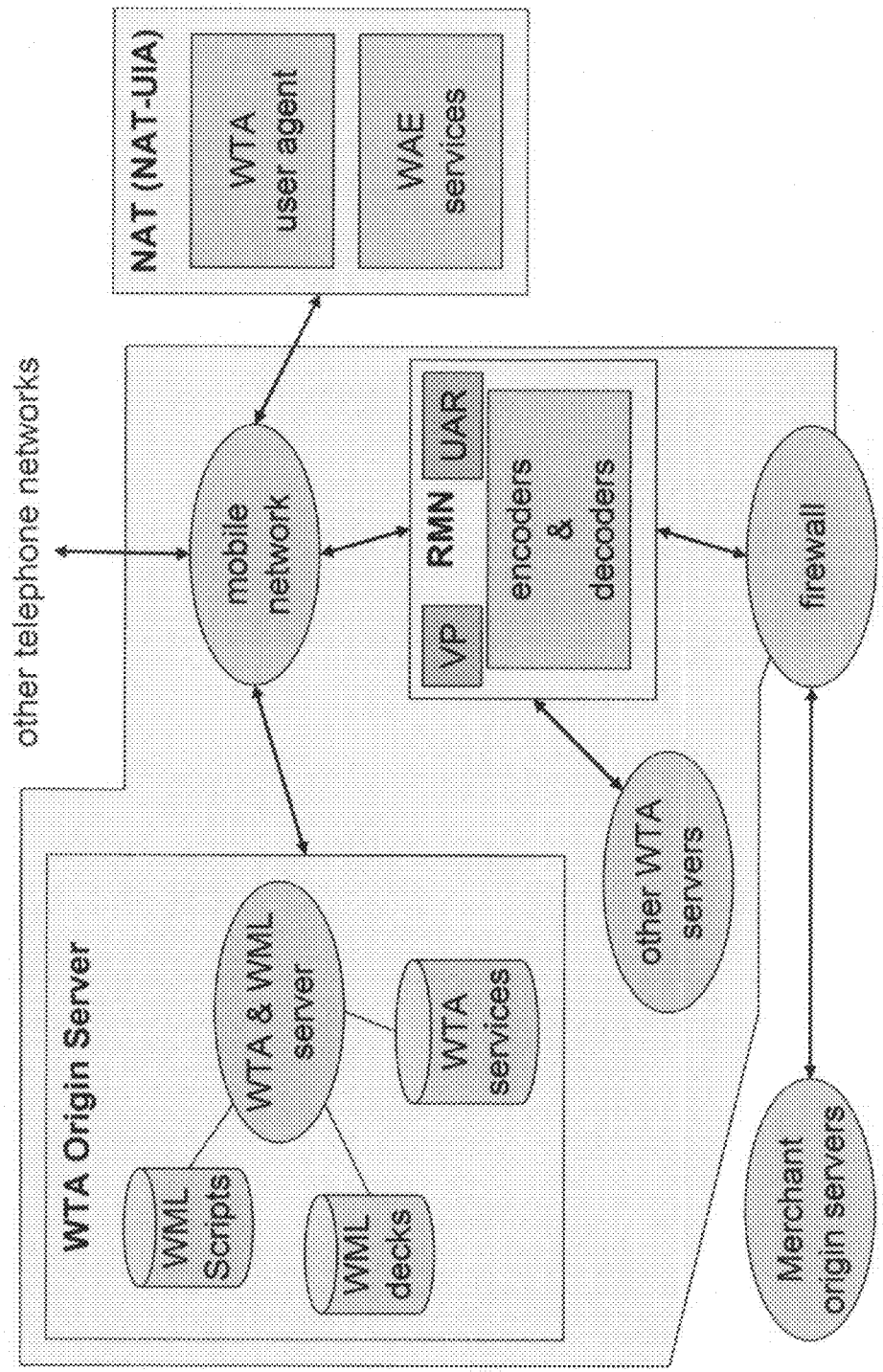
Figures 6, 29G:
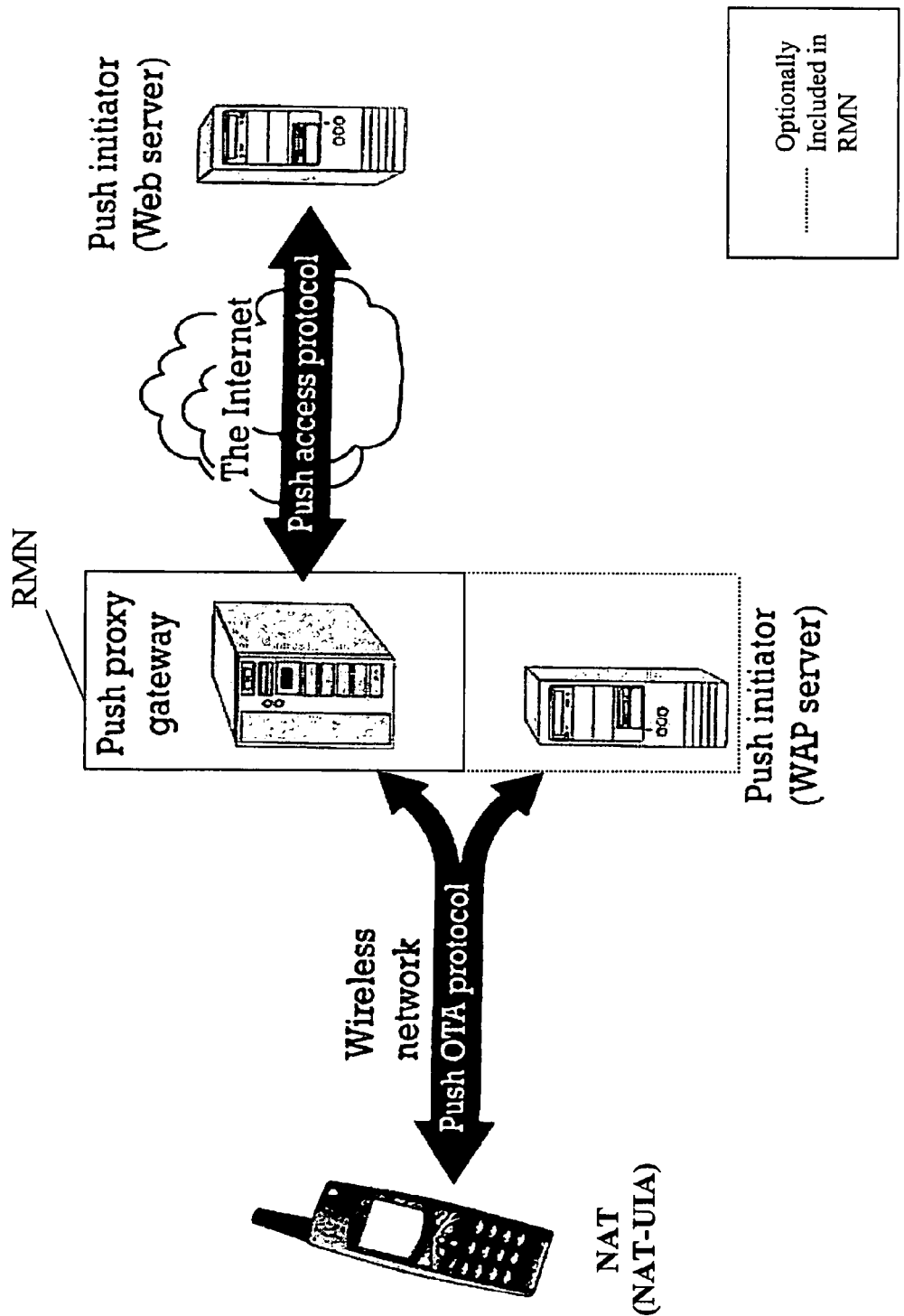
Figures 7, 29G:
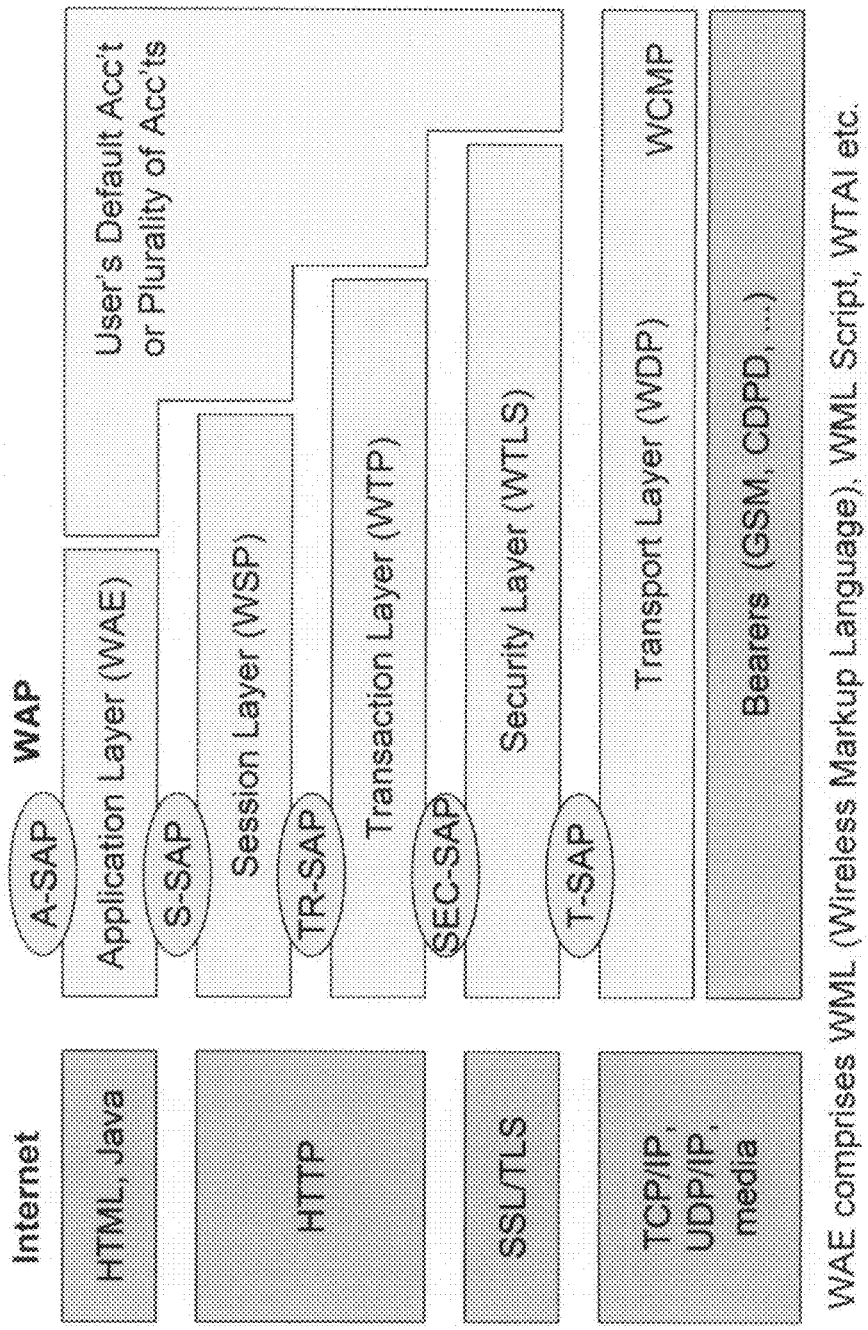

FIG. 29G through 29G-7 are illustrative of embodiments where the RMN 14 is an intermediary acting, receiving and transmitting requests on behalf of Third-Party Platforms 28 for the purpose of processing a financial transaction using a NAT 62, a UUC 200 (or UUC 200—PVC 202) packet for the RMN 14 verifies the User via the VP 12, thereby invoking a VAC 206 and accessing a plurality of the User's proprietary Financial Accounts 65 via the UAR 15, PAR 46, CCR 30, and/or NRR 31. The RMN 14 may optionally provide: translation of the data transmissions where needed; protocol enhancements; transcoding; and/or other optimization or transformation functions.

Figure 8:
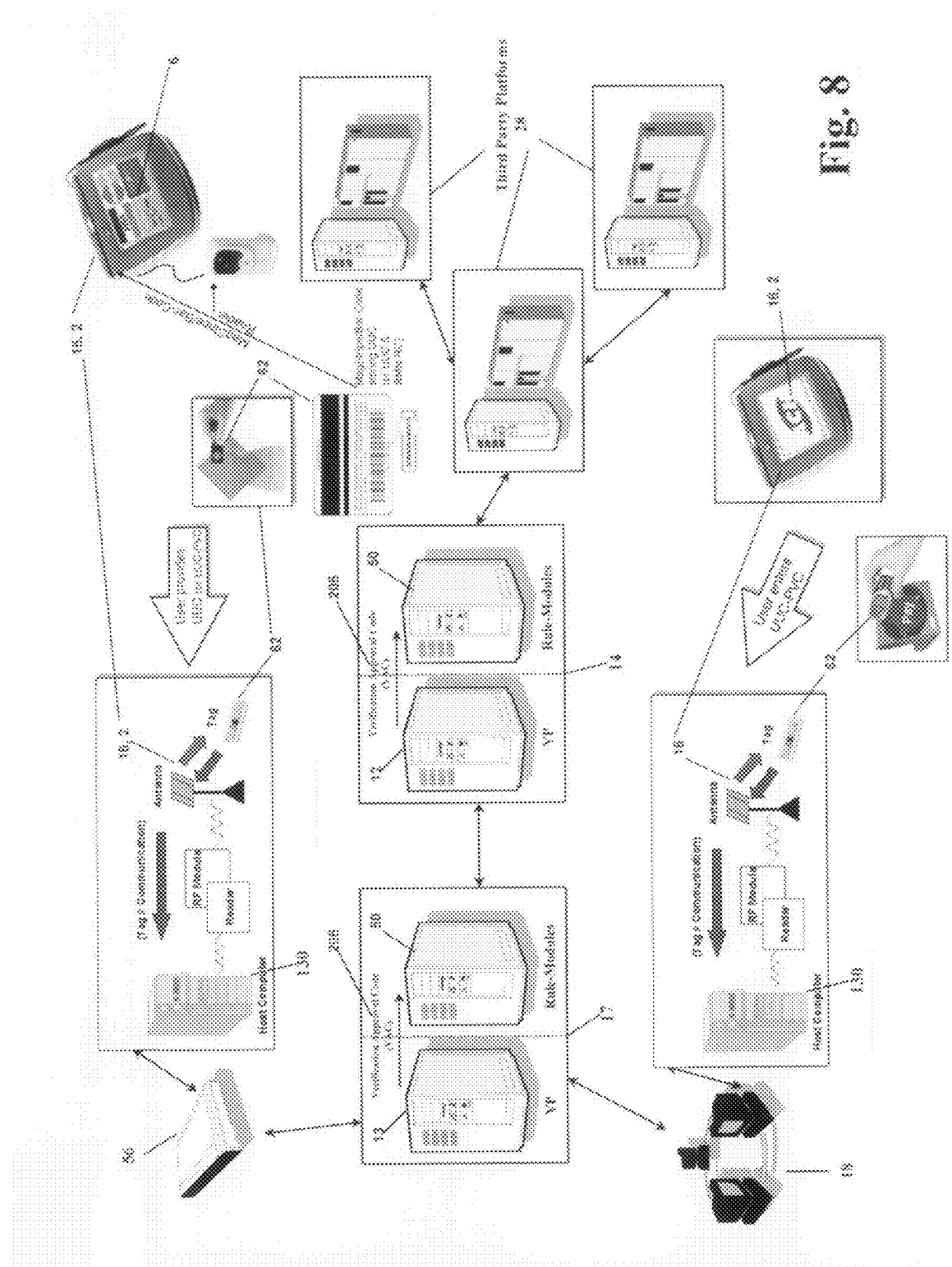
FIG. 8 and FIG. 8A show embodiments of the invention, depicting various NAT's, wireless modem and networked connections between various UIA's and the RMN, including Subset RMN's, a Master RMN, Redundant Master RMN, and Third-Party Platforms.

FIG. 29G-8 is illustrative of an embodiment wherein the RMN 14 a counter part component to an MMS Client Platform 28 in the Network 18. The RMN 14 is responsible for providing an access to other messaging systems 28. For example, an MMS client 28 or Payee submits the message to the RMN 14 which resolves the MM target address(es) and then routes forward the MM to each target Third-Party Platform 28 for the purpose of processing a financial transaction using a NAT 62, a UUC 200 (or UUC 200—PVC 202) packet for the RMN 14 verifies the User via the VP 12, thereby invoking a VAC 206 and accessing a plurality of the User's proprietary Financial Accounts 65 via the UAR 15, PAR 46, CCR 30, and/or NRR 31.

FIG. 29H is illustrative of an embodiment wherein an authentication process within a single sign-on environment works via the RMN 14 for the purpose of processing a financial transaction using a NAT 62, a UUC 200 (or UUC 200—PVC 202) packet for the RMN 14 verifies the User via the VP 12, thereby invoking a VAC 206 and accessing a plurality of the User's proprietary Financial Accounts 65 via the UAR 15, PAR 46, CCR 30, and/or NRR 31.

FIG. 29H is also illustrative of illustrative steps in this embodiment, including: 1) The end user logs in to the RMN 14 server by entering the URL in a web browser; 2) the RMN 14 software authenticates the end user and returns a session token; 3) The session token is what enables single sign-on to work. This token is provided as an applet parameter and is used throughout the authentication process. The users may not be asked for their credentials again as long as the session token is present; 3A) the RMN 14 invokes Rule-Modules 50 of the User, including accessing a plurality of the Financial Accounts 65 of the User, whereby the RMN 15 presents to the User via a NAT 62—UIA 16, a default Financial Account 65 or a plurality of proprietary Financial Accounts 65 for selection to process the financial transaction; 4) the User accesses an Instant Messenger applet URL from a browser and chooses a method to invoke the client; 5) User selects and/or approves a Financial Account 65 for processing the financial transaction; 5A) the browser invokes Java Web Start or the Java plugin as appropriate. Java Web Start or the Java plugin downloads the necessary Instant Messenger resource files and starts Instant Messenger; 6) Instant Messenger requests authentication to the Instant Messaging server using the session token; 7) The Instant Messaging server asks Access Manager to validate the session token. If the session is valid, Instant Messenger displays the end user's contact list and the end user can then use Instant Messenger services: chat, alerts, polls, etc; 8) The Instant Messaging server, in an illustrative embodiment, queries LDAP directly to get or set end-user information, such as contact lists or subscriptions.

Figure 30:
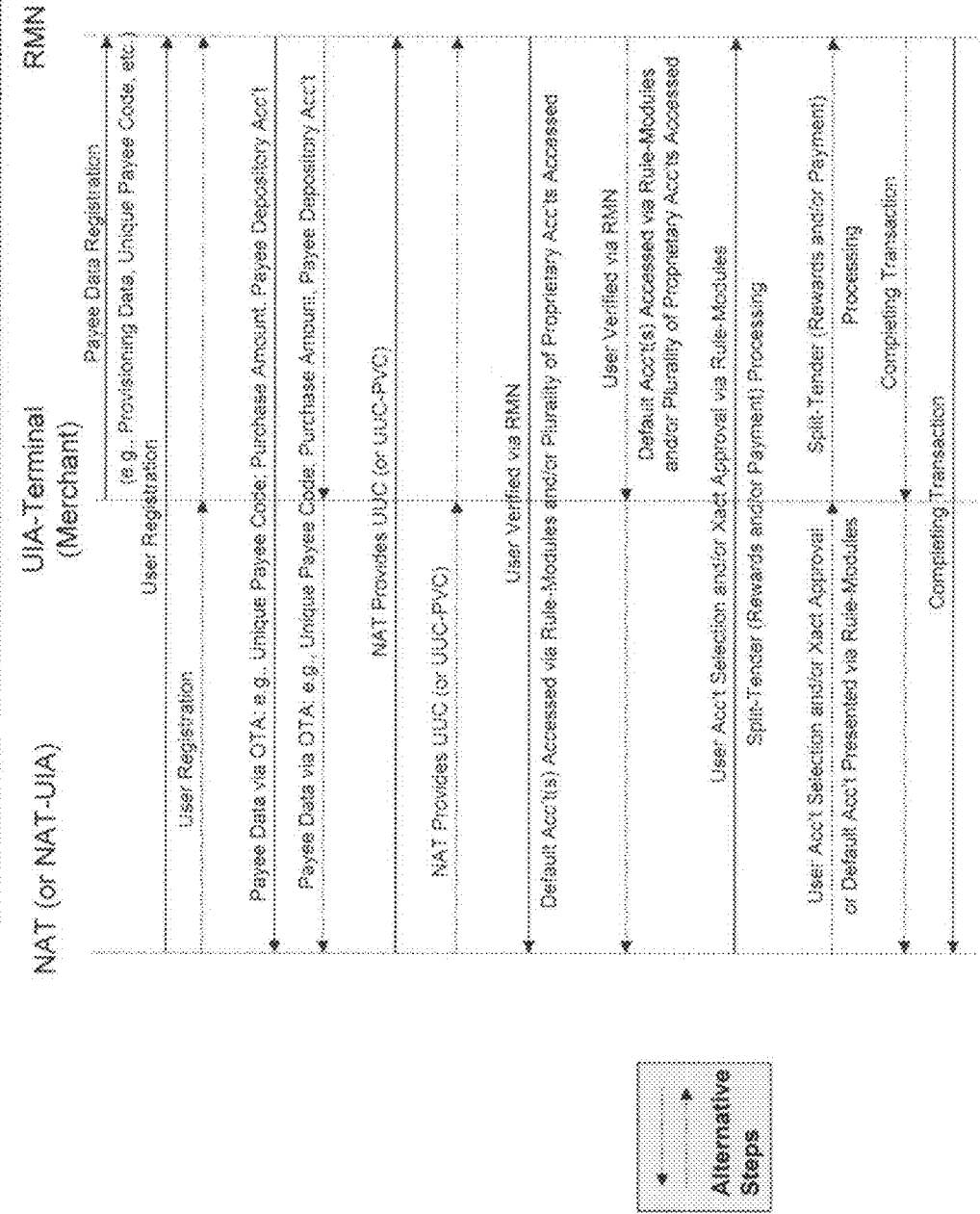
Figure 30B:
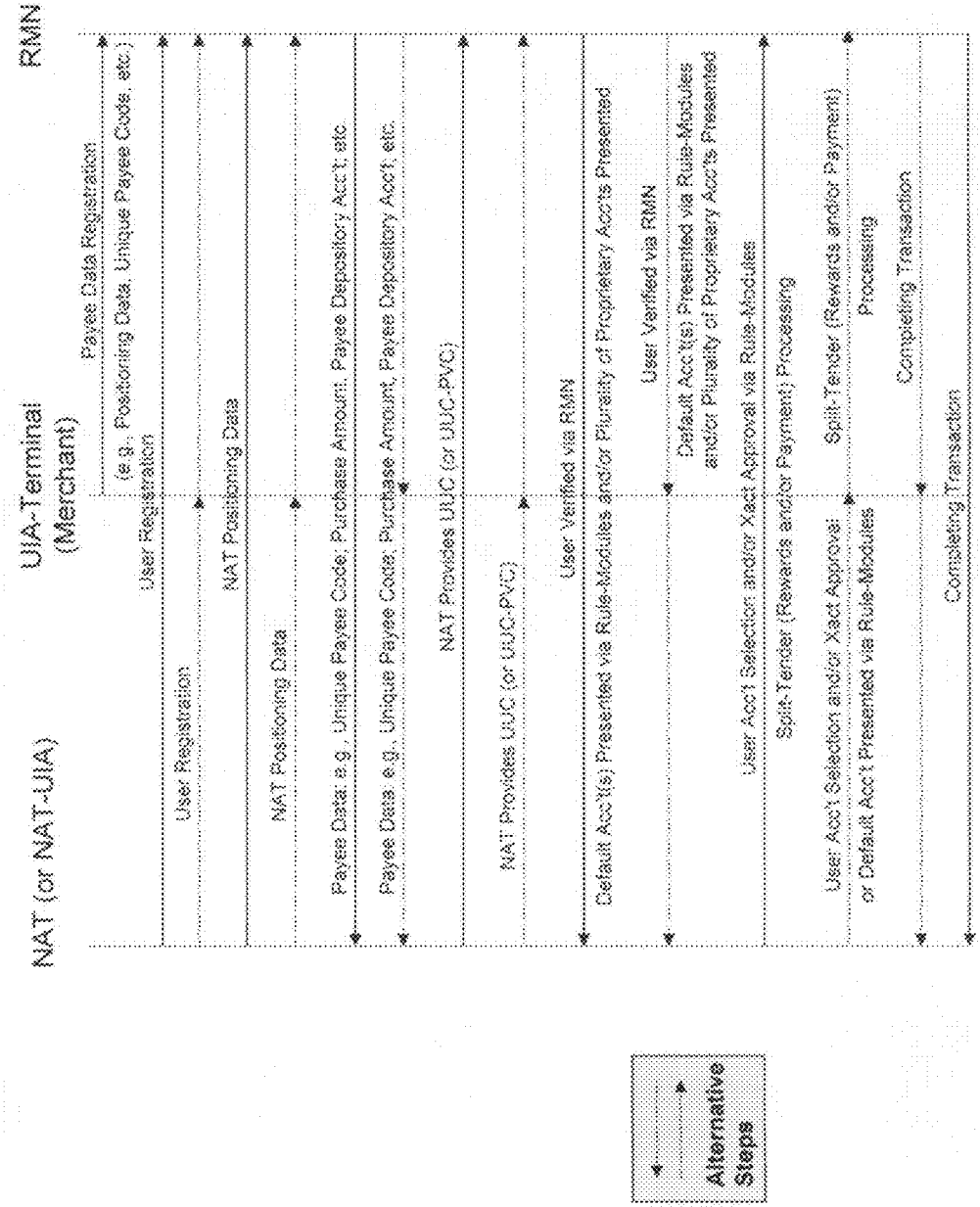
Figure 30C:
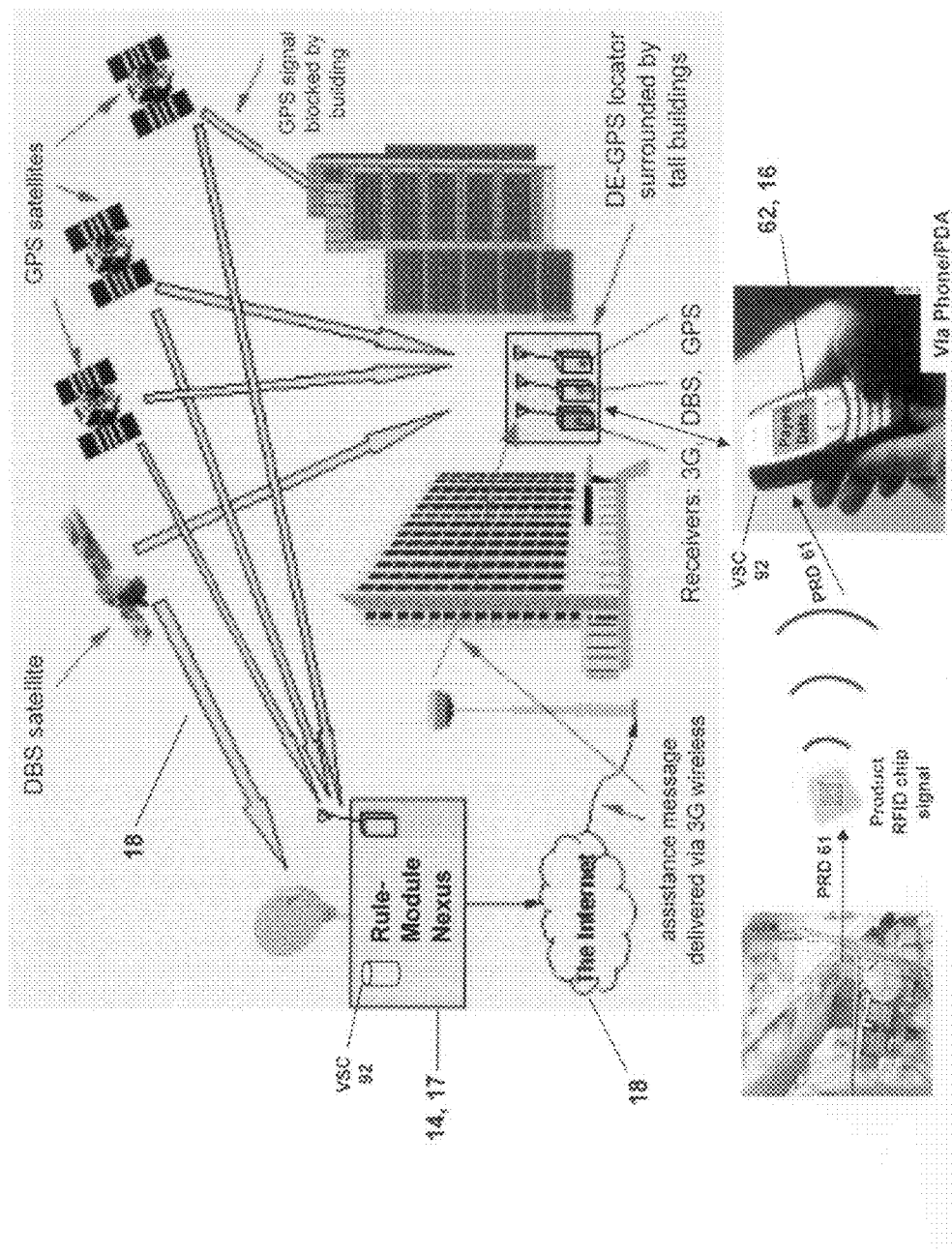
Figure 30D:
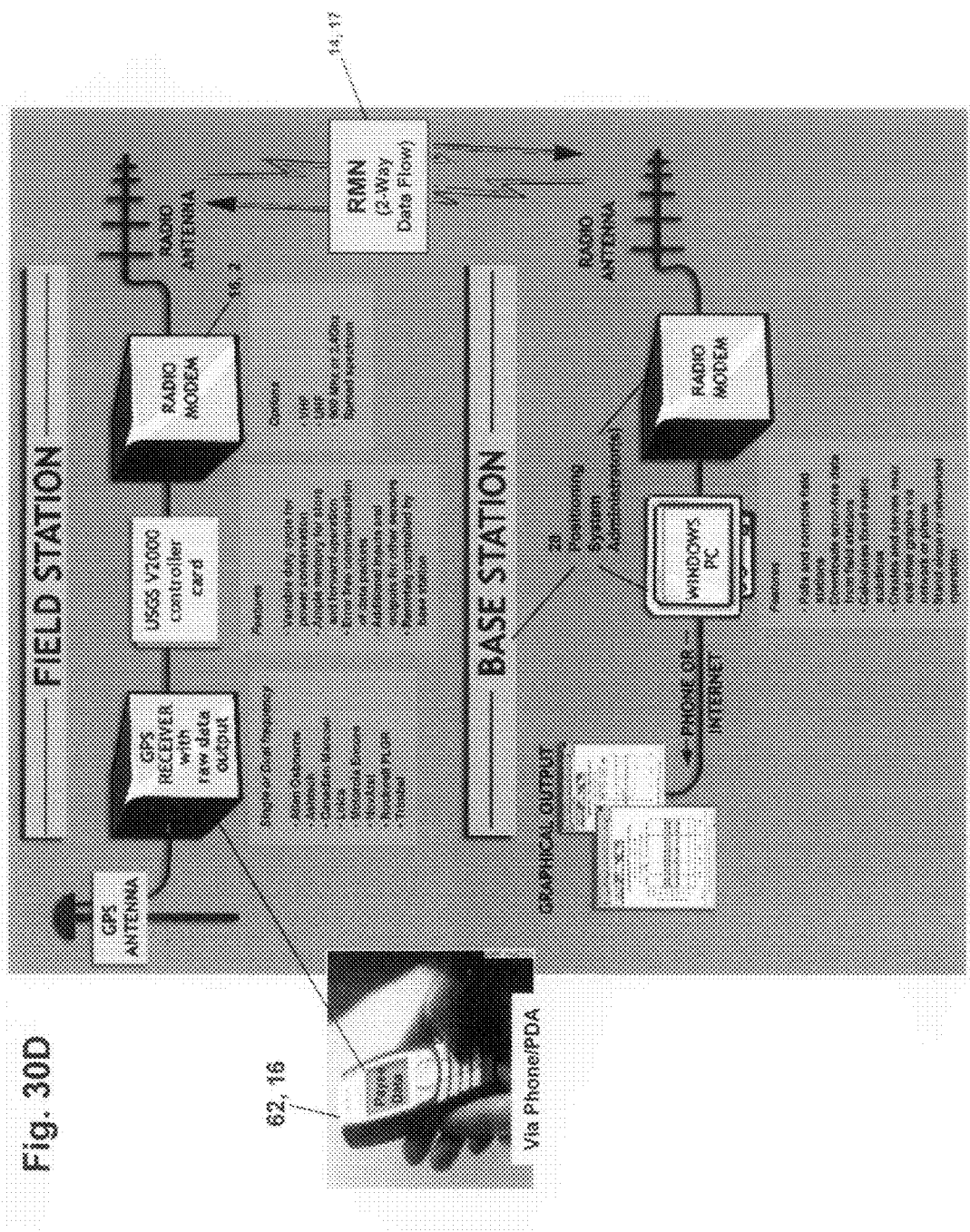

FIG. 30 to FIG. 30D illustrate illustrative embodiments of the invention used in conjunction with automatic detection and/or automatic transmission of Payee data to a NAT 62 (or NAT 62—UIA 16), whether at a physical point-of-sale merchant or in a residential context. This process enables a User to pay for goods and/or services without the requirement to use the NAT 62 to search for, and/or manually enter, Payee data such as a unique Payee code (UPC) 67, a Payee's name, a Payee's depository account, and/or a Payee's bank routing code.

FIG. 30 is an illustrative illustration of steps involved in a financial transaction processed using Over-the-Air (OTA) Provisioning and Protocols via the RMN 14 or Subset RMN 17, used in conjunction with automatic detection and/or automatic transmission of Payee data to a NAT 62 (or NAT 62—UIA 16). When a Payee registers Payee data with the RMN 14 or Subset RMN 17, the Payee, in an illustrative embodiment, associates their registration Rule-Module(s) 50, including Pattern Data 52 and Execution Commands 54, within a Payee Account Registry (PAR) 46. OTA Provisioning and Protocols hardware and software components are known in the art. In an illustrative embodiment, a SIM ("Subscriber Identification Module") is incorporated into a NAT 62 and the communication between the SIM card and the RMN 14 can be done by Short Message System (SMS) exchange and in this case named the SMS channel. In an illustrative embodiment, the NAT 62 is phase 2+ in the GSM standard and is SIM Tool Kit compliant.

In one embodiment, illustrated in FIG. 30A the Payee data may be transmitted to, or detected by, a NAT 62 from a Payee Terminal 2 or a Payee UIA 16 via any Network 18, including internet, intranet, a satellite network, a radio network, and near field communications (NFC), such as a local WiFi field. In one such embodiment, Over-the-Air (OTA) provisioning is used to provide Payee data, pre-registered with the RMN 14 or Subset RMN 17, directly from a Payee UIA 16 or Payee Terminal 2 to a NAT 62. In one embodiment, the User manually initiates the NAT 62 electronic detection, and optionally downloading and/or storing, of Payee data directly from a Payee UIA 16 or Payee Terminal 2 to the NAT 62. Alternatively, in another embodiment, the User may elect to have the NAT 62 set in an "always on" electronic detection mode, whereby the NAT 62 automatically detects, and optionally downloads and/or stores, Payee data directly from a Payee UIA 16 or Payee Terminal 2 to a NAT 62. to the RMN 14 or Subset RMN 17. This OTA Provisioning via the RMN 14 or Subset RMN 17 may electronically inform or populate the NAT 62 with Payee data to enable the User to conduct an online electronic financial transaction with the Payee in payment for goods and/or services without the User having to manually data-enter Payee data required for such a transaction. For example, such required Payee data may include a UPC 67, a Payee depository account, a Payee bank routing code, a Payee's roster of goods and/or services and associated pricing or costs. OTA is known in the art for the transmission and reception of application-related information in a wireless communications system, and is commonly used in conjunction with the Short Messaging Service (SMS), which allows the transfer of small text files even while using a mobile phone for more conventional purposes. In addition to short messages and small graphics, such files can contain instructions for subscription activation, banking transactions, ring tones, and Wireless Access Protocol (WAP) settings. OTA messages are, in an illustrative embodiment, encrypted to ensure User privacy and data security. Such OTA provisioning, in an illustrative embodiment, via the RMN 14 and using pre-registered Rule-Modules 50, enables a NAT 62 (or NAT 62—UIA 16) to select, download and install contents and applications on a NAT 62 mobile device. The software bundles used are, in an illustrative embodiment, compatible with the J2EE Client Provisioning Specification (JSR 124), for ease of uploading those bundles to the provisioning server, in an illustrative embodiment, located at the RMN 14 or Subset RMN 17. These bundles may be delivered to NAT 62 mobile phones through WAP-Push, a technology known in the art. An Application ID can uniquely identify a particular application in the NAT 62. The NAT 62 can inform the RMN 14 of application IDs in a session. In one embodiment, the User manually initiates the NAT 62 transmittal of positioning data, including real-time NAT 62 positioning coordinates, via the RMN 14 or Subset RMN 17. In one embodiment, the User may press a key on a NAT 62 cell phone or PDA having a pre-set speed-dial number or a pre-set approval command. Alternatively, in another embodiment, the User may elect to have the NAT 62 set in an "always on" OTA provisioning data mode, whereby the NAT 62 automatically communicates with a Payee via the RMN 14 or Subset RMN 17, including a Payee UIA 16—Terminal 2. The NAT 62 may optionally be populated with, download and/or store any portion of said Payee data, in an illustrative embodiment, depending on Payee Rule-Modules 50 pre-registered within a PAR 46.

FIG. 30B is an illustrative illustration of steps involved in a financial transaction processed using a Positioning System via the RMN 14 or Subset RMN 17, used in conjunction with automatic detection and/or automatic transmission of Payee data to a NAT 62 (or NAT 62—UIA 16). When a Payee registers Payee data with the RMN 14 or Subset RMN 17, the Payee, in an illustrative embodiment, associates their registration Rule-Module(s) 50, including Pattern Data 52 and Execution Commands 54, within a Payee Account Registry (PAR) 46.

In one embodiment, illustrated in FIG. 30C and FIG. 30D, said Payee data is, in an illustrative embodiment, associated with Payee-specific and Payee-unique geographic positioning data (or positioning data), such that a point-of-sale (POS) physical locality of the Payee is identified for triangulation by an electronic Positioning System, such as a Global Positioning System. As such, when a NAT 62, containing a Positioning System receiver, is located in an appropriate proximity of the Payee's POS location, such as a store or restaurant, the NAT 62 Positioning System receiver may electronically inform or be detected by an electronic Positioning System via the RMN 14 or Subset RMN 17. This detection may enable the RMN 14 or Subset RMN 17, using triangulation or other similar positioning communications, systems and/or methods, to electronically associate the location coordinates of the NAT 62 with corresponding location coordinates of a Payee, whereby the RMN 14 or Subset RMN 17 may invoke Payee Rule-Module(s) 50 to electronically inform or populate the NAT 62 with Payee data to enable the User to conduct an online electronic financial transaction with the Payee in payment for goods and/or services without the User having to manually data-enter Payee data required for such a transaction. For example, such required Payee data may include a UPC 67, a Payee depository account, a Payee bank routing code, a Payee's roster of goods and/or services and associated pricing or costs. In one embodiment, the User manually initiates the NAT 62 transmittal of positioning data, including real-time NAT 62 positioning coordinates, via the RMN 14 or Subset RMN 17. In one embodiment, the User may press a key on a NAT 62 cell phone or PDA having a pre-set speed-dial number or a pre-set approval command. Alternatively, in another embodiment, the User may elect to have the NAT 62 set in an "always on" positioning data mode, whereby the NAT 62 positioning coordinates are automatically transmitted via the RMN 14 or Subset RMN 17. Once the NAT 62 positioning data is received by the Positioning System via the RMN 14 or Subset RMN 17, the Payee positioning data pre-registered with the RMN 14 or Subset RMN 17, may be associated with the real-time NAT 62 positioning data, whereby Payee data may be transmitted or detected by the NAT 62. The NAT 62 may optionally download and/or store any portion of said Payee data, in an illustrative embodiment, depending on Payee Rule-Modules 50 pre-registered within a PAR 46.

In one embodiment, illustrated in FIG. 30D, the NAT 62 further comprises an RFID interrogator for scanning a product's embedded, or adhered, RFID chip for Product-Related Data (PRD) 91 comprising: product name, brand, and manufacturer; unique package code; unique product inventory/tracking code, and; product price. In an alternative embodiment, the NAT 62 may further comprise a bar-code reader for scanning a product's Universal Product Code bar-code label. Each product scanned by the NAT 62 adds the product PRD 91 to the User's "virtual shopping cart" (VSC) 92, which is aggregated product purchasing data stored either on the NAT 62 or on a RMN 14 or subset RMN 17. The VSC 92 enables a real-time cumulative total of products selected by the User for purchase; products added to the VSC 92 may also be deleted by the User, using a Display 7, a keypad 70, or audio commands via the NAT 62 or UIA 16—Transaction Terminal 2. Upon a User concluding product selection(s), the VSC 92 tabulates the total purchase price and product itemization for presentation to the User via the NAT 62. The User may then approve the purchase via the NAT 62 for purposes of processing the financial transaction, with the Payee data being invoked by the NAT 62 via an electronic Positioning System, as described in other embodiments above. As such, in one embodiment within a point-of-sale retailer, the User may thereby conduct real-time product selections and purchases while in a store aisle, avoiding the need to wait for, or pass through, any standard checkout lane, whether self-serve or cashier-attended. In addition, product purchasing data in the VSC 92 may be communicated to a Third-Party Platform 28 of a retailer or manufacturer, for purposes of product inventory, tracking, and logistics.

Processing Financial Transactions Via Arbitrage or Auction Rule-Module(s)

In one illustrative embodiment, processing a User's financial transaction comprises invoking a Rule-Module 50 governing an automated arbitrage, or auction, software program. In one example of this embodiment, a first Account Issuer competes against at least a second Account Issuer to offer the User, or for the User to select, a particular Financial Account 65 for settlement of the financial transaction, either concurrent with a financial transaction or on a post-dated basis.

Another embodiment of Rule-Module 50 may invoke a rewards or loyalty program comprising: providing for the User, or offering the User, split-tender processing with the financial transaction via a rewards or loyalty Financial Account 65; providing for the User, or offering the User, a concurrent or post-dated coupon, printed or electronic, with the financial transaction. Said rewards or loyalty program may comprise input from a product manufacturer. In one embodiment, a printed receipt associated with a User's financial transaction comprises: a coupon for a manufacturer's product(s); a coupon for a service provider's offering(s); a tabulation of discounts provided for the instant financial transaction. In another embodiment, an electronic coupon associated with a User's financial transaction comprises: an email for a manufacturer's product(s); an email for a service provider's offering(s); an email tabulation of discounts provided for the instant financial transaction.

In another embodiment, the UIA-VC 204 is appended to the transaction data of the Financial Transaction Request Packet 251 and a Rule-Module 50 of the RMN 14 thereby invokes a real-time rewards discount during a financial transaction. The RMN 14 may invoke a rewards Financial Account 65 with which processing of a split-tender financial transaction proceeds, wherein via the RMN 14, the User's purchase is partially split between, for example, a Wells Fargo® Visa® Debit Financial Account 65, and a Safeway® Club Discount rewards Financial Account 65. Alternatively, the RMN 14 may invoke a real-time coupon which is transmitted to the User's mobile NAT 62 via a barcode image for presentation on the NAT's 62 Display 7 and scanning via the POS Terminal 2—UIA 16, with which processing of a split-tender financial transaction proceeds, wherein via the RMN 14, the User's purchase is partially split between, for example, a BofA® MasterCard® Debit Financial Account 65, and a Kellogg's® cereal coupon deduction from the retail price.

In one example, an arbitrage or auction Rule-Module 50 may automatically invoke a Financial Account 65, whether for payment, rewards, or coupons, as the default option which the User can select for processing the financial transaction, based upon a competitive bidding process (arbitrage or auction) amongst Account Issuers, product manufacturers, and other parties via the RMN 14. The auction may be taking place in real-time during the financial transaction, or at any previous time wherein the results are invoked by Rule-Modules 50 when a financial transaction is being processed.

In another embodiment, an arbitrage or auction Rule-Module 50 may automatically invoke a plurality of Financial Accounts 65 as default options from which the User can select for processing the financial transaction. In this embodiment, the Financial Account(s) 65 may be displayed to the User in a Ranking 96 manner, comprising: sequential display, a Financial Account 65 at a time, until the User makes a selection; in parallel, a plurality of Financial Accounts 65 at a time or concurrently, optionally including visible indicators. Said visible indicators may comprise: the respective Rankings 96 of the Financial Accounts 65; the offered incentives for selecting the respective Financial Accounts 65.

In one embodiment, the User may elect to decline any offered Financial Account(s) 65, in which case a Rule-Module 50 invokes at least one additional Financial Account 65 to offer the User for processing the financial transaction.

In one embodiment, an arbitrage or auction Rule-Module 50 computes the automatic selection of a Financial Account 65 to offer the User based up predetermined criteria comprising: improving a transaction benefit for an account issuer; improving a transaction benefit for the user, and; improving a transaction benefit for a payee.

In one embodiment, an arbitrage (or auction) Rule-Module 50 comprises a computational program where an Account Issuer can bid per financial transaction, or per purchased product or service, to buy space on a retailer or a manufacturer's printed or electronic receipts which results from a financial transaction. In another embodiment, an Account Issuer and/or a manufacturer split revenues with a retailer where a User is conducting a financial transaction. The exact amount of the split is may reflect the several weighted factors, of traffic, purchase-through-rates and other aspects.

An Account Issuer signs up via the Rule-Module Nexus 14 and, once approved, is able to select the format of coupons, the retailer(s), the type of retailer(s), the User(s), and/or the type of User(s) for which an Account Issuer wants to offer competitive Financial Account(s) 65, competitive transaction processing and/or competitive coupons/rewards.

In an alternative embodiment whether via the Internet or at the point of sale (POS), an Account Issuer can bid on keywords which a User may input or click on when Internet browsing. When a User clicks or inputs a keyword on which an Account Issuer has the highest bid, the Account Issuer can issue an electronic or printed coupon, make an adjustment to Financial Data in a User's rewards/loyalty Financial Account 65, and/or influence the Ranking 96 of a Financial Account 65 which may be offered to the User for selection in processing the financial transaction. At a point when the User is shopping either online or at a point-of-sale, the Account Issuer may be paid by a retailer or manufacturer via the Rule-Module Nexus 14 for having influenced the User's selection of a product, retailer or Financial Account 65.

In another embodiment, an Account Issuer such as a retailer or manufacturer can bid on keywords relating to Ancillary Transaction Data 172 of a User's financial transaction over the Internet or at POS. Prior to, or concurrent with, a User making a purchase, a keyword associated with that purchase may be the subject of such bids, said keyword comprising: the name or type of product; the geographic location of a purchase; the name or type of retailer; the dollar amount of the purchase; the manufacturer of the product; and the like. When a User purchases a product on which an Account Issuer has the highest bid, the Account Issuer can issue an electronic or printed coupon, make an adjustment to Financial Data in a User's rewards/loyalty Financial Account 65, or influence the Ranking 96 of a Financial Account 65 which may be offered to the User for selection in processing the financial transaction. At a point when the User is shopping either online or at a point-of-sale, the Account Issuer may be paid by a retailer or manufacturer via the Rule-Module Nexus 14 for having influenced the User's selection of a product, retailer, or Financial Account 65.

In another embodiment, an Account Issuer can bid on keywords relating to Ancillary Transaction Data 172 of a User's financial transaction over the Internet or at POS. Prior to, or concurrent with, a User making a purchase, a keyword associated with that purchase may be the subject of such bids, said keyword comprising: the name or type of product; the geographic location of a purchase; the name or type of retailer; the dollar amount of the purchase; the manufacturer of the product; and the like. When a User purchases a product on which an Account Issuer has the highest bid, the Account Issuer can issue an non-coupon advertisement, on a printed receipt, or in an electronic receipt, associated with the financial transaction. At a point when the User is shopping either online or at a point-of-sale, the Account Issuer may be paid by a retailer or manufacturer via the Rule-Module Nexus 14 for having influenced the User's selection of a product, retailer, or Financial Account 65.

In an illustrative embodiment, via the Rule-Module Nexus 14, an Account Issuer can either bid low on the same term, looking for keywords with a large bid gap (more on that later) or an Account Issuer can bid on very specific keywords with little competition. The Rule-Module Nexus 14 pricing computations may automatically adjust the cost of a keyword. If the Rule-Module Nexus 14 data shows that a keyword is less likely to turn into actionable business results (Purchase-Through-Rates)—such as a related online or POS sale or financial transaction, registrations, phone calls, or newsletter signups—the Rule-Module Nexus 14 may reduce the price an Account Issuer pays for that keyword.

The Rule-Module Nexus 14 may provide statistics to an Account Issuer, reflecting basic User selection(s) and revenue information as well as monthly totals. The Rule-Module Nexus 14 may also administer bidding on keywords via a software engine comprising a formula or algorithm such as the example below:

$$s = \sqrt{\frac{1}{N}\sum_{i=1}^{N}(x_1 - \bar{x})^2}$$

In another illustrative embodiment, NAT 62 transmits a data packet to the RMN 14 which invokes a Rule-Module 50 for processing a financial transaction, said data packet comprising: the User's geographic location based on GPS coordinates, the UIA-VC 204 merchant's address, descriptions of products being purchased, and the like. As such, a rewards Rule-Module 50 may be invoked to offer the User a coupon or advertisement that is customized for the User's real-time financial transaction, comprising: User location, time of day/night, products being purchased, and the like.

User Account Registry (UAR) for Financial Accounts

Figure 11A:
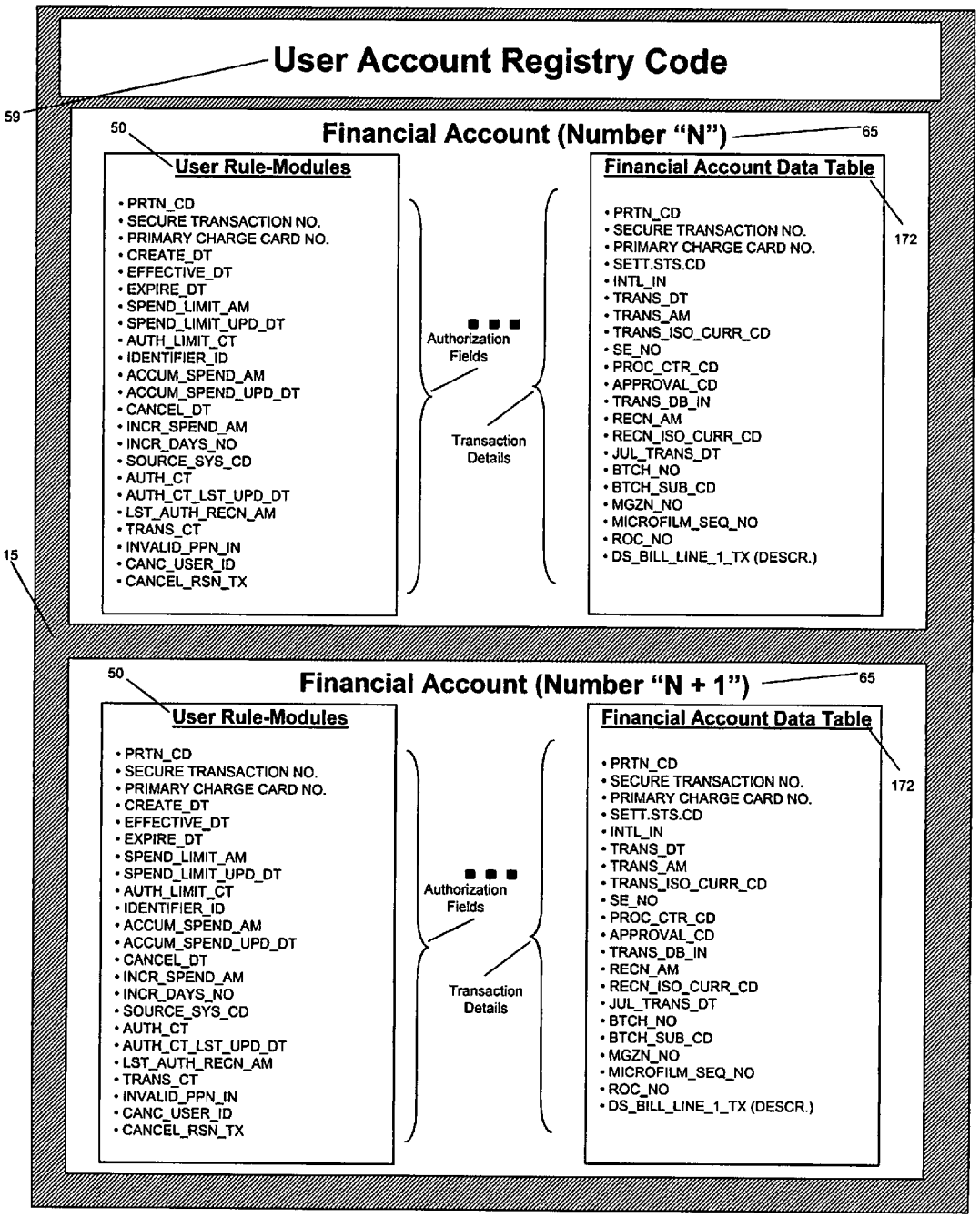
FIG. 11A shows a block diagram of an illustrative data structure of the UAR platform in accordance with the present invention.

FIG. 11A illustrates two proprietary Financial Accounts 65 within a UAR 15 registered to a User of the RMN 14. The Rule-Modules 50 comprise which govern the Financial Account 65; the Account Transaction Data 172 optionally stores information relating to a particular transaction. As is known in the art, the processing mechanisms and data structure methods can be structured in a variety of ways.

In an illustrative embodiment, the UAR 15 comprising "live" account data is "online", whereby it is remotely located from a NAT 62, a UIA 16, and a Terminal 2. As such, whether during a financial transaction originating by a User via Point-of-Sale (POS), Internet, Mail Order, or Telephone Order, the UAR 15 is only accessible by the User via Network 18 connectivity.

Figure 11B:
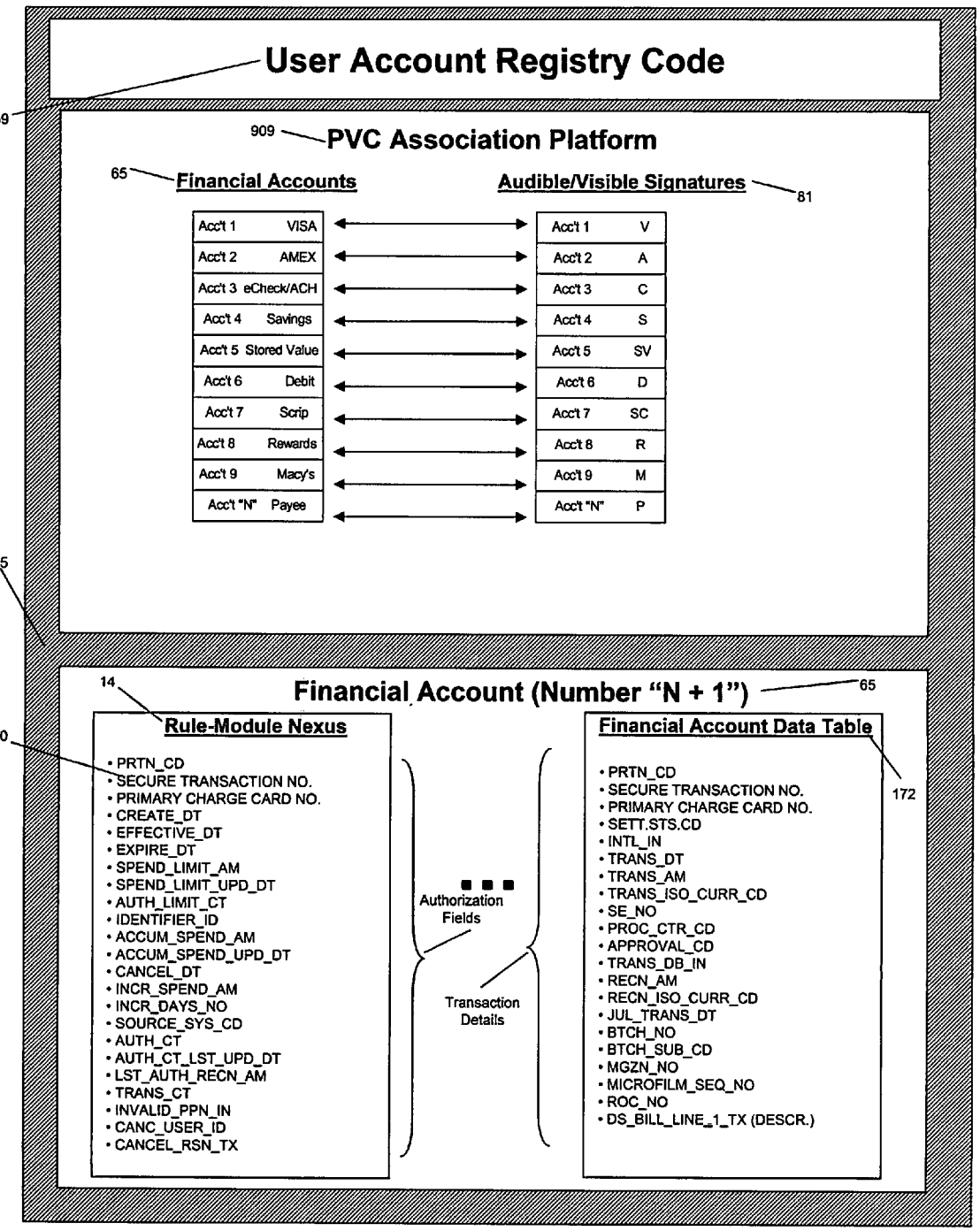
FIG. 11B illustrates an embodiment wherein an electronic Audible/Visible Signature is matched via the RMN with a Financial Account of a UAR.
Figure 12:
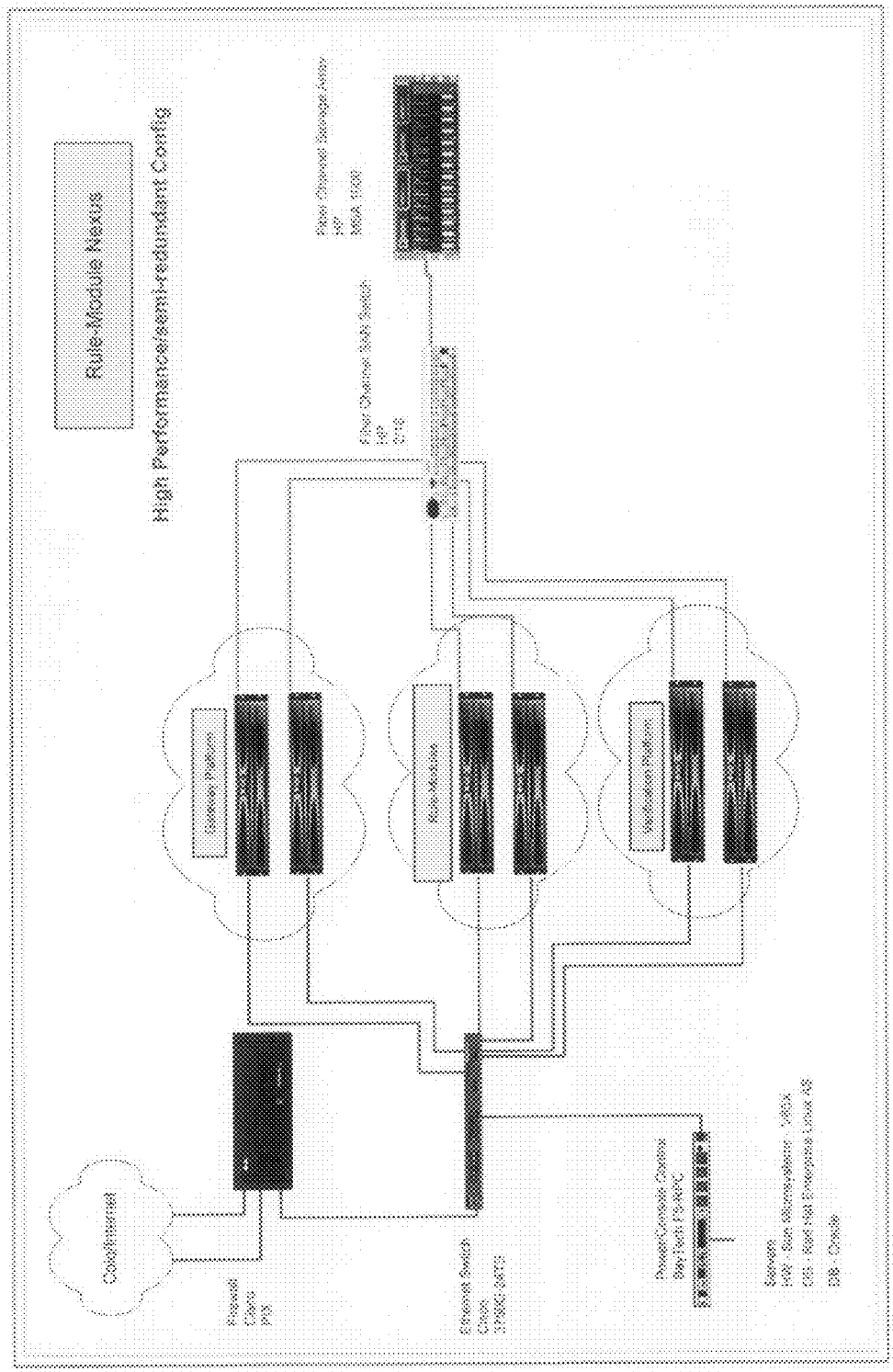
FIG. 12 shows a high performance, semi-redundant configuration for the RMN

FIG. 11B illustrates another embodiment, wherein an electronic Audible/Visible Signature 81 is matched with a Financial Account 65 of a UAR 15. In one embodiment, the Audible/Visible Signature 81 is "thin-client", comprising no "live" financial data and no "live" Financial Account 65 number, and may be stored with a NAT 62 to facilitate a User's selection of a Financial Account 65 for processing an online financial transaction. Note that the Audible/Visible Signature 81 may comprise: a visible display of an electronic Visible Signature 81; a visible text message, and; an audible signal of an electronic Audible Signature 81.

In one illustrative embodiment of the invention, the UAR 15 within the RMN 14 comprises two Financial Accounts 65 comprising Rule-Modules 50 which govern, for example, a per purchase spending limit, a time of day use, geographic location, type or nature of financial transactions, a day of week use, certain merchant use and/or the like, wherein an additional verification may be required when using the NAT 62 outside of the restriction. The restrictions may be personally assigned by the User, the Account Issuer or the RMN 14. For example, in one illustrative embodiment, the account may be established such that purchases above $X (i.e., the spending limit) must be verified by the User using a special secondary Personal Verification Code (PVC) 202 which may be recognized by the RMN 14 as being unique to the User and the correlative financial transaction wherein the Financial Account 65 is selected. Where the requested purchase may be above the established per purchase spending limit, the User may be required to provide, for example, to enter biometric data, wherein a biometric sample of the user is electronically scanned by a user interface apparatus. The restrictions may also be restricted by other User parameters, such as, geographic region (NAT 62 may only be used in a certain geographic region), product type (NAT 62 may only be used to purchase a certain product type), or Internet use only (NAT 62) transactions.

In yet another embodiment, settlement of a financial transaction occurs on a predetermined time schedule, comprising: net-30 settlement terms; recurring monthly charges; and the like. In one embodiment, the financial amounts from an online transaction are deposited into an escrow account for an Internet Account Issuer or a User, instead of being directly credited to or debited from a User's Financial Account 65. This may be the case where a purchase of a product is made over the Internet 18 using an online auction provider such as eBay™, wherein funds may only be released upon delivery or receipt of the purchased product.

In FIG. 18, another illustrative embodiment is shown in which there is a UAR 15 comprising a plurality (e.g., at least two) proprietary Financial Accounts 65 of a User and/or at least one Account Issuer Account in the Rule-Module Nexus 14.

In FIG. 18I, another illustrative embodiment is shown including a RMN 14 Platform and Service Stack. This embodiment also is illustrative of exception item support or lifecycle management. Here, putting the RMN 14 in front of the Account Issuer or acquirer of record, platform 28, ensures that the Acquirer retains the ability to adjudicate exception items. In addition, because credit transactions could now be "pre-authorization secured with PVC 202" via the RMN 14, the volume of chargebacks could drop. In an illustrative embodiment, Users may "seal" their Financial Transaction Authorization Requests 251 with a PVC 202 or other security tool managed via the RMN 14, exception items should be minimized when compared to current market behavior. In the event that exceptions and charge-backs occur, the tracking of these items and data support may occur via the RMN 14 to more accurately account for transactions and provide an audit trail, particularly with respect to Point of Sale transactions such as rewards or split-tender processing previously not supported (e.g. United Airlines® Mileage Plus Points). In the event of split-tender processing, settlement of the financial transaction is divided according to Rule-Modules 50 in the RMN 14, between or among pre-registered Financial Accounts 65 of the User. In an illustrative embodiment, the RMN 14 data flow supports existing infrastructure (e.g. Visa® Reengineering Disputes Infrastructure) to ensure that handling of exception items is a value-added service Acquirers may provide their merchant customers.

In one embodiment, there may be at least one electronic Master User Account Registry 15 platform comprising all of the Financial Accounts 65 in the Rule-Module Nexus and there may be at least one electronic Local or Subset User Account Registry 19 platform comprising a sub-set of the Financial Accounts 65 in the Rule-Module Nexus. In another embodiment, a UAR 15 comprising Financial Accounts 65 of the User reside within Third-Party Platforms 28, external to the Master RMN 14.

In one embodiment of a Master UAR 15, a RMN 14 provides "pan-payment portfolio" rewards and anti-fraud programs.

FIG. 13A illustrates one such embodiment, wherein the RMN 14 and Master UAR 15 may convert, exchange, translate and/or aggregate financial data via rewards or loyalty programs, optionally with communications with Third-Party Platforms 28. In one example, the Master UAR 15 and the RMN 14 operate in conjunction with a software neural network and may electronically aggregate and project purchasing patterns within a Registry Financial Account 65, and across a plurality of Registry Financial Accounts 65 of the User, to more accurately reflect the payment preferences of the User. In this manner, more useful, pertinent rewards programs and benefits can be formulated for the User.

In another example, the Master UAR 15 and the RMN 14 operate in conjunction with a software neural network and may electronically aggregate and project usage patterns within a Registry Financial Account 65, and across a plurality of Registry Financial Accounts 65 of the User, to more accurately reflect the payment patterns of the authentic User. In this way, fraud detection is accelerated and enhanced, given that abnormal or deviating payment patterns can be more readily prevented and detected, since an unauthorized user may attempt to disperse fraudulent purchases across several Registry Financial Accounts 65 in the hope that no unusual payment activity in any one Registry Financial Account 65 might be detected. Here, the unusual payment activity may be detected via an abnormal pan-portfolio payment pattern, involving a plurality of Registry Financial Accounts 65.

Pan-Portfolio Analytics: Reports/Queries. Security, Data-Mining

Figure 34:
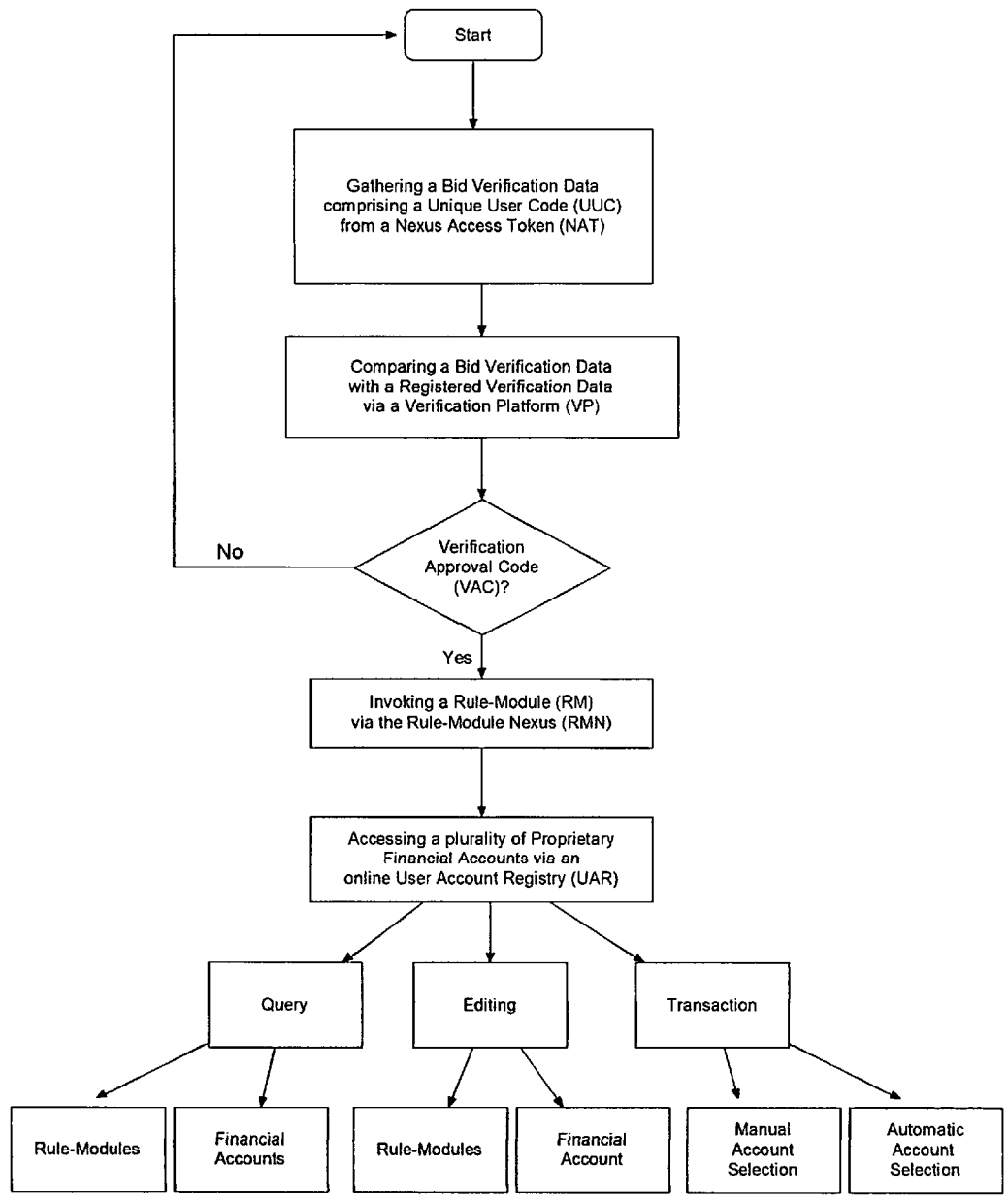
FIG. 34 illustrates an embodiment of the invention for accessing an online user account registry.

FIG. 34 illustrates an embodiment for accessing a plurality of proprietary Financial Accounts 65 via online user account registry, wherein accessing comprises: querying, editing, and transacting. In one embodiment, a User's query may be accompanied by invoking an arbitrage Rule-Module 50, presenting advertisements or rewards incentives to the User while the User is querying their Financial Account(s) 65.

Figure 35:
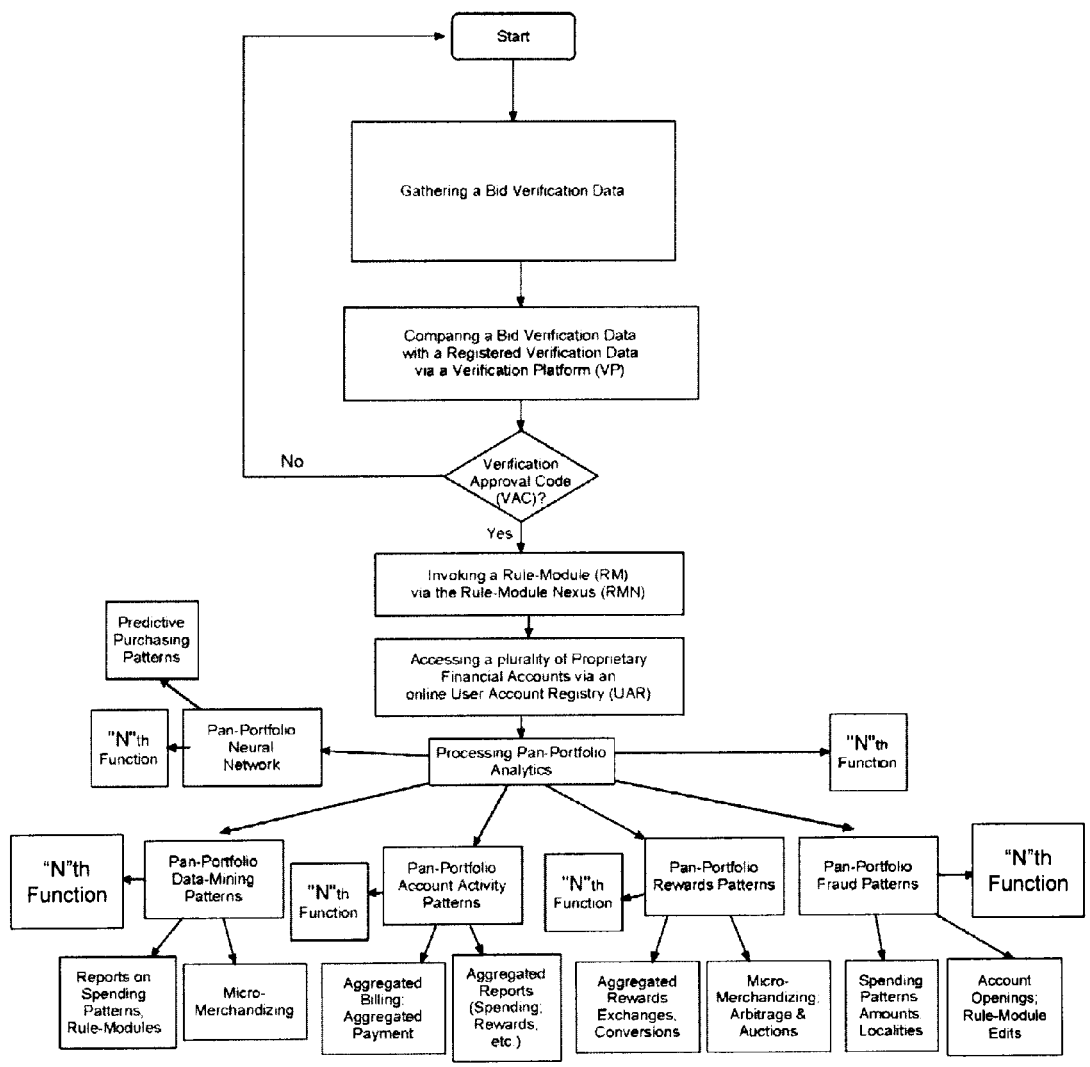
FIG. 35 illustrates an embodiment of the invention for processing pan-portfolio analytics.

FIG. 35 illustrates an embodiment for processing pan-portfolio analytics, wherein a User may access their UAR 15 via a Rule-Module 50 comprising: a key-word search; a report on activity in their Financial Accounts 65, such as spending report by category of expenditures, by chronology of expenditures, by tax-deductibility, and the like. FIG. 35: Pan-Portfolio (=Accessing a Plurality of Financial Accounts within a User Account Registry) Analytics enable the development of mathematical models and neural networks for fraud-detection, rewards programs, micro-merchandising, data-mining, and the like. Said Pan-Portfolio Analytics comprise data compiled via the Rule-Module Nexus from a plurality of otherwise inaccessible Proprietary Financial Accounts. As such, pan-portfolio analytics are compiled via a plurality of otherwise inaccessible Proprietary Financial Accounts being rendered accessible by the Rule-Module Nexus.

Figure 36:
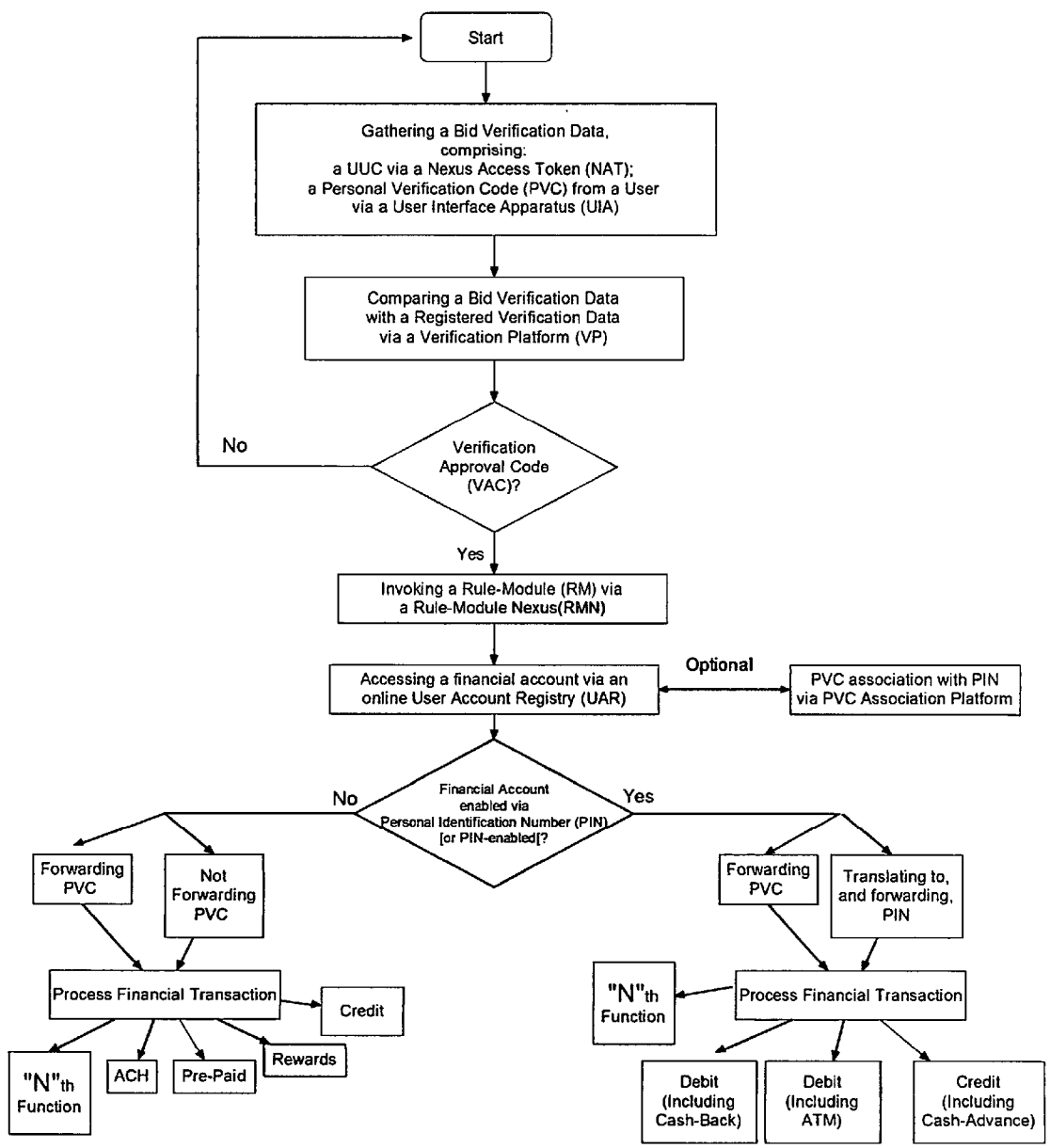
FIG. 36 illustrates an embodiment of the invention for processing a financial transaction via associating a personal verification code with a personal identification number.

FIG. 36 illustrates an embodiment wherein as determined by the RMN 14, the PVC Association Platform 909 may also forward the PVC 202, comprising: forwarding the PIN to a debit processing Network 18, and authorizing a PIN-enabled debit financial transaction; forwarding the PVC 202 to a debit financial transaction processing Network 18, and authorizing a PIN-enabled debit financial transaction; forwarding the PVC 202 to a financial transaction processing Network 18 and authorizing a PIN-enabled financial transaction; forwarding the PVC 202 to a financial transaction processing Network 18 and authorizing a non-PIN enabled financial transaction. As such, the User may "pre-PIN" any or all of their Financial Accounts 65, enabling cash-back and cash advance financial transactions. The RMN 14 may be enable a PIN-validated debit transaction without the User providing their PIN to the RMN 14, such that if the User's accessed to their UAR 15 is protected by requiring a PVC 202, a debit Financial Account 65 therein may be forwarded to process a financial transaction with the RMN 14 appending a confirmation that the User's transaction was validated by having submitting their PVC 202 to the VP 12 for verification of their authority to access the UAR 15. As such, a PIN-less debit transaction may be authorized for processing.

Figure 38A:
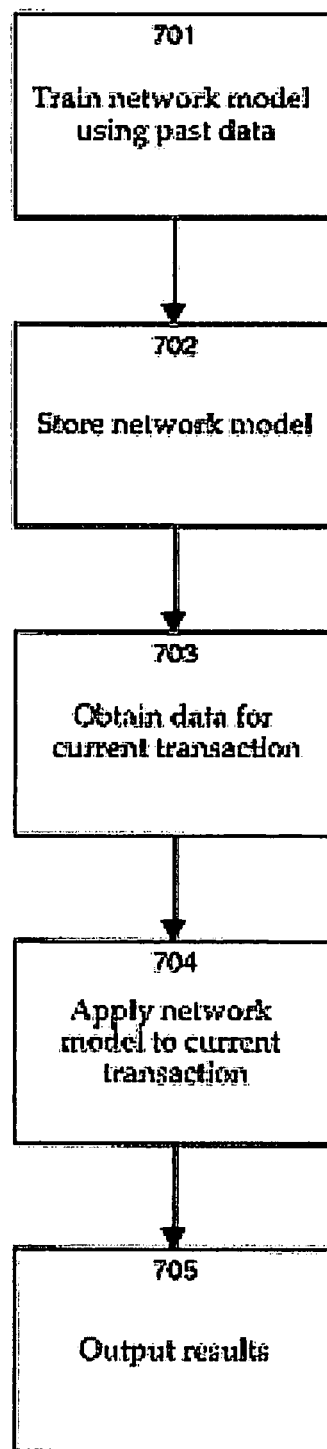
FIG. 38A and FIG. 38B illustrate functions and components of the pan-portfolio Neural Subsection of the Rule-Module Nexus.

FIG. 38A illustrates an embodiment of an overall flowchart illustrating the major functions and operations of the pan-portfolio Neural Subsection 99 within the RMN 14. First Neural (or Network) Model 801 is trained (Step 701) using data describing past transactions from the UAR 15. Then data describing the Neural (or Network) Model 808 is stored (Step 702). Once the Neural (or Network) Model 801 description is stored, system RMN 14 is able to process current transactions. RMN 14 obtains data for a current transaction (Step 703), and applies the current transaction data to stored the Neural (or Network) Model 801(Step 704). The Neural (or Network) Model 801 determines a fraud score and reason codes, which are output (Step 705) to the User, the Prior Pattern Platform 806, or to Third-Party Platform 28.

Figure 38B:
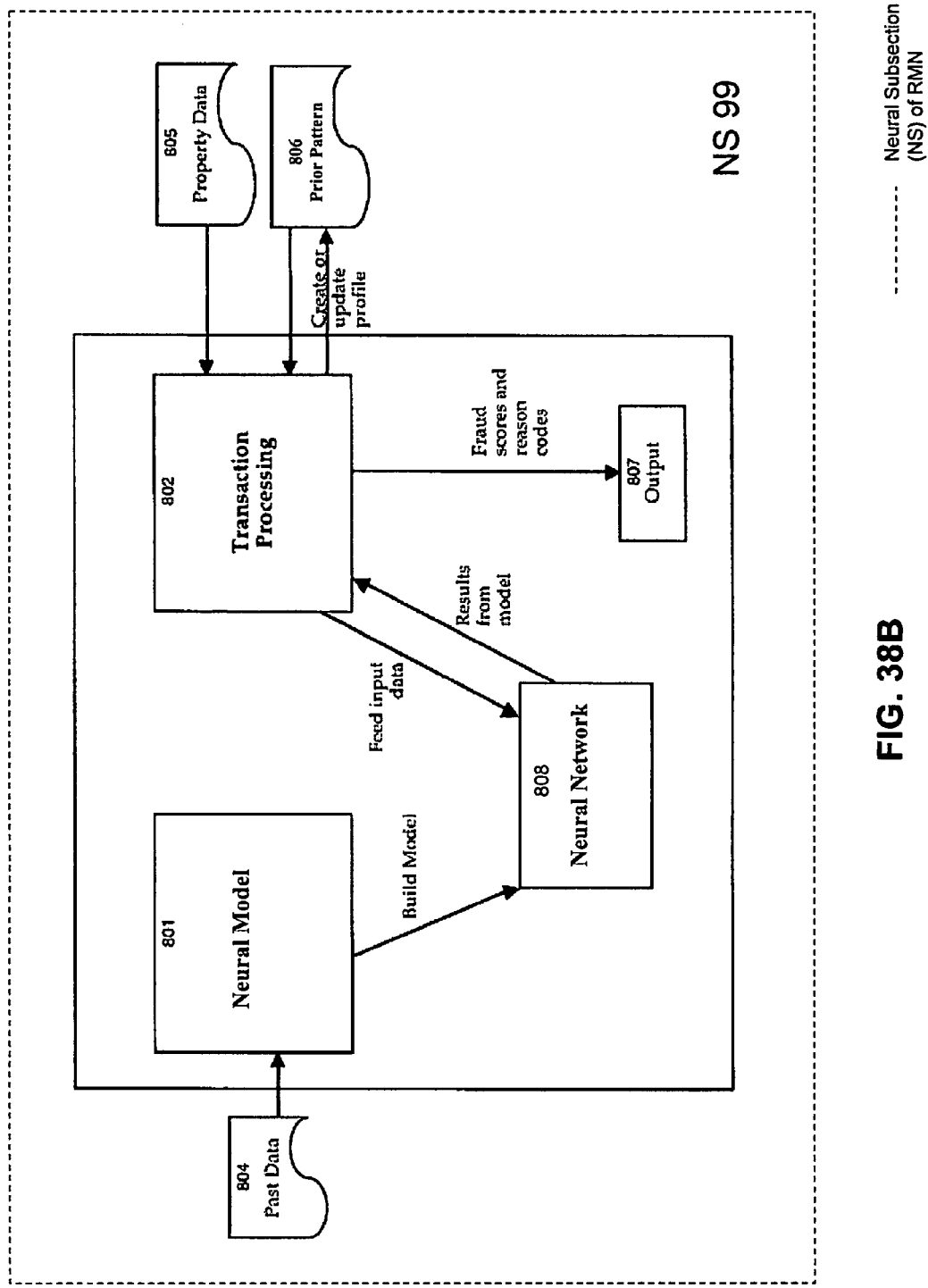

FIG. 38B illustrates an embodiment of overall functional architecture of the pan-portfolio Neural Subsection (NS) 99 of the RMN 14. This Neural Subsection 99 of the RMN 14 is broken down into two major components: Neural (or Network) Model 801 and Transaction Processing Platform 802. Neural (or Network) Model 801 uses Past Data 804 to build Neural Network 808 containing information representing learned relationships among a number of variables. Together, the learned relationships form a model of the behavior of the variables. Although a neural network is used in the preferred embodiment, any type of predictive modeling technique may be used. For purposes of illustration, the invention is described here in terms of a neural network. Transaction Processing Platform 802 performs three functions: 1) it determines the likelihood of fraud for each transaction by feeding data from various sources Property Data 805, Area Data 806 into Neural Network 808, obtaining results, and outputting them via Output Platform 807; 2) when applicable, it creates a record in the Prior Pattern (PP) Platform 806 summarizing past transactional patterns of the customer; and 3) when applicable, it updates the appropriate record in the Prior Pattern Platform 806.

The Neural (or Network) Model 801 further comprises use software for "learning" relationships through repeated exposure to data and adjustment of internal weights. They allow rapid model development and automated data analysis. Essentially, such networks represent a statistical modeling technique that is capable of building models from data containing both linear and non-linear relationships. While similar in concept to regression analysis, neural networks are able to capture nonlinearity and interactions among independent variables without pre-specification. In other words, while traditional regression analysis requires that nonlinearities and interactions be detected and specified manually, neural networks perform these tasks automatically. For a more detailed description of neural networks, see D. E. Rumelhart et al, "Learning Representations by Back-Propagating Errors", Nature v. 323, pp. 533-36 (1986), and R. Hecht-Nielsen, "Theory of the Backpropagation Neural Network", in Neural Networks for Perception, pp. 65-93 (1992), the teachings of which are incorporated herein by reference.

Neural networks learn from the "training" process, the general techniques of which involves the following steps: 1) Repeatedly presenting examples of a particular input/output task to the neural network model; 2) Comparing the model output and desired output to measure error; and 3) Modifying model weights to reduce the error. This set of steps is repeated until further iteration fails to decrease the error. Then, the network is said to be "trained." Once training is completed, the network can predict outcomes for new data inputs.

Examples of software systems for running platforms in the Neural Subsection of the RMN 14 include the Internet Fraud Screen (IFS) system developed by CyberSource Corporation, of Mountain View, Calif., and the FraudShield™ system, developed by ClearCommerce Corporation, of Austin, Tex. An example of a case-based fraud detection system is the Minotaur™ system, developed by Neuralt Technologies, of Hampshire, UK.

Figure 38C:
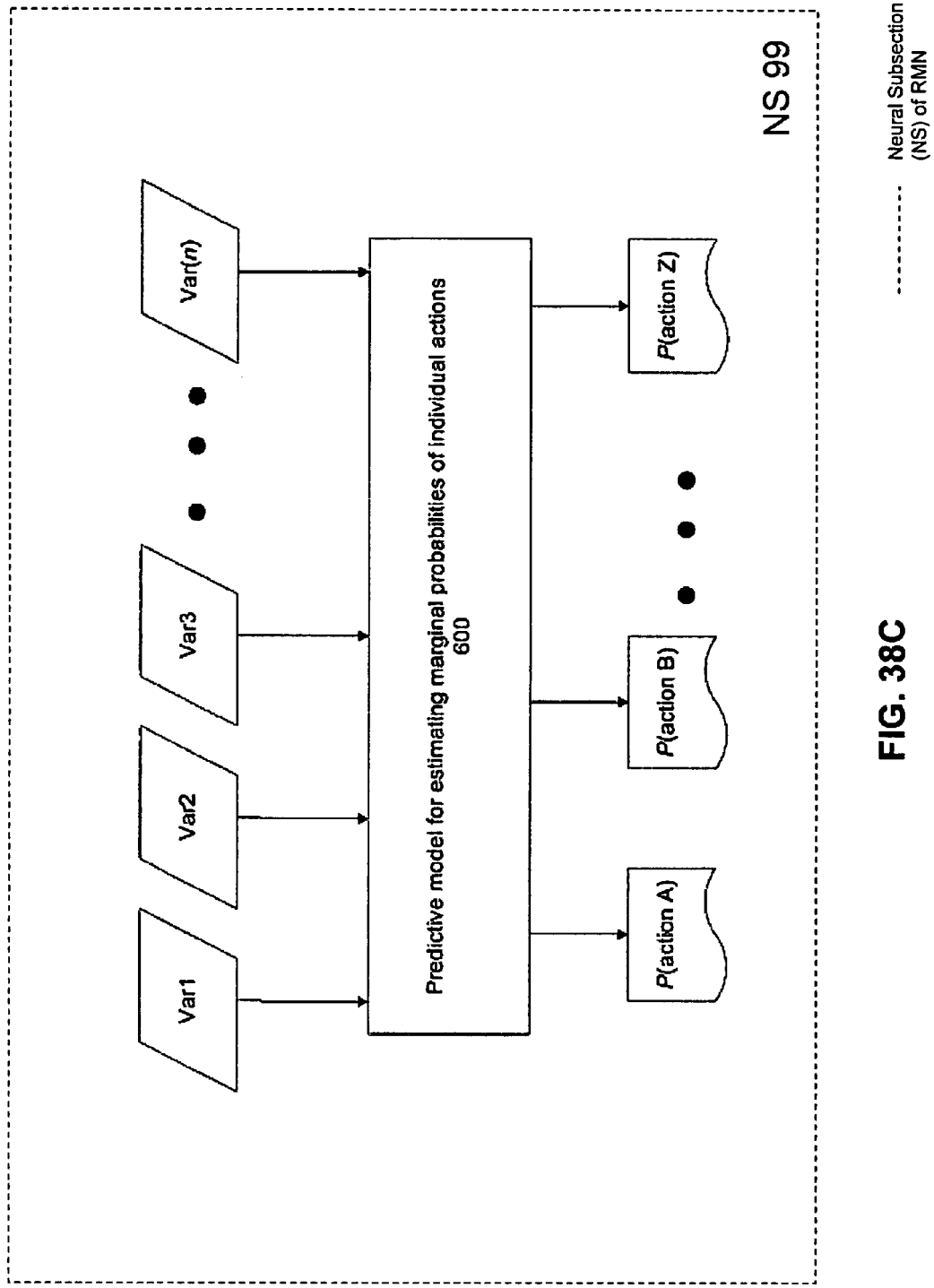
FIG. 38C illustrates a multiple-output predictive model of the pan-portfolio Neural Subsection of the Rule-Module Nexus.

FIG. 38C illustrates an embodiment of a multiple-output Predictive Model 600 of the pan-portfolio Neural Subsection (NS) 99 subsection of the RMN 14, which provide Rule-Modules 50, comprising: predictive fraud, predictive purchasing patterns, predictive rewards redemption, predictive risk-management tools, predictive Financial Account 65 preferences, predictive advertising impact on the User, and the like. Predictive Model 600 has a set of "n" input variables (Var1-Var(n)) representing a set of "n" possible single actions. The Predictive Model 600 provides as output the marginal probability "P" of a given complex action (actions "A", "Z") being applied to the delinquent account. Since actions "A", "B", . . . , "Z" represent an exhaustive enumeration (i.e., partitioning) of all the possible complex actions to be taken, a constrained optimization is performed to ensure that the provided probabilities are normalized (sum up to "1"). This normalization may be avoided by constructing individual predictive models to estimate the marginal probability for each individual complex action. An implicit segmentation is imposed by setting a low threshold for each marginal probability (e.g., "R" could be defined as representing the segment of the population for which P(action A) is less than a specified threshold $T.sub.A$). By scoring the pan-portfolio (or, plurality proprietary Financial Accounts 65 in the UAR 15) data, the desired segmentation is obtained. The probability to pay given a complex action is computed either by using the predictive model estimate or by using the previously discussed prior probability. The prior probability for a population segment is computed as the probability to pay given all possible actions whose marginal probabilities exceed the corresponding thresholds $T.sub.I$, $T.sub.J$, . . . , $T.sub.K$. As sufficient data is gathered for sparse complex actions, the prior probability can be modified to reflect the success or failure of the complex action.

In one embodiment, the RMN 14 identifies a pan-portfolio nomenclature, or numbering convention, via the Neural Subsection 99 for risk-management tool improvement using data from a plurality of proprietary Financial Accounts 65. In this embodiment, the RMN 14 uses a 16-digit alphanumberic code for UPC 67 for each merchant wherein there would also be a uniform numbering or coding sequence assigned to associated categories, such that fast food restaurants or quick-service convenience stores. Further, when an acquirer processor Third-Party Platform 28 establishes connectivity with RMN 14, the UPC 67 would be assigned with a cleansed list of merchant names being used by an acquirer's Third-Party Platform 28 (e.g., UPC 67 unifies all nomenclature being used for "McDonald's®" such as McD's, MickeyD's, McDonald's, McDonald's Hamburgers, etc.). Further, the UPC 67 may comprise a code identifying a payee's retail site location, its Financial Account 65 acceptance policies, the Display 7 capabilities of its Terminal 2—UIA 16 at different payee retail sites. For example, a McDonald's® in New York may accept American Express®, whereas a McDonald's in Iowa only accepts Discover®. In this way, RMN 14 more constructs more accurate Financial Transaction Response Packets 252 comprising presentation of Financial Accounts 65 which are applicable to the matrix of Rule-Module 50 applicable to a particular financial transaction, for a particular User, and for a particular payee, and the like. Further, the fraud detection capabilities can be more precise with respect to specific payee(s), geographic locale(s), and merchant categories.

On-Line Transmissions

There are also several embodiments of User-customized Execution Commands 52 that govern access to electronic online transmissions and associated data such as web sites, web site content and platforms. An electronic transmission is the online communication of content which is non-Financial Data and is not a financial transaction.

In one embodiment, an Execution Command 52 governing electronic transmissions for data access is a Global Execution Command (GEC) 55 that is unique to the User, and said GEC 55 is not invoked as a default for all Users and for all online transmissions of the RMN 14. Each such Execution Command 52 is optionally invoked by the User Verification Approval Code 206 serving as the Pattern Data 54. This Execution Command 52 is a software command that provides an authorized User access to any secured electronic non-Financial Data, such as those on third-party 28 platforms. Invoking this Execution Command 52 enables the User to simultaneously access all Internet chat or messaging forums, web sites and online platform content to which the User has authorization.

In another embodiment, the third-party 28 being contacted by the User for data access is also identified by the Verification Platform 12 using public/private key cryptography. Once the third-party is successfully identified by the Verification Platform 12, this invokes a Rule-Module 50 in the Nexus which is unique to this third-party and which is used to confirm to the User that the correct Third-Party Platform 28 was accessed.

In another embodiment, the Global Execution Command 55 is an Execution Command 52 that activates any of the following: an online or Internet-connected device, such as a wireless pager, a wireless or tethered telephone, a network computer, an exercise machine that is connected to the Internet, an electronic book; an online public access Internet computer, an automobile or household appliance that is connected to the Internet, an Internet-connected personal digital assistant such as a Palm Pilot™; an online photocopy machine; an Internet-connected digital audio player such as the Rio™. In several such instances, the executed Rule-Module 50 renders the online or Internet connected device operational and permits the User that has gained access using their bid UUC 200 (or optionally their bid UUC 200—PVC 202) to conduct online activity to control or otherwise access the above mentioned Internet connected devices. For example, in one embodiment, an exercise machine incorporates a UIA 16 and is connected to the Internet. A User of the exercise machine provides their bid UUC 200 (or optionally their bid UUC 200—PVC 202) to the UIA 16, which is transmitted to the Verification Platform 12 for a matching determination. Upon the User being verified by the VP 12, and the exercise device is identified using its UIA-VC 204, the Rule-Module 50 executes a command allowing the User to activate the exercise device. Optionally, additional Rule-Modules 50 allow a User to save the details of their exercise activity (number of times, weight amount, date of exercise, etc.) on that exercise device as Pattern Data 54, in order to keep track of past performance and as a template for future exercise routines.

In another embodiment, an Internet-connected electronic book that incorporates a UIA 16, is activated when the Verification Platform 12 successfully identifies the User. This allows the User to download text and graphics of complete novels or films for which they have previously paid.

In another embodiment, a personal digital assistant, such as the Palm Pilot™, incorporates a UIA 16. When activated after the Verification Platform 12 has successfully identified the User, the personal digital assistant permits the User to download and take online academic examinations. In another embodiment, an Internet-connected digital audio player such as the Rio™, incorporates a UIA 16. When activated as a result of successfully verification of the User by the Verification Platform 12, the audio player permits the User to download music for which they have authorization. Optionally, additional Rule-Modules 50 can track how many pages of the electronic book have been displayed and can retain a bookmark for the most recently read page. Optionally, additional Rule-Modules 50 can track how many times a downloaded electronic audio track has been played.

Upon the Verification Platform's 12 successful verification of the User from their bid UUC 200 (or optionally their bid UUC 200—PVC 202), other illustrative embodiments of Execution Commands 52 governing electronic transmission access comprise permitting the User: to access their driver's license online and validate to an authority their eligibility to drive a car, to purchase restricted products like alcohol or tobacco, to pick up a prescription at a pharmacy, or to access a restricted entertainment event such as an R-rated film being shown in theatres; to access their credit-rating and validate to a cashier their eligibility for check-writing privileges; to access an Internet web site and enter a real-time chat room with other people on-line.

In another illustrative embodiment of the invention, User verification further comprises a User facial photograph display, wherein upon the VP 12 outputting a positive matching determination that the User is authorized to access the rule-module database, the RMN 14 transmits the User's registered facial photograph 7 for the UIA 16 or the Transaction Terminal 2 to present via a Display 7 for a third-party present, such as a pharmacist, in real-time during the financial transaction, to visually compare the User's actual face with the User's displayed facial photograph 7, for affirming or denying that the authentic User is providing the UUC 200 and/or PVC 202.

Further embodiments of Execution Commands 52 governing electronic transmission access include entitling a User to extend an online User-customized session by repeating their User-customized session log-in by providing their bid UUC 200 (or optionally their bid UUC 200—PVC 202) when periodically queried to do so by the Verification Platform 12 or Rule-Module Nexus 14, to access customized radio or television programming, wherein the User can be provided with customized programming, with or without time restrictions, that reflects predetermined preferences, such as a channel broadcasting only news on companies in which the User has an investment or a channel broadcasting only music from Broadway theater shows which the User has seen or indicated a desire to see, to access restricted portions of corporate intranet Network 18 platforms on a selective basis, based upon predetermined Pattern Data 54, such as the User's job title or company division, to access their travel reservations and validate to the admittance attendant that the User is eligible to travel, such as boarding a particular flight or a specific train, on a predetermined day, at a predetermined time, and to sit in a predetermined seat, to access online position "papers" of User-customized political candidates and electoral ballot initiatives, and validate to an authorized third-party that the User is eligible to vote in particular elections, such as voting for a particular candidate running from a particular User-customized district.

There are several embodiments of User-customized Execution Commands 52 governing the processing of electronic data and electronic transmissions. Such Execution Commands 52 can govern: User-customized notification preferences for such electronic transmissions as real-time medical updates, pending Internet auctions, electronic stock trades and the like; User-customized instructions for User-location designating, for example, that the User may be located by third parties via whichever UIA 16 the User is using during an indicated time period, whereby the User can automatically receive their e-mails, instant messages, phone calls, faxes, and the like in real-time at the particular UIA 16 in use by him; User-customized travel customizations such as the User's preferences for lodging accommodations, travel costs, food, travel locations, and the like.

In other illustrative embodiments, upon verifying the User's UUC 200 (or optionally a UUC 200—PVC 202) packet via the Verification Platform 12, the RMN 14 enables the User to access stored electronic non-Financial Data comprising accessing any of the following: word-processing files; spreadsheet files; software code; graphics files; audio files; medical records; internet web sites; online audio or graphical content; electronic game content; online chat content; online messaging content; online educational content; online academic examination-taking; online personalized medical and health content, and; server-based computer software programs and hardware drivers.

Further embodiments of User-customized Execution Commands 52 governing the processing of electronic non-Financial Data and electronic transmissions include: User-customized verification presentation preferences depending upon various predetermined criteria such as the verification of a particular counter-parties, the User's sending location, and the like, whereby a User's pre-selected personal identifier, such as a distinct audio or visible sample, is electronically presented to a third-party counter-party of the User's electronic transmission; invocation of User-customized Internet environment preferences, whereby a User's preferences are used to create a customized Internet web portal with the User's preferred search engines, bookmarks, and the like; User-customized data presentation preferences, whereby the priority, formatting and organization of displaying data is predetermined by the User; User-customized Internet search engines, and; User-customized intelligent data tracking and extrapolating agents.

In one embodiment of an Execution Command 52 governing the processing of an electronic transmission, the User-customized Internet search engine is customized to locate, retrieve and present electronic transmissions of the User using an intelligent tracking and extrapolating agent. In one embodiment, the User's customized Rule-Modules 50 provide instructions that even when the User is not logged onto a network, the Pattern Data 54 and Execution Commands 52 are periodically and automatically executed, added, changed or deleted based on the User's previous UIA 16 and online usage patterns. As a result, the User-customized search engine is automatically and progressively refined and customized to the User's evolving preferences and online activity patterns as tracked and interpreted by the User's own electronic, automated intelligent agent.

As an example of the above, the User's intelligent agent can direct the User's search engine to automatically conduct periodic, customized online data retrievals reflecting User-customized priorities for: product or service promotional offers or discounts via email or instant messaging; User-customized investment updates; User-customized medical or health information; competitive product or service prices across a broad range of online Account Issuers; hobby or recreational interests; interactive User-customized online advertisements, wherein product or service providers are permitted to provide unsolicited information to a User based upon certain User-customized criteria; online event calendaring, wherein a User is automatically notified of upcoming events or activities reflecting their interests.

Further, the intelligent agent can extrapolate from the User's existing preferences and online activity patterns to automatically and periodically recommend to the User new data that may expand or delete the User's Pattern Data 54 and Execution Commands 52 based upon the intelligent agent's algorithmic projection of what the User's online preferences and activities will be in the future.

In another embodiment, an Execution Command 52 functioning as an intelligent tracking and extrapolating agent centrally integrates data on the User's Internet browsing to provide User-customized recommendations on new products and services available from any number of Internet web sites or Internet Account Issuers. Examples include the Execution Commands for retrieval of new types of music, books, and investment opportunities that reflect the User's preferences, but that such recommendations are pre-selected based on the Execution Command 52 having automatically conducted competitive price-comparisons from various Third-Party Platforms 28. In another embodiment, an Execution Command 52 integrates User-customized data from a User's calendaring or scheduling software program to provide the User with customized recommendations on User-customized offering for products, services or upcoming events based on the User's pre-scheduled activities in their online calendar.

In another embodiment, an Execution Command 52 appends a customized, User-customized audio or visible identifier which accompanies an electronic transmission for presentation to the counter-party. This identifier is appended to the User's electronic transmission as a form of "electronic personal signature" to readily notify the counter-party that the authenticated User sent the message. This identifier may be a unique image or sound sampled from the User, or it may be a non-unique, distinct graphical or audio selected by the User to reflect their personal preferences, such as a cartoon image or a favorite sound or audio tone.

In another embodiment where greater security is required, an Execution Command 52 governs the appending of a User-unique network credential or digital certificate to an electronic transmission. If a User employing a UUC 200 (or optionally a UUC 200—PVC 202) seeks to append their digital certificate to an electronic transmission, the User stores at least one command to sign electronic documents using their private keys, which are themselves centrally stored on a Rule-Module Nexus 14 server. As such, the User's private keys are invoked as a header of the User's electronic transmission which, in combination with the electronic document itself and an MD5 calculation of the document, together form a digital signature. At a later time, an authorized counter-party can use the User's public key from the Master RMN 14 or a third-party certifier to verify the authenticity of the sender and the electronic document's contents to yield a secure, authenticated electronic transmission. In this way, Users do not have to manage their own private keys, nor do they have to retain physical possession of their digital certificates via smart cards or personal computers with resident User-customized data. In one embodiment, public keys of a particular certifying authority are initially stored in the UIA 16 at the time of construction.

In another embodiment, an Execution Command 52 governs the processing of an on-line, User-customized calendaring program or Internet calendaring web site, wherein the User's online scheduling calendar is automatically updated by the User-customized search engine and the User-customized intelligent search and tracking agent based upon User-customized Pattern Data 54. This could include, but would not be limited to, automatically updating the User's online calendar based on upcoming: User-customized entertainment events, User-customized business seminars, User-customized airline discounts to the User's preferred destinations, User-customized candidate and elections bulletins, and the like.

In another embodiment, the User pre-designates Execution Commands 52 governing the processing of electronic transmissions which filter the access and presentation of data when the User is subordinated User who is co-registrant or legal dependant of the primary User himself. Examples of such subordinated Users could be the children or the spouse of a User. Examples of such access and presentation, or viewing, filters may be restrictions predetermined by the primary User governing: subordinated User access to Internet web sites with adult or violent content; subordinated User access to online television or radio programming with adult or violent content; subordinated User access to the Internet 18 with restrictions covering online session length; subordinated User access to educational online resources which are automatically "pushed" to the subordinated User during a particular online session, as pre-determined by the primary User, in order to pro-actively circumscribe the content which a particular subordinated User is permitted to view or download.

In another embodiment, an Execution Command 52 provided to the Nexus 14 by an authorized third-party, such as a User's employer, governs the processing and prioritization of electronic transmissions to the User on an intranet Network 18. As such, the Execution Command 52 determines which electronic transmissions are automatically "pushed" to the User during a particular online session, as pre-determined by the authorized third-party, in order to pro-actively circumscribe the content which a particular User is permitted to view or download Embodiments of User-customized Execution Commands 52 governing the display or presentation of electronic transmissions include controlling the organization and prioritization of online content such that text, audio and graphics are displayed according to a User's pre-determined preferences. This includes displaying informational updates in a certain prioritization order, wherein User-customized regional news may be presented prior to national or international news, displaying expenditure records in User-customized categories which reflect anticipated tax deduction categories, such as home improvement expenses, charitable contributions, and the like, displaying customized User-customized Internet web sites or portals, including the User's predetermined bookmarks, preferred web links, calendaring programs, email mail addressing rosters, a plurality of email accounts with their accompanying inbox messages, User-customized instant messaging "buddy" lists.

Other embodiments of User-customized Execution Commands 52 governing the display or presentation of electronic transmissions include: displaying accrued User-customized consumer rewards incentives or customized online advertising according to a User's prescribed priorities, such that skiing apparel is presented to the User at a time based on their calendaring program's designating their scheduled winter vacation or such that an advertisement for new coffee flavors from the User's preferred vendor is presented during the User's morning log-on session; displaying the User's customized fitness program on an Internet-connected exercise machine, whereby the User is reminded of the number of repetitions the User performed at what difficulty level during their last exercise session, and thereby also presents a recommended number of repetitions and a recommended difficulty level for the User's current session.

Other embodiments include Execution Commands 52 governing: presentation or display filters which circumscribe what text, graphic or audio content the User is permitted to view; presentation or display filters which govern which products or services a User is permitted to purchase, such as a subordinated User whose parent is a primary User, and where the subordinated User is prohibited from purchasing cigarettes, is limited in their selection of online Account Issuers, is limited in the amount of online session time the User is permitted to have in a single day, and the like.

In an illustrative embodiment, each verification request and each transmission request, whether successful or not, is logged in the Logging Platform (LF) 42.

In an illustrative embodiment, more than one Rule-Module Nexus 14 provides fault tolerance from either natural or man-made disasters. In this embodiment, each Verification Platform 12 uses a backup power generator, redundant hardware, mirrored platforms, and other standard fault tolerant equipment known in the industry Execution Platform In an illustrative embodiment, an Execution Command 52 of a Rule-Module 50 causes an electronic financial transaction to be executed by the Execution Platform 38. The Execution Platform 38 may be on a platform which is located within the Master RMN 14 itself, or it may be co-located with an entity platform 28 that is external to the Master RMN 14. In the event that a designated entity platform 28 cannot be contacted for the electronic financial transaction to be completed, the financial transaction is "declined".

In one embodiment, if the Account Issuer approves the transaction, the Execution Platform 38 returns a transaction number to the User Account Registry 15, and the User's Financial Account 65 is thereby adjusted through either a credit or debit. The transaction number is returned to the UIA 16, which lists the transaction on a daily transaction summary. The User need take no further action since financial transactions are automatically settled, at which point a calculation is made to automatically adjust the User's designated Financial Account 65.

In another embodiment, the Execution Platform 38 uses Rule-Modules 50 from the Master Rule-Module Nexus 14 which permit an Account Issuer to itself contribute financial directly to an alternative Account Issuer based upon a User's purchases. In such transactions, units of financial are electronically debited from the User Account controlled by the Account Issuer, and corresponding units of financial are electronically credited to the alternative Account Issuer's Financial Account 65. An example would be that a purchase on a User's Citibank™ Visa™ Financial Account 65 will invoke a Rule-Module 50 wherein: Citibank™ contributes 1% of the User's purchase amount from the financial transaction to the American Lung Association™ registered Financial Account™, or; Citibank™ credits 1% to the User's purchase amount from the financial transaction towards frequent flier miles in the User's Star Alliance™ Rewards Financial Account 65.

Decryption Platform

In an illustrative embodiment, all messages the Rule-Module Nexus 14 receives, with the exception of those not transmitted via a UIA 16, comprise a UIA-VC 204, a sequence number, and a Message Authentication Code (MAC). MACs, also known as cryptographic checksums, are well known in the computer industry, and are used to assure that any changes to the content of the message will be detectable by the entity receiving the financial transaction. The Decryption Platform (DP) 22 validates the message's MAC and checks the sequence number for that particular UIA 16. If the Decryption Platform 22 determines that both the MAC and the sequence number are valid, the DP 22 uses the unique secret key for that particular UIA 16 to decrypt the message. For the decryption to function properly, the Decryption Platform 22 must comprise a copy of each UIA's 16 DUKPT key table.

If the decryption operation fails, or if the MAC check fails, the message is considered an invalid message. The Decryption Platform 22 logs a warning to the logging facility (LF)

42, terminates processing for the message, and returns an error message to the originating UIA 16.

Before the Decryption Platform 22 replies to a message that includes a response key, it encrypts the response message with that response key. The Decryption Platform 22 also generates a MAC for the response and appends it to the message.

In an illustrative embodiment, error messages are not encrypted although the Decryption Platform 22 does include a MAC for message authentication. Such messages never include confidential information. However, most response messages include a status or response codes that can indicate whether the request succeeded or not. For example, when the Execution Platform 38 declines a financial transaction for a specific reason, it does not return an error message, it returns a normal Financial Transaction Response Message 252 with a response code set to "failed".

Gateway Platform (GP)

In an illustrative embodiment, the Gateway Platform 26 serves as an intermediary between redundant Verification Platform 12 and redundant in-house Registry 15 platforms, routing electronic financial transactions and/or electronic transmissions from platforms on overload to platforms that have available capacity. The Gateway Platform 26 also periodically queries platforms to ensure that are operative and to alert the RMN 14 or RMN-authorized Third-Party Platform 28 administrator is any server is inoperative.

Prior Fraud Platform (PFP)

In an illustrative embodiment, the PFP 27 is a central repository for UUCs 200, PVCs 202, and other Pattern Data 54 which have had prior fraud associated with them. Every new User's UUCs 200 (and optionally PVCs 202) are checked against all PFP 27 records with the intent of reducing recidivism. In one embodiment, there is an automatic User prior fraud check step, wherein the User's bid UUCs 200 (and optionally PVCs 202) are compared against previously registered UUCs 200 (and optionally PVCs 202) in the PFP 27 wherein if a match occurs, the Rule-Module Nexus 14 and Verification Platform 12 are alerted to the fact that the User has attempted to re-register or re-access the Rule-Module Nexus 14 after having already been registered with the PFP 27.

Firewall (FW)

In an illustrative embodiment, the Firewall (FW) 40 provides a first line of defense against network viruses and computer hackers. All communication links into or out of the Verification Platform 12 and Master Rule-Module Nexus 14 server sites first pass through a secure Firewall 40 Machine.

In an illustrative embodiment, the firewall 40 Machine, an Internet-Local or Subset-Internet router, only handles messages destined for the Gateway Platform 26 machines.

Intra-RMN Communications

In an illustrative embodiment, UIA-equipped Transaction Terminals 2 send packets to Verification Platform 12 and Master Rule-Module Nexus 14 server sites via modem, X.25, or other communication medium. The Verification Platform 12 and Master Rule-Module Nexus 14 server sites rely on an entity to supply the modem banks required to handle the volume of calls and feed the data onto the Master RMN 14 backbone.

In an illustrative embodiment, for communications between Verification Platform 12 and Master Rule-Module Nexus 14 server sites, the FW 40 Machines send out double-length DES encrypted packets. The server site LAN component handles the encryption and decryption: the firewall 40 does not have the ability to decrypt the packets.

In an illustrative embodiment, a properly configured network sniffer acts as an intruder detector as backup for the FW 40. If an anomalous message is detected, the intruding messages are recorded in their entirety, an operator is alerted, and the Firewall 40 is physically shut down by the sniffer.

In an illustrative embodiment, the Firewall 40 disallows any financial transactions from the internal network to the rest of the Internet. An electronic financial transaction message requires about 400 bytes and registration packets require about 10 to 20 KB. To handle 1000 electronic financial transactions per second and 16 registration packet per second, the Firewall 40 machines are able to process about 400 KB per second.

Logging Platform

In an illustrative embodiment, the Logging Facility 42 logs all electronic financial transaction attempts, whether successful or not, to write-once media, so that a record is kept of each financial transaction and each error that has occurred during the operation of the Verification Platform 12.

Interconnections and Communications Among the Electronic Verification Platform, Rule-Module Nexus and User Account Registry A variety of conventional communications media and protocols may be used to connect or place the devices herein in communication. For example, the communications media may be an Internet Service Provider (ISP) configured to facilitate communications over a local loop as may be typically used in connection with standard modem communication, cable modem, dish networks, ISDN, Digital Subscriber Lines (DSL), or any wireless communication media. In one illustrative embodiment, the Retail Subset Platform (RSP) 130 is conjoined with a Subset RMN 17. In another illustrative embodiment, the UIA 16 is conjoined with the Transaction Terminal 2 via a local area Network 18, which in turn and interfaces to a remote network (not shown) for remote authorization via the RMN 14. The Retail Subset Platform 130 may communicate with the remote network via a leased line, such as a T1, D3 line, or the like. Such communications lines are described in a variety of texts, such as, "Understanding Data Communications," by Gilbert Held, which may be incorporated herein by reference.

In one embodiment depicted in FIG. 8, the Verification Platform 12 platform is physically separate from, but associated and registered with, the Master Rule-Module Nexus 14. In one embodiment depicted in FIG. 8A, the User Account Registry 15 platforms are conjoined with the Verification Platform 12 within the RMN 14, although they may be housed in independent platforms or joint platforms. In an embodiment shown in FIG. 18, the Rule-Module Nexus 14 is separately located from a User Account Registry 15, which is conjoined with a Third-Party Platform 28, but associated and registered with the RMN 14. In another embodiment depicted in FIGS. 1 and 3, the Verification Platform 12 is physically integrated with the Rule-Module Nexus 14 and the User Account Registry 15, whereby the Verification Platform 12, Master Rule-Module Nexus 14 and the User Account Registry 15 are physically interconnected and integrated together within one server or platform. In these embodiments, communications among the Verification Platform 12, the Master Rule-Module Nexus 14 and the User Account Registry 15, in an illustrative embodiment, occur via many different methods and means that are well known in the art. Most depend on the particular communication networks already deployed by the organization or company that deploys the electronic financial transaction authorization system.

In one embodiment, the Verification Platform 12, the Master Rule-Module Nexus 14 and the User Account Registry 15 are connected via Ethernet 18 to a Local or Subset router, which is connected to a network operations center (NOC) via frame relay lines. Messages are sent among the Verification Platform 12, the Master Rule-Module Nexus 14 and the User Account Registry 15 using TCP/IP over this Network 18. In another embodiment, the Verification Platform 12, the Master Rule-Module Nexus 14 and the User Account Registry 15 are connected via a cellular digital packet data (CDPD) modem Network 18 to a CDPD provider, who provides TCP/IP connectivity from the Verification Platform to an intranet 18 to which at least one Master Rule-Module Nexus 14 is attached.

In yet another embodiment, a Verification Platform 12 is connected via the Internet 18, as is at least one Master Rule-Module Nexus 14 and at least one User Account Registry 15. TCP/IP is used to transmit messages from among the Verification Platform 12, the Master Rule-Module Nexus 14 and the User Account Registry 15. There are many different ways to connect the Verification Platform 12, the Master Rule-Module Nexus 14 and the User Account Registry 15 that are well understood in the industry, such as cable networks, wireless networks, telephone networks, the Internet, an intranet, a local area network (LAN), a wide area network (WAN), and an X.25 network.

The Verification Platform 12, the Master Rule-Module Nexus 14 and the User Account Registry 15 hardware platforms are, in an illustrative embodiment, high-reliability platforms, well known in the art, such as those available from Sun™, Compaq™, Tandem™, IBM™ and the like. Further, the Verification Platform 12, the Master Rule-Module Nexus 14 and the User Account Registry 15 software may, in an illustrative embodiment, incorporate scalable platform architecture, well known in the art, such as those available from Oracle™, Sybase™, Informix™, Red Hat™ and the like.

Electronic Verification Platform, Rule-Module Nexus and User Account Registry: Master Platforms and Local or Subset Platforms In certain embodiments, a Master Verification Platform 12 is responsible for storage of the entire set of UUC 200, PVCs 202, digital certificates and the like registered for use with this invention. In an illustrative embodiment, an electronic Master Rule-Module Nexus 14 is responsible for storage of the entire set of Pattern Data 54, Execution Commands 52, and Rule-Modules 50 registered for use with this invention. An electronic Master User Account Registry 15 is responsible for storage of the entire set of Financial Accounts 65 of a User and Financial Accounts 65 of an Account Issuer registered for use with this invention.

Each Master Verification Platform 12, Master Rule-Module Nexus 14 site is, in an illustrative embodiment, made up of a number of computers and platforms connected together over a LAN (known in the industry). Multiple and redundant Master computer sites ensure reliable service in the face of disaster or serious hardware failure at any single central computer site.

In another embodiment, there is at least one Local or Subset Verification Platform 13 server which stores a subset of the entire set of UUC 200, PVCs 202, and digital certificates registered for use with this invention. In another embodiment, there is at least one Local or Subset Rule-Module Nexus 17 server which stores a subset of the entire set of Pattern Data 54, Execution Commands 52, and Rule-Modules 50 registered for use with this invention. Such Pattern Data 54 and Execution Commands 52 subsets may be circumscribed by any number of criteria including, usage location, usage frequency, usage recency, usage demographics and usage volume of electronic financial transactions. In another embodiment, there is at least one Local or Subset User Account Registry 19 server which stores a subset of the entire set of User Accounts and Account Issuer Accounts registered for use with this invention.

It is preferred that the Master platforms have a Firewall 40 machine which is the entry point of data and messages into these computers, and a Gateway Platform 26 which is a RMN 14 coordinator and message processor.

Figure 33A:
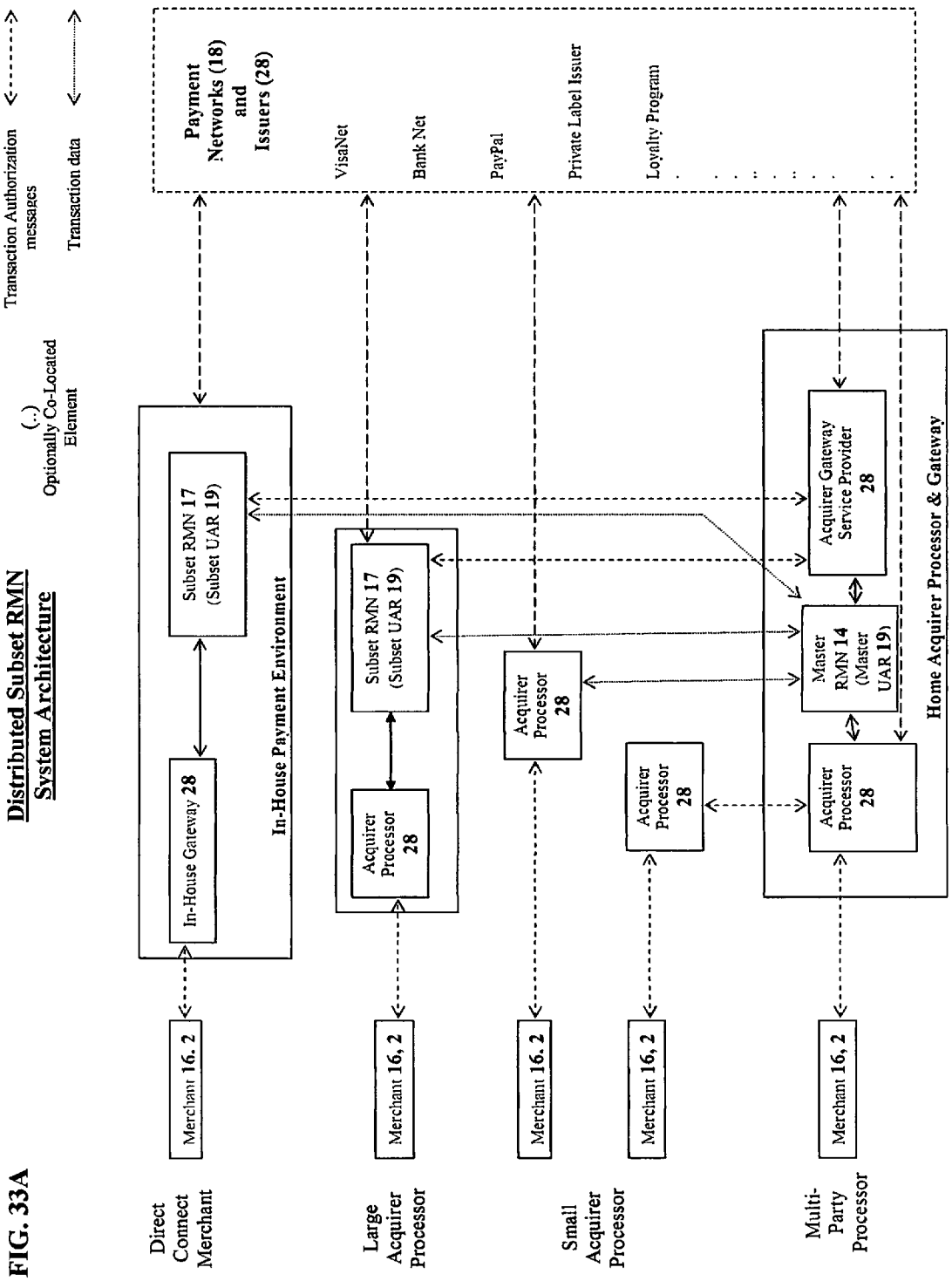
FIG. 33A illustrates an embodiment of a distributed system architecture for processing financial transactions via a Subset Rule-Module Nexus (and/or a Subset User Account Registry, with use of a National/International (or Global) Gateway Platform, optionally with co-located Master Rule-Module Nexus (and/or Master User Account Registry).

FIG. 33A illustrates an embodiment of a distributed system architecture for processing financial transactions via Subset RMN's 17 (and/or Subset UAR's 19), with use of a National/International (or Global) Gateway Platform 28, optionally with co-located Master RMN 14 (and/or Master UAR 15). This distributed system architecture enables payment processors Third-Party Platforms 28 to control returning authorization messages to the Acquirer Platform 28 for it to gateway to the Payment Networks 18 and/or the Account Issuer Platforms 28. Further, Acquirer Platforms 28 can view the resolution/settlement of the translation of the RMN 14 message, comprising the UUC 200, before the message gets passed to the Payment Networks 18 and/or the Account Issuer Platforms 28.

Figure 8A:
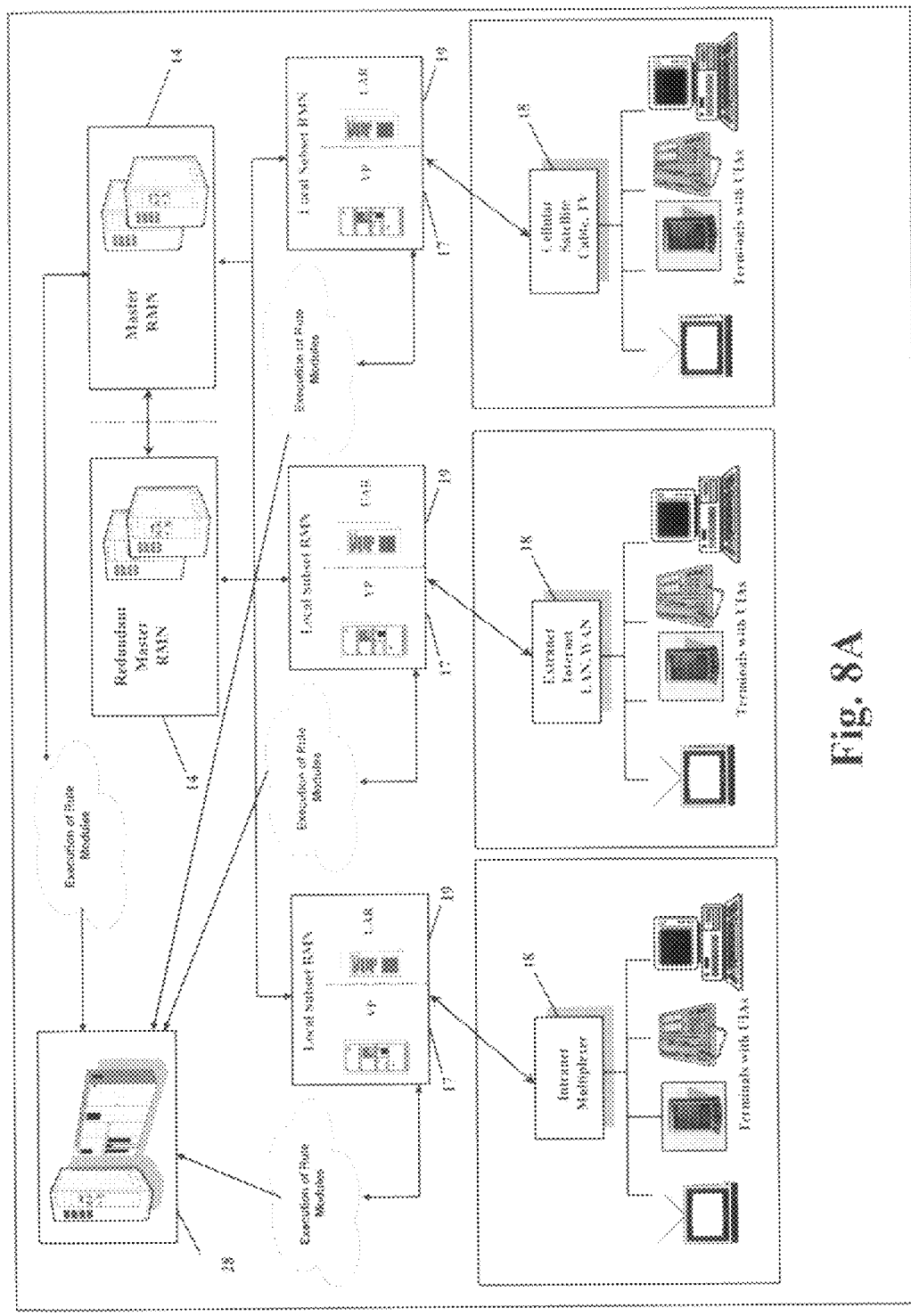
Figure 10:
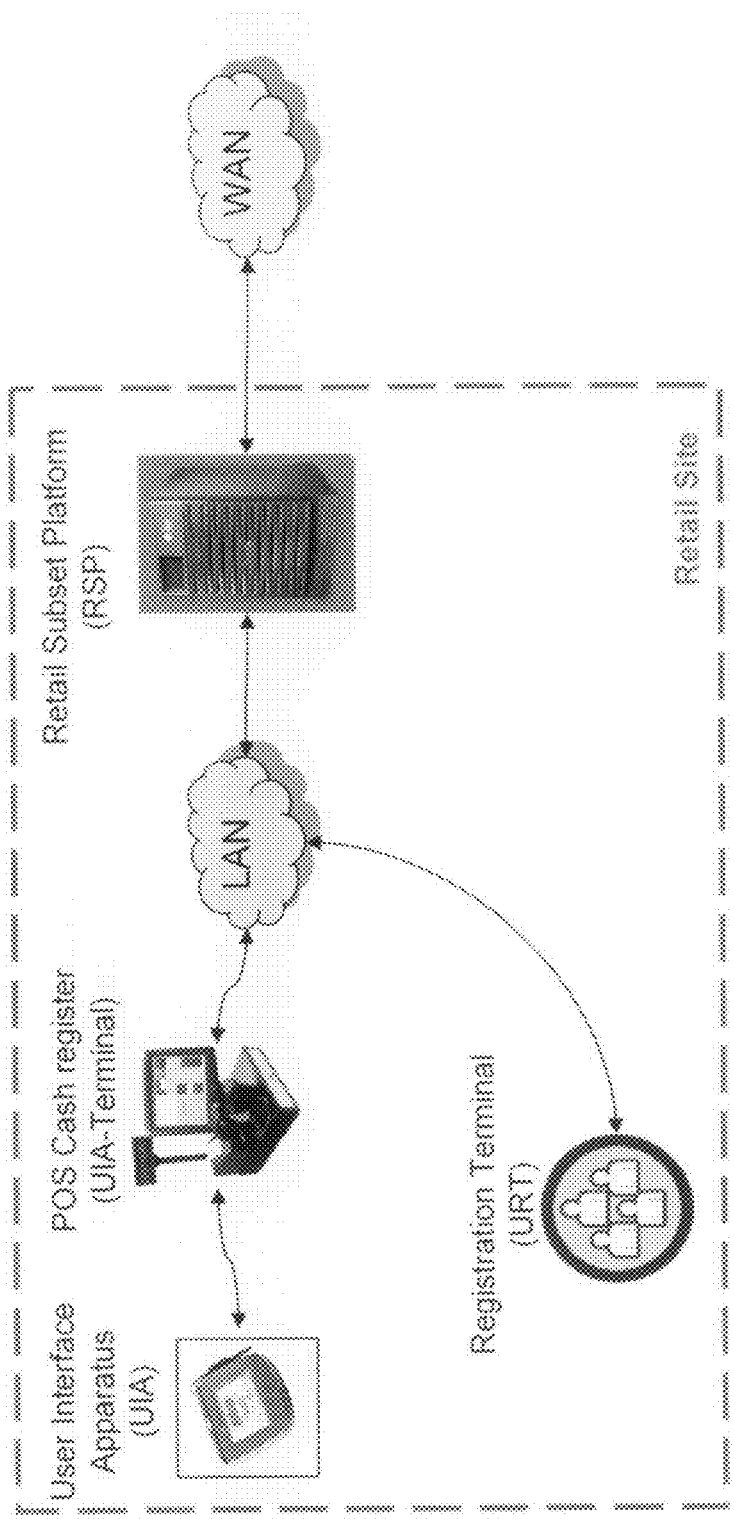

Use-Sensitive Configurations for Verification Platform, Rule-Module Nexus and User Account Registry As shown in FIG. 3 and FIG. 8A, in some embodiments the invention has use-sensitive data processing capabilities, wherein at least two Verification Platforms 12, at least two Rule-Module Nexuses 14, or at least two electronic Rule-Module Nexuses 14 exist, some of which respectively store a subset of the total data registered with the RMN 14 or RMN-authorized Third-Party Platform 28.

Figure 19:
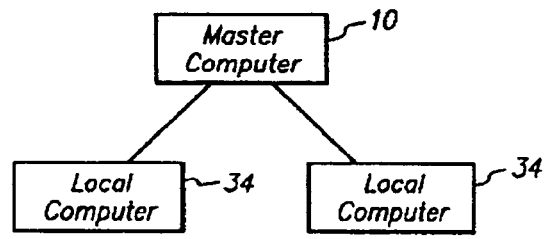
FIG. 19, FIG. 20, and FIG. 21 show use-sensitive embodiments, with Master, Intermediary, and Local (or Subset) configurations.
Figure 20:
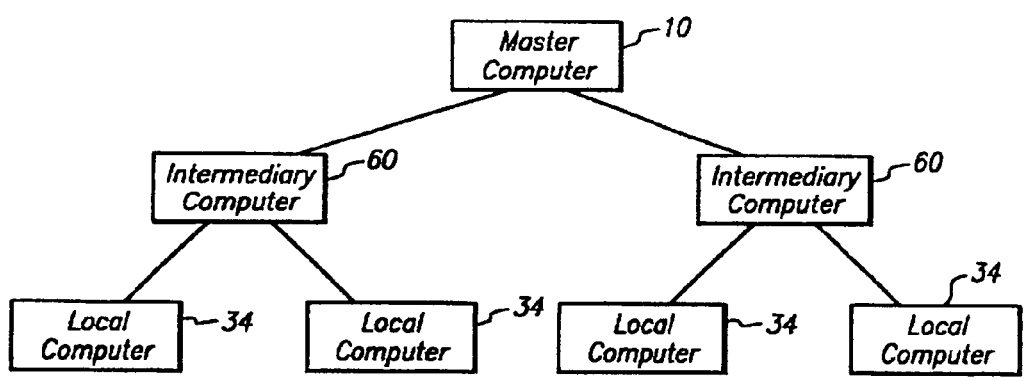
Figure 21:
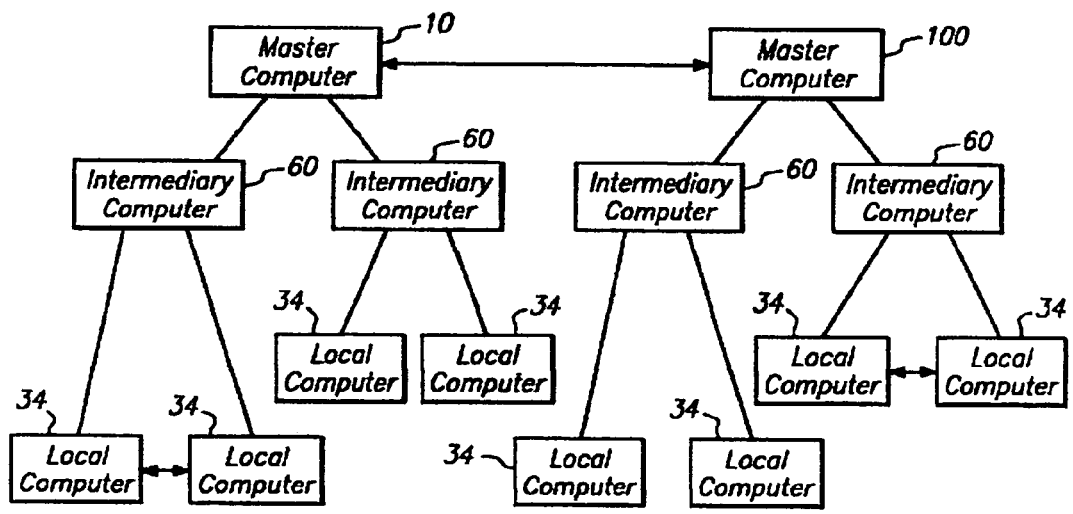
Figure 22:
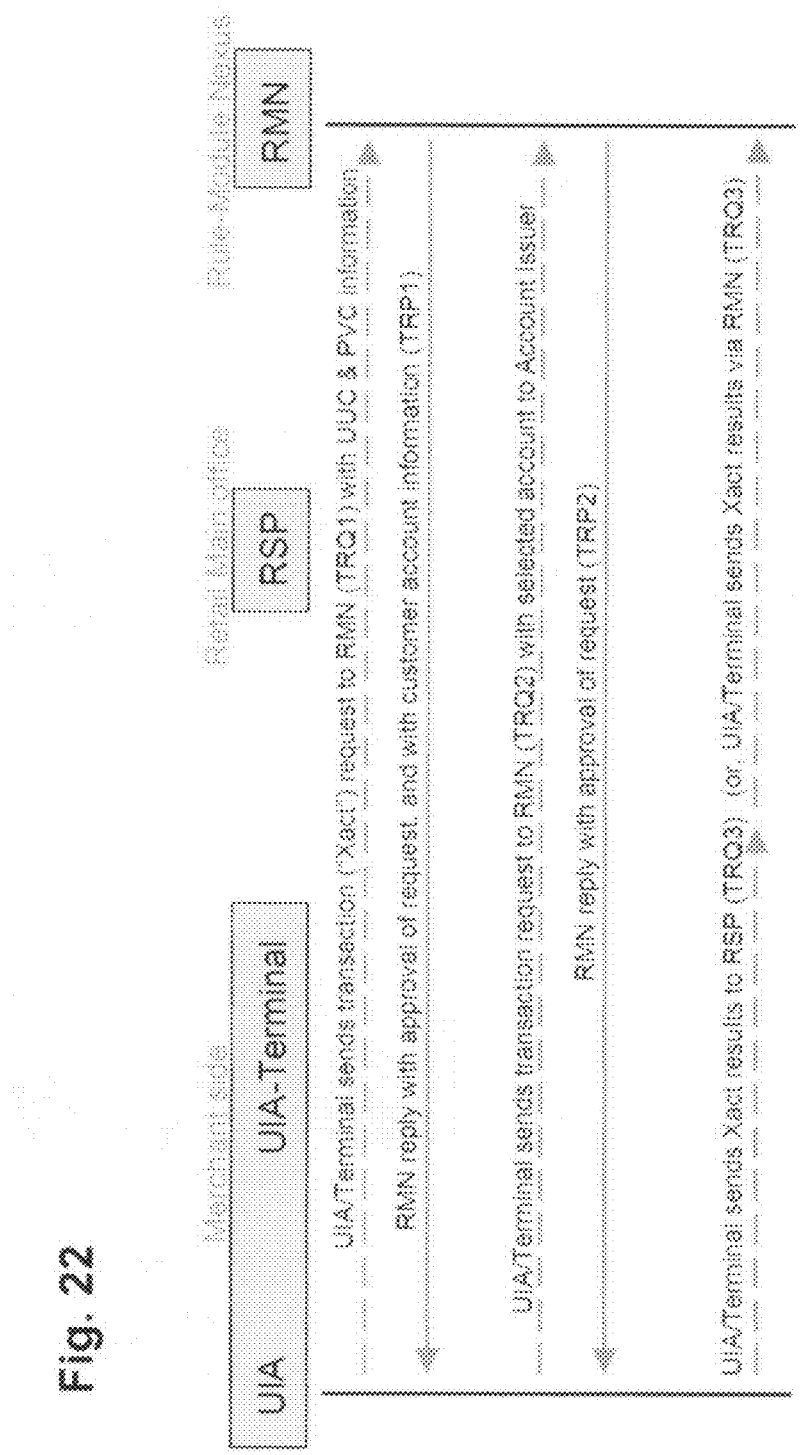
Figure 23:
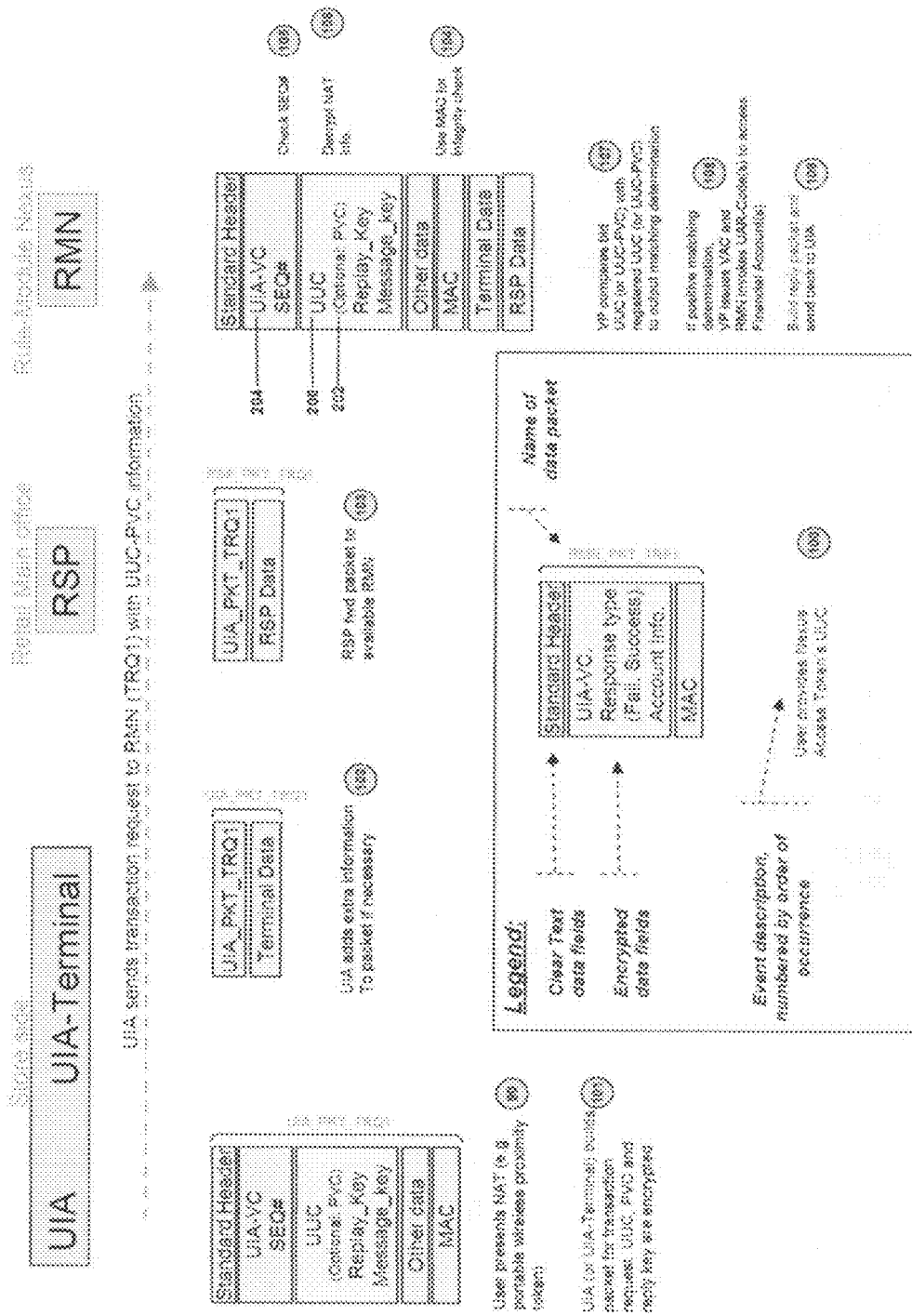
Figure 24:
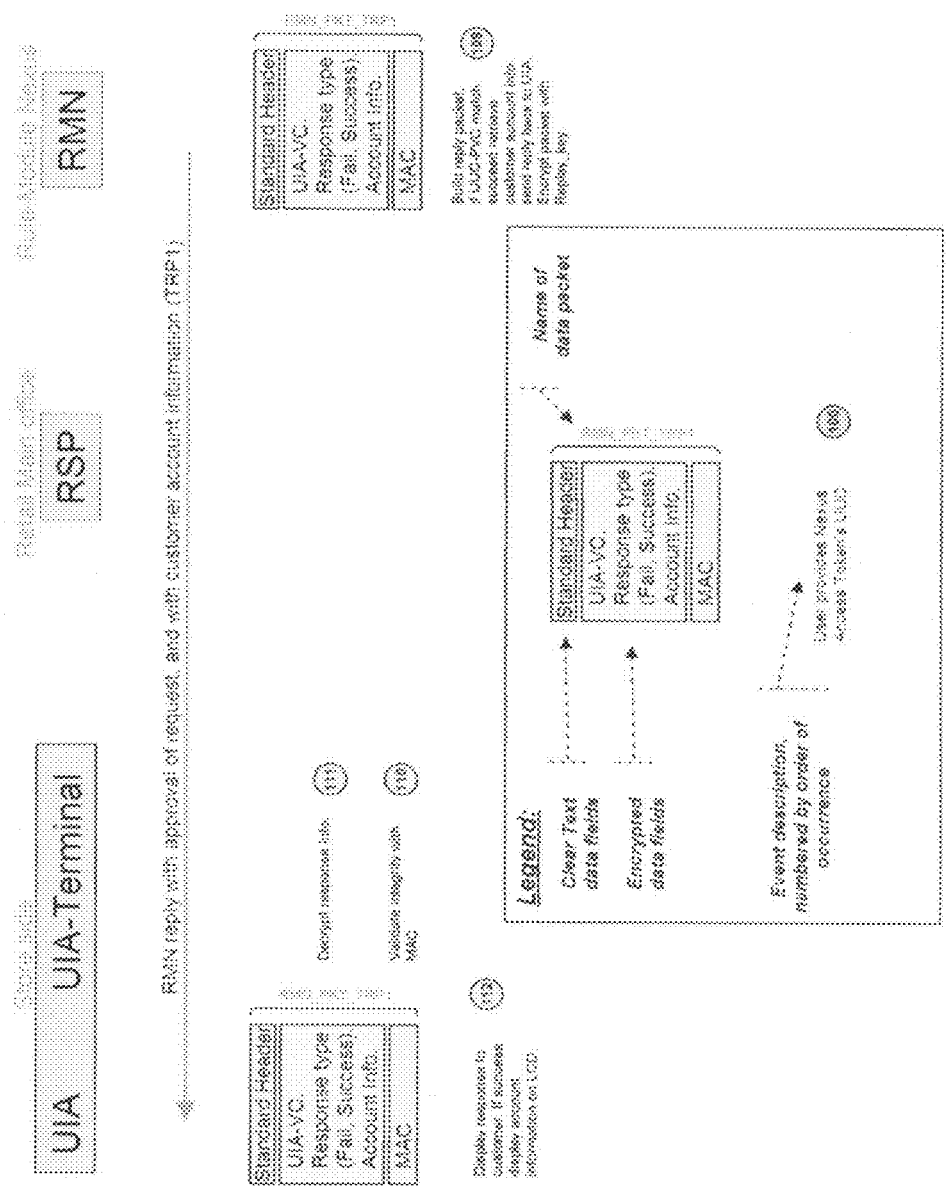

FIG. 19 through FIG. 21 show use-sensitive embodiments, with Master, Intermediary, and Local (or Subset) configurations.

One embodiment comprises at least one Master Verification Platform 12, one Master Rule-Module Nexus 14, which respectively comprise the entire set of all data registered with the RMN 14 or RMN-authorized Third-Party Platform 28. This embodiment further comprises at least two Local or Subset Verification Platforms 13, at least two Local or Subset Rule-Module Nexuses 17, that are physically apart from each other. Each Local or Subset Verification Platform 13, Local or Subset Rule-Module Nexus 17 and Local or Subset User Account Registry 19 may comprise a subset of the data contained respectively within the Master Verification Platform 12, Master Rule-Module Nexus 14. Data communications lines may allow electronic financial transactions to flow between each Local or Subset Verification Platform 13, Local or Subset Rule-Module Nexus 17 or Local or Subset User Account Registry 19, and the Master Verification Platform 12, Master Rule-Module Nexus 14 or Master User Account Registry 15.

In this embodiment, electronic financial transactions may first be sent to the Local or Subset Verification Platform 13, Local or Subset Rule-Module Nexus 17 or Local or Subset User Account Registry 19 for processing. If a party cannot be identified by the Local or Subset Verification Platform 13 or if the requisite Rule-Module 50 or Financial Account 65 is not contained, respectively, in the Local or Subset Rule-Module Nexus 17 or the Local or Subset User Account Registry 19, the electronic financial transaction is forwarded to the Master Verification Platform 12, the Master Rule-Module Nexus 14 or the Master User Account Registry 15. If the parties are identified properly by the Master Verification Platform 12 or if the requisite Rule-Module 50 or Financial Account 65 is located, respectively, in the Master Rule-Module Nexus 14 or the Master User Account Registry 15, the electronic financial transaction is processed appropriately. In addition, the User's verification information can be transmitted from the Master Verification Platform 12 to the Local or Subset Verification Platform 13, so that the next time the User will be successfully identified by the Local or Subset Verification Platform 13. This can likewise occur for the Master Rule-Module Nexus 14 and Local or Subset Rule-Module Nexuses 17, and Local or Subset Registries 17.

In another embodiment of a use-sensitive RMN 14 or RMN-authorized Third-Party Platform 28, the RMN 14 or RMN-authorized Third-Party Platform 28 further comprise a purge engine for deleting a party's User-customized information from the Local or Subset Verification Platform 13, the Local or Subset Rule-Module Nexus 17 or the Local or Subset User Account Registry 19 platforms. In order to store only records for those parties who use the RMN 14 or RMN-authorized Third-Party Platform 28 more than a prescribed frequency and prevent the overload of platforms with records from parties who use the RMN 14 or RMN-authorized Third-Party Platform 28 only occasionally, the record of a party is deleted from the Local or Subset Verification Platform 13, Local or Subset Rule-Module Nexus 17 or Local or Subset User Account Registry 19 platforms if there has been no attempt to verify the party upon expiration of a predetermined time limit.

In order to make communications between the Master RMN platforms 14 and the Local or Subset RMN platforms 17 secure, the RMN 14 or RMN-authorized Third-Party Platform 28 further comprises encryption and decryption means, wherein communications between the Master RMN platforms 14 and Local or Subset RMN platforms 17 are encrypted.

In an illustrative embodiment, within the Rule-Module Nexus of the use-sensitive embodiment, each Master Platform (or Master Computer) 10, each Intermediary Platform (or Intermediary Computer) 60, and each Local or Subset Platform (or Local or Subset Computer) 34, has electrical power backup and multiple redundancy in all of its critical hardware and platform systems.

External Computers or External Entity Platforms

In one embodiment, an Execution Command 52 optionally requires the RMN 14, including the Master Rule-Module Nexus 14 and the Execution Platform 38, to communicate with at least one external or Third-Party computer or platform 28 to conduct a User's financial transaction. For example, the Execution Platform 38 may need to communicate with: a banking or credit card entity; a merchant's purchasing incentives platform for generating financial; a financial counter-party's computers to determine the correct financial counter-party account for financial disbursal. In this embodiment, at least one Local or Subset Rule-Module Nexus 17 or at least one Local or Subset User Account Registry 19 is located within an external, Third-Party platform 28.

On-Line Network and Communications for Financial Transactions

Network transactions are characterized by verifying the User using a communications network such as the Internet, an intranet, or an extranet. The User's bid UUC 200 is submitted through the User's personal UIA 16, or through a public UIA 16 attached to an ATM or other public Terminal 2. Parties identified through a digital certificate are registered network entities, such as either the Account Issuer or the Account Issuer. The User is identified through UUCs 200 (or optionally UUCs 200—PVCs 202), while the Account Issuer or the Account Issuer, may be identified through the verification of a digital certificate issued by an authorized certifying authority.

In an illustrative embodiment, the User locates the Account Issuer by locating the participating Account Issuer's place of business on the network: the web site, using the network address of the Account Issuer. The User downloads the Account Issuer's digital certificate to the UIA 16 that the User is using. The UIA 16 verifies that the digital certificate provided by the Account Issuer is a valid certificate.

In one embodiment, the UIA 16 transmits the UUC 200 (or optionally the UUC 200—PVC 202) to the Master RMN 14 for verification, along with the Account Issuer's digital certificate.

Both parties verify the Financial Accounts 65 to be involved in the transaction. In an illustrative embodiment, this occurs at the Master RMN 14 using the selected Financial Account 65 included in the transaction by the User. The User's Financial Account 65 is thereby selected by the RMN 14.

In one embodiment, the UIA 16 is actually built-in and/or integrated with a personal Transaction Terminal 2 such as a home computer, or a public Transaction Terminal 2, for example an airport kiosk. In such an embodiment, the UIA-VCs 204 are not required to verify either party in a transaction.

FIG. 18F is illustrative of an embodiment wherein connectivity for a contactless communication between a NAT 62 and a UIA 16—Terminal 2 is optimized using Rule-Modules 50 and a Contactless Connectivity Registry (CCR) 30 via the NAT 62. A Subscriber Identification Module (SIM) card in the NAT 62 may be used to detect real-time availability of connectivity options, in order to select a default option based upon Rankings 96 of Rule-Modules 50 which take into account speed, cost, and security of connectivity options. In an illustrative embodiment, a NAT 62 may be dual-mode or multi-mode connectivity enabled (e.g., RFID and NFC; RFID, NFC and Cell network; etc.).

FIG. 18G is illustrative of an embodiment wherein routing for processing a financial transaction is optimized using Rule-Modules 50 and a Network Routing Registry (NRR) 31 via the RMN 14. Optionally, the RMN 14 provides "best routing" (e.g., lowest cost) for payment processing by directing the bank-owned "on us" transactions directly to the institution's host system for zero-cost payment fulfillment. Optionally, the RMN 14 also supports multiple payment processor options to reduce the risk of getting locked into a single processor.

In another embodiment, the User can be a representative of a business entity that has permission to access the business entity's Financial Accounts 65 to conduct direct transactions with a financial counter-party.

From the foregoing, it will be appreciated how the objectives and features of the invention are met. First, the invention provides an improved financial transaction computer system and method that eliminates the need for a User to possess and manage multiple tokens, in order to authorize a transaction.

Second, the invention provides a financial transaction computer system that is capable of online verification of a User's unique authority to access the Rule-Module Nexus by algorithmically combining their unique User code and personal verification code.

Third, the invention does not require any portable token to store any data which may directly identify or may directly access an online Financial Account of the User.

Fourth, the invention provides a cost-effective financial transaction system that is practical, convenient, and cost-effective to use and integrate with existing financial transaction systems.

Fifth, the invention provides a system of secured access to a financial computer system that is highly resistant to fraudulent transaction authorization attempts by unauthorized Users.

Sixth, the invention provides a financial transaction authorization system that enables a User to notify authorities that a particular access request is being coerced by a third party without giving notice to the third party of the notification.

Seventh, the invention provides a financial transaction system which verifies itself to the User for added security.

Although the description above contains many specificities, these should not be construed as limiting the scope of the invention but as merely providing illustrations of some of the presently illustrated embodiments of this invention. Thus the scope of this invention should be considered in light of the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

Although the invention has been described with respect to a particular system and method for its use, it will be appreciated that various modifications of the apparatus and method are possible without departing from the invention, which is defined by the claims set forth below.

I claim:

1. A method for on-line financial transactions, comprising the steps of:
    a. registering a user, comprising:
        (i) registering a plurality of rule-modules to a user within a rule-module nexus, said registered rule-module further comprising pattern data associated with an execution command;
        (ii) registering to the user within an online user account registry, a plurality of proprietary financial accounts, each comprising an account identifier, said account identifier further comprising: a code identifying an account issuer, as approved by the International Organization for Standardization [(Bank Identification Code, or BIC Code) or (Bank Identification Number, or BIN)]; a code identifying an account issuer, as approved by the Society for Worldwide Interbank Financial Telecommunications (SWIFT Address or SWIFT Code), and; a code identifying an account issuer, as approved by the American Banker's Association (ABA Routing Code);
    b. data-storing in a portable nexus access token, wherein a unique user code of the user is stored in the portable nexus access token, and wherein said unique user code is a thin-client data string, unique to a user, comprising data which does not directly identify a specific online financial account of the user;
    c. processing an on-line financial transaction, using the portable nexus access token and a user interface apparatus located remotely from the rule-module nexus, comprising:
        (i) verifying a user, wherein a user's authority to access the rule-module nexus is verified on-line by a verification platform using verification data provided via the user interface apparatus, said verification data comprising a bid unique user code provided directly from the portable nexus access token, and;
        (ii) accessing financial accounts, wherein upon the verification platform verifying the user is authorized to access the rule-module nexus, the rule-module nexus enables access to a plurality of proprietary financial accounts of the user for completing the on-line financial transaction;

Whereby, the portable nexus access token and the rule-module nexus provide an authorized user access to a plurality of proprietary financial accounts for processing an on-line financial transaction.

2. The method of claim 1, further comprising processing pan-portfolio analytics, comprising:
    a. accessing a plurality of proprietary financial accounts, wherein upon a verification platform verifying a party is authorized to access the online user account registry, the rule-module nexus invokes a rule-module governing the party's access to a plurality of proprietary financial accounts within the online user account registry;
    b. surveying financial data, wherein a pattern in processing a plurality of online financial transactions is detected by an authorized party via surveying financial data residing within the plurality of proprietary financial accounts;
    c. presenting analytics, wherein an analysis of a detected pattern is presented to the authorized party;

Whereby, pan-portfolio analytics are presented by an authorized party accessing a plurality of proprietary financial accounts in an online user account registry via a rule-module nexus.

3. The method of claim 2, wherein the analytics further comprises any of the following: a pattern of fraud; a pattern of product purchasing; a pattern of preferences for processing a financial transaction; a pattern of financial account selection; a pattern of rewards redemption; a pattern of user geographic locations; a pattern retailer locations; a pattern of costs in processing a financial transaction; Whereby pan-portfolio analytics are compiled via a plurality of otherwise inaccessible proprietary financial accounts being rendered accessible by the rule-module nexus.

4. The method of claim 3, wherein the pattern further comprises any of the following: a prior pattern; a real-time pattern; a predictive pattern.

5. The method of claim 1, wherein registering a user further comprises a plurality of rule-modules being registered to a user.

6. The method of claim 1, further comprising a user interface apparatus hardware verification code being verified by the verification platform, and the rule-module nexus invoking a rule-module, said rule-module comprising any of the following: accessing a financial account of a payee; a default electronic audible signature; a default electronic visible signature; a default financial account of a user; a private code of a user; predetermined criteria for tagging and ranking, in a certain order, a plurality of proprietary financial accounts of a user; a financial account routing code of a payee; transmitting payee data to the user interface apparatus, and; transmitting payee data to the portable nexus access token; settlement of the financial transaction wherein a financial account of the user is debited and a financial account of a payee is credited; a rewards incentive; an arbitrage rule-module, and; a financial transaction processing preference.

7. The method of claim 1, further comprising auto-populating a user's pattern data with a plurality of financial accounts, wherein auto-populating comprises:
electronically pulling a credit report of the user; selecting financial accounts contained in said credit report; automatically registering said selected financial accounts via the rule-module nexus.

8. The method of claim 7, wherein auto-populating communications occur via a network comprising any of the following: a cable network; a wireless network; a land-line phone network; the Internet; an intranet; a local area network, a wide area network; an electronic positioning network; a satellite network, and; an X.25 network.

9. A method for on-line financial transactions, comprising the steps of:
a. registering a user, wherein a rule-module is registered to a user within a rule-module nexus, said registered rule-module further comprising pattern data associated with an execution command, wherein the pattern data further comprises: a personal verification code (PVC); a secondary personal verification code; a unique user code, wherein said unique user code is a thin-client data string, unique to a user, comprising data which does not directly identify a specific online financial account of the user, and; a plurality of proprietary financial accounts;
b. associating a personal verification code, comprising: matching the personal verification code (PVC) with a live personal identification number (PIN) for processing a financial transaction of the user, and; translating the personal verification code (PVC) into a live personal identification number (PIN) for processing a financial transaction of the user;
c. data-storing in a portable nexus access token, wherein a unique user code of the user is stored in the portable nexus access token;
d. processing an on-line financial transaction, using the nexus access token and a user interface apparatus located remotely from the rule-module nexus, comprising:
(iii) verifying a user, wherein a user's authority to access the rule-module nexus is verified on-line by a verification platform using verification data provided via the user interface apparatus, said verification data comprising a bid unique user code provided directly from the portable nexus access token, and;
(iv) accessing financial accounts, wherein upon the verification platform verifying the user is authorized to access the rule-module nexus, the rule-module nexus enables access to a plurality of proprietary financial accounts of the user for completing the on-line financial transaction;

Whereby, the portable nexus access token and the rule-module nexus provide an authorized user access to a plurality of proprietary financial accounts for processing an on-line financial transaction.

10. The method of claim 9, further comprising forwarding a personal verification code (PVC), comprising any of the following: forwarding the PIN to a debit processing network, and authorizing a PIN-enabled debit financial transaction; forwarding the PVC to a debit financial transaction processing network, and authorizing a PIN-enabled debit financial transaction; forwarding the PVC to a financial transaction processing network and authorizing a PIN-enabled financial transaction; forwarding the PVC to a financial transaction processing network and authorizing a non-PIN enabled financial transaction.

11. A system for on-line financial transactions, comprising:
a. a first computer executable program tangibily embodied on a computer readable medium comprising
i. a rule-module nexus, configured to register a plurality of rule-modules to a user within a rule-module nexus, said rule-module further comprising pattern data associated with an execution command;
ii. an online user account registry, configured to register a plurality of proprietary financial accounts, each comprising an account identifier, said account identifier further comprising: a code identifying an account issuer, as approved by the International Organization for Standardization [(Bank Identification Code, or BIC Code) or (Bank Identification Number, or BIN)]; a code identifying an account issuer, as approved by the Society for Worldwide Interbank Financial Telecommunications (SWIFT Address or SWIFT Code), and; a code identifying an account issuer, as approved by the American Banker's Association (ABA Routing Code);
b. an on-line financial transaction processing platform, comprising:
i. a nexus access token configured to comprise: portability, and; storing a unique user code of the user, wherein said unique user code is a thin-client data string, unique to a user, comprising data which does not directly identify a specific online financial account of the user;
ii. a user interface apparatus located remotely from the rule-module nexus, configured to gather bid verification data of the user, said verification data comprising a bid unique user code provided directly from the nexus access token, and;
iii. a second computer executable program tangibly embodied on a computer readable medium comprising
1. a verification platform configured to verify a user on-line using the bid verification data, wherein a user's authority to access the rule-module nexus is verified, and;
2. a user account registry platform configured to access financial accounts via the rule-module nexus, wherein upon the verification platform verifying the user is authorized to access the rule-module nexus, the user is provided on-line access via the rule-module nexus to a plurality of proprietary financial accounts of the user for completing the on-line financial transaction;

Whereby, a nexus access token and a rule-module nexus provide an authorized user access to a plurality of proprietary financial accounts for processing an on-line financial transaction.

12. The system of claim 11, further comprising a pan-portfolio analytics processing platform, comprising:
a. means for accessing a plurality of proprietary financial accounts via the verification platform, the rule-module nexus, and the user account registry;
b. means for surveying financial data within said proprietary financial accounts, and detecting a pattern in processing a plurality of online financial transactions;
c. analytics presenting means, comprising means for presenting to the authorized party an analysis of a detected pattern;

Whereby, pan-portfolio analytics are presented by an authorized party accessing a plurality of proprietary financial accounts in an online user account registry via a rule-module nexus.

13. The system of claim 12, wherein the analytics further comprises any of the following: a pattern of fraud; a pattern of product purchasing; a pattern of preferences for processing a financial transaction; a pattern of financial account selection; a pattern of rewards redemption; a pattern of user geographic locations; a pattern retailer locations; a pattern of costs in processing a financial transaction.

14. The system of claim 13, wherein the pattern further comprises any of the following: a prior pattern; a real-time pattern; a predictive pattern.

15. The system of claim 11, further comprising an auto-population platform configured to auto-populate a user's pattern data with a plurality of financial accounts, comprising: electronically pulling a credit report of the user; selecting financial accounts contained in said credit report; automatically registering said selected financial accounts via the rule-module nexus.

16. The system of claim 15, wherein the auto-population platform auto-populates financial accounts via a network comprising any of the following: a cable network; a wireless network; a land-line phone network; the Internet; an intranet; a local area network, a wide area network; an electronic positioning network; a satellite network, and; an X.25 network.

17. The system of claim 11, the registration platform is further configured to comprise registering a plurality of rule-modules to a user.

18. The system of claim 11, further comprising the verification platform being configured to verify a user interface apparatus hardware verification code, and to invoke a a rule-module from the rule-module nexus, said rule-module comprising any of the following: accessing a financial account of a payee; a default electronic audible signature; a default electronic visible signature; a default financial account of a user; a private code of a user; predetermined criteria for tagging and ranking, in a certain order, a plurality of proprietary financial accounts of a user; a financial account routing code of a payee; transmitting payee data to the user interface apparatus, and; transmitting payee data to the nexus access token; settlement of the financial transaction wherein a financial account of the user is debited and a financial account of a payee is credited; a rewards incentive; an arbitrage rule-module, and; a financial transaction processing preference.

19. A system for on-line financial transactions, comprising:
a. a first computer executable program tangibily embodied on a computer readable medium comprising
  i. a registration platform, configured within a rule-module nexus to comprise registering a rule-module to a user, said rule-module further comprising pattern data associated with an execution command;
  ii. a personal verification code (PVC) association platform, comprising: matching means, wherein the personal verification code (PVC) is matched with a live personal identification number (PIN) for processing a financial transaction of the user, and; translating means, wherein the personal verification code is translated into a live personal identification number (PIN) for processing a financial transaction of the user;
b. a nexus access token, configured to comprise: portability, and; storing a unique user code of the user, wherein said unique user code is a thin-client data string, unique to a user, comprising data which does not directly identify a specific online financial account of the user;
c. an on-line financial transaction processing platform, comprising:
  i. a nexus access token;
  ii. a user interface apparatus located remotely from the rule-module nexus, configured to gather bid verification data of the user, said verification data comprising a bid unique user code provided directly from the nexus access token, and;
  iii. a second computer executable program tangibily embodied on a computer readable medium comprising
    1. a verification platform configured to verify a user on-line using the bid verification data, wherein a user's authority to access the rule-module nexus is verified, and;
    2. a user account registry platform configured to access financial accounts via the rule-module nexus, wherein upon the verification platform verifying the user is authorized to access the rule-module nexus, the user is provided on-line access via the rule-module nexus to a plurality of proprietary financial accounts of the user for completing the on-line financial transaction;

Whereby, a nexus access token and a rule-module nexus provide an authorized user access to a plurality of proprietary financial accounts for processing an on-line financial transaction.

20. The system of claim 19, further comprising a personal verification code (PVC) forwarding platform, comprising any of the following: forwarding means, wherein the PIN is forwarded to a debit processing network, and a PIN-enabled debit financial transaction is authorized, and; forwarding means, wherein the PVC is forwarded to a debit financial transaction processing network, and a PIN-enabled debit financial transaction is authorized; forwarding means, wherein the PVC is forwarded to a financial transaction processing network, and a PIN-enabled financial transaction is authorized; forwarding means, wherein the PVC is forwarded to a financial transaction processing network, and a non-PIN enabled financial transaction is authorized.

* * * * *